US012665988B2

(12) United States Patent
Rickwald et al.

(10) Patent No.: US 12,665,988 B2
(45) Date of Patent: Jun. 23, 2026

(54) DEVICES, METHODS, AND GRAPHICAL USER INTERFACES FOR DISPLAYING A REPRESENTATION OF A PERSON

(71) Applicant: Apple Inc., Cupertino, CA (US)

(72) Inventors: Jason D. Rickwald, Santa Cruz, CA (US); Giancarlo Yerkes, San Francisco, CA (US); Rupert Burton, San Francisco, CA (US); William A. Sorrentino, III, Mill Valley, CA (US); Peter D. Anton, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 18/582,474

(22) Filed: Feb. 20, 2024

(65) Prior Publication Data

US 2024/0372968 A1 Nov. 7, 2024

Related U.S. Application Data

(60) Provisional application No. 63/542,036, filed on Oct. 2, 2023, provisional application No. 63/528,400, filed on Jul. 23, 2023, provisional application No. 63/470,825, filed on Jun. 2, 2023, provisional application No. 63/464,125, filed on May 4, 2023, provisional application No. 63/463,830, filed on May 3, 2023.

(51) Int. Cl.
| | |
|---|---|
| *H04N 7/15* | (2006.01) |
| *G06T 13/40* | (2011.01) |
| *G06T 15/50* | (2011.01) |
| *G06V 40/16* | (2022.01) |

(52) U.S. Cl.
CPC ............. *H04N 7/157* (2013.01); *G06T 13/40* (2013.01); *G06T 15/50* (2013.01); *G06V 40/171* (2022.01)

(58) Field of Classification Search
CPC ...... H04N 7/157; G06V 40/171; G06T 13/40; G06T 15/50
See application file for complete search history.

(56) References Cited

U.S. PATENT DOCUMENTS

| | | | |
|---|---|---|---|
| 6,088,040 | A | 7/2000 | Oda et al. |
| 7,894,638 | B2 | 2/2011 | Nakada et al. |
| 8,254,647 | B1 | 8/2012 | Nechyba et al. |
| 8,498,453 | B1 | 7/2013 | Benson et al. |
| 8,601,379 | B2 | 12/2013 | Marks et al. |
| 9,035,999 | B2 | 5/2015 | Carpenter et al. |
| 9,083,844 | B2 | 7/2015 | Tamiya et al. |

(Continued)

FOREIGN PATENT DOCUMENTS

| | | |
|---|---|---|
| AU | 2020269590 A1 | 12/2021 |
| CN | 101472158 A | 7/2009 |

(Continued)

OTHER PUBLICATIONS

Invitation to Pay Search Fees received for European Patent Application No. 22706486.2, mailed on Jun. 11, 2025, 3 pages.

(Continued)

*Primary Examiner* — Olisa Anwah

(74) *Attorney, Agent, or Firm* — YHE Law LLP

(57) ABSTRACT

Techniques for displaying a representation of a person based on a background, viewing angle, and/or a mouth occlusion.

43 Claims, 53 Drawing Sheets

(56) References Cited

U.S. PATENT DOCUMENTS

| | | | |
|---|---|---|---|
| 9,104,908 B1 | 8/2015 | Rogers et al. | |
| 9,298,257 B2 | 3/2016 | Hwang et al. | |
| 9,547,763 B1 | 1/2017 | Avital | |
| 9,639,974 B2 | 5/2017 | Smith et al. | |
| 9,686,466 B1 | 6/2017 | Billinghurst et al. | |
| 9,747,716 B1 | 8/2017 | Mallet et al. | |
| 10,235,408 B1 | 3/2019 | Lao et al. | |
| 10,811,055 B1 | 10/2020 | Kimber et al. | |
| 10,861,248 B2 | 12/2020 | Scapel et al. | |
| 11,282,174 B1 | 3/2022 | Demaio | |
| 11,900,013 B2 * | 2/2024 | Tokuchi | G06T 7/70 |
| 2001/0033675 A1 | 10/2001 | Maurer et al. | |
| 2002/0135581 A1 | 9/2002 | Russell et al. | |
| 2005/0248582 A1 | 11/2005 | Scheepers et al. | |
| 2007/0003915 A1 | 1/2007 | Templeman | |
| 2007/0127844 A1 | 6/2007 | Watanabe | |
| 2008/0267459 A1 | 10/2008 | Nakada et al. | |
| 2009/0079813 A1 | 3/2009 | Hildreth | |
| 2009/0132371 A1 | 5/2009 | Strietzel et al. | |
| 2009/0195545 A1 | 8/2009 | Debevec et al. | |
| 2009/0202114 A1 | 8/2009 | Morin et al. | |
| 2009/0254843 A1 | 10/2009 | Van et al. | |
| 2009/0300525 A1 | 12/2009 | Jolliff et al. | |
| 2010/0035682 A1 | 2/2010 | Gentile et al. | |
| 2010/0153847 A1 | 6/2010 | Fama | |
| 2010/0322111 A1 | 12/2010 | Li | |
| 2011/0009241 A1 | 1/2011 | Lane et al. | |
| 2011/0025689 A1 | 2/2011 | Perez et al. | |
| 2011/0080356 A1 | 4/2011 | Kang et al. | |
| 2011/0175809 A1 | 7/2011 | Markovic et al. | |
| 2011/0248992 A1 | 10/2011 | Van et al. | |
| 2011/0306420 A1 | 12/2011 | Nishimoto et al. | |
| 2011/0306422 A1 | 12/2011 | Nishimoto et al. | |
| 2012/0069028 A1 | 3/2012 | Bouguerra | |
| 2012/0079377 A1 | 3/2012 | Goossens | |
| 2012/0079378 A1 | 3/2012 | Goossens | |
| 2012/0139830 A1 | 6/2012 | Hwang et al. | |
| 2012/0154557 A1 | 6/2012 | Perez et al. | |
| 2012/0289290 A1 | 11/2012 | Chae et al. | |
| 2013/0015946 A1 | 1/2013 | Lau et al. | |
| 2013/0044128 A1 | 2/2013 | Liu et al. | |
| 2013/0147933 A1 | 6/2013 | Kulas et al. | |
| 2013/0227651 A1 | 8/2013 | Schultz et al. | |
| 2013/0321412 A1 | 12/2013 | Coon et al. | |
| 2013/0342672 A1 | 12/2013 | Gray et al. | |
| 2014/0085293 A1 | 3/2014 | Konoplev et al. | |
| 2014/0085487 A1 | 3/2014 | Park et al. | |
| 2014/0092130 A1 | 4/2014 | Anderson et al. | |
| 2014/0152758 A1 | 6/2014 | Tong et al. | |
| 2014/0168217 A1 | 6/2014 | Kim et al. | |
| 2014/0198121 A1 | 7/2014 | Tong et al. | |
| 2014/0213318 A1 | 7/2014 | Leem et al. | |
| 2014/0218459 A1 | 8/2014 | Wenlong et al. | |
| 2014/0267311 A1 | 9/2014 | Evertt et al. | |
| 2014/0270351 A1 | 9/2014 | Hoof et al. | |
| 2014/0324600 A1 | 10/2014 | Soffin | |
| 2014/0358475 A1 | 12/2014 | Boulkenafed et al. | |
| 2014/0361974 A1 | 12/2014 | Li et al. | |
| 2014/0362091 A1 | 12/2014 | Bouaziz et al. | |
| 2015/0024592 A1 | 1/2015 | Chandrashekar et al. | |
| 2015/0029097 A1 | 1/2015 | Craig | |
| 2015/0052462 A1 | 2/2015 | Kulkarni | |
| 2015/0084950 A1 | 3/2015 | Li et al. | |
| 2015/0172238 A1 | 6/2015 | Ahmed et al. | |
| 2015/0172584 A1 | 6/2015 | Park et al. | |
| 2015/0213307 A1 | 7/2015 | Beeler et al. | |
| 2015/0312185 A1 | 10/2015 | Langholz et al. | |
| 2015/0312523 A1 | 10/2015 | Li et al. | |
| 2015/0325029 A1 | 11/2015 | Li et al. | |
| 2015/0334292 A1 | 11/2015 | Tartz et al. | |
| 2015/0346912 A1 | 12/2015 | Yang et al. | |
| 2015/0348269 A1 | 12/2015 | Dedhia et al. | |
| 2015/0350125 A1 | 12/2015 | Henderson | |
| 2016/0005206 A1 | 1/2016 | Li et al. | |
| 2016/0006987 A1 | 1/2016 | Li et al. | |
| 2016/0042548 A1 | 2/2016 | Du et al. | |
| 2016/0050169 A1 | 2/2016 | Ben Atar et al. | |
| 2016/0105388 A1 | 4/2016 | Bin Mahfooz et al. | |
| 2016/0110593 A1 | 4/2016 | Hoof et al. | |
| 2016/0110922 A1 | 4/2016 | Haring | |
| 2016/0134840 A1 | 5/2016 | Mcculloch | |
| 2016/0163084 A1 | 6/2016 | Corazza et al. | |
| 2016/0191958 A1 | 6/2016 | Nauseef et al. | |
| 2016/0227115 A1 | 8/2016 | Bin Mahfooz et al. | |
| 2016/0247308 A1 | 8/2016 | Jiao et al. | |
| 2016/0267699 A1 | 9/2016 | Borke et al. | |
| 2016/0284123 A1 | 9/2016 | Hare et al. | |
| 2016/0291822 A1 | 10/2016 | Ahuja et al. | |
| 2016/0292901 A1 | 10/2016 | Li et al. | |
| 2016/0292903 A1 | 10/2016 | Li et al. | |
| 2016/0328874 A1 | 11/2016 | Tong et al. | |
| 2016/0328875 A1 | 11/2016 | Fang et al. | |
| 2016/0328876 A1 | 11/2016 | Tong et al. | |
| 2016/0350957 A1 | 12/2016 | Woods et al. | |
| 2017/0007183 A1 | 1/2017 | Dusan et al. | |
| 2017/0018289 A1 | 1/2017 | Morgenstern | |
| 2017/0046045 A1 | 2/2017 | Tung et al. | |
| 2017/0046065 A1 | 2/2017 | Zeng et al. | |
| 2017/0069124 A1 | 3/2017 | Tong et al. | |
| 2017/0076142 A1 | 3/2017 | Chang | |
| 2017/0080346 A1 | 3/2017 | Abbas | |
| 2017/0083524 A1 | 3/2017 | Huang et al. | |
| 2017/0083586 A1 | 3/2017 | Huang et al. | |
| 2017/0098122 A1 | 4/2017 | El Kaliouby et al. | |
| 2017/0132828 A1 | 5/2017 | Zelenin et al. | |
| 2017/0140214 A1 | 5/2017 | Matas et al. | |
| 2017/0160819 A1 | 6/2017 | Yi et al. | |
| 2017/0206694 A1 | 7/2017 | Jiao et al. | |
| 2017/0285764 A1 | 10/2017 | Kim et al. | |
| 2018/0047200 A1 | 2/2018 | O'Hara et al. | |
| 2018/0063603 A1 | 3/2018 | Tang et al. | |
| 2018/0101227 A1 | 4/2018 | Frueh et al. | |
| 2018/0144746 A1 * | 5/2018 | Mishra | G06V 40/172 |
| 2018/0157901 A1 | 6/2018 | Arbatman et al. | |
| 2018/0165862 A1 | 6/2018 | Sawaki | |
| 2018/0189549 A1 | 7/2018 | Inomata | |
| 2018/0225263 A1 | 8/2018 | Zhong et al. | |
| 2018/0232934 A1 | 8/2018 | Schmidt | |
| 2018/0335927 A1 | 11/2018 | Anzures et al. | |
| 2018/0335929 A1 | 11/2018 | Scapel et al. | |
| 2018/0335930 A1 | 11/2018 | Scapel et al. | |
| 2018/0336715 A1 | 11/2018 | Rickwald et al. | |
| 2018/0365904 A1 | 12/2018 | Holmes | |
| 2019/0079597 A1 | 3/2019 | Kada et al. | |
| 2019/0080066 A1 | 3/2019 | Van Os et al. | |
| 2019/0080070 A1 | 3/2019 | Van Os et al. | |
| 2019/0080072 A1 | 3/2019 | Van Os et al. | |
| 2019/0080189 A1 | 3/2019 | Van Os et al. | |
| 2019/0088018 A1 | 3/2019 | Shenton et al. | |
| 2019/0094981 A1 | 3/2019 | Bradski et al. | |
| 2019/0096106 A1 | 3/2019 | Shapiro et al. | |
| 2019/0160378 A1 | 5/2019 | Fajt et al. | |
| 2019/0188895 A1 | 6/2019 | Miller et al. | |
| 2019/0199761 A1 | 6/2019 | Felman | |
| 2019/0278894 A1 | 9/2019 | Andalo et al. | |
| 2019/0340419 A1 | 11/2019 | Milman et al. | |
| 2019/0370448 A1 | 12/2019 | Devine et al. | |
| 2019/0370583 A1 | 12/2019 | Van Os et al. | |
| 2020/0051304 A1 | 2/2020 | Choi et al. | |
| 2020/0053262 A1 | 2/2020 | Wexler et al. | |
| 2020/0074711 A1 | 3/2020 | Barlier et al. | |
| 2020/0082135 A1 | 3/2020 | Tagawa et al. | |
| 2020/0082157 A1 | 3/2020 | Susskind et al. | |
| 2020/0104620 A1 | 4/2020 | Cohen et al. | |
| 2020/0110864 A1 | 4/2020 | Casado et al. | |
| 2020/0117270 A1 | 4/2020 | Gibson et al. | |
| 2020/0134383 A1 | 4/2020 | Rhee et al. | |
| 2020/0175772 A1 | 6/2020 | Hariton | |
| 2020/0193669 A1 | 6/2020 | Churchill et al. | |
| 2020/0202625 A1 | 6/2020 | Jones et al. | |
| 2020/0302669 A1 | 9/2020 | Barlier et al. | |
| 2020/0311429 A1 | 10/2020 | Chen | |
| 2021/0019541 A1 | 1/2021 | Wang et al. | |
| 2021/0056747 A1 | 2/2021 | Hefny et al. | |

(56) References Cited

U.S. PATENT DOCUMENTS

| | | |
|---|---|---|
| 2021/0089136 A1 | 3/2021 | Hossain et al. |
| 2021/0097766 A1 | 4/2021 | Palangie et al. |
| 2021/0097875 A1 | 4/2021 | Alexander et al. |
| 2021/0110015 A1 | 4/2021 | Mccarty et al. |
| 2021/0192187 A1 | 6/2021 | Kim et al. |
| 2021/0264656 A1 | 8/2021 | Barlier et al. |
| 2021/0312167 A1 | 10/2021 | Shirai |
| 2021/0312684 A1 | 10/2021 | Zimmermann et al. |
| 2021/0382544 A1 | 12/2021 | Butcher et al. |
| 2021/0407215 A1 | 12/2021 | Evangelista et al. |
| 2022/0012922 A1 | 1/2022 | Ishikawa |
| 2022/0020220 A1 | 1/2022 | Lehman |
| 2022/0083636 A1 | 3/2022 | Sarkis et al. |
| 2022/0084279 A1 | 3/2022 | Lindmeier et al. |
| 2022/0105389 A1 | 4/2022 | Lianides et al. |
| 2022/0134234 A1 | 5/2022 | Sachson et al. |
| 2022/0137724 A1 | 5/2022 | Schliemann et al. |
| 2022/0147148 A1 | 5/2022 | Begley |
| 2022/0262080 A1 | 8/2022 | Burton et al. |
| 2022/0343934 A1* | 10/2022 | Lynch .................. G10L 21/034 |
| 2022/0351549 A1 | 11/2022 | Van Os et al. |
| 2022/0366626 A1 | 11/2022 | Miller et al. |
| 2023/0090342 A1 | 3/2023 | Barlier et al. |
| 2023/0103161 A1 | 3/2023 | Li et al. |
| 2023/0171484 A1 | 6/2023 | Dedonato et al. |
| 2023/0229283 A1 | 7/2023 | Long et al. |
| 2023/0316674 A1 | 10/2023 | Boesel et al. |
| 2023/0350489 A1 | 11/2023 | Butcher et al. |
| 2023/0384860 A1 | 11/2023 | Dedonato et al. |
| 2024/0077937 A1 | 3/2024 | Rickwald et al. |
| 2024/0078846 A1 | 3/2024 | Chyn et al. |
| 2024/0393871 A1 | 11/2024 | Thiebot et al. |
| 2024/0395073 A1 | 11/2024 | Huergo Wagner et al. |
| 2025/0022237 A1 | 1/2025 | Burton et al. |
| 2025/0029344 A1 | 1/2025 | Li et al. |
| 2025/0103132 A1 | 3/2025 | Rickwald et al. |
| 2025/0216931 A1 | 7/2025 | Butcher et al. |
| 2025/0245942 A1 | 7/2025 | Boesel et al. |

FOREIGN PATENT DOCUMENTS

| | | |
|---|---|---|
| CN | 101930284 A | 12/2010 |
| CN | 102479388 A | 5/2012 |
| CN | 102999934 A | 3/2013 |
| CN | 103116902 A | 5/2013 |
| CN | 103886632 A | 6/2014 |
| CN | 104011738 A | 8/2014 |
| CN | 104115503 A | 10/2014 |
| CN | 104170318 A | 11/2014 |
| CN | 104170358 A | 11/2014 |
| CN | 105139438 A | 12/2015 |
| CN | 105374055 A | 3/2016 |
| CN | 105528805 A | 4/2016 |
| CN | 106575444 A | 4/2017 |
| EP | 2394711 A1 | 12/2011 |
| EP | 2492873 B1 | 9/2013 |
| EP | 3531377 A1 | 8/2019 |
| EP | 3627450 A1 | 3/2020 |
| EP | 3537378 B1 | 11/2021 |
| JP | 10-116351 A | 4/1998 |
| JP | 2001-334071 A | 12/2001 |
| JP | 2004-287558 A | 10/2004 |
| JP | 2006-65683 A | 3/2006 |
| JP | 2008-27086 A | 2/2008 |
| JP | 2011-70623 A | 4/2011 |
| JP | 2011-186816 A | 9/2011 |
| JP | 2011-258159 A | 12/2011 |
| JP | 2012-223357 A | 11/2012 |
| JP | 2013-97814 A | 5/2013 |
| JP | 5219184 B2 | 6/2013 |
| JP | 2014-149856 A | 8/2014 |
| JP | 2014-225801 A | 12/2014 |
| JP | 2015-75915 A | 4/2015 |
| JP | 2016-528571 A | 9/2016 |
| JP | 2017-531228 A | 10/2017 |
| JP | 2018-84878 A | 5/2018 |
| JP | 2018-109924 A | 7/2018 |
| JP | 6535699 B2 | 6/2019 |
| JP | 2019-192266 A | 10/2019 |
| JP | 2019-204494 A | 11/2019 |
| JP | 2020-525868 A | 8/2020 |
| JP | 2020-156919 A | 10/2020 |
| JP | 2020-194546 A | 12/2020 |
| JP | 2021-47864 A | 3/2021 |
| JP | 2021-527998 A | 10/2021 |
| KR | 10-2011-0014224 A | 2/2011 |
| KR | 10-2011-0063741 A | 6/2011 |
| KR | 10-2011-0089429 A | 8/2011 |
| KR | 10-2012-0006610 A | 1/2012 |
| KR | 10-2012-0018479 A | 3/2012 |
| KR | 10-2012-0047616 A | 5/2012 |
| KR | 10-2012-0130627 A | 12/2012 |
| KR | 10-2013-0032620 A | 4/2013 |
| KR | 10-2014-0039737 A | 4/2014 |
| KR | 10-2017-0007285 A | 1/2017 |
| KR | 10-2017-0012384 A | 2/2017 |
| KR | 10-2017-0067077 A | 6/2017 |
| KR | 10-2020-0044983 A | 4/2020 |
| KR | 10-2020-0117685 A | 10/2020 |
| WO | 2010/037956 A1 | 4/2010 |
| WO | 2010/059306 A2 | 5/2010 |
| WO | 2010/143359 A1 | 12/2010 |
| WO | 2013/097139 A1 | 7/2013 |
| WO | 2013/097264 A1 | 7/2013 |
| WO | 2013/152453 A1 | 10/2013 |
| WO | 2013/152454 A1 | 10/2013 |
| WO | 2014/094199 A1 | 6/2014 |
| WO | 2015/064144 A1 | 5/2015 |
| WO | 2015/065928 A1 | 5/2015 |
| WO | 2015/167590 A1 | 11/2015 |
| WO | 2016/026402 A2 | 2/2016 |
| WO | 2016/101132 A1 | 6/2016 |
| WO | 2017/013936 A1 | 1/2017 |
| WO | 2017/015949 A1 | 2/2017 |
| WO | 2017/043314 A1 | 3/2017 |
| WO | 2018/226265 A1 | 12/2018 |
| WO | 2019/176236 A1 | 9/2019 |
| WO | 2019/217177 A1 | 11/2019 |
| WO | 2019/220742 A1 | 11/2019 |
| WO | 2020/075308 A1 | 4/2020 |
| WO | 2020/112561 A1 | 6/2020 |
| WO | 2020/129959 A1 | 6/2020 |
| WO | 2021/071532 A1 | 4/2021 |
| WO | 2021/145067 A1 | 7/2021 |

OTHER PUBLICATIONS

Office Action received for European Patent Application No. 22706486.2, mailed on Oct. 15, 2025, 8 pages.

Applicant-Initiated Interview Summary received for U.S. Appl. No. 17/667,350, mailed on May 24, 2024, 4 pages.

Applicant-Initiated Interview Summary received for U.S. Appl. No. 18/220,200, mailed on Jul. 17, 2024, 2 pages.

Applicant-Initiated Interview Summary received for U.S. Appl. No. 18/241,802, mailed on Jul. 17, 2024, 6 pages.

Chun et al., "3D face pose estimation by a robust real time tracking of facial features", Multimedia Tools and Applications, Kluwer Academic Publishers, Boston, US vol. 75, No. 23, Available online at 10.1007/S11042-014-2356-9, Nov. 18, 2014, pp. 15693-15708.

Chun et al., "Real-Time Face Pose Tracking and Facial Expression Synthesizing for the Animation of 3D Avatar", Technologies For E-Learning and Digital Entertainment, Springer Berlin Heidelberg, Jun. 11, 2007, pp. 191-201.

Corrected Notice of Allowance received for U.S. Appl. No. 18/071,434, mailed on Apr. 24, 2024, 2 pages.

Corrected Notice of Allowance received for U.S. Appl. No. 18/071,434, mailed on Mar. 21, 2024, 2 pages.

Corrected Notice of Allowance received for U.S. Appl. No. 18/071,434, mailed on May 29, 2024, 2 pages.

Decision to Grant received for European Patent Application No. 18732519.6, mailed on Mar. 28, 2024, 4 pages.

(56)                    References Cited

OTHER PUBLICATIONS

Extended European Search Report received for European Patent Application No. 24165004.3, mailed on Jul. 5, 2024, 8 pages.

Final Office Action received for U.S. Appl. No. 17/667,350, mailed on Mar. 21, 2024, 19 pages.

Final Office Action received for U.S. Appl. No. 18/220,200, mailed on Aug. 23, 2024, 39 pages.

Intention to Grant received for European Patent Application No. 18703184.4, mailed on Jul. 24, 2024, 12 pages.

International Preliminary Report on Patentability received for PCT Patent Application No. PCT/US2022/044194, mailed on Apr. 4, 2024, 12 pages.

International Preliminary Report on Patentability received for PCT Patent Application No. PCT/US2022/050799, mailed on Jun. 13, 2024, 10 pages.

International Search Report and Written Opinion received for PCT Patent Application No. PCT/US2023/031979, mailed on Mar. 12, 2024, 16 pages.

International Search Report and Written Opinion received for PCT Patent Application No. PCT/US2024/025380, mailed on Sep. 23, 2024, 23 pages.

Invitation to Pay Additional Fees and Partial International Search Report received for PCT Patent Application No. PCT/US2024/025380, mailed on Aug. 1, 2024, 15 pages.

Non-Final Office Action received for U.S. Appl. No. 17/944,911, mailed on Mar. 26, 2024, 11 pages.

Non-Final Office Action received for U.S. Appl. No. 17/988,532, mailed on Jun. 21, 2024, 32 pages.

Office Action received for U.S. Appl. No. 18/220,200, mailed on Mar. 27, 2024, 38 pages.

Office Action received for U.S. Appl. No. 18/241,802, mailed on May 17, 2024, 57 pages.

Of Allowance received for Japanese Patent Application No. 2022-573765, mailed on Aug. 9, 2024, 4 pages (1 page of English Translation and 3 pages of Official Copy).

Of Allowance received for U.S. Appl. No. 17/667,350, mailed on Jul. 8, 2024, 10 pages.

Of Allowance received for U.S. Appl. No. 17/944,911, mailed on Jul. 9, 2024, 10 pages.

Of Allowance received for U.S. Appl. No. 18/071,434, mailed on May 20, 2024, 9 pages.

Action received for Chinese Patent Application No. 201880004632.1, mailed on Apr. 3, 2024, 13 pages (7 pages of English Translation and 6 pages of Official Copy).

Action received for Chinese Patent Application No. 201880004632.1, mailed on Jul. 16, 2024, 11 pages (5 pages of English Translation and 6 pages of Official Copy).

Action received for European Patent Application No. 19186042.8, mailed on Jul. 18, 2024, 8 pages.

Action received for European Patent Application No. 19211833.9, mailed on Aug. 23, 2024, 5 pages.

Action received for European Patent Application No. 21733268.3, mailed on Jun. 13, 2024, 4 pages.

Action received for European Patent Application No. 21733268.3, mailed on Jun. 25, 2024, 4 pages.

Office Action received for Indian Patent Application No. 202218005498, mailed on May 31, 2024, 6 pages.

Office Action received for Japanese Patent Application No. 2021-173713, mailed on Jun. 18, 2024, 4 pages (2 pages of English Translation and 2 pages of Official Copy).

Office Action received for Japanese Patent Application No. 2023-169627, mailed on Jul. 29, 2024, 4 pages (2 pages of English Translation and 2 pages of Official Copy).

Office Action received for Japanese Patent Application No. 2023-548256, mailed on Aug. 5, 2024, 8 pages (4 pages of English Translation and 4 pages of Official Copy).

Office Action received for Korean Patent Application No. 10-2024-7023682, mailed on Aug. 5, 2024, 6 pages (2 pages of English Translation and 4 pages of Official Copy).

Applicant-Initiated Interview Summary received for U.S. Appl. No. 18/220,200, mailed on Nov. 15, 2024, 2 pages.

Corrected Notice of Allowance received for U.S. Appl. No. 18/241,802, mailed on Oct. 22, 2024, 9 pages.

Decision on Appeal received for Japanese Patent Application No. 2021-173713, mailed on Nov. 5, 2024, 8 pages (1 page of English Translation and 7 pages of Official Copy).

Decision to Grant received for European Patent Application No. 18703184.4, mailed on Nov. 21, 2024, 4 pages.

Decision to Grant received for Japanese Patent Application No. 2023-169627, mailed on Nov. 5, 2024, 3 pages (1 page of English Translation and 2 pages of Official Copy).

Decision to Grant received for Japanese Patent Application No. 2023-548256, mailed on Feb. 17, 2025, 3 pages (1 pages of English Translation and 2 pages of Official Copy).

Final Office Action received for U.S. Appl. No. 17/988,532, mailed on Dec. 9, 2024, 35 pages.

Intention to Grant received for European Patent Application No. 21733268.3, mailed on Nov. 20, 2024, 9 pages.

International Preliminary Report on Patentability received for PCT Patent Application No. PCT/US2023/017484, mailed on Oct. 17, 2024, 21 pages.

International Preliminary Report on Patentability received for PCT Patent Application No. PCT/US2023/023273, mailed on Dec. 5, 2024, 13 pages.

International Search Report and Written Opinion received for PCT Patent Application No. PCT/US2024/028208, mailed on Nov. 13, 2024, 20 pages.

Invitation to Pay Additional Fees and Partial International Search Report received for PCT Patent Application No. PCT/US2024/028208, mailed on Sep. 23, 2024, 12 pages.

Notice of Allowance received for U.S. Appl. No. 18/125,600, mailed on Jan. 23, 2025, 13 pages.

Notice of Allowance received for U.S. Appl. No. 18/220,200, mailed on Jan. 21, 2025, 10 pages.

Notice of Allowance received for U.S. Appl. No. 18/241,802, mailed on Dec. 4, 2024, 12 pages.

Notice of Allowance received for U.S. Appl. No. 18/241,802, mailed on Oct. 8, 2024, 11 pages.

Office Action received for Australian Patent Application No. 2024200190, mailed on Jan. 15, 2025, 3 pages.

Office Action received for Australian Patent Application No. 2024200460, mailed on Nov. 14, 2024, 3 pages.

Office Action received for European Patent Application No. 19186042.8, mailed on Nov. 13, 2024, 7 pages.

Office Action received for European Patent Application No. 24165004.3, mailed on Dec. 5, 2024, 5 pages.

Office Action received for Japanese Patent Application No. 2023-548256, mailed on Nov. 11, 2024, 6 pages (3 pages of English Translation and 3 pages of Official Copy).

Office Action received for Japanese Patent Application No. 2024-531175, mailed on Feb. 3, 2025, 4 pages (2 pages of English Translation and 2 pages of Official Copy).

Office Action received for Korean Patent Application No. 10-2022-7041713, mailed on Oct. 28, 2024, 11 pages (5 pages of English Translation and 6 pages of Official Copy).

Supplemental Notice of Allowance received for U.S. Appl. No. 18/220,200, mailed Feb. 7, 2025, 2 pages.

Supplemental Notice of Allowance received for U.S. Appl. No. 18/220,200, mailed on Jan. 29, 2025, 2 pages.

Corrected Notice of Allowance received for U.S. Appl. No. 18/241,802, mailed on Mar. 28, 2025, 9 pages.

International Preliminary Report on Patentability received for PCT Patent Application No. PCT/US2023/031979, mailed on Mar. 20, 2025, 11 pages.

Notice of Allowance received for Japanese Patent Application No. 2024-531175, mailed on Mar. 31, 2025, 4 pages (1 page of English Translation and 3 pages of Official Copy).

Applicant-Initiated Interview Summary received for U.S. Appl. No. 17/988,532, mailed on Mar. 7, 2025, 5 pages.

Non-Final Office Action received for U.S. Appl. No. 17/988,532, mailed on Mar. 26, 2025, 39 pages.

(56) References Cited

OTHER PUBLICATIONS

Corrected Notice of Allowance received for U.S. Appl. No. 18/125,600, mailed on Apr. 17, 2025, 5 pages.

Applicant-Initiated Interview Summary received for U.S. Appl. No. 18/737,710, mailed on May 22, 2025, 3 pages.

Office Action received for Australian Patent Application No. 2022398468, mailed on May 30, 2025, 4 pages.

Final Office Action received for U.S. Appl. No. 17/988,532, mailed on Sep. 4, 2025, 42 pages.

Notice of Acceptance received for Australian Patent Application No. 2022398468, mailed on Sep. 10, 2025, 3 pages.

Notice of Allowance received for Korean Patent Application No. 10-2024-7018090, mailed on Aug. 21, 2025, 7 pages (2 pages of English Translation and 5 pages of Official Copy).

Office Action received for European Patent Application No. 22787099. 5, mailed on Sep. 1, 2025, 7 pages.

A Day in the Life of Mike, "#SnapChat Vs #Msqrd", Available Online at: <https://www.youtube.com/watch?v=vS_1mrWXmC8>, See especially 4:22-6:05, Mar. 9, 2016, 4 pages.

Alldieck et al., "Learning to Reconstruct People in Clothing from a Single RGB Camera", Rxiv.Org, Cornell University Library, 201 Olin Library Cornell University Ithaca, Ny 14853, 2019, 12 pages.

Androidslide, "Camera Zoom FX", Available at: <https://www. youtube.com/watch?v=AHmPn8y74wY>, Nov. 5, 2011, 3 pages.

Appes, Stela, "Gif Me! Camera [Android] Video review by Stelapps", Available Online at: <https://www.youtube.com/watch?v= uae0xUucOyY>, Jul. 17, 2014, 3 pages.

Applicant-Initiated Interview Summary received for U.S. Appl. No. 15/940,017, mailed on Dec. 26, 2019, 5 pages.

Applicant-Initiated Interview Summary received for U.S. Appl. No. 15/940,017, mailed on Jun. 30, 2020, 5 pages.

Applicant-Initiated Interview Summary received for U.S. Appl. No. 17/220,752, mailed on Jul. 22, 2022, 3 pages.

Applicant-Initiated Interview Summary received for U.S. Appl. No. 17/337,164, mailed on Nov. 23, 2022, 2 pages.

Applicant-Initiated Interview Summary received for U.S. Appl. No. 17/667,350, mailed on Jan. 18, 2024, 4 pages.

Applicant-Initiated Interview Summary received for U.S. Appl. No. 17/667,350, mailed on May 31, 2023, 4 pages.

Applicant-Initiated Interview Summary received for U.S. Appl. No. 17/667,350, mailed on Sep. 20, 2023, 4 pages.

Beyouravatar, "Faceshift studio tutorial part 4.8: tracking—fbx export", Available online at: https://www.youtube.com/watch?v=_ yqmc9yzKLM, Nov. 19, 2012, 3 pages.

Chan et al., "FrontFace", Facilitating Communication Between HMD Users and Outsiders Using Front-Facing-Screen HMDs, Sep. 4-7, 2017, 5 pages.

Chicaview, "What is New! Make Funny GIFs Clips—Gif Me (Phone App)", Available online at: <https://www.youtube.com/ watch?v=0LPGSFFP-V0>, See especially 1:15-2:25, Sep. 20, 2016, 3 pages.

Corrected Notice of Allowance received for U.S. Appl. No. 15/940,017, mailed on Aug. 27, 2020, 2 pages.

Corrected Notice of Allowance received for U.S. Appl. No. 15/940,017, mailed on Oct. 21, 2020, 3 pages.

Corrected Notice of Allowance received for U.S. Appl. No. 15/981,754, mailed on Oct. 15, 2019, 2 pages.

Corrected Notice of Allowance received for U.S. Appl. No. 15/981,754, mailed on Oct. 24, 2019, 2 pages.

Corrected Notice of Allowance received for U.S. Appl. No. 16/676,087, mailed on Aug. 3, 2020, 2 pages.

Corrected Notice of Allowance received for U.S. Appl. No. 16/676,087, mailed on Aug. 19, 2020, 2 pages.

Corrected Notice of Allowance received for U.S. Appl. No. 16/676,087, mailed on Jul. 8, 2020, 2 pages.

Corrected Notice of Allowance received for U.S. Appl. No. 16/896,457, mailed on Apr. 6, 2021, 3 pages.

Corrected Notice of Allowance received for U.S. Appl. No. 16/896,457, mailed on Feb. 24, 2021, 2 pages.

Corrected Notice of Allowance received for U.S. Appl. No. 16/896,457, mailed on Jan. 28, 2021, 2 pages.

Corrected Notice of Allowance received for U.S. Appl. No. 17/220,752, mailed on Oct. 14, 2022, 2 pages.

Decision to Grant received for Danish Patent Application No. PA201770720, mailed on Aug. 8, 2019, 2 pages.

Decision to Grant received for Danish Patent Application No. PA201770721, mailed on Jun. 17, 2019, 2 pages.

Decision to Grant received for Danish Patent Application No. PA201870381, mailed on Oct. 14, 2019, 2 pages.

Decision to Grant received for Japanese Patent Application No. 2019-563408, mailed on Aug. 25, 2021, 3 pages (1 page of English Translation and 2 pages of Official Copy).

European Search Report received for European Patent Application No. 19186042.8, mailed on Sep. 12, 2019, 4 pages.

European Search Report received for European Patent Application No. 19211833.9, mailed on Jul. 1, 2020, 4 pages.

FaceRig, "FaceRig Mobile Selfie Tip", Available online at: https:// www.youtube.com/watch?v=x3DZHnXWZ3U, Oct. 18, 2016, 3 pages.

FaceRig, "FaceRig Mobile Tip: How to record with and without the camera feed", Available Online at: https://www.youtube.com/watch? v=Iwk9FIWGvVM, Nov. 8, 2016, 3 pages.

Final Office Action received for U.S. Appl. No. 15/870,195, mailed on Dec. 13, 2018, 27 pages.

Final Office Action received for U.S. Appl. No. 15/940,017, mailed on Apr. 15, 2020, 19 pages.

Final Office Action received for U.S. Appl. No. 15/940,017, mailed on Dec. 20, 2018, 17 pages.

Final Office Action received for U.S. Appl. No. 15/940,232, mailed on Jan. 10, 2019, 27 pages.

Final Office Action received for U.S. Appl. No. 17/667,350, mailed on Jul. 26, 2023, 19 pages.

Giphy Inc. Communication, "Giphy Cam. The GIF Camera", Available at: <https://web.archive.org/web/20170309234909/https://play. google.com/store/apps/details?id=com.giphy.camera>, Mar. 9, 2017, pp. 1-3.

Holotech Studios Entertainment, "FaceRig", Available at: <https:// web.archive.org/web/20161120090627/https://play.google.com/store/ apps/details?id=com.holotech.facerig&hl=da>, Nov. 9, 2016, 3 pages.

How to Use MSQRD, Available Online at: <https://web.archive. org/web/20160505072814/https:/www.wikihow.com/Use-MSQRD>, May 5, 2016, 3 pages.

Intention to Grant received for Danish Patent Application No. PA201770720, mailed on Apr. 4, 2019, 2 pages.

Intention to Grant received for Danish Patent Application No. PA201770720, mailed on Jun. 21, 2019, 2 pages.

Intention to Grant received for Danish Patent Application No. PA201770721, mailed on Apr. 4, 2019, 2 pages.

Intention to Grant received for Danish Patent Application No. PA201870381, mailed on Jul. 18, 2019, 2 pages.

Intention to Grant received for European Patent Application No. 18732519.6, mailed on Dec. 15, 2023, 10 pages.

International Preliminary Report on Patentability received for PCT Patent Application No. PCT/US2018/014892, mailed on Nov. 28, 2019, 8 pages.

International Preliminary Report on Patentability received for PCT Patent Application No. PCT/US2018/033044, mailed on Nov. 28, 2019, 8 pages.

International Preliminary Report on Patentability received for PCT Patent Application No. PCT/US2021/033320, mailed on Dec. 22, 2022, 14 pages.

International Preliminary Report on Patentability received for PCT Patent Application No. PCT/US2022/016451, mailed on Aug. 31, 2023, 13 pages.

International Search Report and Written Opinion received for PCT Patent Application No. PCT/US2018/014892, mailed on Mar. 7, 2018, 10 pages.

International Search Report and Written Opinion received for PCT Patent Application No. PCT/US2018/033044, mailed on Sep. 11, 2018, 13 pages.

(56) References Cited

OTHER PUBLICATIONS

International Search Report and Written Opinion received for PCT Patent Application No. PCT/US2021/033320, mailed on Nov. 2, 2021, 19 pages.

International Search Report and Written Opinion received for PCT Patent Application No. PCT/US2021/049989, mailed on Dec. 6, 2021, 11 pages.

International Search Report and Written Opinion received for PCT Patent Application No. PCT/US2022/016451, mailed on Jun. 24, 2022, 18 pages.

International Search Report and Written Opinion received for PCT Patent Application No. PCT/US2022/044194, mailed on Feb. 13, 2023, 18 pages.

International Search Report and Written Opinion received for PCT Patent Application No. PCT/US2022/050799, mailed on Apr. 3, 2023, 18 pages.

International Search Report and Written Opinion received for PCT Patent Application No. PCT/US2023/017484, mailed on Aug. 28, 2023, 28 pages.

International Search Report and Written Opinion received for PCT Patent Application No. PCT/US2023/023273, mailed on Sep. 15, 2023, 19 pages.

Invitation to Pay Additional Fees and Partial International Search Report received for PCT Patent Application No. PCT/US2022/044194, mailed on Dec. 15, 2022, 10 pages.

Invitation to Pay Additional Fees and Partial International Search Report received for PCT Patent Application No. PCT/US2023/017484, mailed on Jul. 7, 2023, 20 pages.

Invitation to Pay Additional Fees and Partial International Search Report received for PCT Patent Application No. PCT/US2023/031979, mailed on Jan. 19, 2024, 9 pages.

Invitation to Pay Additional fees received for PCT Patent Application No. PCT/US2021/033320, mailed on Sep. 10, 2021, 12 pages.

Invitation to Pay Additional Fees received for PCT Patent Application No. PCT/US2022/016451, mailed on Apr. 28, 2022, 11 pages.

Krotov, Ilya, "Bellus3D app experience", Available online at: https://www.youtube.com/watch?v=aSu688IY26c&t=45s, Aug. 17, 2021, 2 pages.

Mai et al., "Frontal Screens on Head-Mounted Displays to Increase Awareness of the HMD Users' State in Mixed Presence Collaboration", May 15, 2019, 10 pages.

Mai et al., "TransparentHMD", Revealing the HMD User's Face to Bystanders, Nov. 26-29, 2017, 6 pages.

Mega, Ninja, "Face rig review", Available online at: https://www.youtube.com/watch?v=8YqeeiEVkRg, Feb. 6, 2017, 3 pages.

NCCU, DCT, "Faceshift", Available online at: https://www.youtube.com/watch?v=4Ph0_SP8tpA, Dec. 1, 2014, 3 pages.

Non-Final Office Action received for U.S. Appl. No. 15/940,017, mailed on Jun. 18, 2018, 15 pages.

Non-Final Office Action received for U.S. Appl. No. 15/940,017, mailed on Sep. 30, 2019, 16 pages.

Non-Final Office Action received for U.S. Appl. No. 15/940,232, mailed on Jun. 18, 2018, 23 pages.

Non-Final Office Action received for U.S. Appl. No. 16/676,087, mailed on Apr. 9, 2020, 55 pages.

Non-Final Office Action received for U.S. Appl. No. 17/220,752, mailed on Apr. 15, 2022, 21 pages.

Non-Final Office Action received for U.S. Appl. No. 17/337,164, mailed on Sep. 21, 2022, 43 pages.

Non-Final Office Action received for U.S. Appl. No. 17/667,350, mailed on Apr. 21, 2023, 16 pages.

Non-Final Office Action received for U.S. Appl. No. 17/667,350, mailed on Oct. 12, 2023, 21 pages.

Non-Final Office Action received for U.S. Appl. No. 17/944,911, mailed on Dec. 26, 2023, 21 pages.

Non-Final Office Action received for U.S. Appl. No. 18/071,434, mailed on Sep. 22, 2023, 27 pages.

Non-Final Office Action received for U.S. Appl. No. 15/870,195, mailed on May 2, 2018, 22 pages.

Notice of Acceptance received for Australian Patent Application No. 2018269375, mailed on Dec. 3, 2020, 3 pages.

Notice of Acceptance received for Australian Patent Application No. 2021201681, mailed on Feb. 3, 2022, 3 pages.

Notice of Acceptance received for Australian Patent Application No. 2021290132, mailed on Sep. 29, 2023, 3 pages.

Notice of Acceptance received for Australian Patent Application No. 2022203285, mailed on Jun. 16, 2023, 3 pages.

Notice of Acceptance received for Australian Patent Application No. 2023233200, mailed on Oct. 17, 2023, 3 pages.

Notice of Allowance received for Chinese Patent Application No. 201880022585.3, mailed on Oct. 28, 2020, 6 pages (3 pages of English Translation and 3 pages of Official Copy).

Notice of Allowance received for Chinese Patent Application No. 201910563974.3, mailed on Jun. 2, 2021, 2 pages (1 page of English Translation and 1 page of Official Copy).

Notice of Allowance received for Chinese Patent Application No. 201910692958.4, mailed on Jul. 21, 2020, 2 pages (1 page of English Translation and 1 page of Official Copy).

Notice of Allowance received for Chinese Patent Application No. 201911219517.9, mailed on Jul. 4, 2022, 6 pages (3 pages of English Translation and 3 pages of Official Copy).

Notice of Allowance received for Korean Patent Application No. 10-2019-7033634, mailed on Aug. 20, 2021, 4 pages (1 page of English Translation and 3 pages of Official Copy).

Notice of Allowance received for Korean Patent Application No. 10-2021-7038284, mailed on Feb. 25, 2022, 5 pages (1 page of English Translation and 4 pages of Official Copy).

Notice of Allowance received for Korean Patent Application No. 10-2022-7017766, mailed on Jun. 14, 2022, 6 pages (2 pages of English Translation and 4 pages of Official Copy).

Notice of Allowance received for Korean Patent Application No. 10-2022-7017767, mailed on Jun. 14, 2022, 6 pages (2 pages of English Translation and 4 pages of Official Copy).

Notice of Allowance received for Korean Patent Application No. 10-2022-7029803, mailed on Mar. 23, 2023, 8 pages (2 pages of English Translation and 6 pages of Official Copy).

Notice of Allowance received for Korean Patent Application No. 10-2023-7021441, mailed on Jul. 6, 2023, 8 pages (2 pages of English Translation and 6 pages of Official Copy).

Notice of Allowance received for U.S. Appl. No. 15/870,195, mailed on Sep. 23, 2019, 13 pages.

Notice of Allowance received for U.S. Appl. No. 15/940,017, mailed on Aug. 6, 2020, 10 pages.

Notice of Allowance received for U.S. Appl. No. 15/940,232, mailed on Jun. 4, 2019, 12 pages.

Notice of Allowance received for U.S. Appl. No. 15/981,754, mailed on Jul. 17, 2019, 15 pages.

Notice of Allowance received for U.S. Appl. No. 15/981,754, mailed on Sep. 18, 2019, 14 pages.

Notice of Allowance received for U.S. Appl. No. 16/676,087, mailed on Jun. 19, 2020, 9 pages.

Notice of Allowance received for U.S. Appl. No. 16/676,087, mailed on Oct. 21, 2020, 9 pages.

Notice of Allowance received for U.S. Appl. No. 16/896,457, mailed on Jan. 8, 2021, 22 pages.

Notice of Allowance received for U.S. Appl. No. 17/220,752, mailed on Sep. 7, 2022, 8 pages.

Notice of Allowance received for U.S. Appl. No. 17/337,164, mailed on Feb. 7, 2023, 9 pages.

Notice of Allowance received for U.S. Appl. No. 17/337,164, mailed on Jun. 6, 2023, 11 pages.

Notice of Allowance received for U.S. Appl. No. 18/071,434, mailed on Jan. 31, 2024, 10 pages.

Office Action received for Australian Patent Application No. 2018269375, mailed on Jun. 19, 2020, 4 pages.

Office Action received for Australian Patent Application No. 2018269375, mailed on Sep. 7, 2020, 3 pages.

Office Action received for Australian Patent Application No. 2021201681, mailed on Nov. 11, 2021, 4 pages.

Office Action received for Australian Patent Application No. 2021290132, mailed on Jul. 25, 2023, 3 pages.

(56) References Cited

OTHER PUBLICATIONS

Office Action received for Australian Patent Application No. 2021290132, mailed on Jun. 3, 2023, 3 pages.

Office Action received for Australian Patent Application No. 2022203285, mailed on Apr. 20, 2023, 4 pages.

Office Action received for Australian Patent Application No. 2022203285, mailed on Jan. 18, 2023, 3 pages.

Office Action received for Chinese Patent Application No. 201880004632.1, mailed on Jan. 31, 2024, 7 pages (3 pages of English Translation and 4 pages of Official Copy).

Office Action received for Chinese Patent Application No. 201880022585.3, mailed on May 22, 2020, 11 pages (6 pages of English Translation and 5 pages of Official Copy).

Office Action received for Chinese Patent Application No. 201910563974.3, mailed on Feb. 7, 2021, 7 pages (4 pages of English Translation and 3 pages of Official Copy).

Office Action received for Chinese Patent Application No. 201910563974.3, mailed on May 8, 2020, 18 pages (8 pages of English Translation and 10 pages of Official Copy).

Office Action received for Chinese Patent Application No. 201910692958.4, mailed on Mar. 19, 2020, 20 pages (9 pages of English Translation and 11 pages of Official Copy).

Office Action received for Chinese Patent Application No. 201911219517.9, mailed on Jan. 19, 2022, 11 pages (6 pages of English Translation and 5 pages of Official Copy).

Office Action received for Chinese Patent Application No. 201911219517.9, mailed on Mar. 2, 2021, 20 pages (11 pages of English Translation and 9 pages of Official Copy).

Office Action received for Danish Patent Application No. PA201770393, mailed on Dec. 12, 2018, 7 pages.

Office Action received for Danish Patent Application No. PA201770393, mailed on Jan. 31, 2020, 6 pages.

Office Action received for Danish Patent Application No. PA201770393, mailed on Jul. 11, 2019, 2 pages.

Office Action received for Danish Patent Application No. PA201770393, mailed on Mar. 19, 2018, 8 pages.

Office Action received for Danish Patent Application No. PA201770720, mailed on Apr. 26, 2018, 3 pages.

Office Action received for Danish Patent Application No. PA201770720, mailed on Nov. 16, 2018, 3 pages.

Office Action received for Danish Patent Application No. PA201770720, mailed on Oct. 18, 2017, 8 pages.

Office Action received for Danish Patent Application No. PA201770721, mailed on Apr. 26, 2018, 3 pages.

Office Action received for Danish Patent Application No. PA201770721, mailed on Nov. 16, 2018, 3 pages.

Office Action received for Danish Patent Application No. PA201770721, mailed on Oct. 19, 2017, 8 pages.

Office Action received for European Patent Application No. 18703184. 4, mailed on Dec. 14, 2021, 4 pages.

Office Action received for European Patent Application No. 18703184. 4, mailed on Jul. 2, 2021, 6 pages.

Office Action received for European Patent Application No. 18703184. 4, mailed on Jul. 13, 2022, 4 pages.

Office Action received for European Patent Application No. 18703184. 4, mailed on May 6, 2020, 7 pages.

Office Action received for European Patent Application No. 18703184. 4, mailed on Nov. 23, 2020, 8 pages.

Office Action received for European Patent Application No. 18732519. 6, mailed on Apr. 24, 2020, 6 pages.

Office Action received for European Patent Application No. 18732519. 6, mailed on Oct. 6, 2020, 5 pages.

Office Action received for European Patent Application No. 19186042. 8, mailed on Dec. 2, 2021, 5 pages.

Office Action received for European Patent Application No. 19186042. 8, mailed on May 12, 2020, 5 pages.

Office Action received for European Patent Application No. 19186042. 8, mailed on Oct. 10, 2023, 6 pages.

Office Action received for European Patent Application No. 19186042. 8, mailed on Sep. 24, 2019, 6 pages.

Office Action received for European Patent Application No. 19211833. 9, mailed on Jan. 29, 2021, 5 pages.

Office Action received for European Patent Application No. 19211833. 9, mailed on Jul. 13, 2020, 7 pages.

Office Action received for European Patent Application No. 21733268. 3, mailed on Aug. 8, 2023, 7 pages.

Office Action received for European Patent Application No. 21733268. 3, mailed on Jan. 29, 2024, 7 pages.

Office Action received for European Patent Application No. 18703184. 4, mailed on Oct. 29, 2019, 6 pages.

Office Action received for Indian Patent Application No. 201917046737, mailed on Aug. 9, 2021, 8 pages.

Office Action received for Japanese Patent Application No. 2019-563408, mailed on Nov. 2, 2020, 4 pages (2 pages of English Translation and 2 pages of Official Copy).

Office Action received for Japanese Patent Application No. 2021-173713, mailed on Jun. 15, 2023, 4 pages (2 pages of English Translation and 2 pages of Official Copy).

Office Action received for Japanese Patent Application No. 2021-173713, mailed on Nov. 16, 2022, 9 pages (5 pages of English Translation and 4 pages of Official Copy).

Office Action received for Japanese Patent Application No. 2022-573765, mailed on Feb. 5, 2024, 14 pages (7 pages of English Translation and 7 pages of Official Copy).

Office Action received for Korean Patent Application No. 10-2019-7033634, mailed on Sep. 28, 2020, 15 pages (7 pages of English Translation and 8 pages of Official Copy).

Office Action received for Korean Patent Application No. 10-2022-7029803, mailed on Sep. 3, 2022, 5 pages (2 pages of English Translation and 3 pages of Official Copy).

Opuni, Kojo, "FaceShift Studio Demo", Available online at: https://www.youtube.com/watch?v=72ty7PYKwGU, Oct. 1, 2012, 3 pages.

Pang et al., "Approaches to uncertainty visualization", The Visual Computer, vol. 13, No. 8, 1997, pp. 370-390.

Pre-Appeal Review Report received for Japanese Patent Application No. 2021-173713, mailed on Nov. 10, 2023, 4 pages (2 pages of English Translation and 2 pages of Official Copy).

Rekimoto et al., "Behind-the-Mask", A Face-Through Head-Mounted Display, 18, May 29-Jun. 1, 2018, 5 pages.

Result of Consultation received for European Patent Application No. 19211833.9, mailed on Jul. 15, 2021, 3 pages.

Sambrook, Jade, "Video Selfie Filters with MSQRD for Facebook Live", Available Online at: <https://www.youtube.com/watch?v=JZrWK2NEFeg>, See especially 2:44-3:03, Jul. 2, 2016, 3 pages.

Search Report and Opinion received for Danish Patent Application No. PA201770393, mailed on Jun. 21, 2017, 9 pages.

Search Report received for Danish Patent Application No. PA201870381, mailed on Sep. 13, 2018, 7 pages.

Supplemental Notice of Allowance received for U.S. Appl. No. 15/870,195, mailed on Nov. 14, 2019, 9 pages.

Supplemental Notice of Allowance received for U.S. Appl. No. 17/337,164, mailed on Jun. 26, 2023, 3 pages.

Ting, "Giphy Cam (iOS) | Ting Download", Available online at: https://www.youtube.com/watch?v=mykfBpyD3gg, Oct. 2, 2015, 3 pages.

Twins, Tornado, "New Tutorial: Add Facial Expressions to your Game Characters!", Available online at: https://www.youtube.com/watch?v=wKSjByNyaKA, Mar. 14, 2014, 4 pages.

Yom, Mama, "SnapChat Tutorial for Beginners!", Available Online at: <https://www.youtube.com/watch?v=zUmj039NNOU>, See especially 6:55-7:22, Jun. 6, 2016, 3 pages.

Applicant-Initiated Interview Summary received for U.S. Appl. No. 18/131,833, mailed on Jun. 27, 2025, 2 pages.

Corrected Notice of Allowance received for U.S. Appl. No. 18/737,710, mailed on Aug. 13, 2025, 2 pages.

Corrected Notice of Allowance received for U.S. Appl. No. 18/737,710, mailed on Jul. 1, 2025, 2 pages.

Corrected Notice of Allowance received for U.S. Appl. No. 18/737,710, mailed on Sep. 23, 2025, 2 pages.

Decision to Grant received for European Patent Application No. 21733268.3, mailed on Mar. 27, 2025, 2 pages.

Extended European Search Report received for European Patent Application No. 25164730.1, mailed on Jun. 2, 2025, 8 pages.

(56) References Cited

OTHER PUBLICATIONS

Final Office Action received for U.S. Appl. No. 18/125,277, mailed on Oct. 16, 2025, 28 pages.

Final Office Action received for U.S. Appl. No. 18/131,833, mailed on Aug. 19, 2025, 14 pages.

Intention to Grant received for European Patent Application No. 24165004.3, mailed on Jun. 5, 2025, 9 pages.

Intention to Grant received for European Patent Application No. 24165004.3, mailed on Sep. 11, 2025, 9 pages.

Non-Final Office Action received for U.S. Appl. No. 18/131,833, mailed on Apr. 3, 2025, 15 pages.

Non-Final Office Action received for U.S. Appl. No. 18/737,710, mailed on Mar. 14, 2025, 39 pages.

Notice of Acceptance received for Australian Patent Application No. 2024200190, mailed on Jun. 16, 2025, 3 pages.

Notice of Acceptance received for Australian Patent Application No. 2024200460, mailed on Mar. 20, 2025, 3 pages.

Notice of Allowance received for Chinese Patent Application No. 201880004632.1, mailed on Mar. 20, 2025, 4 pages (1 page of English translation and 3 pages of Official Copy).

Notice of Allowance received for Chinese Patent Application No. 202411117608.2, mailed on Jul. 1, 2025, 4 pages (1 page of English Translation and 3 pages of Official Copy).

Notice of Allowance received for Korean Patent Application No. 10-2022-7041713, mailed on Jun. 4, 2025, 7 pages (2 pages of English translation and 5 pages of Official Copy).

Notice of Allowance received for Korean Patent Application No. 10-2023-7033560, mailed on Mar. 6, 2025, 8 pages (2 pages of English translation and 6 pages of Official Copy).

Notice of Allowance received for Korean Patent Application No. 10-2024-7023682, mailed on Feb. 3, 2025, 8 pages (2 pages of English translation and 6 pages of Official Copy).

Notice of Allowance received for U.S. Appl. No. 18/737,710, mailed on Jun. 20, 2025, 8 pages.

Notice of Allowance received for U.S. Appl. No. 18/737,710, mailed on Sep. 4, 2025, 9 pages.

Office Action received for Chinese Patent Application No. 201880004632.1, mailed on Jan. 6, 2025, 2 pages (1 page of English translation and 1 page of Official Copy).

Office Action received for European Patent Application No. 19186042.8 mailed on Feb. 13, 2025, 7 pages.

Office Action received for Indian Patent Application No. 202217068796, mailed on May 22, 2025, 8 pages.

Office Action received for Japanese Patent Application No. 2024-154177, mailed on Jul. 7, 2025, 11 pages (5 pages of English Translation and 6 pages of Official Copy).

Office Action received for Japanese Patent Application No. 2024-569641, mailed on Nov. 21, 2025, 4 pages (2 pages of English Translation and 2 pages of Official Copy).

Office Action received for Korean Patent Application No. 10-2024-7037278, mailed on Nov. 13, 2025, 14 pages (6 pages of English Translation and 8 pages of Official Copy).

Result of Consultation received for European Patent Application No. 24165004.3, mailed on Feb. 4, 2025, 3 pages.

Ex Parte Quayle received for U.S. Appl. No. 18/972,738, mailed on Nov. 18, 2025, 8 pages.

International Preliminary Report on Patentability received for PCT Patent Application No. PCT/US2024/025380, mailed on Nov. 13, 2025, 17 pages.

Notice of Allowance received for Japanese Patent Application No. 2024-154177, mailed on Nov. 7, 2025, 4 pages (1 page of English Translation and 3 pages of Official Copy).

Office Action received for Japanese Patent Application No. 2024-212271, mailed on Oct. 6, 2025, 4 pages (2 pages of English Translation and 2 pages of Official Copy).

* cited by examiner

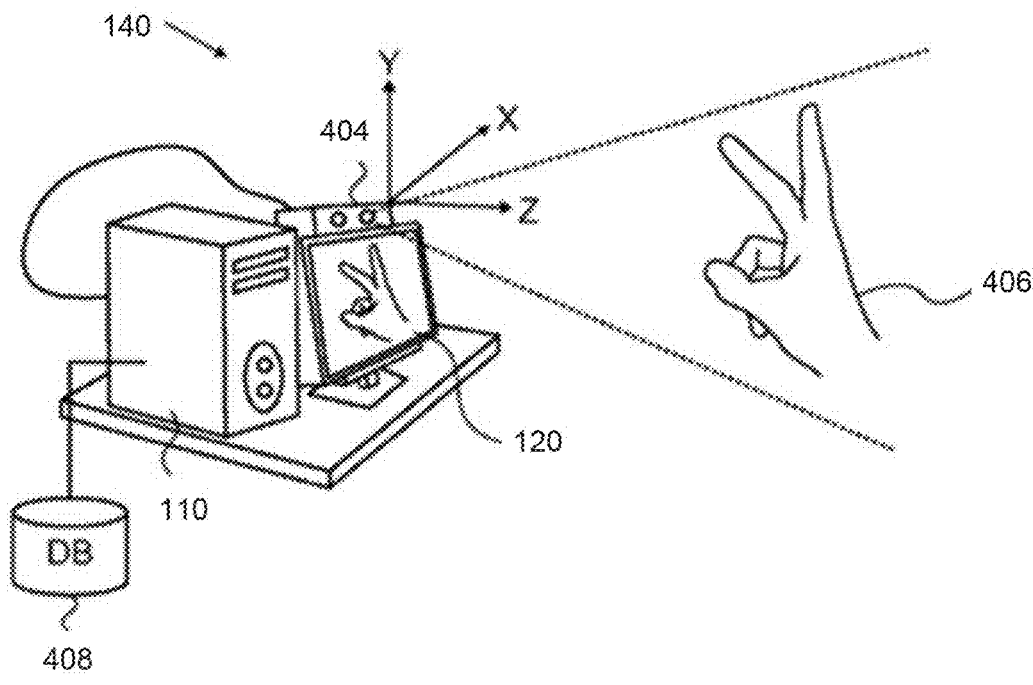
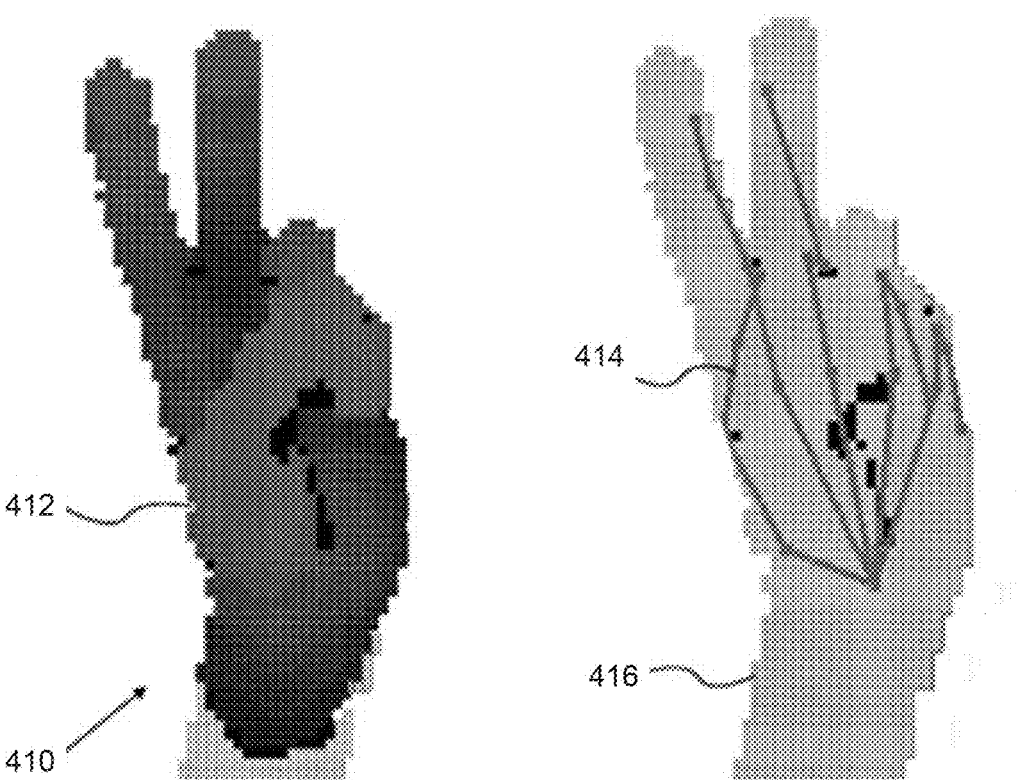
*FIG. 4*

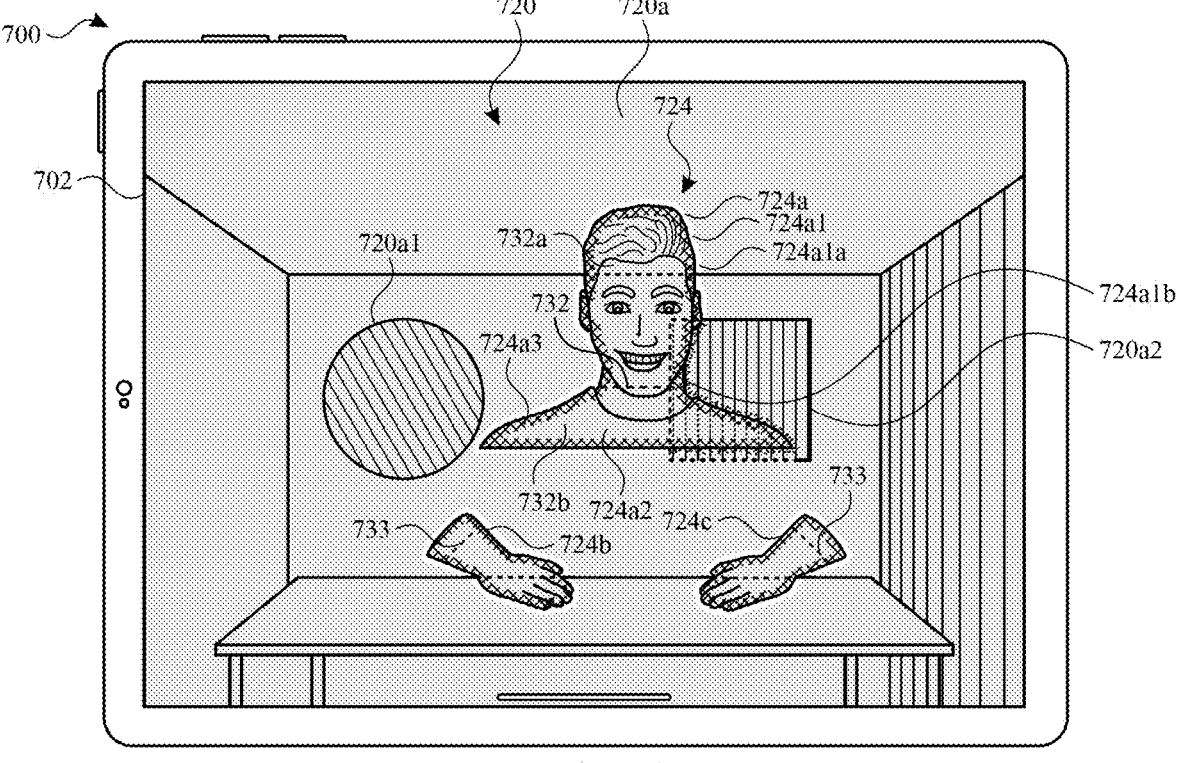
*FIG. 7J1*

*FIG. 7J2*

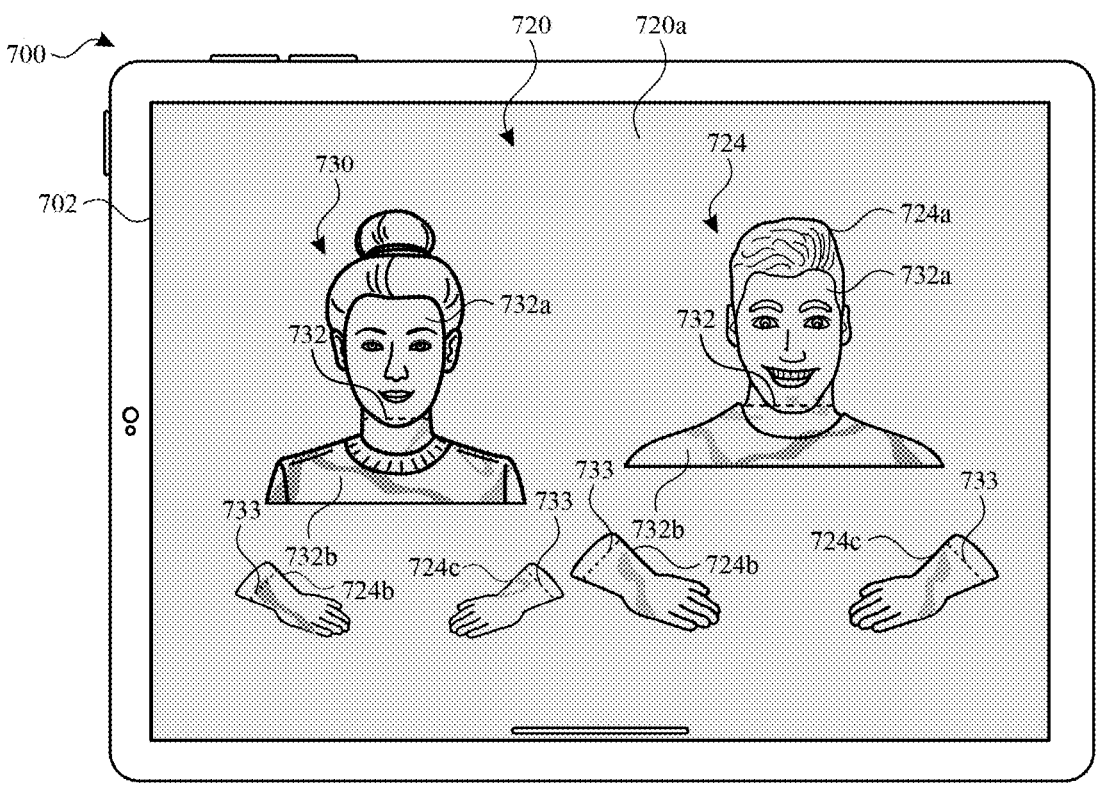
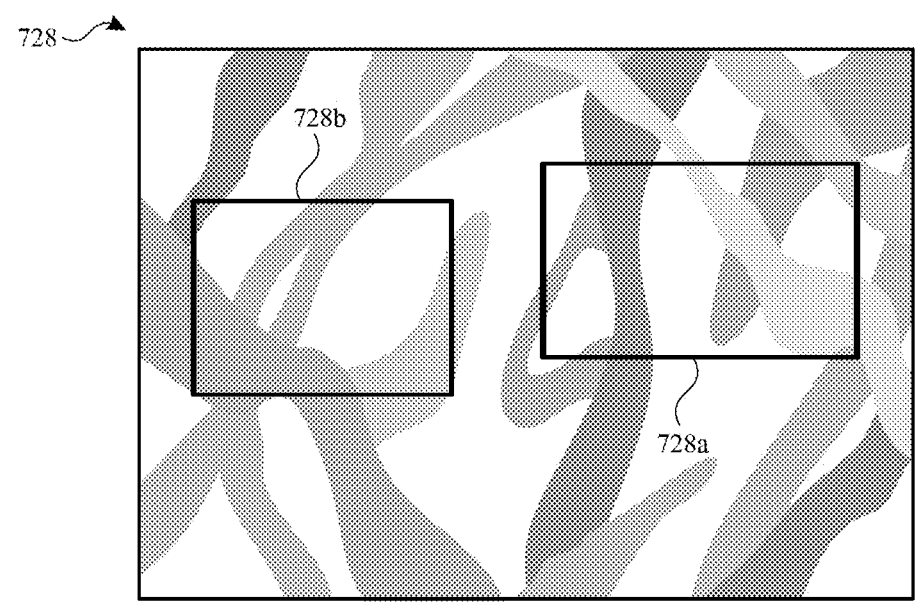
*FIG. 70*

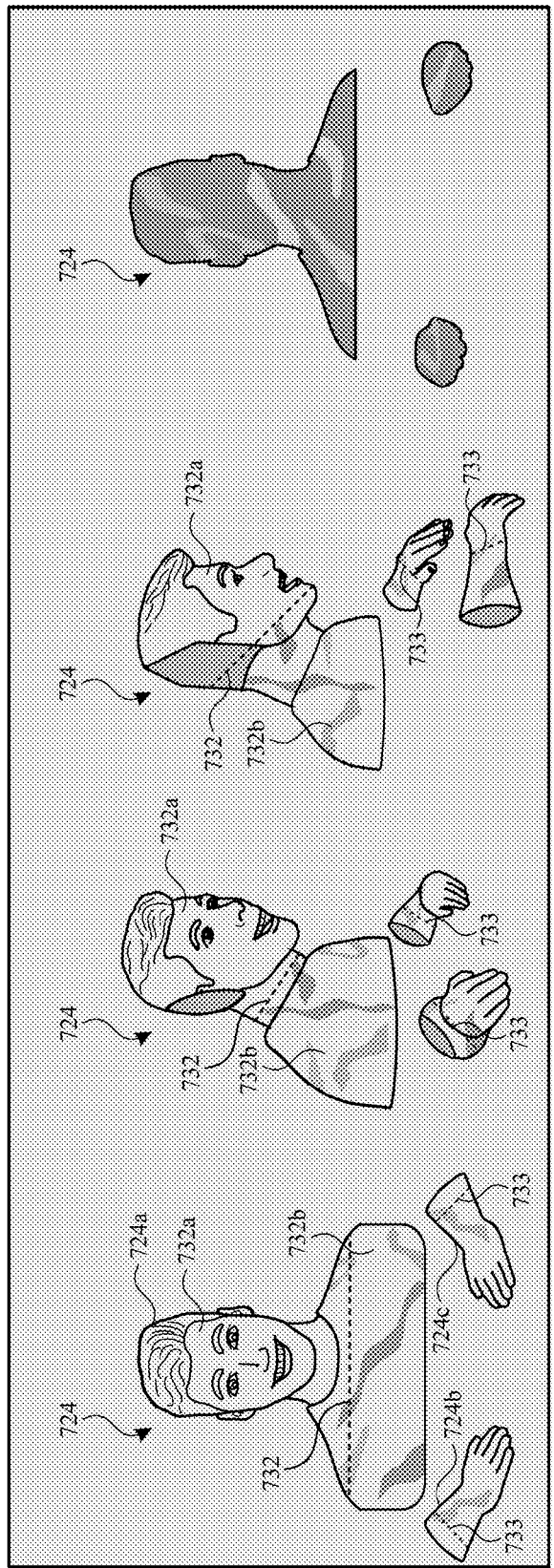
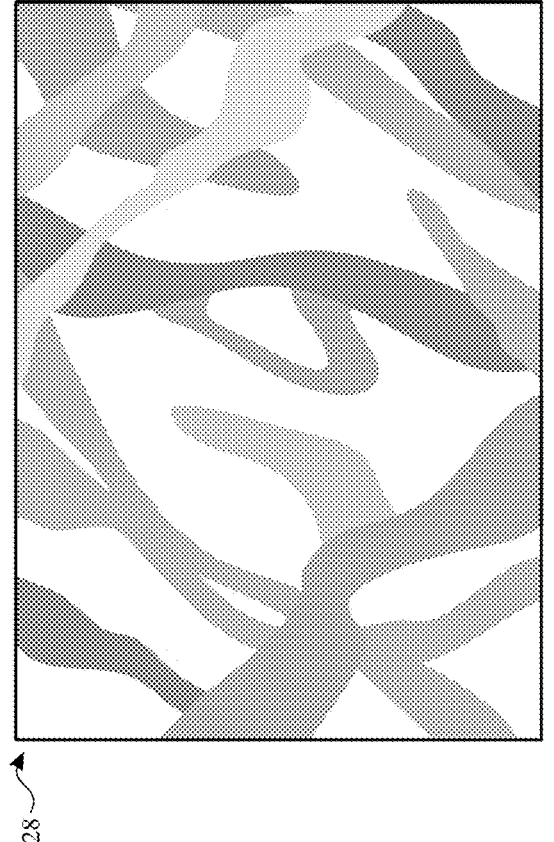
FIG. 7P

800

802
Display, via one or more display generation components, movement of a representation of a person in front of a background, wherein a visual property of an edge of a respective portion of the representation of the person changes based on an appearance of a portion of the background behind the respective portion of the representation of the person, including:

804
In accordance with a determination that the portion of the background behind the respective portion of the representation of the person has a first value for a respective visual property, display the edge of the respective portion of the representation of the person with a first appearance that is based on the first value for the respective visual property.

806
In accordance with a determination that the portion of the background behind the respective portion of the representation of the person has a second value for the respective visual property that is different from the first value for the respective visual property, display the edge of the respective portion of the representation of the person with a second appearance that is based on the second value for the respective visual property and is different from the first appearance of the edge of the respective portion of the representation of the person.

*FIG. 8*

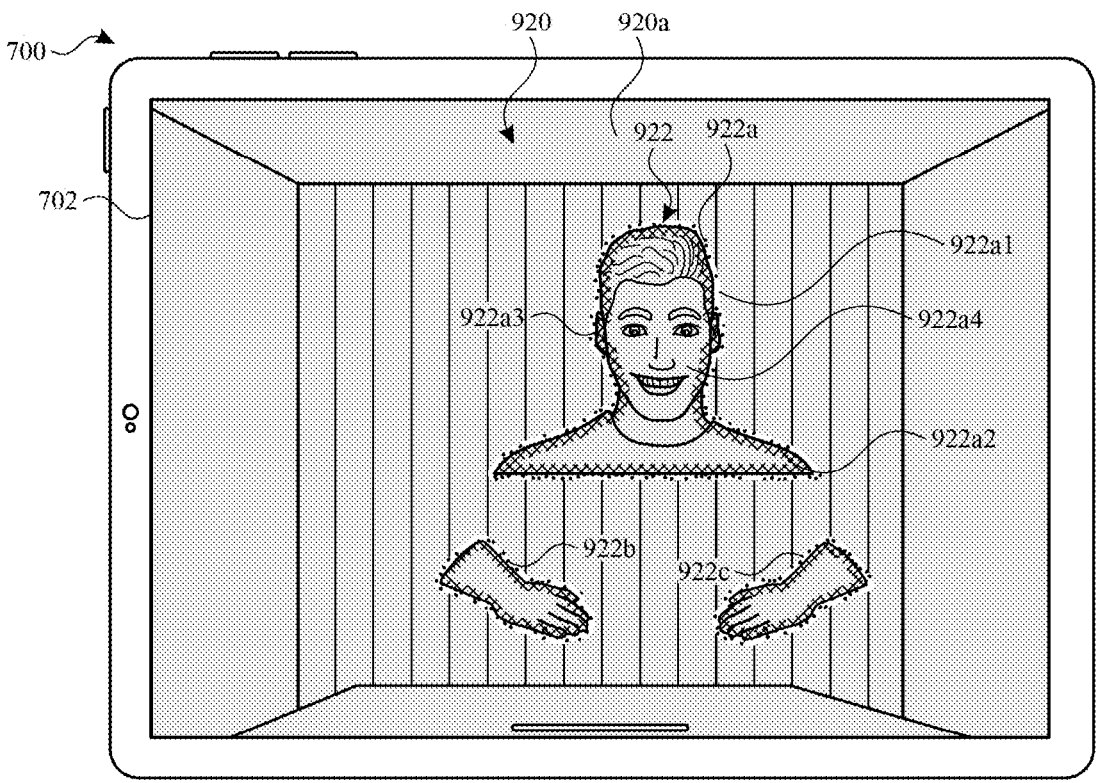
FIG. 9F
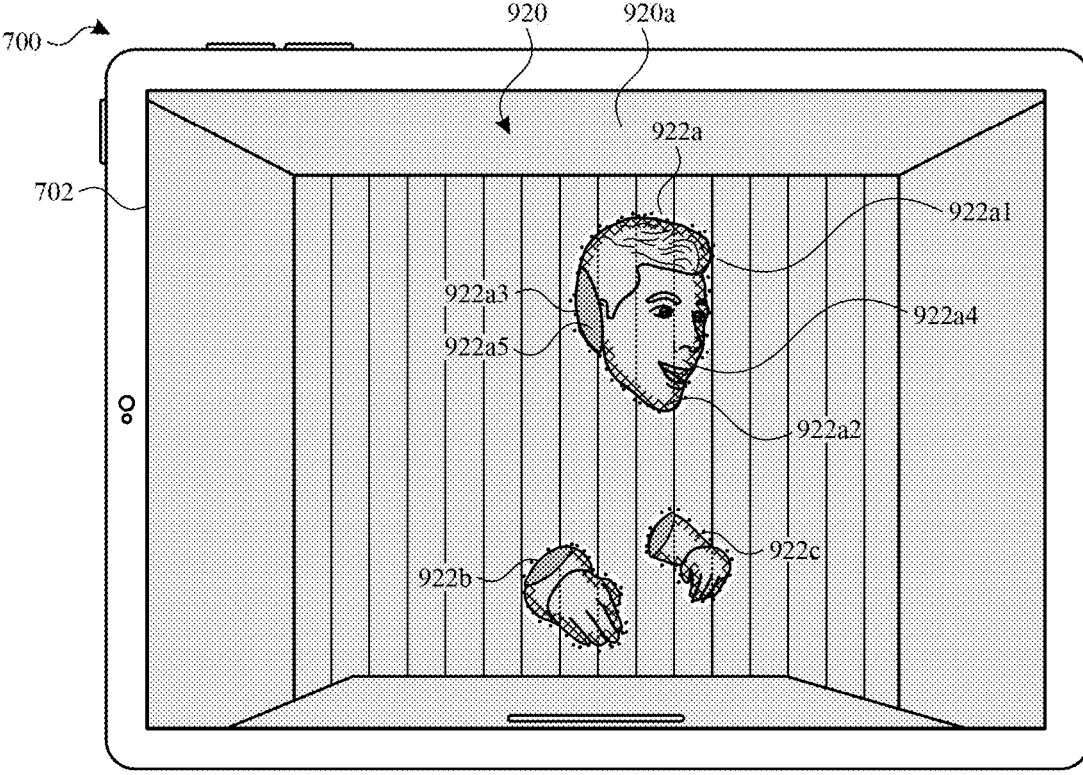
FIG. 9G1

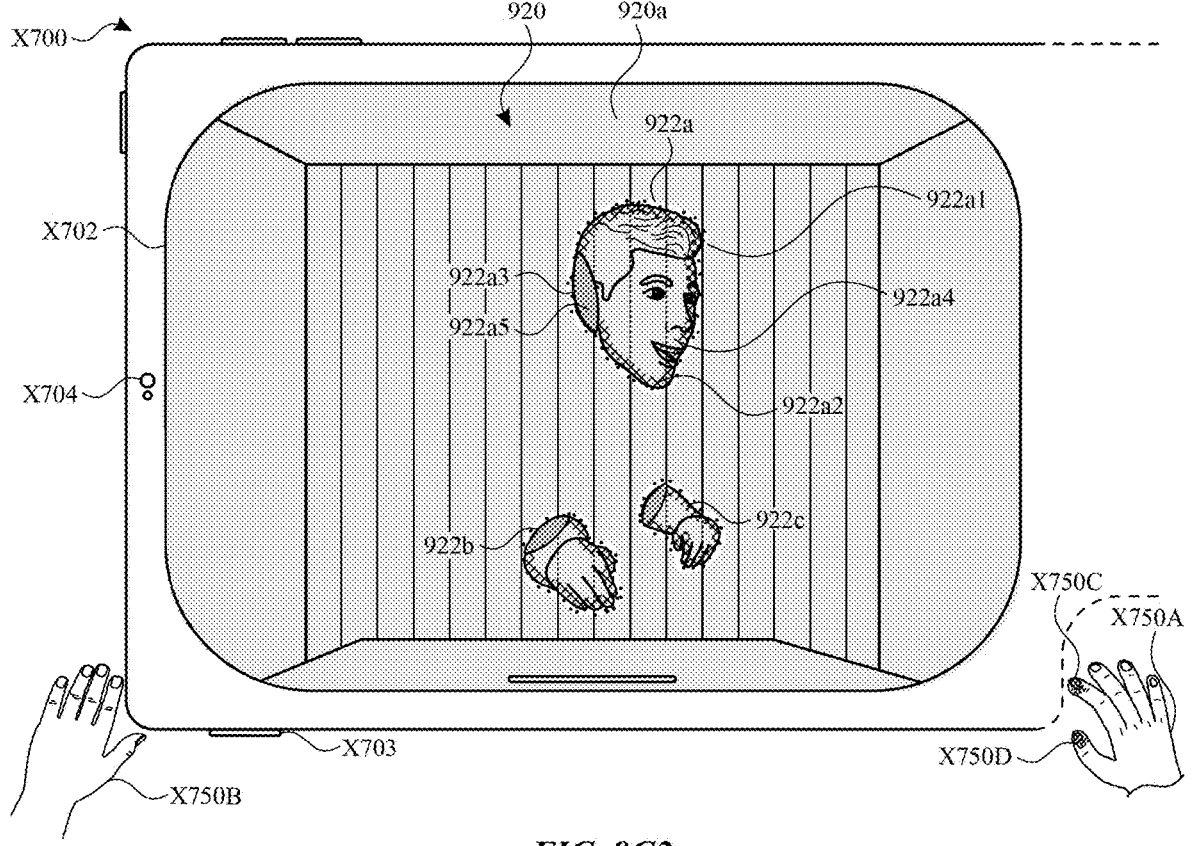
*FIG. 9G2*

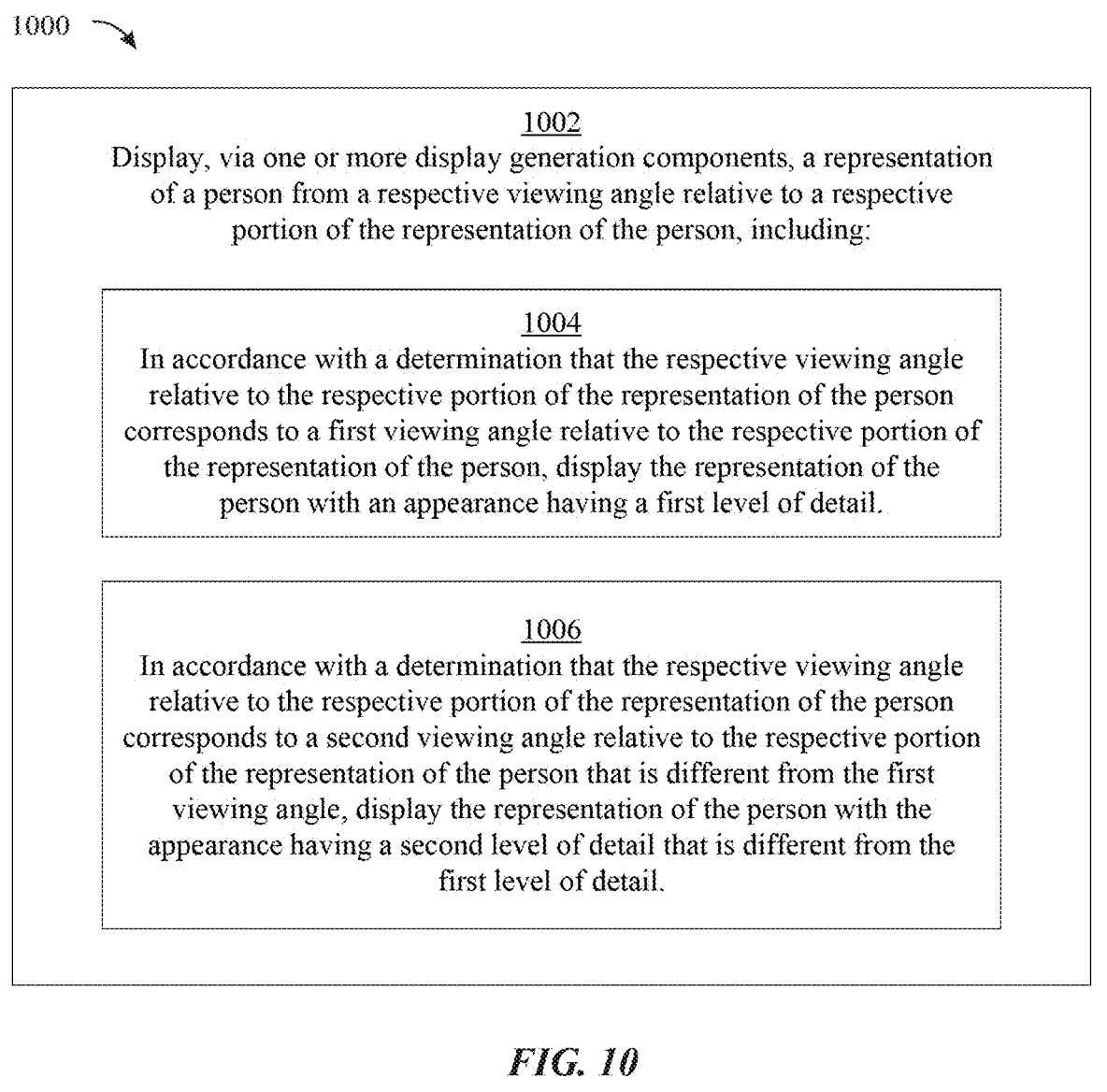

1000

1002
Display, via one or more display generation components, a representation of a person from a respective viewing angle relative to a respective portion of the representation of the person, including:

1004
In accordance with a determination that the respective viewing angle relative to the respective portion of the representation of the person corresponds to a first viewing angle relative to the respective portion of the representation of the person, display the representation of the person with an appearance having a first level of detail.

1006
In accordance with a determination that the respective viewing angle relative to the respective portion of the representation of the person corresponds to a second viewing angle relative to the respective portion of the representation of the person that is different from the first viewing angle, display the representation of the person with the appearance having a second level of detail that is different from the first level of detail.

*FIG. 10*

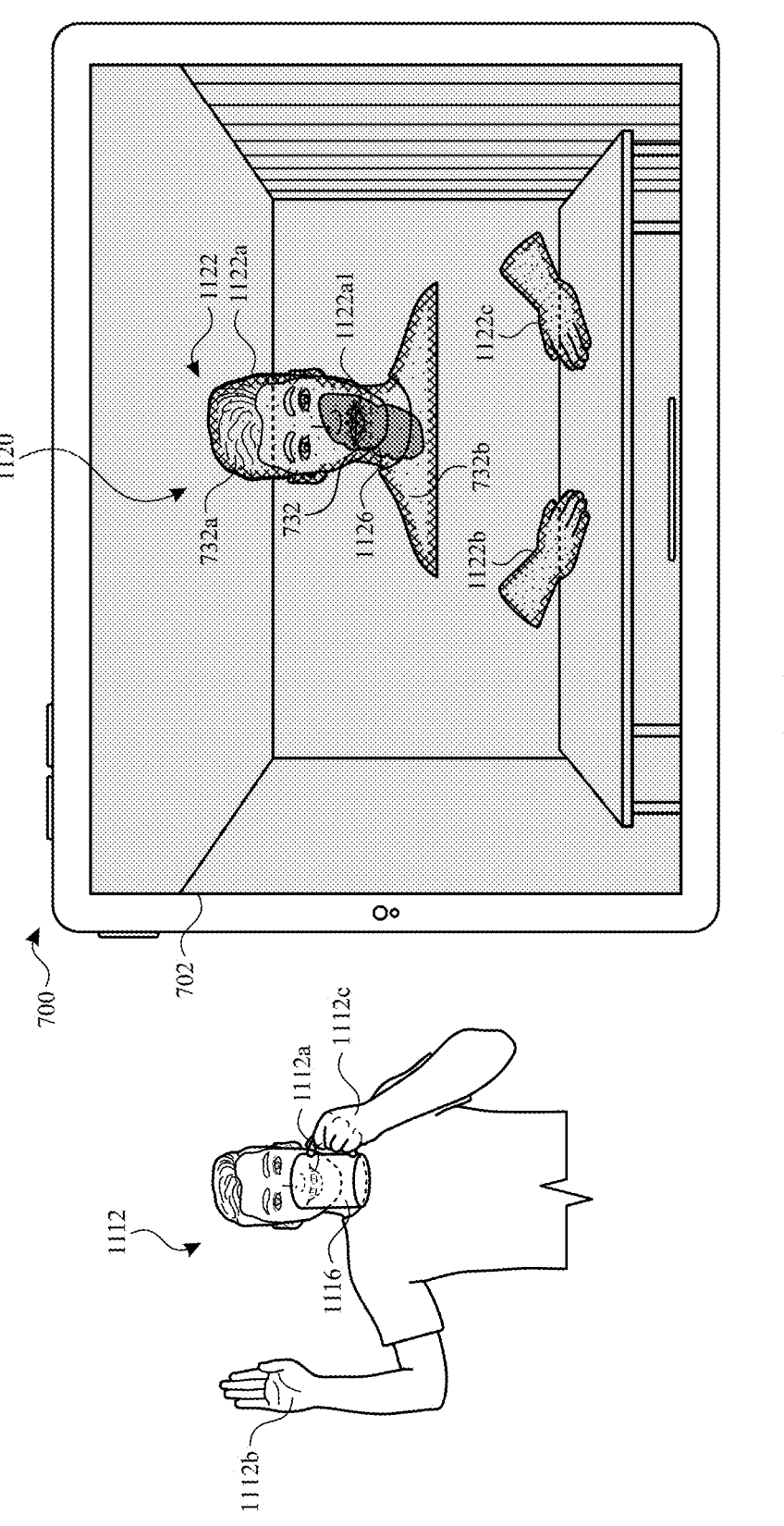
*FIG. 11E1*

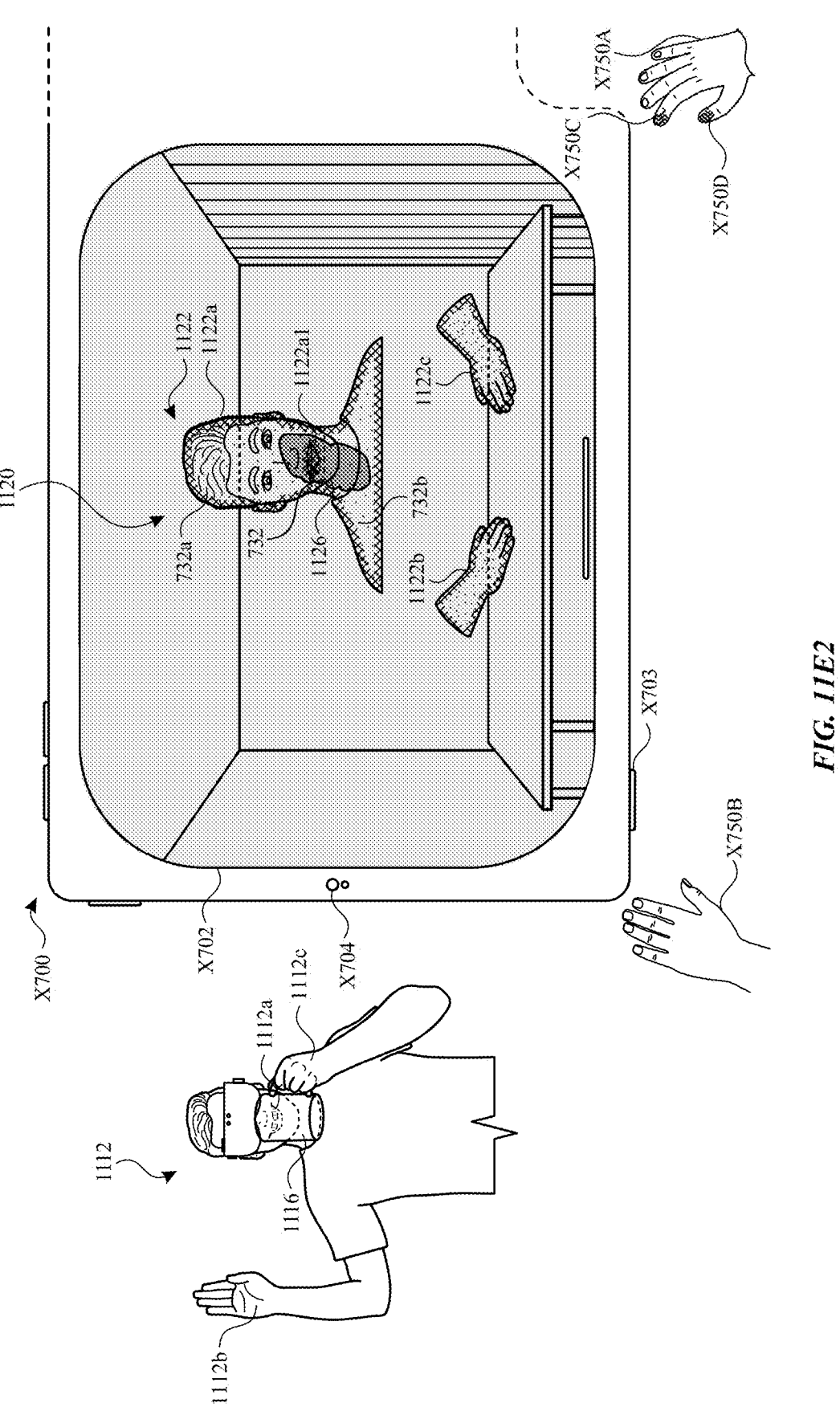
FIG. 11E2

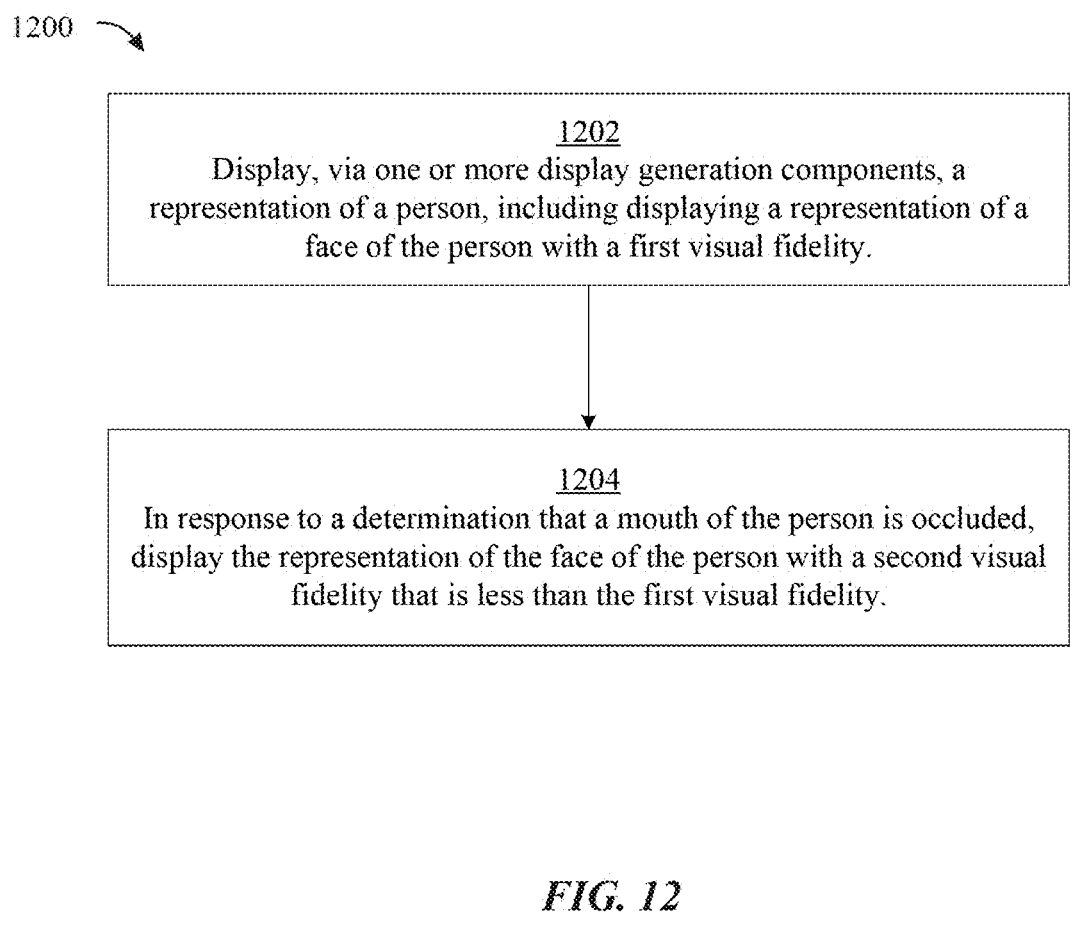

1200

1202
Display, via one or more display generation components, a representation of a person, including displaying a representation of a face of the person with a first visual fidelity.

1204
In response to a determination that a mouth of the person is occluded, display the representation of the face of the person with a second visual fidelity that is less than the first visual fidelity.

*FIG. 12*

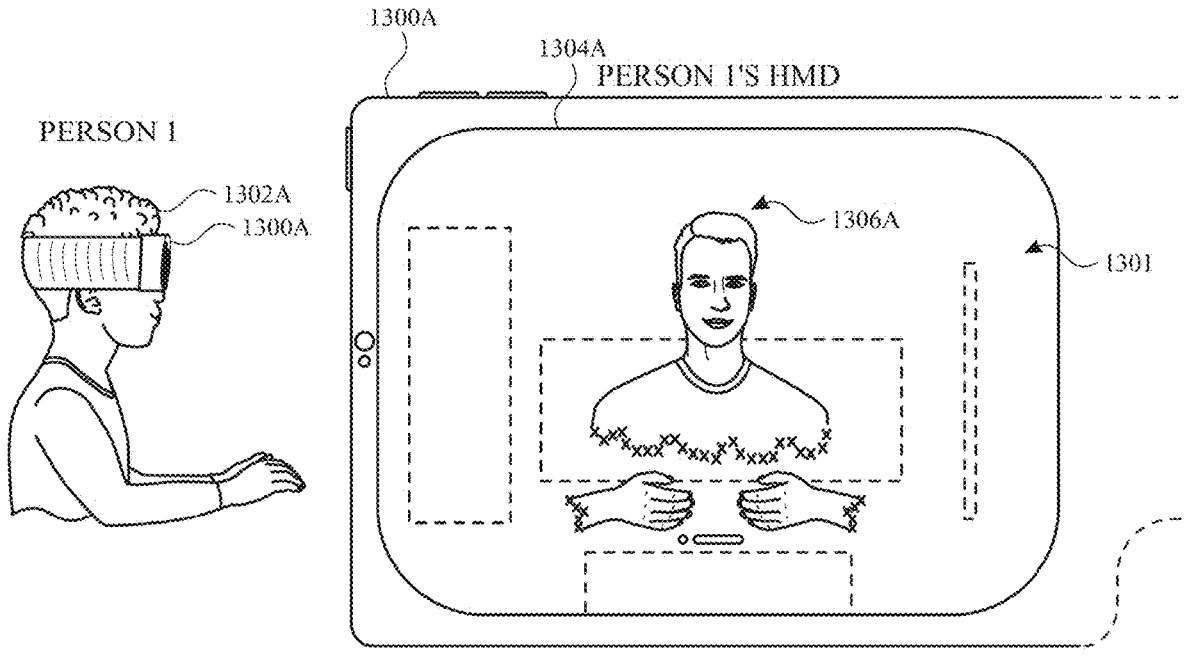
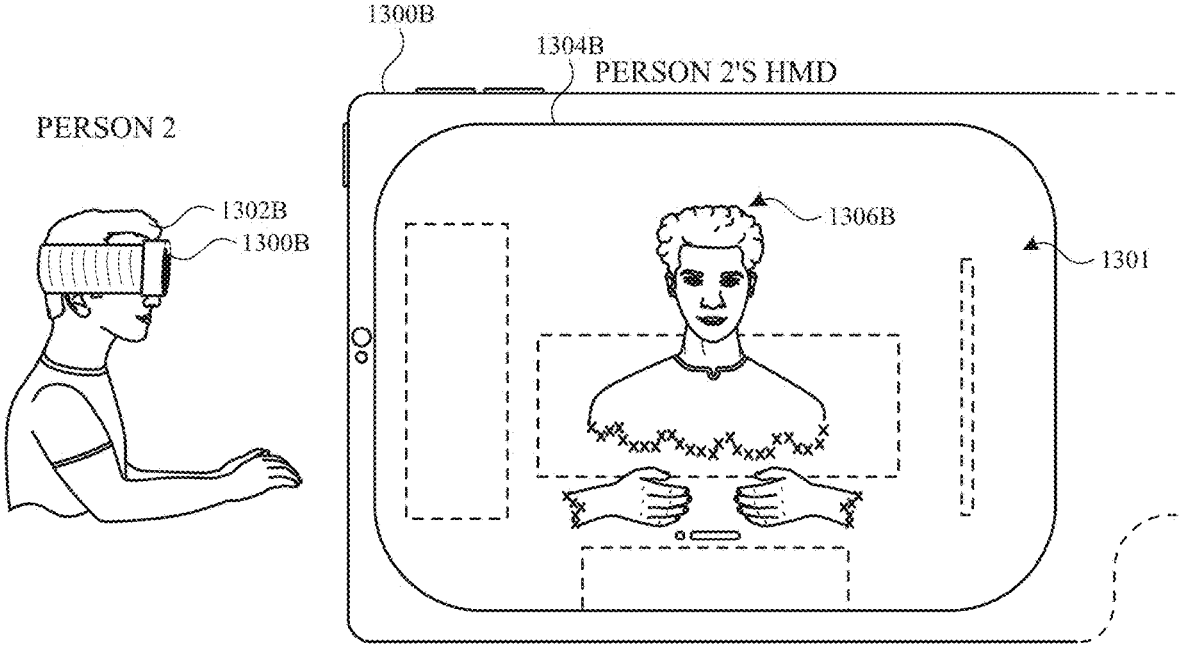
*FIG. 13A*

1400

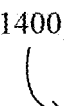

---

<u>1402</u>
While displaying, via the one or more display generation components, a representation
of a person, update the representation of the person over time, including:

---

<u>1404</u>
Move one or more portions of the representation of the person based on
movement of one or more corresponding portions of the person.

---

<u>1406</u>
While moving one or more portions of the representation of the person based on
movement of one or more corresponding portions of the person, shift a
boundary of the representation of the person over time to change which portions
of the representation of the person are visible, wherein the boundary shifts
gradually over time, including:

---

<u>1408</u>
At a first time, display, via the one or more display generation
components, a first portion of the representation of the person that is
based on a first position of the boundary.

---

<u>1410</u>
After displaying the first portion of the representation of the person that is based
on the first position of the boundary, display, via the one or more display
generation components, a second portion of the representation of the person that
is based on a second position of the boundary that is different from the first
position of the boundary, wherein the second portion of the representation of the
person is different from the first portion of the representation of the person.

DEVICES, METHODS, AND GRAPHICAL USER INTERFACES FOR DISPLAYING A REPRESENTATION OF A PERSON

CROSS-REFERENCE TO RELATED APPLICATIONS

This application claims priority to U.S. Provisional Application No. 63/542,036, filed Oct. 2, 2023, and entitled "DEVICES, METHODS, AND GRAPHICAL USER INTERFACES FOR DISPLAYING A REPRESENTATION OF A PERSON," U.S. Provisional Application No. 63/528,400, filed Jul. 23, 2023, and entitled "DEVICES, METHODS, AND GRAPHICAL USER INTERFACES FOR DISPLAYING A REPRESENTATION OF A PERSON," U.S. Provisional Application No. 63/470,825, filed Jun. 2, 2023, and entitled "DEVICES, METHODS, AND GRAPHICAL USER INTERFACES FOR DISPLAYING A REPRESENTATION OF A PERSON," U.S. Provisional Application No. 63/464,125, filed May 4, 2023, entitled "DEVICES, METHODS, AND GRAPHICAL USER INTERFACES FOR DISPLAYING A REPRESENTATION OF A PERSON," and U.S. Provisional Application No. 63/463,830, filed May 3, 2023, and entitled "DEVICES, METHODS, AND GRAPHICAL USER INTERFACES FOR DISPLAYING A REPRESENTATION OF A PERSON." The content of each of these applications is incorporated herein by reference.

TECHNICAL FIELD

The present disclosure relates generally to computer systems that are in communication with a display generation component and, optionally, one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touchscreen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for displaying a representation of a person (e.g., in real-time communication sessions, augmented reality environments, mixed reality environments, and/or virtual reality environments) are cumbersome, inefficient, and limited. For example, systems that display a representation of a person in front of a background, systems that display a representation of a person from a viewing angle, and systems that display a representation of a person who is at least partially blocked by an object are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for displaying a representation of a person to users that make interaction with the computer systems more efficient and intuitive for a user. Such methods and interfaces optionally complement or replace conventional methods for displaying a representation of a person (e.g., in extended reality experiences). Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for displaying a representation of a person in a three-dimensional environment. Such methods and interfaces may complement or replace conventional methods for displaying a representation of a person a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is described. The method comprises: at a computer system that is in communication with one or more display generation components: displaying, via the one or more display generation components, movement of a representation of a person in front of a background, wherein a visual property of an edge of a respective portion of the representation of the person changes based on an appearance of a portion of the background behind the respective portion of the representation of the person, including: in accordance with a determination that the portion of the background behind the respective portion of the representation of the person has a first value for a respective visual property, displaying the edge of the respective portion of the representation of the person with a first appearance that is based on the first value for the respective visual property; and in accordance with a determination that the portion of the background behind the respective portion of the representation of the person has a second value for the respective visual property that is different from the first value for the respective visual property, displaying the edge of the respective portion of the representation of the person with a second appearance that is based on the second value for the respective visual property and is different from the first appearance of the edge of the respective portion of the representation of the person.

In accordance with some embodiments, a non-transitory computer-readable storage medium is described. The non-transitory computer-readable storage medium stores one or more programs configured to be executed by one or more processors of a computer system that is in communication with one or more display generation components. The one or more programs include instructions for: displaying, via the one or more display generation components, movement of a representation of a person in front of a background, wherein a visual property of an edge of a respective portion of the representation of the person changes based on an appearance of a portion of the background behind the respective portion of the representation of the person, including: in accordance with a determination that the portion of the background behind the respective portion of the representation of the person has a first value for a respective visual property, displaying the edge of the respective portion of the representation of the person with a first appearance that is based on the first value for the respective visual property; and in accordance with a determination that the portion of the background behind the respective portion of the representation of the person has a second value for the respective visual property that is different from the first value for the respective visual property, displaying the edge of the respective portion of the representation of the person with a second appearance that is based on the second value for the respective visual property and is different from the first appearance of the edge of the respective portion of the representation of the person.

In accordance with some embodiments, a transitory computer-readable storage medium is described. The transitory computer-readable storage medium stores one or more programs configured to be executed by one or more processors of a computer system that is in communication with one or more display generation components. The one or more programs include instructions for: displaying, via the one or more display generation components, movement of a representation of a person in front of a background, wherein a visual property of an edge of a respective portion of the representation of the person changes based on an appearance of a portion of the background behind the respective portion of the representation of the person, including: in accordance with a determination that the portion of the background behind the respective portion of the representation of the person has a first value for a respective visual property, displaying the edge of the respective portion of the representation of the person with a first appearance that is based on the first value for the respective visual property; and in accordance with a determination that the portion of the background behind the respective portion of the representation of the person has a second value for the respective visual property that is different from the first value for the respective visual property, displaying the edge of the respective portion of the representation of the person with a second appearance that is based on the second value for the respective visual property and is different from the first appearance of the edge of the respective portion of the representation of the person.

In accordance with some embodiments, a computer system configured to communicate with one or more display generation components is described. The computer system comprises: one or more processors; and memory storing one or more programs configured to be executed by the one or more processors, the one or more programs including instructions for: displaying, via the one or more display generation components, movement of a representation of a person in front of a background, wherein a visual property of an edge of a respective portion of the representation of the person changes based on an appearance of a portion of the background behind the respective portion of the representation of the person, including: in accordance with a determination that the portion of the background behind the respective portion of the representation of the person has a first value for a respective visual property, displaying the edge of the respective portion of the representation of the person with a first appearance that is based on the first value for the respective visual property; and in accordance with a determination that the portion of the background behind the respective portion of the representation of the person has a second value for the respective visual property that is different from the first value for the respective visual property, displaying the edge of the respective portion of the representation of the person with a second appearance that is based on the second value for the respective visual property and is different from the first appearance of the edge of the respective portion of the representation of the person.

In accordance with some embodiments, a computer system configured to communicate with one or more display generation components is described. The computer system comprises: means for displaying, via the one or more display generation components, movement of a representation of a person in front of a background, wherein a visual property of an edge of a respective portion of the representation of the person changes based on an appearance of a portion of the background behind the respective portion of the representation of the person, including: in accordance with a determination that the portion of the background behind the respective portion of the representation of the person has a first value for a respective visual property, displaying the edge of the respective portion of the representation of the person with a first appearance that is based on the first value for the respective visual property; and in accordance with a determination that the portion of the background behind the respective portion of the representation of the person has a second value for the respective visual property that is different from the first value for the respective visual property, displaying the edge of the respective portion of the representation of the person with a second appearance that is based on the second value for the respective visual property and is different from the first appearance of the edge of the respective portion of the representation of the person.

In accordance with some embodiments, a computer program product is described. The computer program product comprises one or more programs configured to be executed by one or more processors of a computer system that is in communication with one or more display generation components. The one or more programs include instructions for: displaying, via the one or more display generation components, movement of a representation of a person in front of a background, wherein a visual property of an edge of a respective portion of the representation of the person changes based on an appearance of a portion of the background behind the respective portion of the representation of the person, including: in accordance with a determination that the portion of the background behind the respective portion of the representation of the person has a first value for a respective visual property, displaying the edge of the respective portion of the representation of the person with a first appearance that is based on the first value for the respective visual property; and in accordance with a determination that the portion of the background behind the respective portion of the representation of the person has a second value for the respective visual property that is different from the first value for the respective visual property, displaying the edge of the respective portion of the representation of the person with a second appearance that is based on the second value for the respective visual property and is different from the first appearance of the edge of the respective portion of the representation of the person.

In accordance with some embodiments, a method is described. The method comprises: at a computer system that is in communication with one or more display generation components: displaying, via the one or more display generation components, a representation of a person from a respective viewing angle relative to a respective portion of the representation of the person, including: in accordance with a determination that the respective viewing angle relative to the respective portion of the representation of the person corresponds to a first viewing angle relative to the respective portion of the representation of the person, displaying the representation of the person with an appearance having a first level of detail; and in accordance with a determination that the respective viewing angle relative to the respective portion of the representation of the person corresponds to a second viewing angle relative to the respective portion of the representation of the person that is different from the first viewing angle, displaying the representation of the person with the appearance having a second level of detail that is different from the first level of detail.

In accordance with some embodiments, a non-transitory computer-readable storage medium is described. The non-transitory computer-readable storage medium stores one or more programs configured to be executed by one or more processors of a computer system that is in communication with one or more display generation components. The one or more programs include instructions for: displaying, via the one or more display generation components, a representation of a person from a respective viewing angle relative to a respective portion of the representation of the person, including: in accordance with a determination that the respective viewing angle relative to the respective portion of the representation of the person corresponds to a first viewing angle relative to the respective portion of the representation of the person, displaying the representation of the person with an appearance having a first level of detail; and in accordance with a determination that the respective viewing angle relative to the respective portion of the representation of the person corresponds to a second viewing angle relative to the respective portion of the representation of the person that is different from the first viewing angle, displaying the representation of the person with the appearance having a second level of detail that is different from the first level of detail.

In accordance with some embodiments, a transitory computer-readable storage medium is described. The transitory computer-readable storage medium stores one or more programs configured to be executed by one or more processors of a computer system that is in communication with one or more display generation components. The one or more programs include instructions for: displaying, via the one or more display generation components, a representation of a person from a respective viewing angle relative to a respective portion of the representation of the person, including: in accordance with a determination that the respective viewing angle relative to the respective portion of the representation of the person corresponds to a first viewing angle relative to the respective portion of the representation of the person, displaying the representation of the person with an appearance having a first level of detail; and in accordance with a determination that the respective viewing angle relative to the respective portion of the representation of the person corresponds to a second viewing angle relative to the respective portion of the representation of the person that is different from the first viewing angle, displaying the representation of the person with the appearance having a second level of detail that is different from the first level of detail.

In accordance with some embodiments, a computer system configured to communicate with one or more display generation components is described. The computer system comprises: one or more processors; and memory storing one or more programs configured to be executed by the one or more processors, the one or more programs including instructions for: displaying, via the one or more display generation components, a representation of a person from a respective viewing angle relative to a respective portion of the representation of the person, including: in accordance with a determination that the respective viewing angle relative to the respective portion of the representation of the person corresponds to a first viewing angle relative to the respective portion of the representation of the person, displaying the representation of the person with an appearance having a first level of detail; and in accordance with a determination that the respective viewing angle relative to the respective portion of the representation of the person corresponds to a second viewing angle relative to the respective portion of the representation of the person that is different from the first viewing angle, displaying the representation of the person with the appearance having a second level of detail that is different from the first level of detail.

In accordance with some embodiments, a computer system configured to communicate with one or more display generation components is described. The computer system comprises: means for displaying, via the one or more display generation components, a representation of a person from a respective viewing angle relative to a respective portion of the representation of the person, including: in accordance with a determination that the respective viewing angle relative to the respective portion of the representation of the person corresponds to a first viewing angle relative to the respective portion of the representation of the person, displaying the representation of the person with an appearance having a first level of detail; and in accordance with a determination that the respective viewing angle relative to the respective portion of the representation of the person corresponds to a second viewing angle relative to the respective portion of the representation of the person that is different from the first viewing angle, displaying the representation of the person with the appearance having a second level of detail that is different from the first level of detail.

In accordance with some embodiments, a computer program product is described. The computer program product comprises one or more programs configured to be executed by one or more processors of a computer system that is in communication with one or more display generation components, the one or more programs including instructions for: displaying, via the one or more display generation components, a representation of a person from a respective viewing angle relative to a respective portion of the representation of the person, including: in accordance with a determination that the respective viewing angle relative to the respective portion of the representation of the person corresponds to a first viewing angle relative to the respective portion of the representation of the person, displaying the representation of the person with an appearance having a first level of detail; and in accordance with a determination that the respective viewing angle relative to the respective portion of the representation of the person corresponds to a second viewing angle relative to the respective portion of the representation of the person that is different from the first viewing angle, displaying the representation of the person with the appearance having a second level of detail that is different from the first level of detail.

In accordance with some embodiments, a method is described. The method comprises: at a computer system that is in communication with one or more display generation components: displaying, via the one or more display generation components, a representation of a person, including displaying a representation of a face of the person with a first visual fidelity; and in response to a determination that a mouth of the person is occluded, displaying the representation of the face of the person with a second visual fidelity that is less than the first visual fidelity.

In accordance with some embodiments, a non-transitory computer-readable storage medium is described. The non-transitory computer-readable storage medium stores one or more programs configured to be executed by one or more processors of a computer system that is in communication with one or more display generation components. The one or more programs include instructions for: displaying, via the one or more display generation components, a representation of a person, including displaying a representation of a face of the person with a first visual fidelity; and in response to a determination that a mouth of the person is occluded, displaying the representation of the face of the person with a second visual fidelity that is less than the first visual fidelity.

In accordance with some embodiments, a transitory computer-readable storage medium is described. The transitory computer-readable storage medium stores one or more programs configured to be executed by one or more processors of a computer system that is in communication with one or more display generation components. The one or more programs include instructions for: displaying, via the one or more display generation components, a representation of a person, including displaying a representation of a face of the person with a first visual fidelity; and in response to a determination that a mouth of the person is occluded, displaying the representation of the face of the person with a second visual fidelity that is less than the first visual fidelity.

In accordance with some embodiments, a computer system configured to communicate with one or more display generation components is described. The computer system comprises: one or more processors; and memory storing one or more programs configured to be executed by the one or more processors, the one or more programs including instructions for: displaying, via the one or more display generation components, a representation of a person, including displaying a representation of a face of the person with a first visual fidelity; and in response to a determination that a mouth of the person is occluded, displaying the representation of the face of the person with a second visual fidelity that is less than the first visual fidelity.

In accordance with some embodiments, a computer system configured to communicate with one or more display generation components is described. The computer system comprises: means for displaying, via the one or more display generation components, a representation of a person, including displaying a representation of a face of the person with a first visual fidelity; and means for, in response to a determination that a mouth of the person is occluded, displaying the representation of the face of the person with a second visual fidelity that is less than the first visual fidelity.

In accordance with some embodiments, a computer program product is described. The computer program product comprises one or more programs configured to be executed by one or more processors of a computer system that is in communication with one or more display generation components, the one or more programs including instructions for: displaying, via the one or more display generation components, a representation of a person, including displaying a representation of a face of the person with a first visual fidelity; and in response to a determination that a mouth of the person is occluded, displaying the representation of the face of the person with a second visual fidelity that is less than the first visual fidelity.

In accordance with some embodiments, a method is described. The method comprises: at a computer system that is in communication with one or more display generation components: while displaying, via the one or more display generation components, a representation of a person, updating the representation of the person over time, including: moving one or more portions of the representation of the person based on movement of one or more corresponding portions of the person; while moving one or more portions of the representation of the person based on movement of one or more corresponding portions of the person, shifting a boundary of the representation of the person over time to change which portions of the representation of the person are visible, wherein the boundary shifts gradually over time, including: at a first time, displaying, via the one or more display generation components, a first portion of the representation of the person that is based on a first position of the boundary; and after displaying the first portion of the representation of the person that is based on the first position of the boundary, displaying, via the one or more display generation components, a second portion of the representation of the person that is based on a second position of the boundary that is different from the first position of the boundary, wherein the second portion of the representation of the person is different from the first portion of the representation of the person.

In accordance with some embodiments, a non-transitory computer-readable storage medium is described. The non-transitory computer-readable storage medium stores one or more programs configured to be executed by one or more processors of a computer system that is in communication with one or more display generation components. The one or more programs include instructions for: while displaying, via the one or more display generation components, a representation of a person, updating the representation of the person over time, including: moving one or more portions of the representation of the person based on movement of one or more corresponding portions of the person; while moving one or more portions of the representation of the person based on movement of one or more corresponding portions of the person, shifting a boundary of the representation of the person over time to change which portions of the representation of the person are visible, wherein the boundary shifts gradually over time, including: at a first time, displaying, via the one or more display generation components, a first portion of the representation of the person that is based on a first position of the boundary; and after displaying the first portion of the representation of the person that is based on the first position of the boundary, displaying, via the one or more display generation components, a second portion of the representation of the person that is based on a second position of the boundary that is different from the first position of the boundary, wherein the second portion of the representation of the person is different from the first portion of the representation of the person.

In accordance with some embodiments, a transitory computer-readable storage medium is described. The transitory computer-readable storage medium stores one or more programs configured to be executed by one or more processors of a computer system that is in communication with one or more display generation components. The one or more programs include instructions for: while displaying, via the one or more display generation components, a representation of a person, updating the representation of the person over time, including: moving one or more portions of the representation of the person based on movement of one or more corresponding portions of the person; while moving one or more portions of the representation of the person based on movement of one or more corresponding portions of the person, shifting a boundary of the representation of the person over time to change which portions of the representation of the person are visible, wherein the boundary shifts gradually over time, including: at a first time, displaying, via the one or more display generation components, a first portion of the representation of the person that is based on a first position of the boundary; and after displaying the first portion of the representation of the person that is based on the first position of the boundary, displaying, via the one or more display generation components, a second portion of the representation of the person that is based on a second position of the boundary that is different from the first position of the boundary, wherein the second portion of the representation of the person is different from the first portion of the representation of the person.

In accordance with some embodiments, a computer system configured to communicate with one or more display generation components is described. The computer system comprises one or more processors and memory storing one or more programs configured to be executed by the one or more processors. The one or more programs include instructions for: while displaying, via the one or more display generation components, a representation of a person, updating the representation of the person over time, including:

moving one or more portions of the representation of the person based on movement of one or more corresponding portions of the person; while moving one or more portions of the representation of the person based on movement of one or more corresponding portions of the person, shifting a boundary of the representation of the person over time to change which portions of the representation of the person are visible, wherein the boundary shifts gradually over time, including: at a first time, displaying, via the one or more display generation components, a first portion of the representation of the person that is based on a first position of the boundary; and after displaying the first portion of the representation of the person that is based on the first position of the boundary, displaying, via the one or more display generation components, a second portion of the representation of the person that is based on a second position of the boundary that is different from the first position of the boundary, wherein the second portion of the representation of the person is different from the first portion of the representation of the person.

In accordance with some embodiments, a computer system configured to communicate with one or more display generation components is described. The computer system comprises: means for, while displaying, via the one or more display generation components, a representation of a person, updating the representation of the person over time, including: moving one or more portions of the representation of the person based on movement of one or more corresponding portions of the person; while moving one or more portions of the representation of the person based on movement of one or more corresponding portions of the person, shifting a boundary of the representation of the person over time to change which portions of the representation of the person are visible, wherein the boundary shifts gradually over time, including: at a first time, displaying, via the one or more display generation components, a first portion of the representation of the person that is based on a first position of the boundary; and after displaying the first portion of the representation of the person that is based on the first position of the boundary, displaying, via the one or more display generation components, a second portion of the representation of the person that is based on a second position of the boundary that is different from the first position of the boundary, wherein the second portion of the representation of the person is different from the first portion of the representation of the person.

In accordance with some embodiments, a computer program product is described. The computer program product comprises one or more programs configured to be executed by one or more processors of a computer system that is in communication with one or more display generation components. The one or more programs include instructions for: while displaying, via the one or more display generation components, a representation of a person, updating the representation of the person over time, including: moving one or more portions of the representation of the person based on movement of one or more corresponding portions of the person; while moving one or more portions of the representation of the person based on movement of one or more corresponding portions of the person, shifting a boundary of the representation of the person over time to change which portions of the representation of the person are visible, wherein the boundary shifts gradually over time, including: at a first time, displaying, via the one or more display generation components, a first portion of the representation of the person that is based on a first position of the boundary; and after displaying the first portion of the representation of the person that is based on the first position of the boundary, displaying, via the one or more display generation components, a second portion of the representation of the person that is based on a second position of the boundary that is different from the first position of the boundary, wherein the second portion of the representation of the person is different from the first portion of the representation of the person.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIG. 8 is a flow diagram of methods of displaying a representation of a person based on a background behind the representation of the person, in accordance with some embodiments.

FIGS. 9A-9J illustrate example techniques for displaying a representation of a person at different viewing angles, in accordance with some embodiments.

FIG. 10 is a flow diagram of methods of displaying a representation of a person at different viewing angles, in accordance with some embodiments.

FIGS. 11A-11F illustrate example techniques for displaying a representation of a person when a mouth of the person is occluded by an object, in accordance with some embodiments.

FIG. 12 is a flow diagram of methods of displaying a representation of a person when a mouth of the person is occluded by an object, in accordance with some embodiments.

FIG. 14 is a flow diagram of methods of displaying a representation of a person, in accordance with some embodiments.

DESCRIPTION OF EMBODIMENTS

Figure 1A:
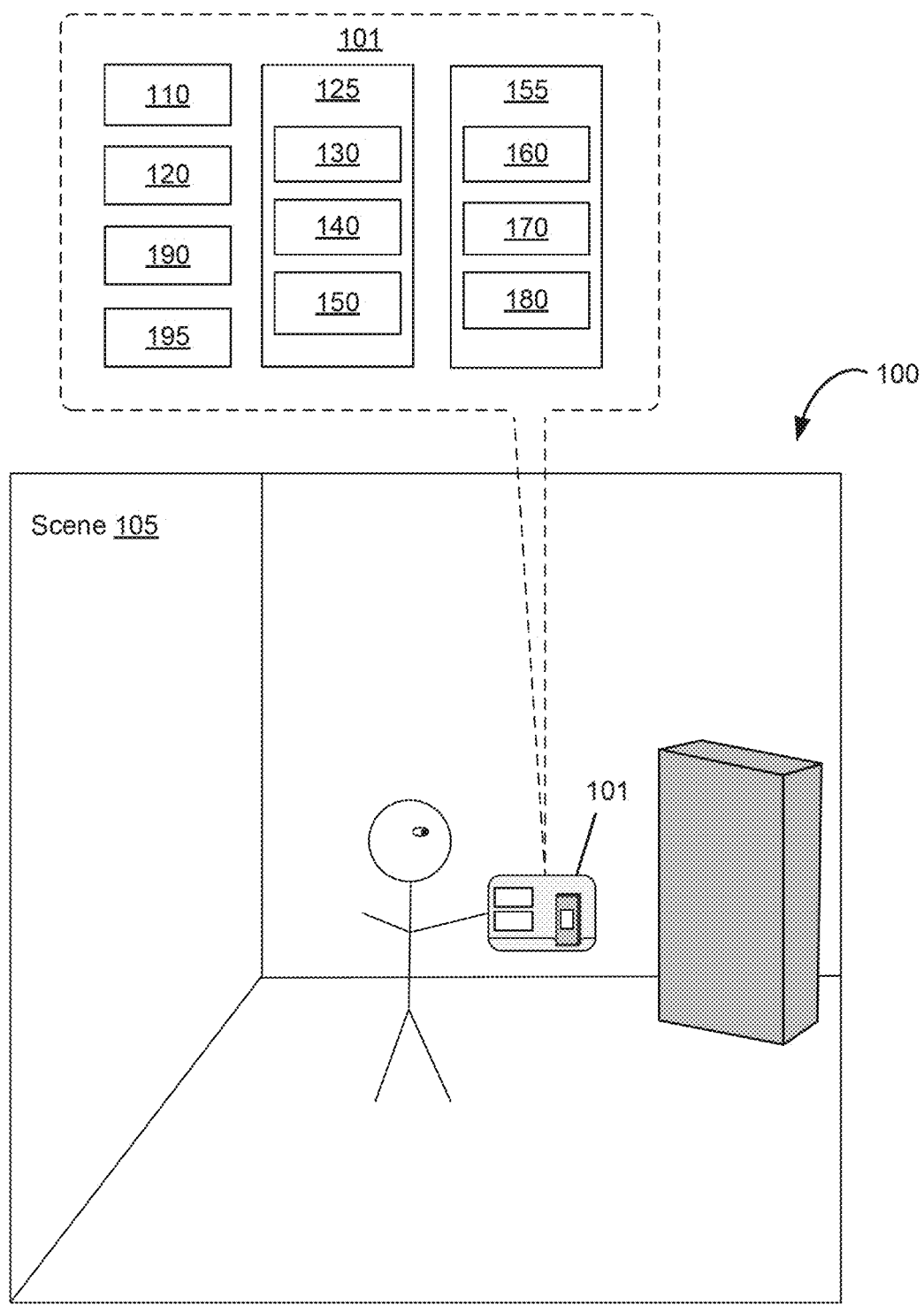
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system displays a representation of a person based on a background behind the representation of the person (e.g., in a virtual or mixed reality environment). Displaying a representation of a person based on a background behind the representation of the person informs the user about the state (or change in state) of the person, conveys information from the person, and updates the appearance of the representation of the person without requiring user input, thereby performing an operation when a set of conditions has been met without requiring further user input, providing improved visual feedback to the user, reducing the number of inputs needed to perform an operation, and providing a more varied, detailed, and/or realistic user experience while saving storage space.

In some embodiments, a computer system displays a representation of a person with different levels of detail at different viewing angles. Displaying the representation of the person with different levels of detail at different viewing angles informs the user about the state of the person and the amount of information that is known about the portion of the user that is visible from a particular viewing angle, thereby providing improved visual feedback and providing a more varied, detailed, and/or realistic user experience.

In some embodiments, a computer system displays a representation of a person when a mouth of the person is occluded by an object. The computer system displays the representation with less visual fidelity when the mouth of the person is occluded. Displaying the representation of the face of the person with less visual fidelity when a mouth of the person is occluded indicates to the user that the mouth of the person is occluded, avoids confusing the user by not displaying the face of the person with an appearance that portrays a greater accuracy than is actually known, and updates the appearance of the representation of the person due to the occlusion without requiring user input, thereby providing improved visual feedback to the user, reducing the number of inputs needed to perform an operation, and providing a more varied, detailed, and/or realistic user experience while saving storage space.

In some embodiments, a computer system displays a representation of a person including a boundary that shifts over time to change which portions of the representation of the person are visible. Shifting the boundary of the representation of the person over time to change which portions of the representation of the person are visible informs the user about the state (or change in state) of the person (e.g., such as the movement of the one or more corresponding portions of the person), conveys information about the certainty of the appearance of the person (e.g., the accuracy of the representation of the person), and updates the appearance of the representation of the person without requiring user input, thereby providing improved visual feedback to the user, reducing the number of inputs needed to perform an operation, and providing a more varied, detailed, and/or realistic user experience while saving storage space.

Figure 13B:
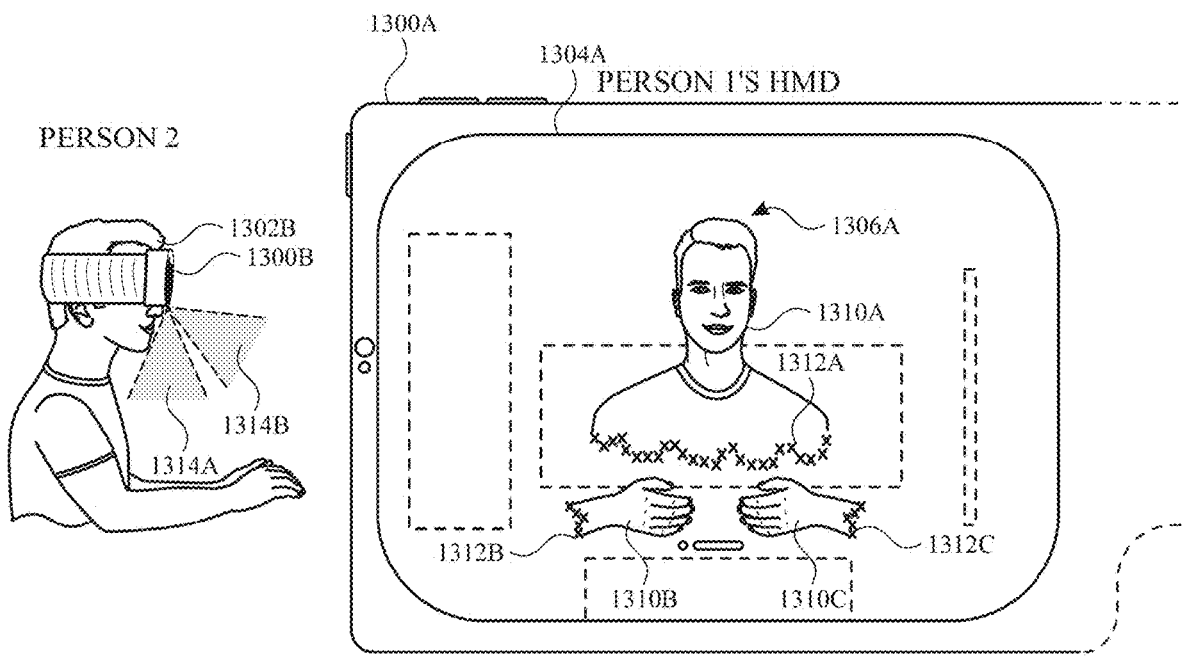
FIGS. 13A-13N illustrate example techniques for displaying a representation of a person, in accordance with some embodiments.

FIGS. 1A-6 provide a description of example computer systems for providing XR experiences to users. FIGS. 7A-7P illustrate example techniques for displaying a representation of a person based on a background behind the representation of the person, in some embodiments. FIG. 8 is a flow diagram of methods of displaying a representation of a person based on a background behind the representation of the person, in some embodiments. The user interfaces in FIGS. 7A-7P are used to illustrate the processes in FIG. 8. FIGS. 9A-9J illustrate example techniques for displaying a representation of a person at different viewing angles, in some embodiments. FIG. 10 is a flow diagram of methods of displaying a representation of a person at different viewing angles, in some embodiments. The user interfaces in FIGS. 9A-9J are used to illustrate the processes in FIG. 10. FIGS. 11A-11F illustrate example techniques for displaying a representation of a person when a mouth of the person is occluded by an object, in some embodiments. FIG. 12 is a flow diagram of methods of displaying a representation of a person when a mouth of the person is occluded by an object, in some embodiments. The user interfaces in FIGS. 11A-11F are used to illustrate the processes in FIG. 12. FIGS. 13A-13N illustrate example techniques for displaying a representation of a person, in some embodiments. FIG. 14 is a flow diagram of methods of displaying a representation of a person, in some embodiments. The user interfaces in FIGS. 13A-13N are used to illustrate the processes in FIG. 14.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, or 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the car-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the cars of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the cars of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/ earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
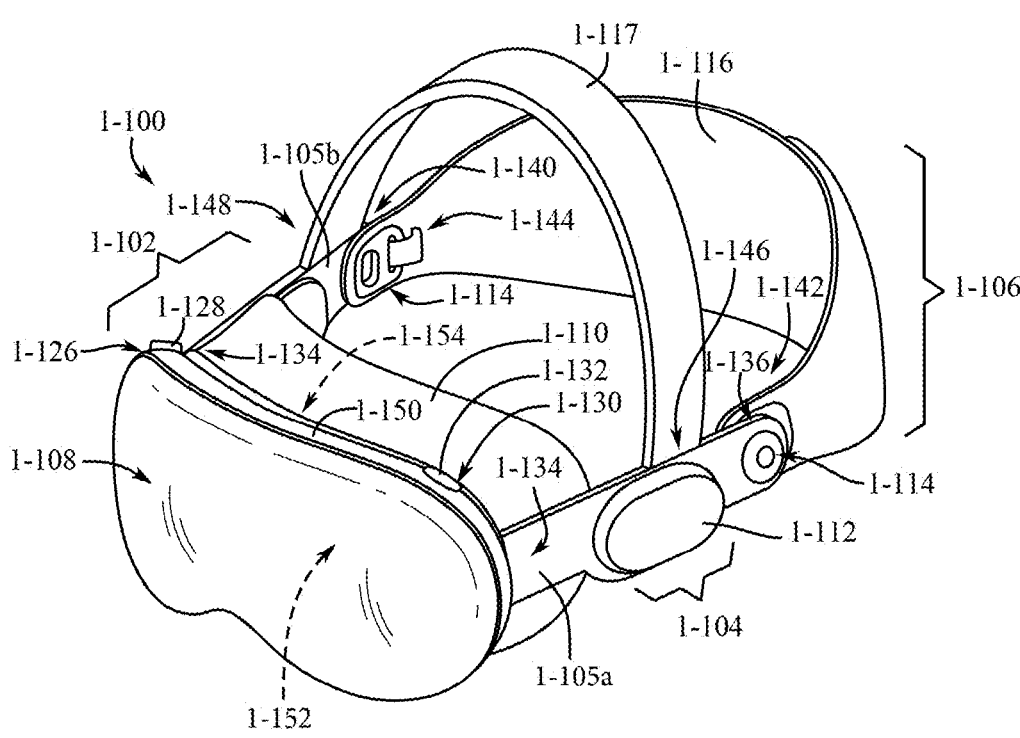
FIGS. 1B-1P are examples of a computer system for providing XR experiences in the operating environment of FIG. 1A.
Figure 1C:
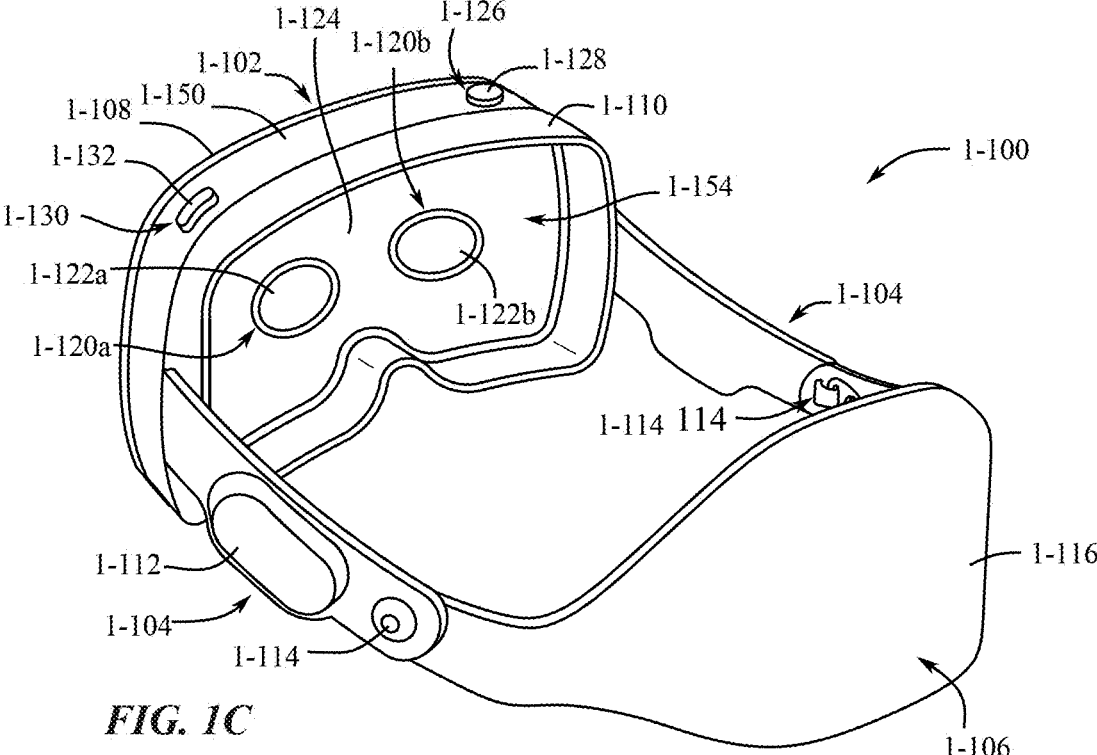
Figure 1D:
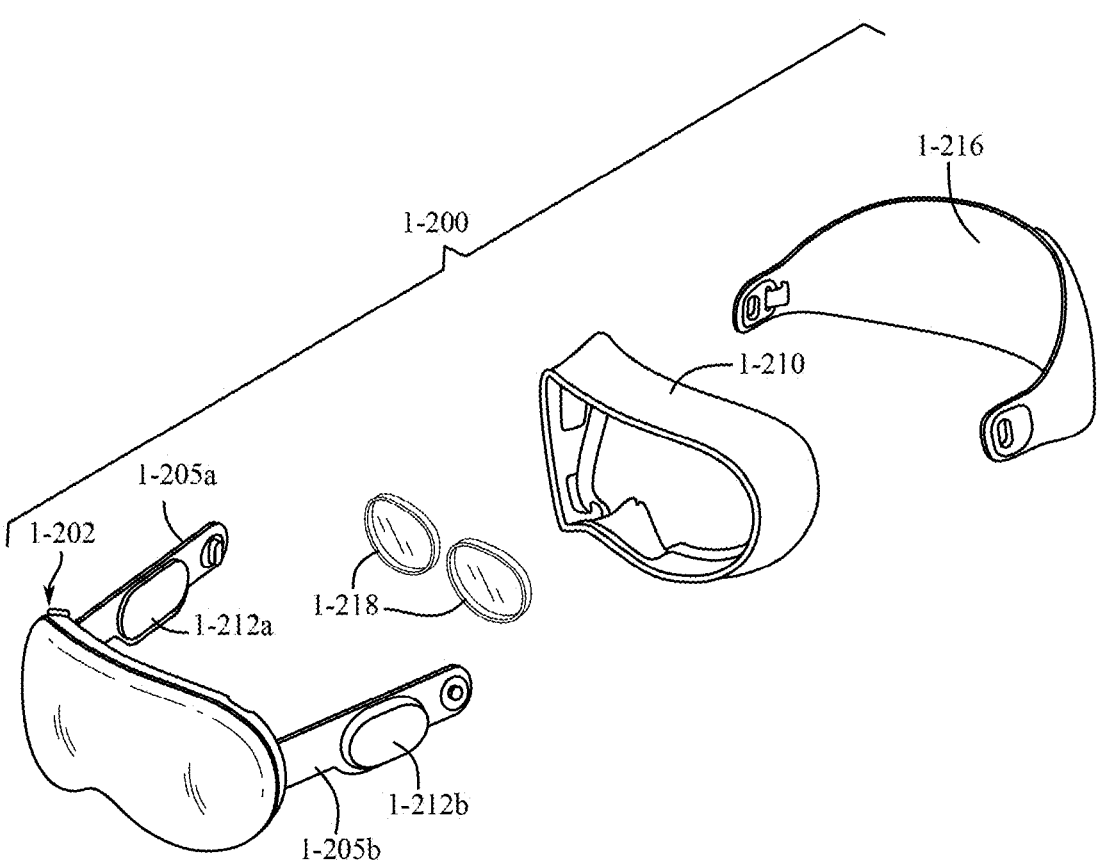
Figure 1E:
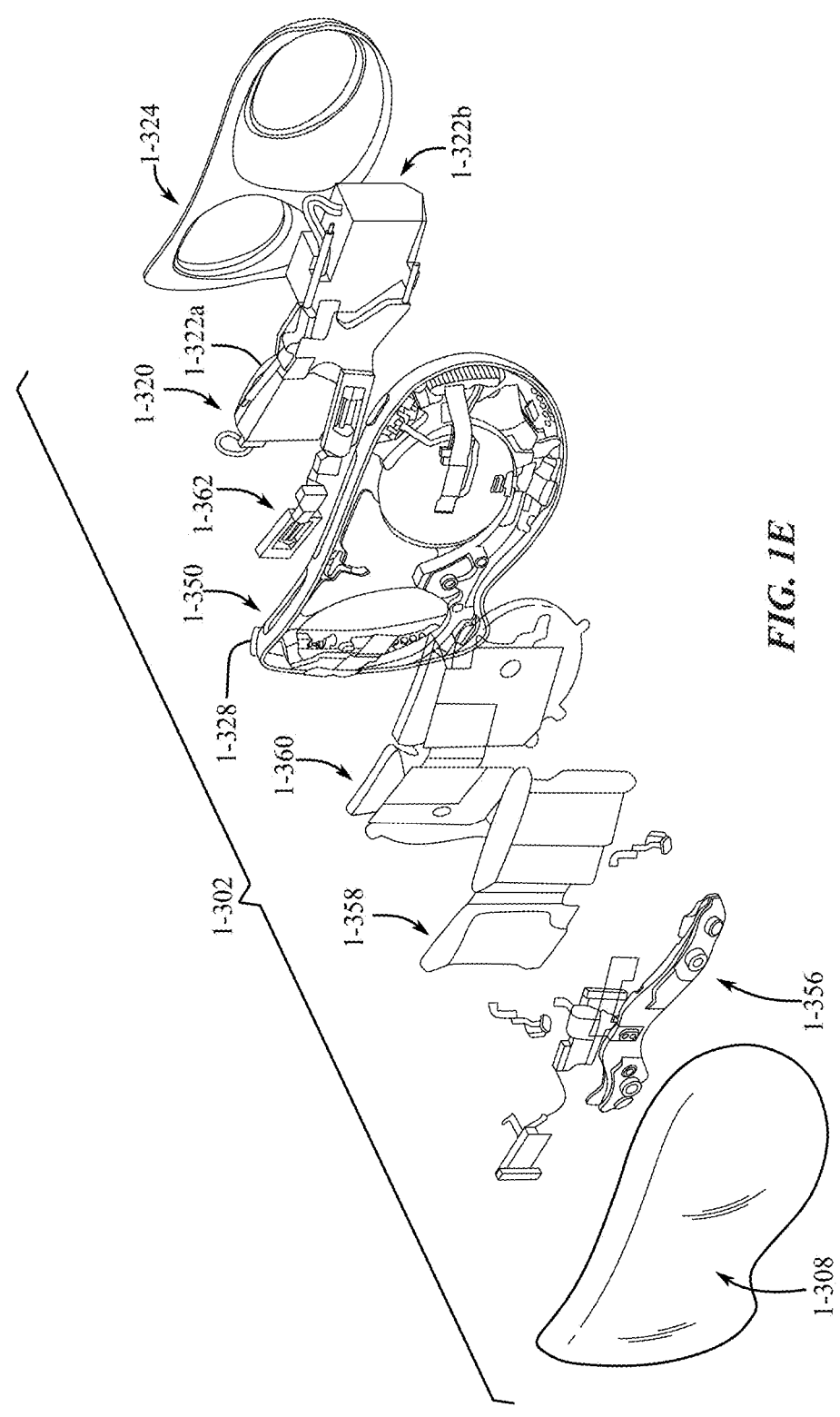
Figure 1F:
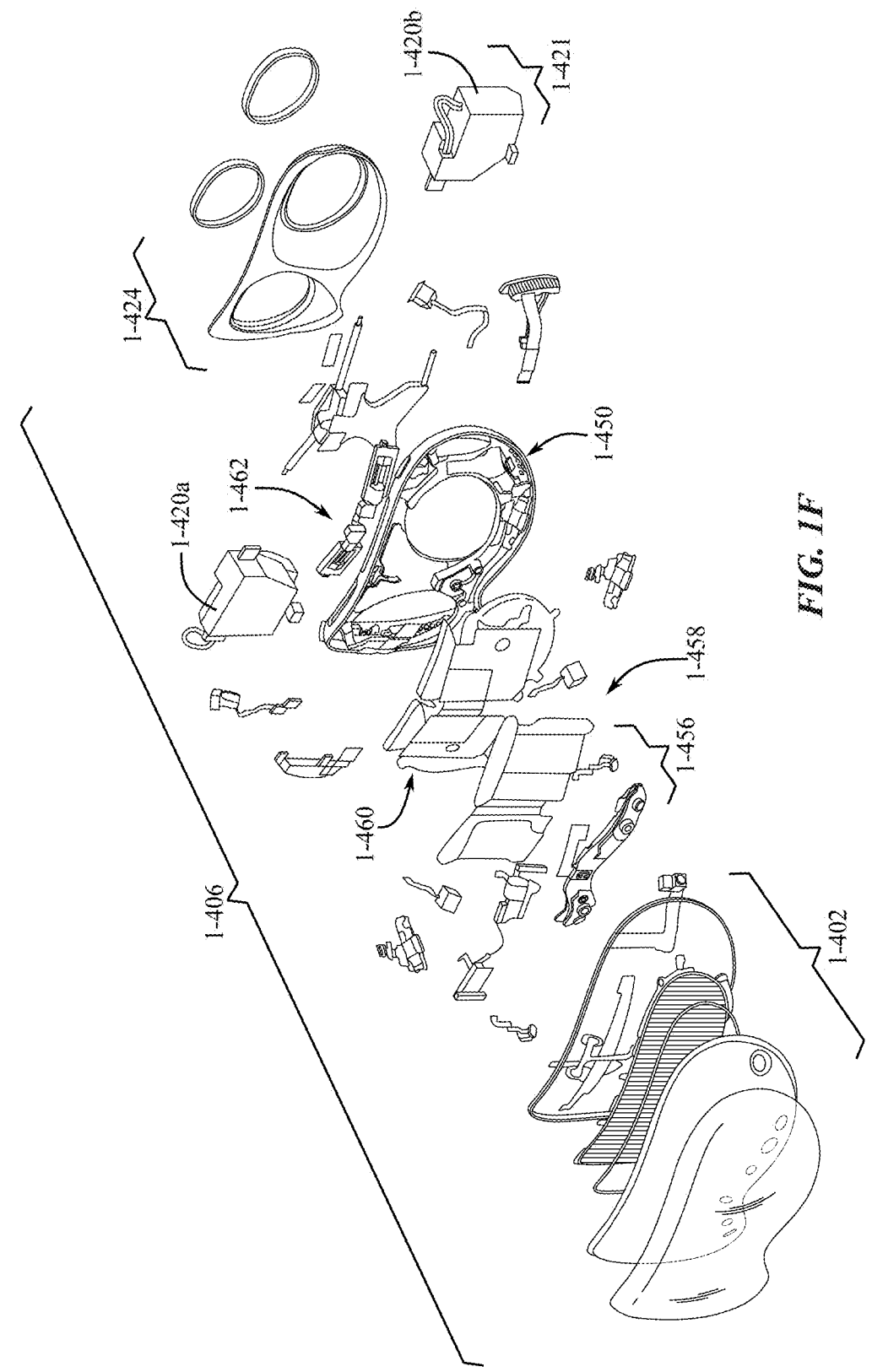
Figure 1G:
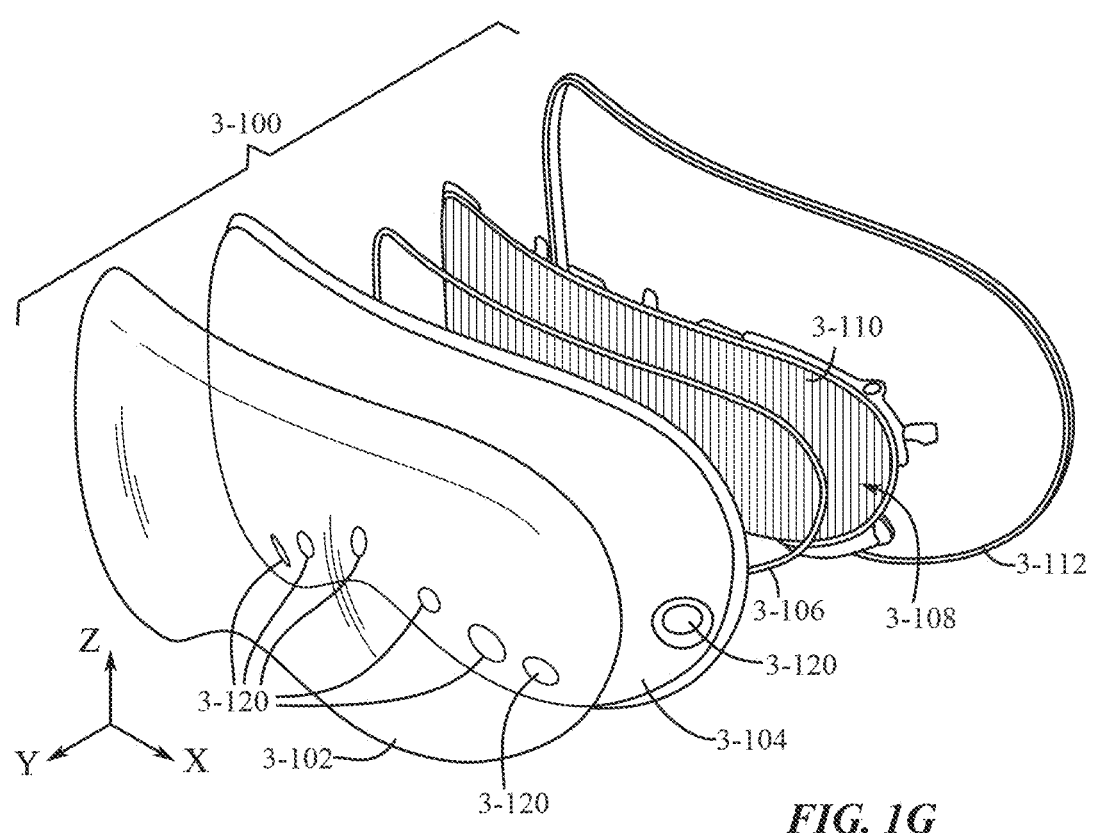
Figure 1H:
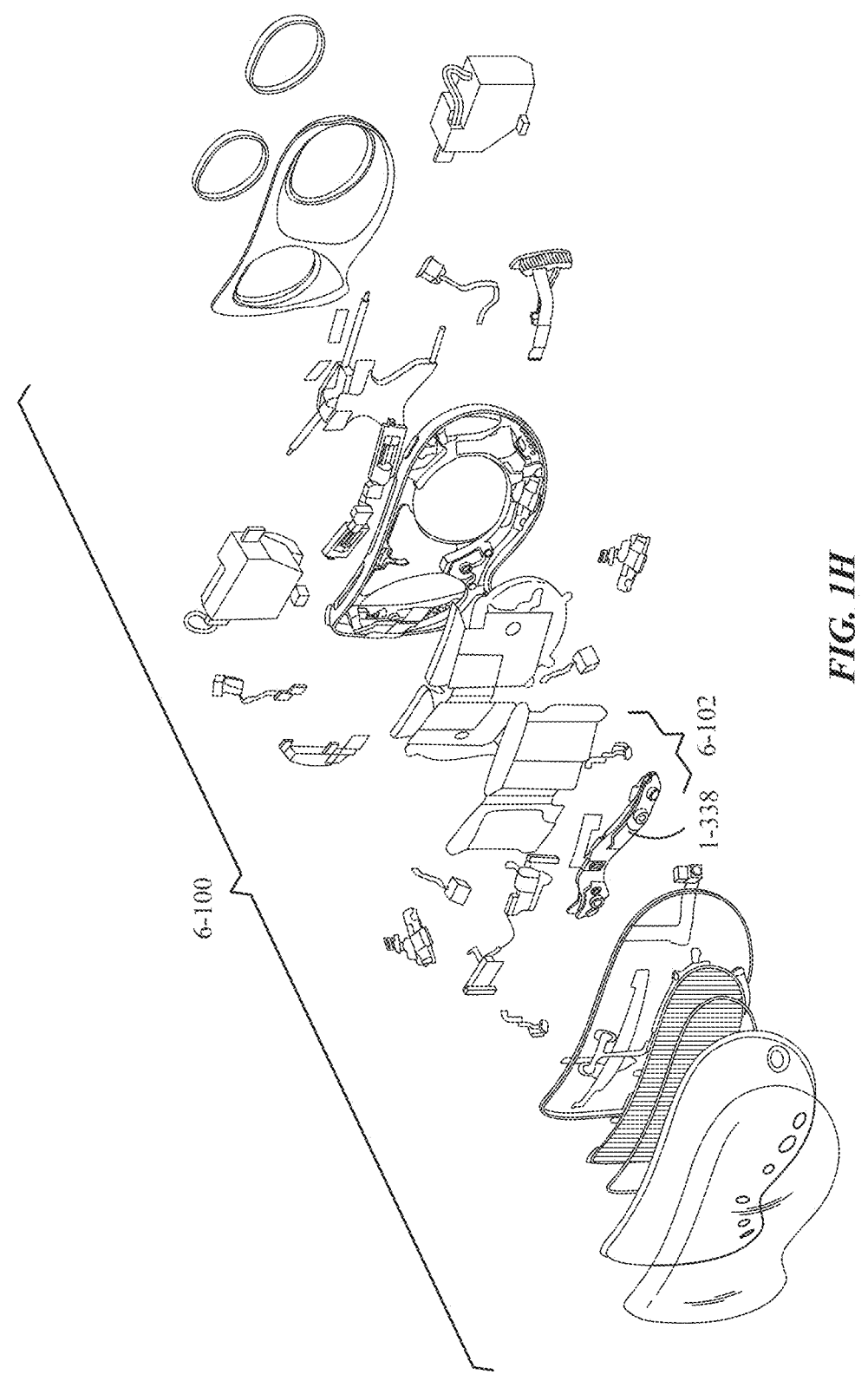
Figure 1I:
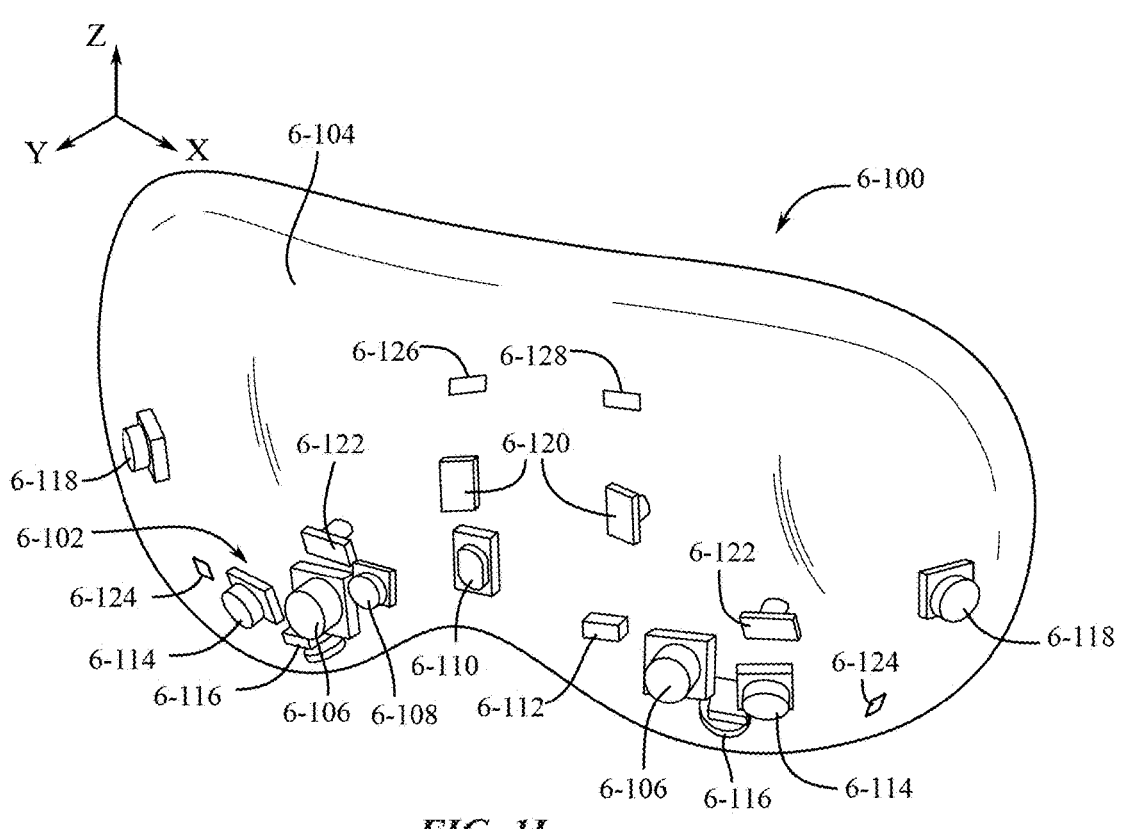
Figure 1J:
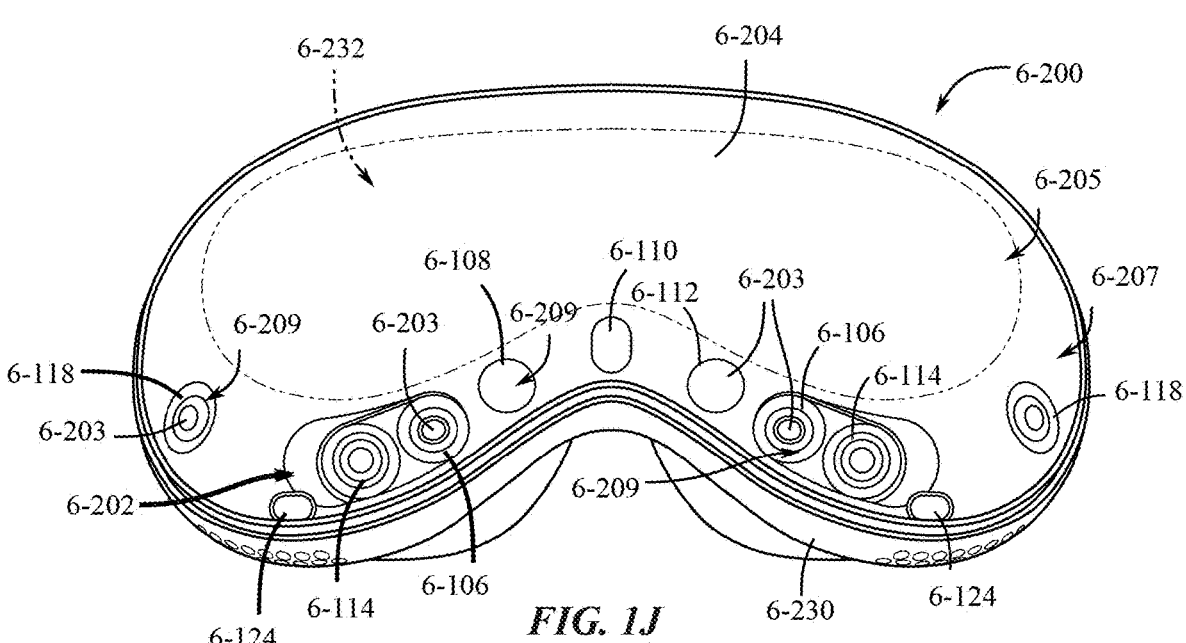
Figure 1K:
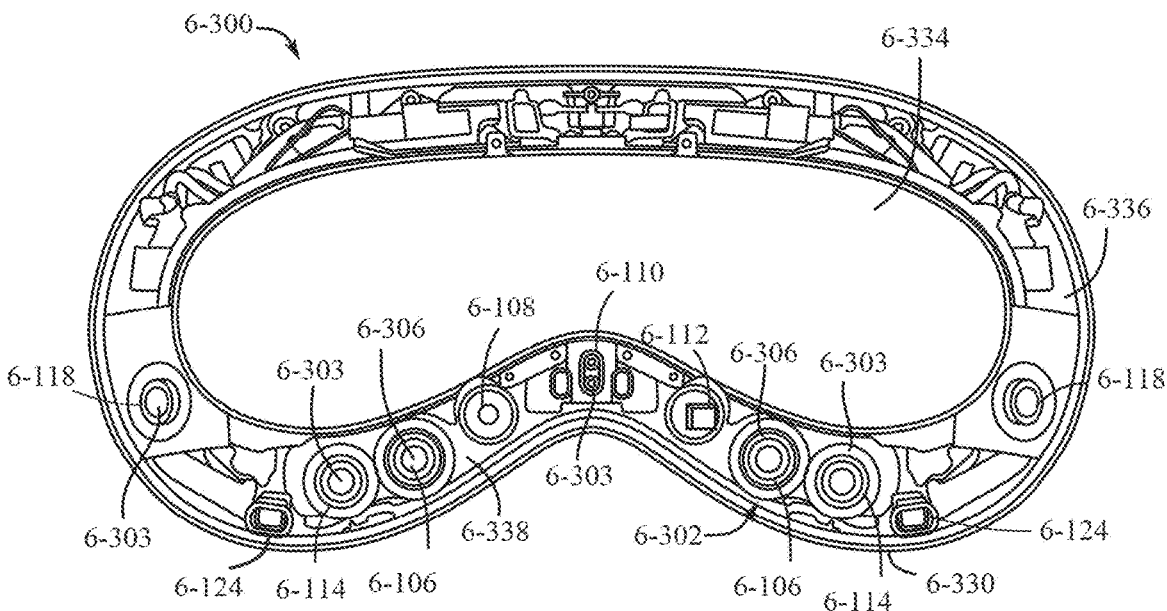
Figure 1L:
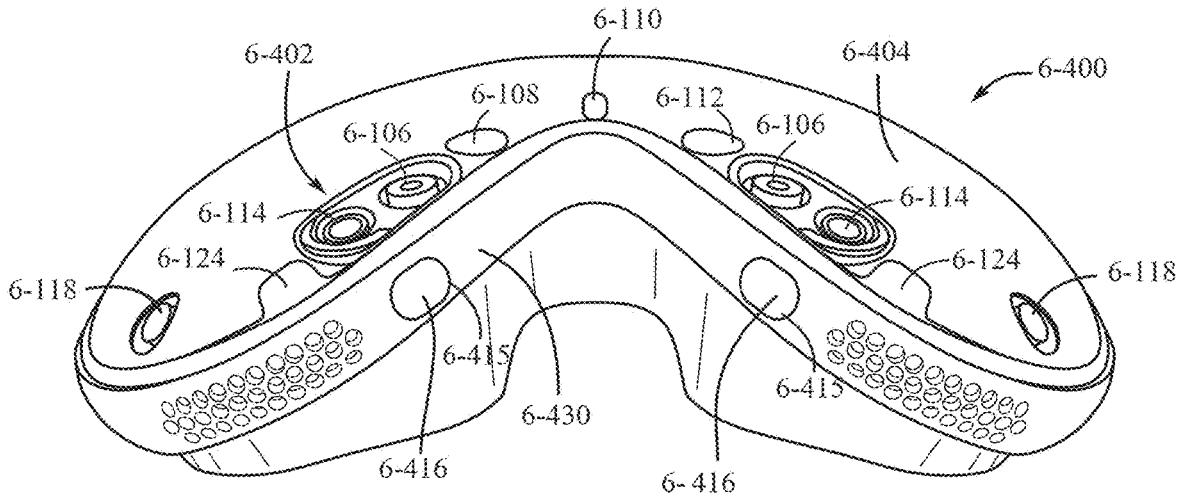
Figure 1M:
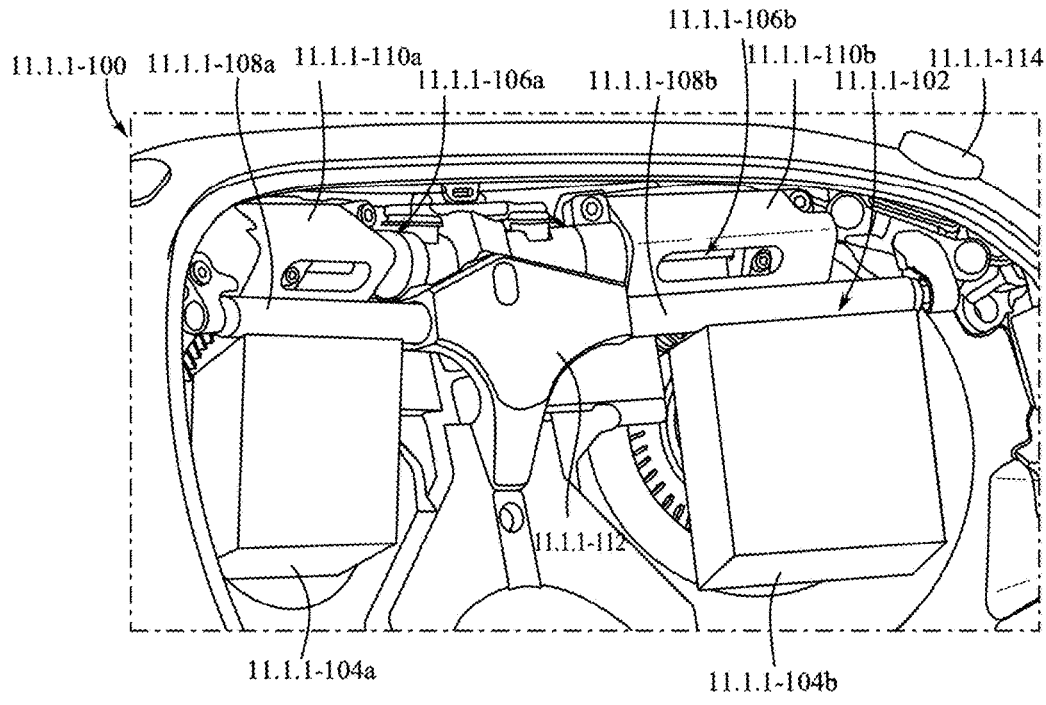
Figure 1N:
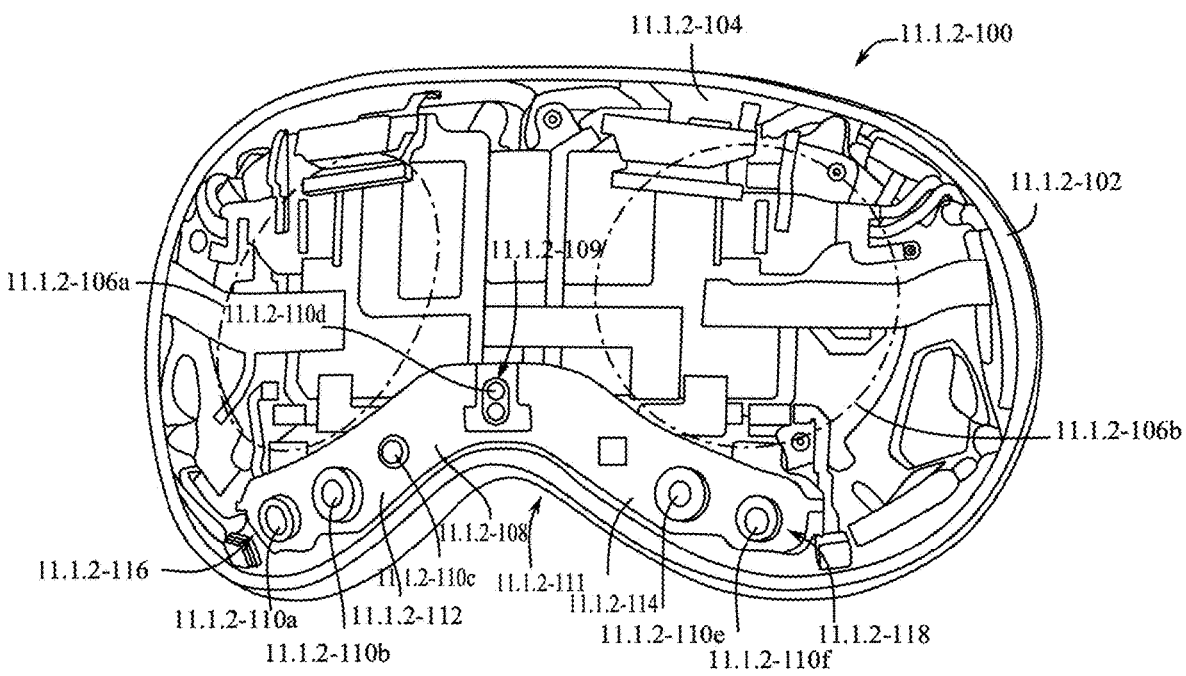
Figure 1O:
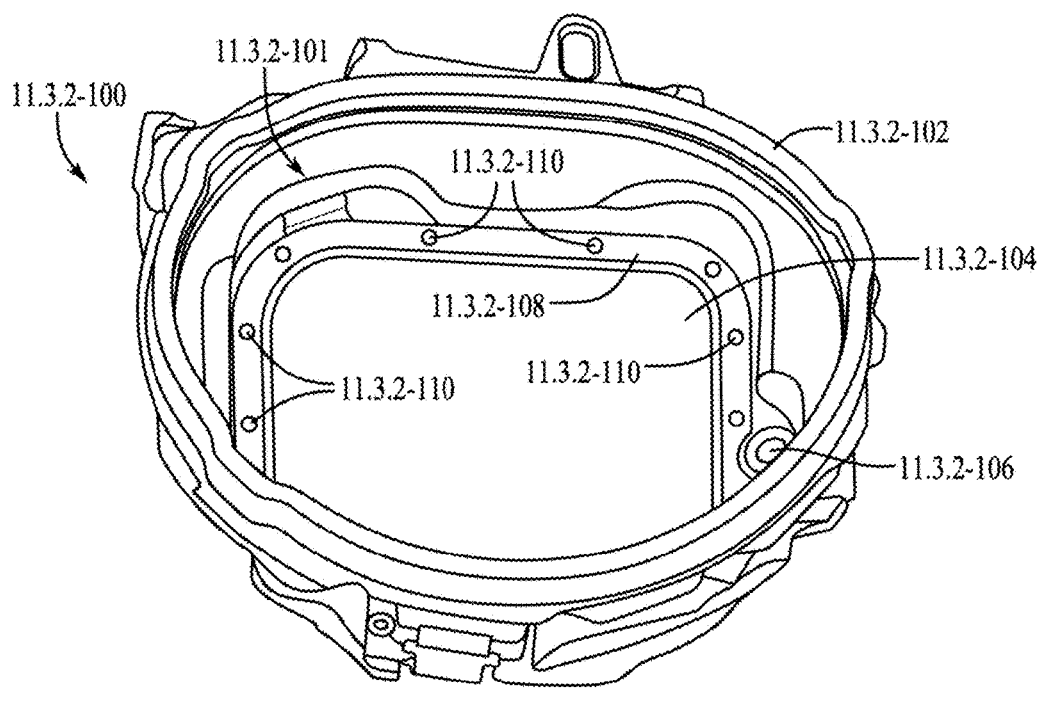
Figure 1P:
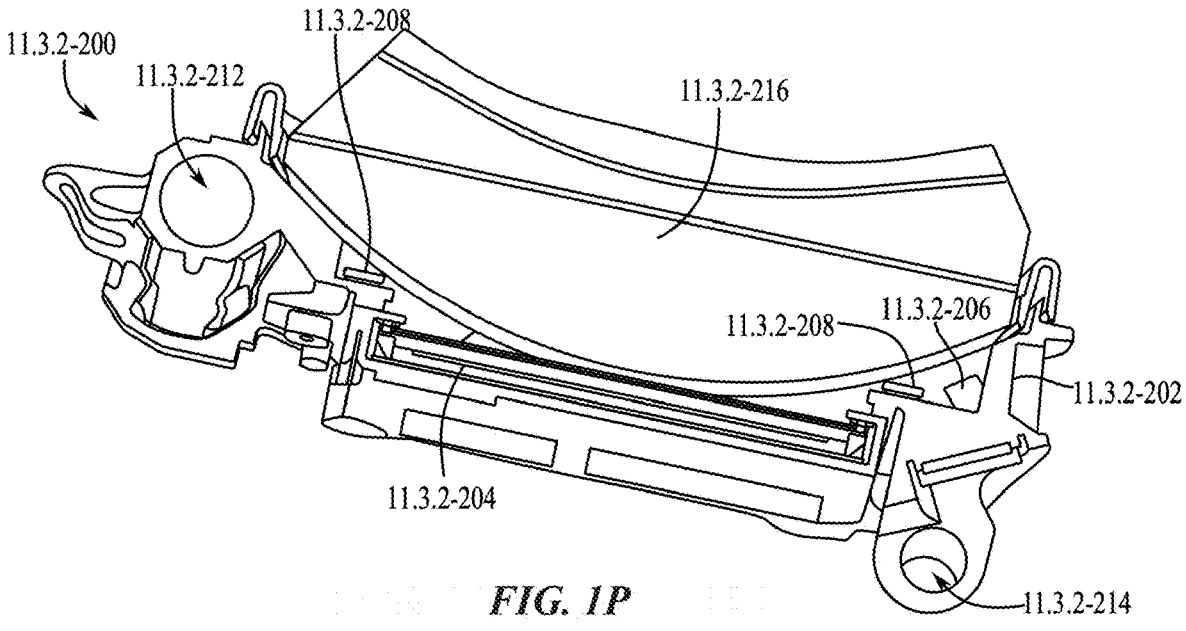

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 10) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward-facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-IF and described herein. Likewise, any of the features, components, and/or parts, including the arrangements and configurations thereof shown and described with reference to FIGS. 1D-IF can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-IF can be included, either alone or in any combination, in the example of the devices, features, components, and parts shown in FIG. 1D.

FIG. 1E illustrates an exploded view of an example of a display unit 1-302 of an HMD. The display unit 1-302 can include a front display assembly 1-308, a frame/housing assembly 1-350, and a curtain assembly 1-324. The display unit 1-302 can also include a sensor assembly 1-356, logic board assembly 1-358, and cooling assembly 1-360 disposed between the frame assembly 1-350 and the front display assembly 1-308. In at least one example, the display unit 1-302 can also include a rear-facing display assembly 1-320 including first and second rear-facing display screens 1-322a, 1-322b disposed between the frame 1-350 and the curtain assembly 1-324.

In at least one example, the display unit 1-302 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-302 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and IF and described herein. Likewise, any of the features, components, and/or parts, including the arrangements and configurations thereof shown and described with reference to FIGS. 1B-ID and IF can be included, either alone or in any combination, in the example of the devices, features, components, and parts shown in FIG. 1E.

FIG. 1F illustrates an exploded view of another example of a display unit 1-406 of an HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the display assembly 1-108 of the HMD 1-100 shown in FIG. 1B or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward-facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward-facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin.

In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG.

1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 11-1J and 1L and described herein. Likewise, any of the features, components, and/or parts, including the arrangements and configurations thereof shown and described with reference to FIGS. 11-1J and IL can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 11-1K and described herein. Likewise, any of the features, components, and/or parts, including the arrangements and configurations thereof shown and described with reference to FIGS. 11-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors

11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 10 illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 10 can be replicated in another (e.g., second) optical module disposed with the HMD to interact (e.g., project light and capture images) of another eye of the user.

Any of the features, components, and/or parts, including the arrangements and configurations thereof shown in FIG. 10 can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 10.

FIG. 1P illustrates a cross-sectional view of an example of an optical module 11.3.2-200 including a housing 11.3.2-202, display assembly 11.3.2-204 coupled to the housing

11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
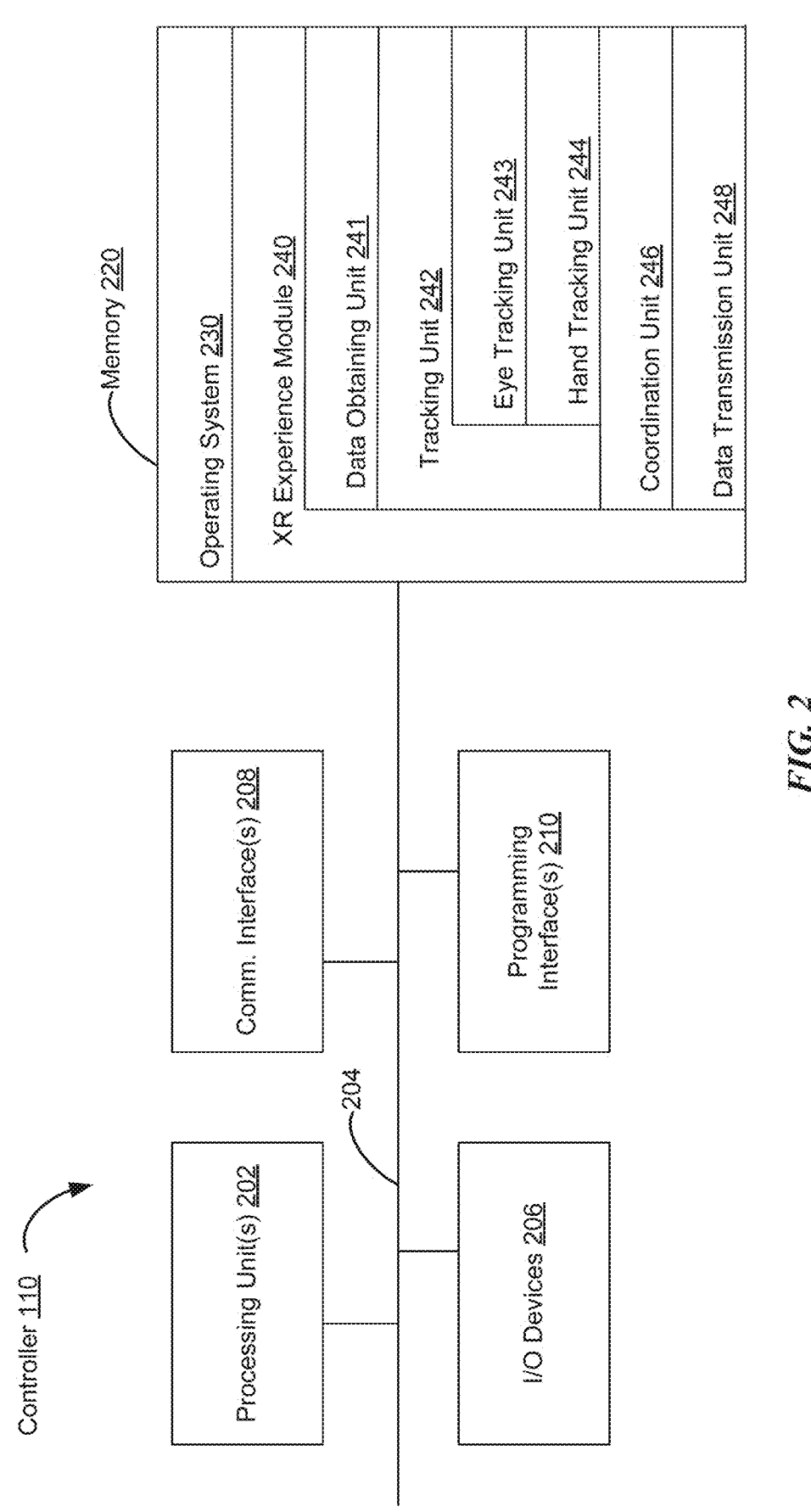
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
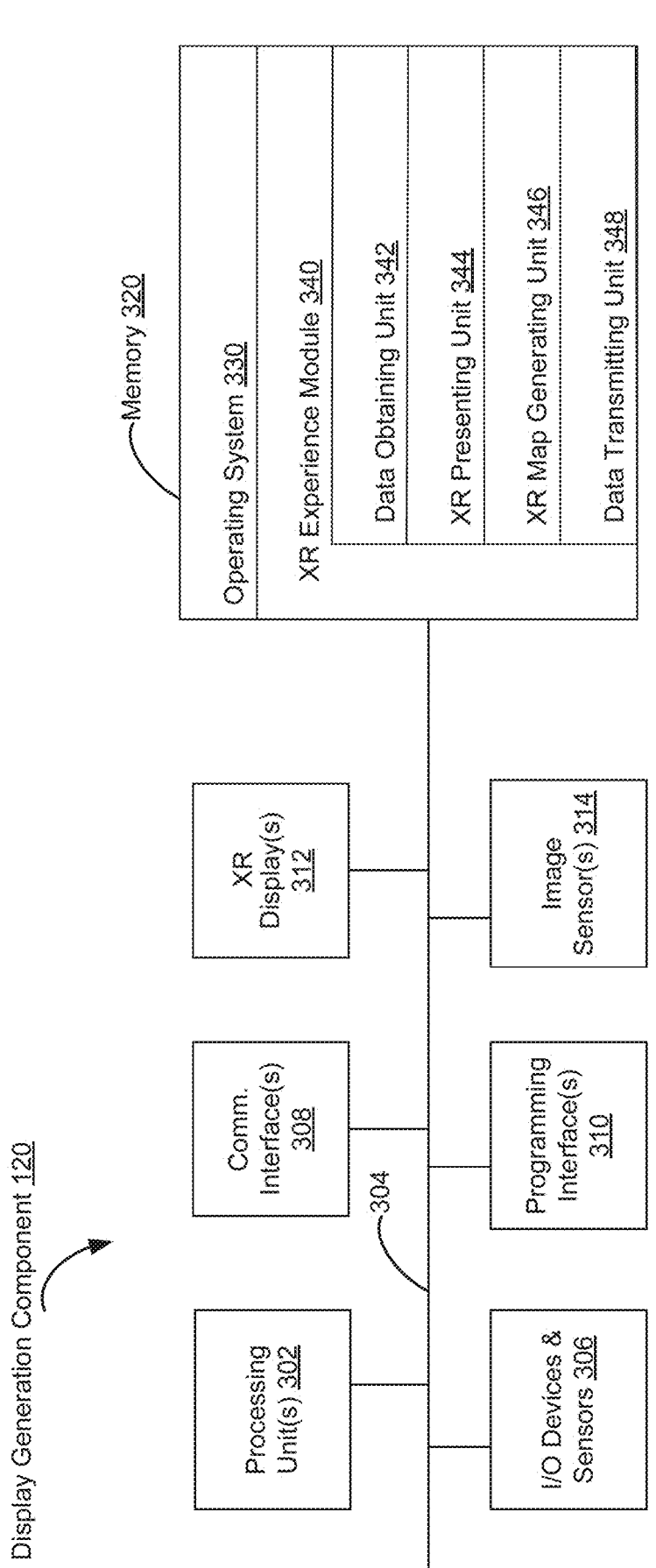
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105 or serve as the image sensors that capture the physical environments of the scene 105. In some embodiments, the image sensors 404 are positioned relative to a user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, e.g., the measured z distance from the image sensors 404, with the shade of gray growing darker with increasing depth. The controller 110 processes these depth values in order to identify and segment a component of the image (e.g., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
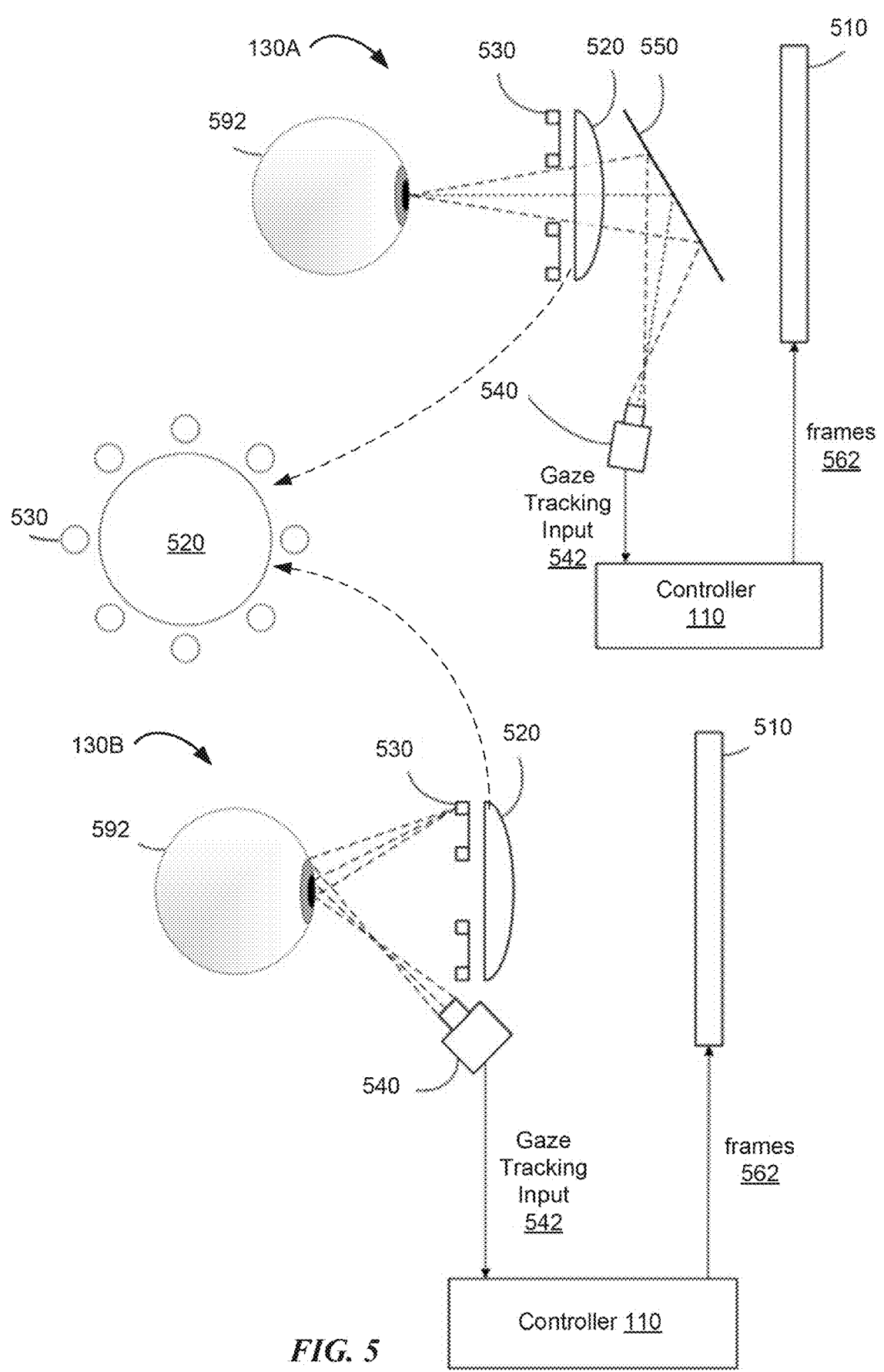
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device and is optionally used in conjunction with a head-mounted display generation component. In some embodiments, the eye tracking device 130 is not a head-mounted device and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
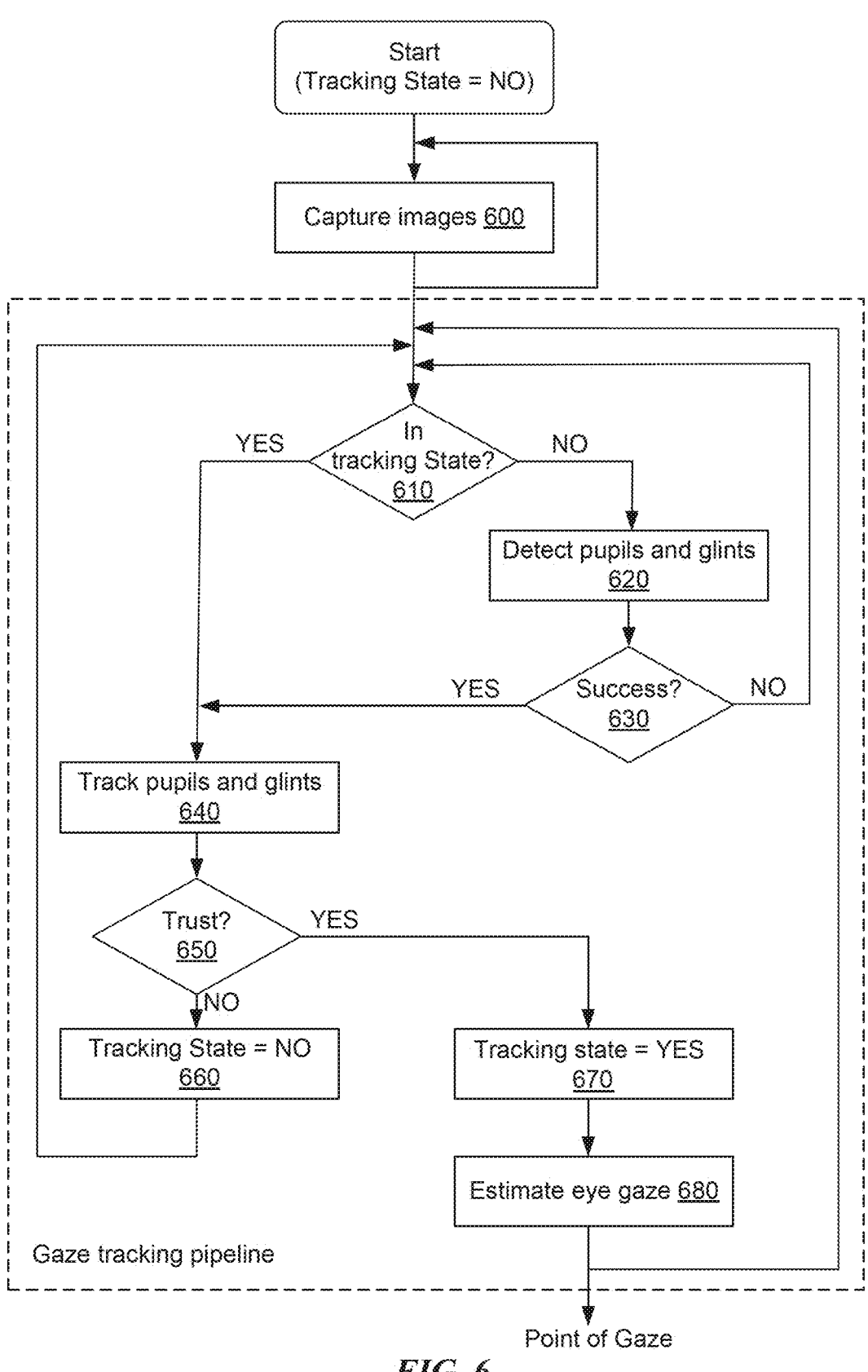
FIG. 6 is a flow diagram illustrating a glint-assisted gaze tracking pipeline in accordance with some embodiments.
Figures 7A, 7B:
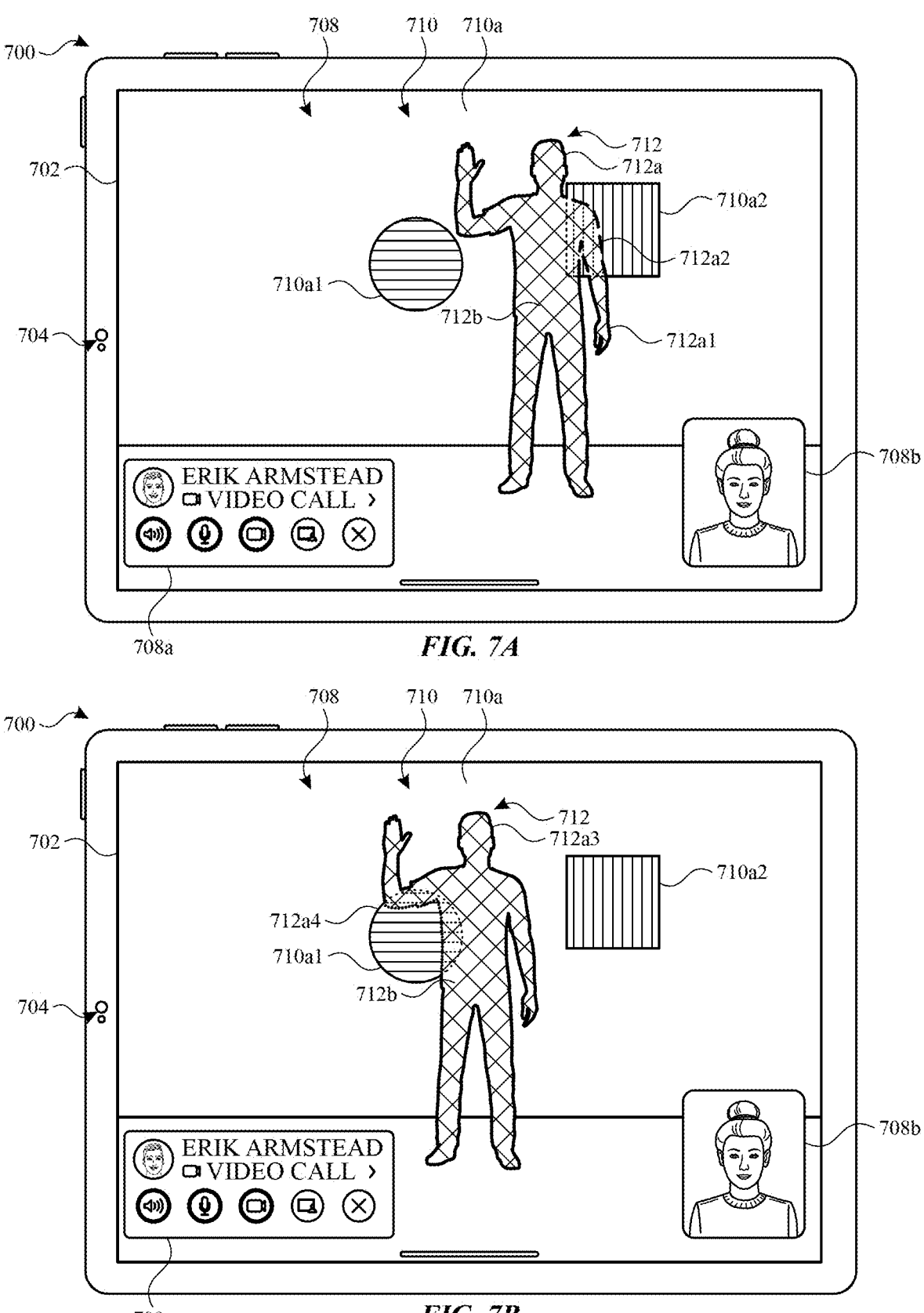
FIGS. 7A-7P illustrate example techniques for displaying a representation of a person based on a background behind the representation of the person, in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real-world environment 602 are used to provide a XR experience to the user, for example, a mixed reality environment in which one or more virtual objects are superimposed over representations of real-world environment 602.

Thus, the description herein describes some embodiments of three-dimensional environments (e.g., XR environments) that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, one or more input devices, and (optionally) one or more cameras.

FIGS. 7A-7P illustrate examples of displaying a representation of a person based on a background behind the representation of the person, in accordance with some embodiments. In some embodiments, a representation of a person (e.g., an edge of a representation of a person and/or visual effects of the representation of the person) is displayed based on characteristics of a background behind the representation of the person. FIG. 8 is a flow diagram of an exemplary method 800 for displaying a representation of a person based on a background behind the representation of the person. The user interfaces in FIGS. 7A-7P are used to illustrate the processes described below, including the processes in FIG. 8.

FIG. 7A illustrates computer system 700 (e.g., a tablet computer), which includes display generation component 702 and camera sensor 704. In some embodiments, computer system 700 is a head-mounted device that displays three-dimensional versions of the user interfaces and environments (e.g., environments 710, 720, 910, 920, 1110, and/or 1120) described herein. In some embodiments, computer system 700 displays different portions of an environment in response to movement of the head-mounted device such that a user can look around the displayed environment by moving their head.

In FIG. 7A, computer system 700 displays user interface 708 of a real-time communication application. User interface 708 displays a real-time communication session between a user of computer system 700 and one or more remote participants. User interface 708 includes menu 708a, self-view representation 708b, and representation 710 of an environment (also referred to as environment 710). Menu 708a includes selectable options for controlling functions of the real-time communication session such as, e.g., turning a speaker on or off, turning a microphone on or off, turning a camera on or off, and ending the real-time communication session. Self-view representation 708b displays images and/or video captured by camera sensor 704. Environment 710 includes representation 712 of a person, such as a remote participant of the real-time communication session.

In some embodiments, representation 712 of the person is displayed and/or otherwise used to communicate during the real-time communication session. In some embodiments, the real-time communication session includes real-time communication between participants of the real-time communication session, such as a user of computer system 700 and one or more other persons (e.g., one or more other users associated with other (e.g., different) computer systems). In some embodiments, providing the real-time communication session includes displaying representations of the person's body (e.g., facial expression, body expression, body position, and/or body movement) via representation 712 of the person. In some embodiments, providing the real-time communication session includes displaying representation 712 of the person and/or outputting audio corresponding to utterances of the person in real time. In some embodiments, computer system 700 and one or more other (e.g., remote) computer systems are in communication (e.g., wireless communication) with one another to enable transmission of information indicative of representation 712 of the person and/or audio corresponding to utterances of the person between computer system 700 and the one or more other computer systems. In some embodiments, the real-time communication session includes an XR experience (e.g., an XR environment). In some embodiments, the real-time communication session includes displaying representation 712 of the person (and, optionally, a representation of a second person) in an XR environment via display generation components (e.g., 702) of the computer system and the one or more other computer systems in communication via the real-time communication session. In some embodiments, the techniques related to real-time communication sessions described above for representation 712 are applied to representation 714, representation 716, representation 722, representation 724, representation 726, representation 912, representation 922, representation 1114, representation 1118, representation 1122, and/or representation 1124 described below. In some embodiments, the techniques related to real-time communication sessions described above for environment 710 are applied to environment 720, environment 910, environment 920, environment 1110, and/or environment 1120.

Environment 710 includes representation 710a of a background, representation 710a1 of a first background element (e.g., a circle), and representation 710a2 of a second background element (e.g., a square). Representation 710a of the background is also referred to as background 710a; representation 710a1 of the first background element is also referred to as first background element 710a1; and representation 710a2 of the second background element is also referred to as second background element 710a2.

First background element 710a1 has a first value of a visual property (e.g., color, pattern, and/or brightness), where the first value is represented by the horizontal shading in first background element 710a1. Second background element 710a1 has a second value of the visual property, where the second value is represented by the vertical shading in second background element 710a2. The first value of the visual property is different from the second value of the visual property, which is indicated by the different shading in first background element 710a1 and second background element 710*a*2. Background 710*a* has a third value of the visual property that is different from the first value and the second value, as indicated by the lack of shading.

In FIG. 7A, representation 712 is a placeholder representation (e.g., a silhouette and/or outline with uniform, substantially uniform, gradient, or pattern fill) that includes reduced detail in interior portion 712*b*. In some embodiments, computer system 700 displays (e.g., for a predetermined amount of time) representation 712 as a placeholder representation when the participant represented by representation 712 initially joins the real-time communication session, when image data of the remote participant does not meet a set of image criteria (e.g., there is no image data of the remote participant and/or image data of the remote participant does not satisfy a threshold bandwidth, update rate, and/or resolution), and/or tracking of the remote participant does not meet a set of tracking criteria (e.g., a certainty level of a position and/or other characteristic of the remote participant does not meet a threshold certainty and/or an uncertainty of the position and/or other characteristic of the remote participant exceeds a threshold uncertainty).

From the perspective of environment 710 displayed in FIG. 7A, representation 712 appears closer to the user of computer system 700 than background 710*a*, first background element 710*a*1 (e.g., a physical element or a virtual element), and second background element 710*a*2 (e.g., a physical element or a virtual element). Representation 712 includes edge 712*a*, which includes first edge portion 712*a*1 (e.g., an edge of a portion of representation 712 that is in front of background 710*a*) and second edge portion 712*a*2 (e.g., an edge of a portion of representation 712 that is in front of second background element 710*a*2).

An appearance of edge 712*a* is based on a value of the visual property of the portion of the background behind a corresponding portion of representation 712. For example, in some embodiments, a color of the portion of the background behind a portion of a participant representation is blurred and/or blended into the edge of the portion of a participant representation. In some embodiments, a brightness of a portion of the edge of a participant representation is based on (e.g., proportional to) a brightness of the portion of the background behind the portion of the participant representation that has the corresponding edge. In FIG. 7A, first edge portion 712*a*1 has a first appearance indicated by the solid line used to illustrate first edge portion 712*a*1, and second edge portion 712*a*2 has a second appearance that is different from the first appearance of first edge portion 712*a*1, as indicated by the broken line style used to illustrate second edge portion 712*a*2. The first appearance of first edge portion 712*a*1 is based on the value of the visual property of background 710*a* because a portion of representation 712 with first edge portion 712*a*1 is in front of (e.g., overlaps) background 710*a* (e.g., background 710*a* is behind the portion of representation 712 with first edge portion 712*a*1). Similarly, the second appearance of second edge portion 712*a*2 is based on the value of the visual property of second background element 710*a*2 because a portion of representation 712 with second edge portion 712*a*2 is in front of (e.g., overlaps) second background element 710*a*2 (e.g., second background element 710*a*2 is behind the portion of representation 712 with second edge portion 712*a*2).

In some embodiments, representation 712 moves in environment 710 (e.g., in response to physical movement of the remote participant in the physical world). In FIG. 7B, representation 712 has moved from the position shown in FIG. 7A (e.g., partially in front of second background element 710*a*2) to partially in front of first background element 710*a*1. Accordingly, the background behind representation 712 is different from in FIG. 7A. In response to the movement of representation 712 and the change in the background behind representation 712, edge 712*a* of representation 712 is displayed with a different appearance. For example, in FIG. 7B, edge portion 712*a*3 has the first appearance (e.g., the same appearance as edge portion 712*a*1 in FIG. 7A) because background 710*a* is behind the portion of representation 712 that has edge portion 712*a*3. Notably, in FIG. 7B, the portion of edge portion 712*a*3 that was in front of second background element 710*a*2 in FIG. 7A (e.g., edge portion 712*a*2) has the first appearance instead of the second appearance shown in FIG. 7A (e.g., the appearance of edge portion 712*a*2 changed from the second appearance in FIG. 7A to the first appearance in FIG. 7B due to having a different portion of the background behind edge portion 712*a*2). In FIG. 7B, first background element 710*a*1 is behind edge portion 712*a*4. As a result, edge portion 712*a*4 has a third appearance that is different from the first appearance of edge portion 712*a*1 and edge portion 712*a*2, as indicated by the different line style of edge portion 712*a*3 in FIG. 7B.

Figures 7C, 7D:
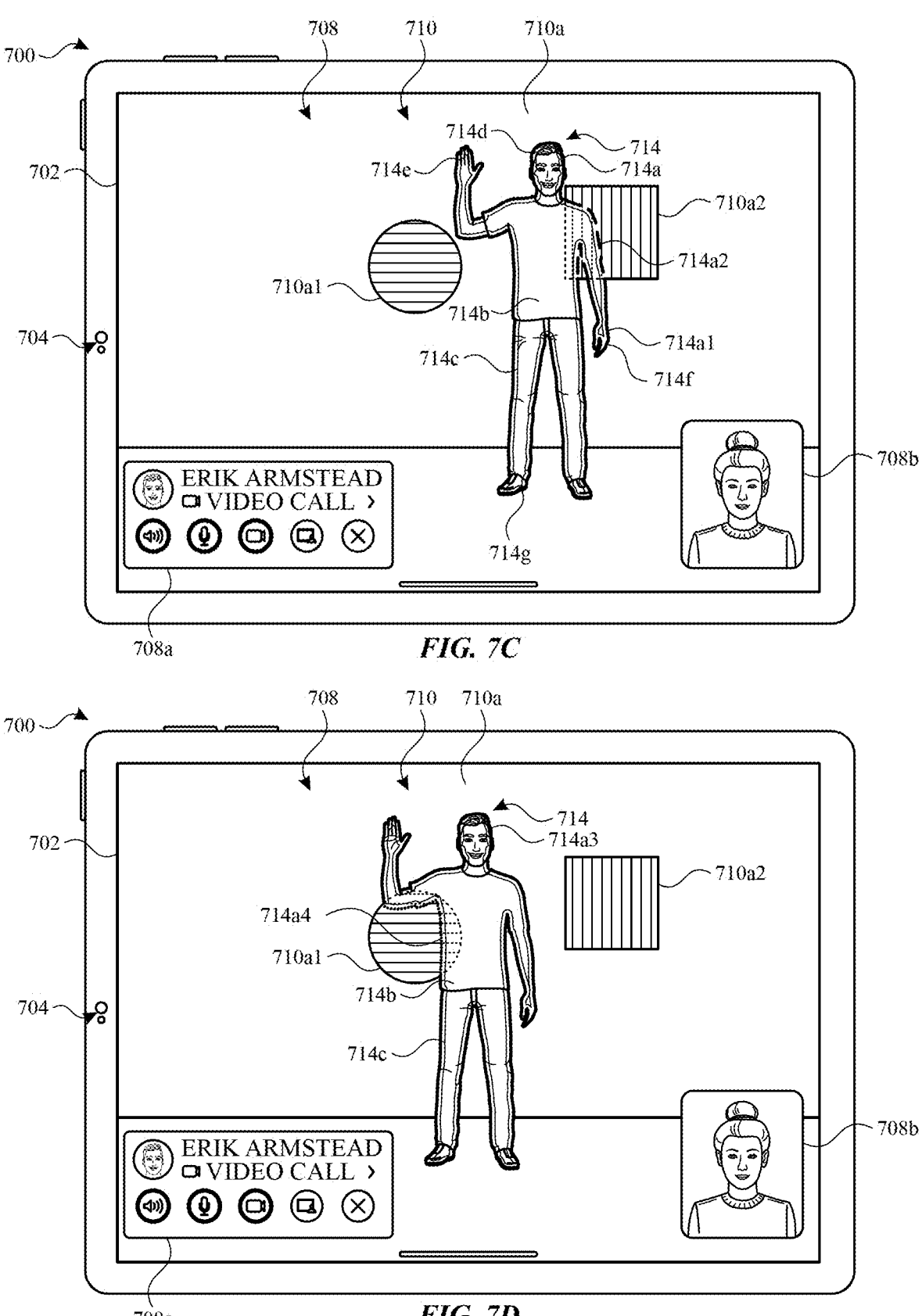

Turning to FIG. 7C, computer system 700 replaces representation 712 with representation 714 of the remote participant in environment 710. In some embodiments, representation 712 is replaced with representation 714 after a predetermined amount of time and/or in response to image data of the remote participant satisfying a set of data and/or tracking criteria. Interior portion 714*b* of representation 714 includes more detailed features and/or is a more accurate representation of the physical characteristics of the remote participant than interior portion 712*b* of the placeholder representation shown in FIGS. 7A-7B.

Representation 714 includes edge 714*a*, which includes first edge portion 714*a*1 (e.g., an edge of a portion of representation 714 that is in front of background 710*a*) and second edge portion 714*a*2 (e.g., an edge of a portion of representation 714 that is in front of second background element 710*a*2). Similar to representation 712, an appearance of edge 714*a* is based on a value of the visual property of the portion of the background behind a corresponding portion of representation 714. For example, first edge portion 714*a*1 has the first appearance, as indicated by the solid line used to illustrate first edge portion 714*a*1, and second edge portion 714*a*2 has the second appearance, as indicated by the broken line style used to illustrate second edge portion 714*a*2. The first appearance of first edge portion 714*a*1 is based on the value of the visual property of background 710*a* because a portion of representation 714 with first edge portion 714*a*1 is in front of (e.g., overlaps) background 710*a* (e.g., background 710*a* is behind the portion of representation 714 with first edge portion 714*a*1). Similarly, the second appearance of second edge portion 714*a*2 is based on the second value of the visual property of second background element 710*a*2 because a portion of representation 714 with second edge portion 714*a*2 is in front of (e.g., overlaps) second background element 710*a*2 (e.g., second background element 710*a*2 is behind the portion of representation 714 with second edge portion 714*a*2).

In some embodiments, representation 714 includes a visual effect (e.g., an iridescent effect) at edge 714*a* and/or interior boundary 714*c* (e.g., an interior portion of representation 714 adjacent to edge 714*a*). In some embodiments, the visual effect is separate and/or independent from the appearance of edge 714*a*. In some embodiments, the visual effect is not based on the background (e.g., background 710*a*) and does not change when the background behind representation 714 changes. In some embodiments, the visual effect includes an iridescent effect with one or more colors and/or that varies over space and/or time. In some embodiments, the iridescent effect has an appearance such as, e.g., a color, brightness, width, magnitude, extent, pattern, temporal pattern, spatial pattern, and/or duration. In some embodiments, the appearance of the iridescent effect changes as representation 714 moves or the viewpoint from which representation 714 is viewed changes.

In some embodiments, representation 714 includes an animated noise effect (e.g., in interior portion 714*b*). In some embodiments, the animated noise effect (e.g., a simulated film grain effect) changes over time to add an appearance of motion to representation 714. In some embodiments, the animated noise effect varies a transparency and/or luminance of representation 714 over space and/or time. For example, in some embodiments, the animated noise effect has a greater magnitude (e.g., luminance and/or transparency) on some portions (e.g., hand 714*f*, hand 714*c*, feet 714*g*, and/or edge 714*a*) of representation 714 than on another portion (e.g., head 714*d* and/or interior portion 714*b*) of representation 714.

In some embodiments, representation 714 is at least partially transparent. For example, in FIG. 7C, the portion of second background element 710*a*2 behind representation 714 is partially visible through representation 714. In some embodiments, the transparency of representation 714 is different for different portions of representation 714. For example, in some embodiments, participant representation is more transparent at edge 714*a* than at positions further from edge 714*a* (e.g., in the center of representation 714 and/or interior portion 714*b*). In some embodiments, some portions of representation 714 (e.g., extremities such as hand 714*c*, hand 714*f*, and/or feet 714*g*) are more transparent than other portions (e.g., head 714*d*) of representation 714.

In some embodiments, representation 714 moves in environment 710 (e.g., in response to physical movement of the remote participant in the physical world). In FIG. 7D, representation 714 has moved from the position shown in FIG. 7C (e.g., partially in front of second background element 710*a*2) to partially in front of first background element 710*a*1. Accordingly, the background behind representation 714 is different from in FIG. 7C. In response to the movement of representation 714 and the change in the background behind representation 714, edge 714*a* of representation 714 is displayed with a different appearance. For example, in FIG. 7D, edge portion 714*a*3 has the first appearance (e.g., the same appearance as first edge portion 714*a*1 in FIG. 7C) because background 710*a* is behind the portion of representation 714 that has edge portion 714*a*3. Notably, in FIG. 7D, the portion of edge portion 714*a*3 that was in front of second background element 710*a*2 in FIG. 7C (e.g., edge portion 714*a*2) has the first appearance instead of the second appearance shown in FIG. 7C (e.g., the appearance of edge portion 714*a*2 changed from the second appearance in FIG. 7C to the first appearance in FIG. 7D due to having a different portion of the background behind edge portion 714*a*2). In FIG. 7D, first background element 710*a*1 is behind edge portion 714*a*4. As a result, edge portion 714*a*4 has the third appearance that is different from the first appearance of first edge portion 714*a*1 and edge portion 714*a*2, as indicated by the different line style of edge portion 714*a*3 in FIG. 7D.

In some embodiments, the visual effect at edge 714*a* and/or interior boundary 714*c* changes when representation 714 moves. For example, interior boundary 714*c* changes as representation 714 moves from the position in FIG. 7C to the position in FIG. 7D. In some embodiments, representation 712 does not include the visual effect (e.g., an iridescent effect) described with reference to FIGS. 7C and 7D. In some embodiments, representation 712 includes the visual effect (e.g., an iridescent effect) described with reference to FIGS. 7C and 7D. In some embodiments, the animated noise effect in representation 714 changes when representation 714 moves. For example, an animated noise effect on interior portion 714*b* changes as representation 714 moves from the position in FIG. 7C to the position in FIG. 7D. In some embodiments, representation 712 does not include the animated noise effect described with reference to FIGS. 7C and 7D. In some embodiments, representation 712 includes the animated noise effect described with reference to FIGS. 7C and 7D.

Figures 7E, 7F:
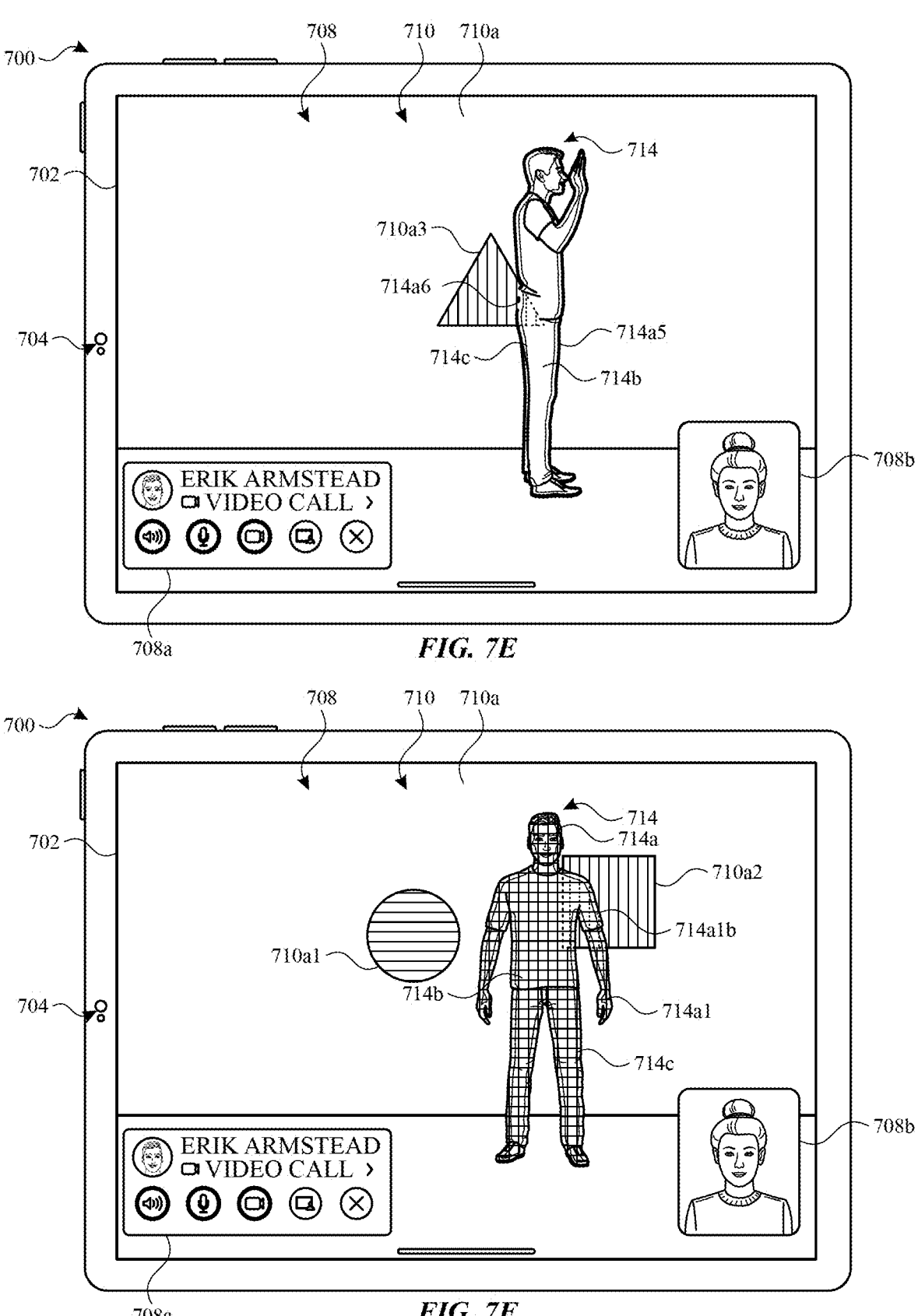

In some embodiments, the appearance of one or more aspects of representation 714 changes in response to a change in the viewpoint from which representation 714 is displayed (e.g., even if representation 714 does not move relative to environment 710). Turning to FIG. 7E, representation 714 is in the same position relative to environment 710 as in FIG. 7D, but the viewpoint from which environment 710 is displayed has changed compared to FIG. 7D. For example, the viewpoint has moved such that computer system 700 displays a side view of representation 714 (e.g., as opposed to a front view as shown in FIG. 7D). As a result of the change in viewpoint, the background behind representation 714 is different from the background in FIG. 7D. In FIG. 7E, background 710*a* is behind the portion of representation 714 with edge portion 714*a*5, and third background element 710*a*3 is behind a portion of representation 714 with edge portion 714*a*6. Because edge portion 714*a*5 is in front of background 710*a*, edge portion 714*a*5 has the first appearance described with reference to FIGS. 7A-7D, as indicated by the solid line. Third background element 714*a*3 has the same value of the visual property as second background element 710*a*2, as indicated by the vertical shading lines in third background element 710*a*3. As a result, edge portion 714*a*6 has the same appearance as edge portion 714*a*2 described with reference to FIGS. 7A and 7C. In some embodiments, the visual effect and the animated noise effect are applied to representation 714 in FIG. 7E. In some embodiments, the visual effect and the animated noise effect remain the same even though representation 714 has a different background and is viewed from a different viewpoint.

Figure 7G:
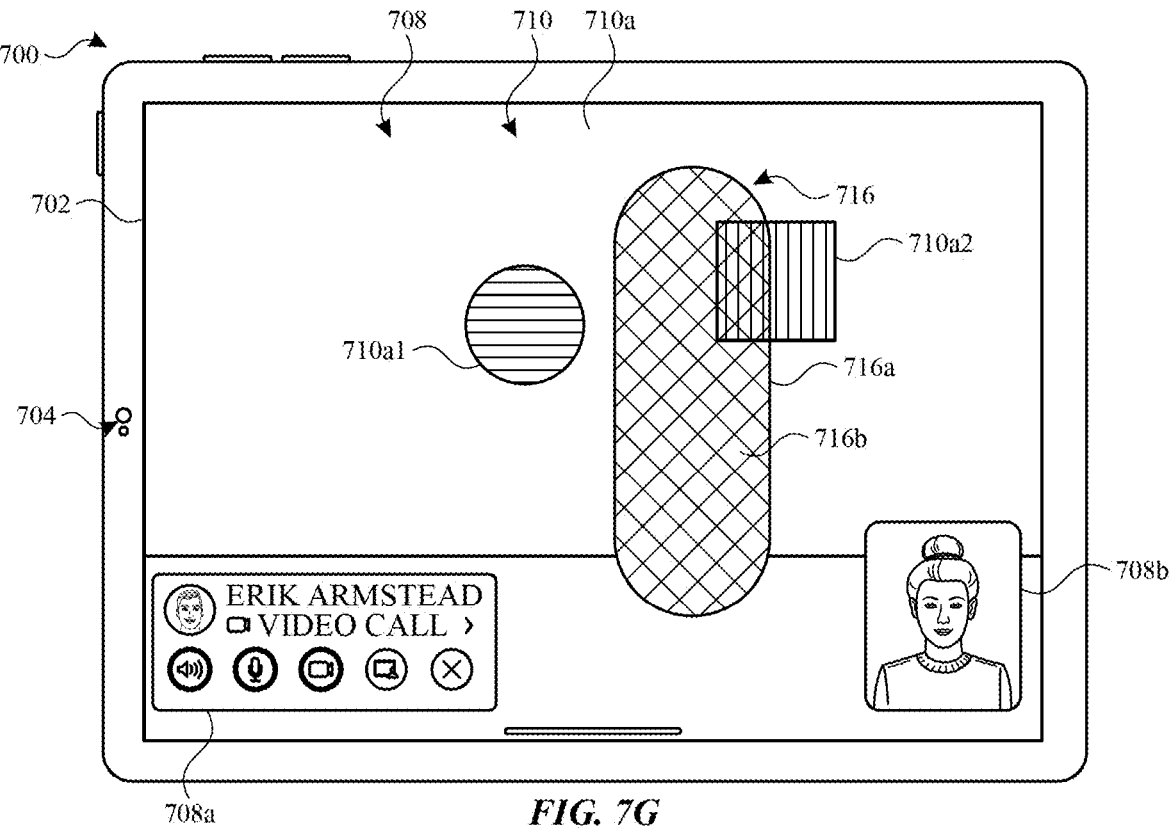

In some embodiments, computer system 700 changes an appearance of representation 714 when image and/or tracking data of the remote participant corresponding to representation 714 does not meet a set of image and/or tracking criteria (e.g., when the image and/or tracking data is degraded). Turning to FIG. 7F, representation 714 is in the same position relative to environment 710 and is displayed from the same viewpoint as in FIG. 7C. However, image and/or tracking data of the remote participant corresponding to representation 714 is degraded (e.g., has a lower bandwidth, reduced confidence, and/or lower resolution). As a result, representation 714 is displayed with less detail and/or physical accuracy than in FIG. 7C. The reduced detail and/or physical accuracy is represented by the shading of representation 714 in FIG. 7F. In some embodiments, when image and/or tracking data of the remote participant corresponding to representation 714 does not meet the set of image and/or tracking criteria, the edge of representation 714 is not displayed based on the visual properties of the background (e.g., representation 714 is displayed without an edge treatment and/or edge effect). For example, in FIG. 7F, first edge portion 714*a*1 and edge portion 714*a*2 have the same appearance, as indicated by the same solid line style used for both first edge portion 714*a*1 and second edge portion 714*a*2. In some embodiments, representation 714 does not include the visual effect and/or the animated noise effect when image and/or tracking data of the remote participant corresponding to representation 714 does not meet the set of image and/or tracking criteria. For example, in FIG. 7F, interior boundary 714*c* does not have the visual effect (e.g., an iridescent effect) and interior portion 714*b* does not have the animated noise effect. In some embodiments, if image and/or tracking issues persist, computer system 700 further reduces the fidelity of the representation of the remote participant in environment 710. For example, in FIG. 7G, the image and/or tracking data of the remote participant corresponding continues not to meet the set of image and/or tracking criteria. As a result, computer system 700 replaces representation 714 with representation 716 shown in FIG. 7G. Representation 716 does not include features that are based on physical features of the remote participant. In some embodiments, representation 716 is a predefined shape. An appearance of the edge of representation 716 is not based on the background, and representation 716 does not include the visual effect and does not include the animated noise effect described with reference to representation 714. In some embodiments, when the image and/or tracking data of the remote participant corresponding continues not to meet the set of image and/or tracking criteria, computer system 700 removes representation 716 and does not display a representation of the participant (e.g., does not display representation 716).

In some embodiments, the real-time communication session includes three or more participants. For example, in some embodiments, the real-time communication session includes a third participant other than the person represented by, e.g., representation 714 and the user of computer system 700. In some embodiments, the third participant has a different viewpoint than the user of computer system 700. Because the third participant has a different viewpoint, representation 714 is displayed at a different viewing angle for the third participant than for the user of computer system 700. In some embodiments, representation 714 of the person is displayed according to the techniques described with reference to FIGS. 7A-7G based on the viewing angle of representation 714 for the third participant. Thus, representation 714 is displayed with a different appearance (e.g., a different level of detail) for the third participant than for the user of computer system 700 because of the different viewing angle.

Figure 7H:
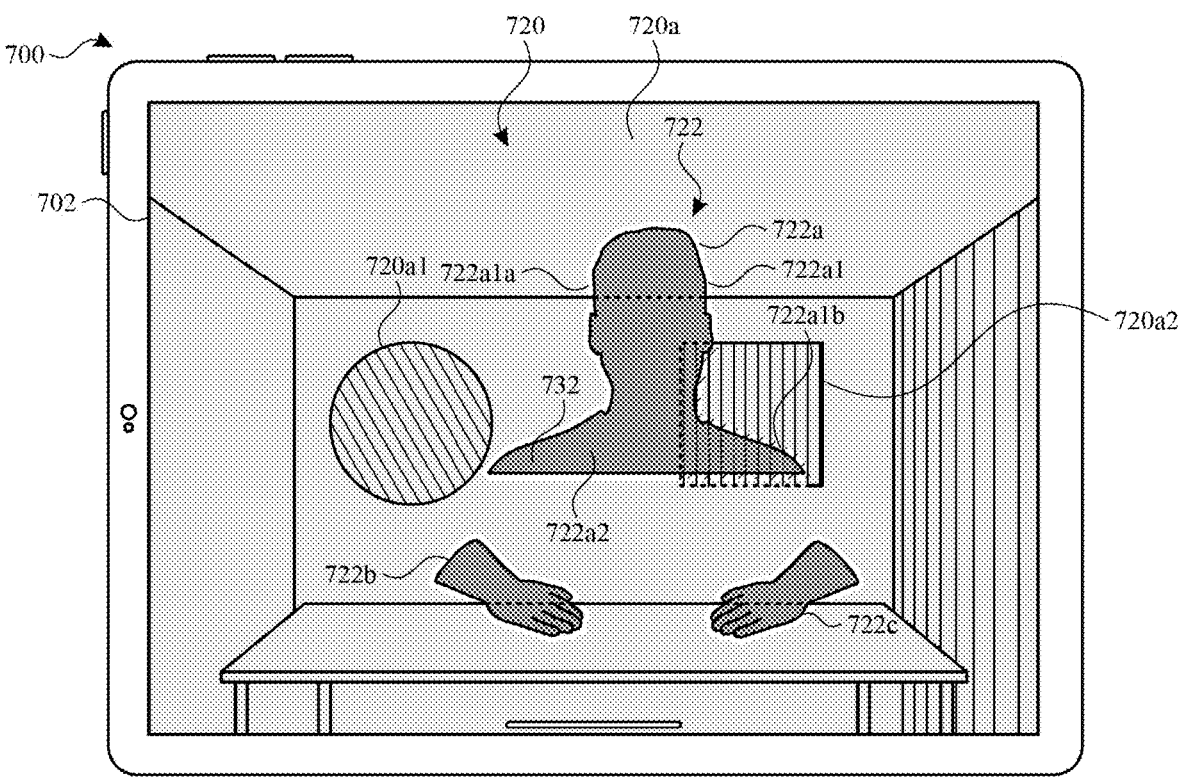

FIGS. 7H-7N illustrate an embodiment that is analogous to the embodiment described in FIGS. 7A-7G. In FIG. 7H, computer system 700 displays a real-time communication session between a user of computer system 700 and one or more remote participants in environment 720. Environment 720 includes representation 722 of a person, such as a remote participant of the real-time communication session. Representation 722 includes upper portion 722*a* (e.g., head, shoulders, and upper torso), right hand 722*b* and left hand 722*c*.

In some embodiments, representation 722 of the person is displayed and/or otherwise used to communicate during the real-time communication session.

Environment 720 includes representation 720*a* of a background, representation 720*a*1 of a first background element (e.g., a circle), and representation 720*a*2 of a second background element (e.g., a square). Representation 720*a* of the background is also referred to as background 720*a*; representation 720*a*1 of the first background element is also referred to as first background element 720*a*1; and representation 720*a*2 of the second background element is also referred to as second background element 720*a*2. First background element 720*a*1 has a first value of a visual property (e.g., color, pattern, and/or brightness), where the first value is represented by the diagonal shading in first background element 720*a*1. Second background element 720*a*1 has a second value of the visual property, where the second value is represented by the vertical shading in second background element 720*a*2. The first value of the visual property is different from the second value of the visual property, which is indicated by the different shading in first background element 720*a*1 and second background element 720*a*2. Background 720*a* has a third value of the visual property that is different from the first value and the second value, as indicated by the lack of a fill pattern.

In FIG. 7H, representation 722 is a placeholder representation (e.g., a silhouette and/or outline with uniform, substantially uniform, gradient, or pattern fill) that includes reduced detail in interior portion 722*a*2. In some embodiments, computer system 700 displays (e.g., for a predetermined amount of time) representation 722 as a placeholder representation when the participant represented by representation 722 initially joins the real-time communication session, when image data of the remote participant does not meet a set of image criteria (e.g., there is no image data of the remote participant and/or image data of the remote participant does not satisfy a threshold bandwidth, update rate, and/or resolution), and/or tracking of the remote participant does not meet a set of tracking criteria (e.g., a certainty level of a position and/or other characteristic of the remote participant does not meet a threshold certainty and/or an uncertainty of the position and/or other characteristic of the remote participant exceeds a threshold uncertainty).

From the perspective of environment 720 displayed in FIG. 7H, representation 722 is in front of background 720*a*, first background element 720*a*1 (e.g., a physical element or a virtual element), and second background element 720*a*2 (e.g., a physical element or a virtual element). Representation 722 includes edge 722*a*1, which includes first edge portion 722*a*1*a* (e.g., an edge of a portion of representation 722 that is in front of background 720*a*) and second edge portion 722*a*1*b* (e.g., an edge of a portion of representation 722 that is in front of second background element 720*a*2). An appearance of edge 722*a*1 is based on a value of the visual property of the portion of the background behind a corresponding portion of representation 722. For example, in some embodiments, a color of the portion of the background behind a portion of a participant representation is blurred and/or blended into the edge of the portion of a participant representation. In some embodiments, a brightness of a portion of the edge of a participant representation is based on (e.g., proportional to) a brightness of the portion of the background behind the portion of the participant representation that has the corresponding edge.

In FIG. 7H, first edge portion 722*a*1*a* has a first appearance indicated by the white border used to illustrate first edge portion 722*a*1*a*, and second edge portion 722*a*1*b* has a second appearance that is different from the first appearance of first edge portion 722*a*1*a*, as indicated by the diagonal fill pattern used to illustrate second edge portion 722*a*1*b*. The first appearance of first edge portion 722*a*1*a* is based on the value of the visual property of background 720*a* because a portion of representation 722 with first edge portion 722*a*1*a* is in front of (e.g., overlaps) background 720*a* (e.g., background 720*a* is behind the portion of representation 722 with first edge portion 722*a*1*a*). Similarly, the second appearance of second edge portion 722*a*1*b* is based on the value of the visual property of second background element 720*a*2 because a portion of representation 722 with second edge portion 722*a*1*b* is in front of (e.g., overlaps) second background element 720*a*2 (e.g., second background element 720*a*1*b* is behind the portion of representation 722 with second edge portion 722*a*1*b*).

Figure 7I:
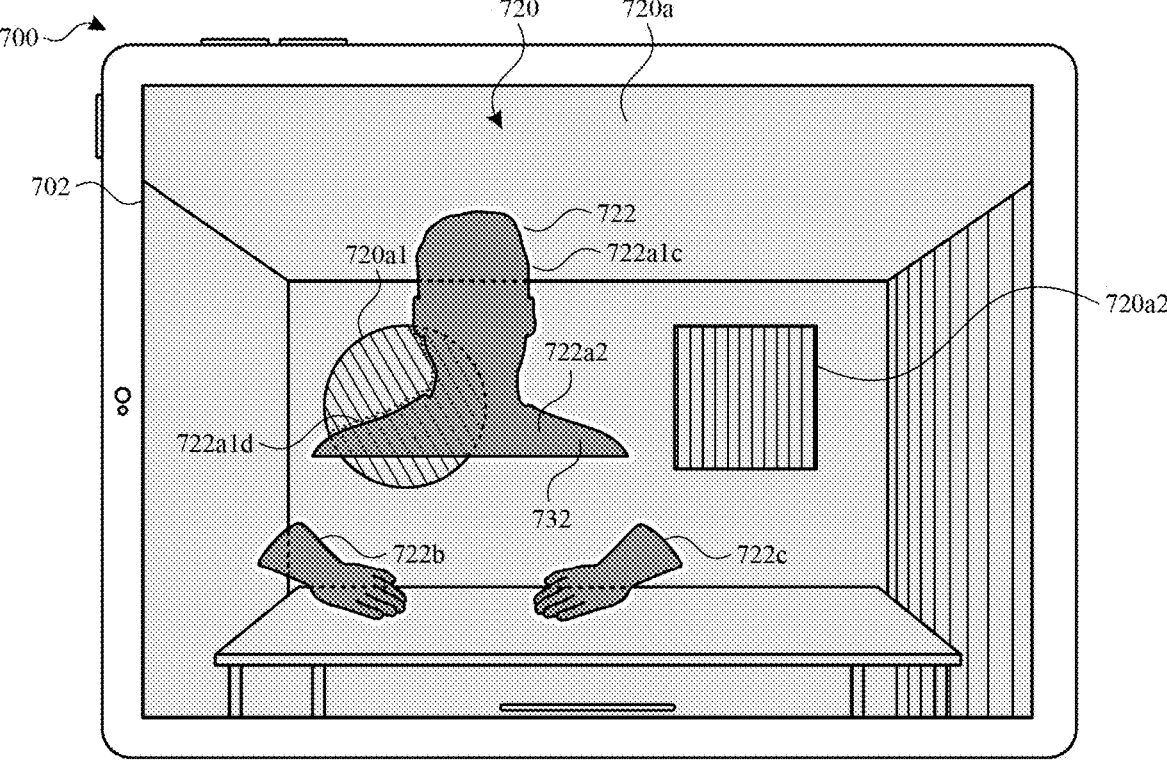

In some embodiments, representation 722 moves in environment 720 (e.g., in response to physical movement of the remote participant in the physical world). In FIG. 7I, representation 722 has moved from the position shown in FIG. 7I (e.g., partially in front of second background element 720*a*2) to partially in front of first background element 720*a*1. Accordingly, the background behind representation 722 is different from in FIG. 7H. In response to the movement of representation 722 and the change in the background behind representation 722, edge 722*a*1 of representation 722 is displayed with a different appearance. For example, in FIG. 7I, edge portion 722*a*1*c* has the first appearance (e.g., the same appearance as edge portion 722*a*1*a* in FIG. 7H) because background 720*a* is behind the portion of representation 722 that has edge portion 722*a*1*c*. Notably, in FIG. 7I, the portion of edge portion 722*a*1*c* that was in front of second background element 720*a*2 in FIG. 7H (e.g., edge portion 722*a*1*b*) has the first appearance instead of the second appearance shown in FIG. 7H (e.g., the appearance of edge portion 722*a*1*b* changed from the second appearance in FIG. 7H to the first appearance in FIG. 7I due to having a different portion of the background behind edge portion 722*a*1*b*). In FIG. 7I, first background element 720*a*1 is behind edge portion 722*a*1*d*. As a result, edge portion 722*a*1*d* has a third appearance that is different from the first appearance of edge portion 722*a*1*a* and edge portion 722*a*1*b*, as indicated by the different fill pattern of edge portion 722*a*1*d* in FIG. 7I.

Turning to FIG. 7J1, computer system 700 replaces representation 722 with representation 724 of the remote participant in environment 720. In some embodiments, representation 722 is replaced with representation 724 after a predetermined amount of time and/or in response to image data of the remote participant satisfying a set of data and/or tracking criteria. Interior portion 724*a*2 of representation 724 includes more detailed features and/or is a more accurate representation of the physical characteristics of the remote participant than interior portion 722*a*2 of the placeholder representation shown in FIGS. 7H-7I.

Representation 724 includes edge 724*a*1, which includes first edge portion 724*a*1*a* (e.g., an edge of a portion of representation 724 that is in front of background 720*a*) and second edge portion 724*a*1*b* (e.g., an edge of a portion of representation 724 that is in front of second background element 720*a*2). Similar to representation 722, an appearance of edge 724*a*1*a* is based on a value of the visual property of the portion of the background behind a corresponding portion of representation 724. For example, first edge portion 724*a*1*a* has the first appearance, as indicated by the white border used to illustrate edge portion 724*a*1*a*, and second edge portion 724*a*1*b* has the second appearance, as indicated by the fill pattern used to illustrate second edge portion 724*a*1*b*. The first appearance of first edge portion 724*a*1*a* is based on the value of the visual property of background 720*a* because a portion of representation 724 with first edge portion 724*a*1*a* is in front of (e.g., overlaps) background 720*a* (e.g., background 720*a* is behind the portion of representation 724 with first edge portion 724*a*1*a*). Similarly, the second appearance of second edge portion 724*a*1*b* is based on the second value of the visual property of second background element 720*a*2 because a portion of representation 724 with second edge portion 724*a*1*b* is in front of (e.g., overlaps) second background element 720*a*2 (e.g., second background element 720*a*2 is behind the portion of representation 724 with second edge portion 724*a*1*b*).

In some embodiments, representation 724 includes a visual effect (e.g., an iridescent effect) at edge 724*a*1 and/or interior boundary 724*a*3 (e.g., an interior portion of representation 724 adjacent to edge 724*a*1). In some embodiments, the visual effect is separate and/or independent from the appearance of edge 724*a*1. In some embodiments, the visual effect is not based on the background (e.g., background 720*a*) and does not change when the background behind representation 724 changes. In some embodiments, the visual effect includes an iridescent effect with one or more colors and/or that varies over space and/or time. In some embodiments, the iridescent effect has an appearance such as, e.g., a color, brightness, width, magnitude, extent, pattern, temporal pattern, spatial pattern, and/or duration. In some embodiments, the appearance of the iridescent effect changes as representation 714 moves or the viewpoint from which representation 714 is viewed changes.

In some embodiments, representation 724 includes an animated noise effect (e.g., in interior portion 724*a*2). In some embodiments, the animated noise effect (e.g., a simulated film grain effect) changes over time to add an appearance of motion to representation 724. In some embodiments, the animated noise effect varies a transparency and/or luminance of representation 724 over space and/or time. For example, in some embodiments, the animated noise effect has a greater magnitude (e.g., luminance and/or transparency) on some portions (e.g., right hand 724*b*, left hand 724*c*, and/or edge 724*a*1) of representation 724 than on another portion (e.g., upper portion 724*a*) of representation 724.

In some embodiments, representation 724 is at least partially transparent. For example, in FIG. 7J1, the portion of second background element 720*a*2 behind representation 724 is partially visible through representation 724. In some embodiments, the transparency of representation 724 is different for different portions of representation 724. For example, in some embodiments, representation 724 is more transparent at edge 724*a*1 than at positions further from edge 724*a*1 (e.g., in the center of representation 724). In some embodiments, some portions of representation 724 (e.g., right hand 724*b* and/or left hand 724*c*) are more transparent than other portions (e.g., upper portion 724*a*) of representation 714.

In some embodiments, the techniques and user interface(s) described in FIGS. 7A-7P are provided by one or more of the devices described in FIGS. 1A-1P. For example, FIG. 7J2 illustrates an embodiment in which representation 724 (e.g., as described in FIGS. 7I and 7J1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 7J2, HMD X700 replaces representation 722 with representation 724 of the remote participant in environment 720. In some embodiments, representation 722 is replaced with representation 724 after a predetermined amount of time and/or in response to image data of the remote participant satisfying a set of data and/or tracking criteria. Interior portion 724a2 of representation 724 includes more detailed features and/or is a more accurate representation of the physical characteristics of the remote participant than interior portion 722a2 of the placeholder representation shown in FIGS. 7H-7I.

Representation 724 includes edge 724a1, which includes first edge portion 724a1a (e.g., an edge of a portion of representation 724 that is in front of background 720a) and second edge portion 724a1b (e.g., an edge of a portion of representation 724 that is in front of second background element 720a2). Similar to representation 722, an appearance of edge 724a1a is based on a value of the visual property of the portion of the background behind a corresponding portion of representation 724. For example, first edge portion 724a1a has the first appearance, as indicated by the white border used to illustrate edge portion 724a1a, and second edge portion 724a1b has the second appearance, as indicated by the fill pattern used to illustrate second edge portion 724a1b. The first appearance of first edge portion 724a1a is based on the value of the visual property of background 720a because a portion of representation 724 with first edge portion 724a1a is in front of (e.g., overlaps) background 720a (e.g., background 720a is behind the portion of representation 724 with first edge portion 724a1a). Similarly, the second appearance of second edge portion 724a1b is based on the second value of the visual property of second background element 720a2 because a portion of representation 724 with second edge portion 724a1b is in front of (e.g., overlaps) second background element 720a2 (e.g., second background element 720a2 is behind the portion of representation 724 with second edge portion 724a1b).

In some embodiments, representation 724 includes a visual effect (e.g., an iridescent effect) at edge 724a1 and/or interior boundary 724a3 (e.g., an interior portion of representation 724 adjacent to edge 724a1). In some embodiments, the visual effect is separate and/or independent from the appearance of edge 724a1. In some embodiments, the visual effect is not based on the background (e.g., background 720a) and does not change when the background behind representation 724 changes. In some embodiments, the visual effect includes an iridescent effect with one or more colors and/or that varies over space and/or time. In some embodiments, the iridescent effect has an appearance such as, e.g., a color, brightness, width, magnitude, extent, pattern, temporal pattern, spatial pattern, and/or duration. In some embodiments, the appearance of the iridescent effect changes as representation 714 moves or the viewpoint from which representation 714 is viewed changes.

In some embodiments, representation 724 includes an animated noise effect (e.g., in interior portion 724a2). In some embodiments, the animated noise effect (e.g., a simulated film grain effect) changes over time to add an appearance of motion to representation 724. In some embodiments, the animated noise effect varies a transparency and/or luminance of representation 724 over space and/or time. For example, in some embodiments, the animated noise effect has a greater magnitude (e.g., luminance and/or transparency) on some portions (e.g., right hand 724b, left hand 724c, and/or edge 724a1) of representation 724 than on another portion (e.g., upper portion 724a) of representation 724.

In some embodiments, representation 724 is at least partially transparent. For example, in FIG. 7J2, the portion of second background element 720a2 behind representation 724 is partially visible through representation 724. In some embodiments, the transparency of representation 724 is different for different portions of representation 724. For example, in some embodiments, representation 724 is more transparent at edge 724a1 than at positions further from edge 724a1 (e.g., in the center of representation 724). In some embodiments, some portions of representation 724 (e.g., right hand 724b and/or left hand 724c) are more transparent than other portions (e.g., upper portion 724a) of representation 714.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7K:
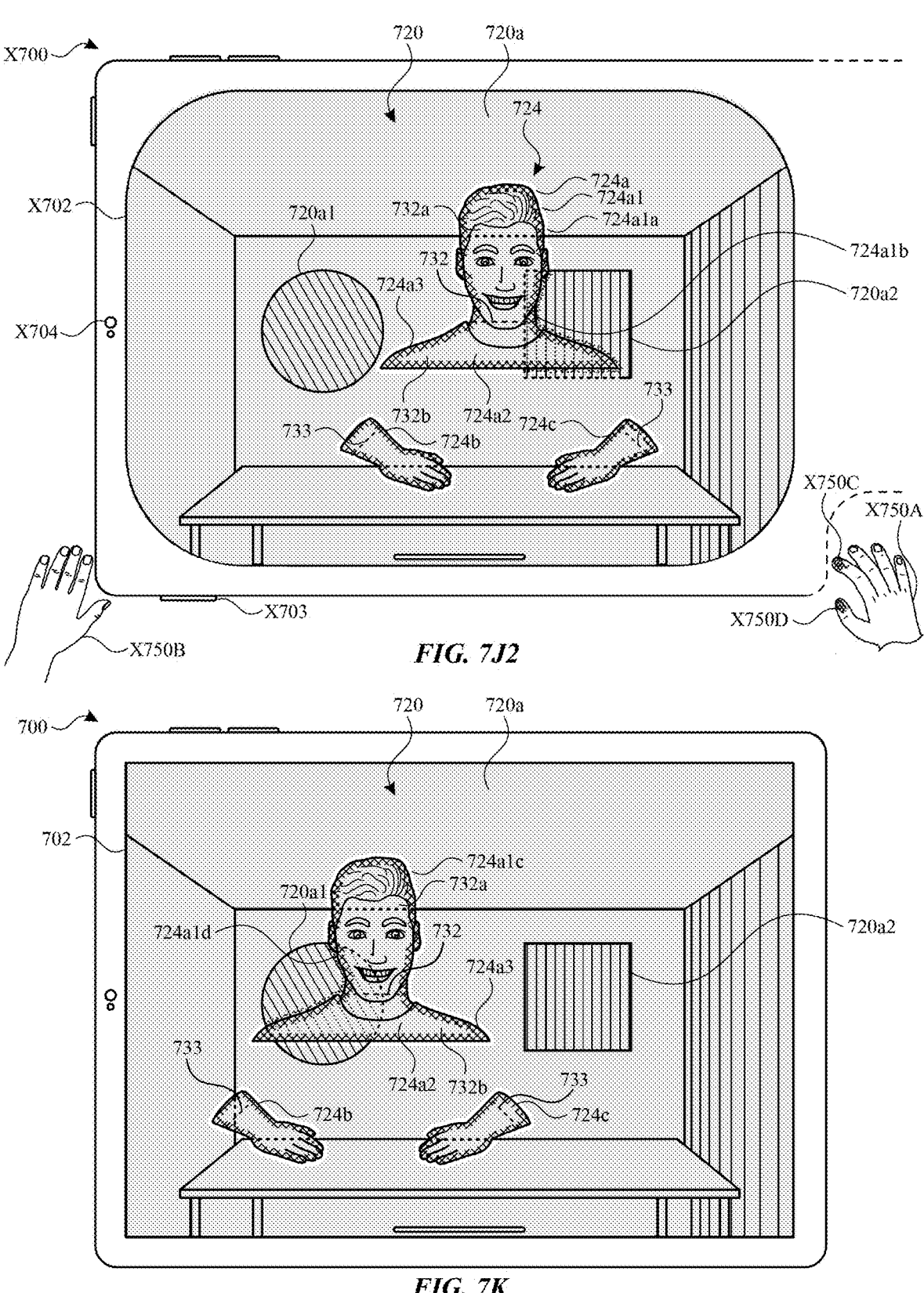

In some embodiments, representation 724 moves in environment 720 (e.g., in response to physical movement of the remote participant in the physical world). In FIG. 7K, representation 724 has moved from the position shown in FIGS. 7J1 and/or 7J2 (e.g., partially in front of second background element 720a2) to partially in front of first background element 720a1. Accordingly, the background behind representation 724 is different from in FIGS. 7J1 and/or 7J2. In response to the movement of representation 724 and the change in the background behind representation 724, edge 724a1 of representation 724 is displayed with a different appearance. For example, in FIG. 7K, edge portion 724a1c has the first appearance (e.g., the same appearance as edge portion 724a1a in FIGS. 7J1 and/or 7J2) because background 720a is behind the portion of representation 724 that has edge portion 724a1c. Notably, in FIG. 7K, the portion of edge portion 724a1c that was in front of second background element 720a2 in FIGS. 7J1 and/or 7J2 (e.g., edge portion 724a1b) has the first appearance instead of the second appearance shown in FIGS. 7J1 and/or 7J2 (e.g., the appearance of edge portion 724a1b changed from the second appearance in FIGS. 7J1 and/or 7J2 to the first appearance in FIG. 7K due to having a different portion of the background behind edge portion 724a1b). In FIG. 7K, first background element 720a1 is behind edge portion 724a1d. As a result, edge portion 724a1d has the third appearance that is different from the first appearance of edge portion 724a1a and edge portion 724a1b, as indicated by the different fill effect of edge portion 724a1c in FIG. 7K.

In some embodiments, the visual effect at edge 724a1 and/or interior boundary 724a3 changes when representation 724 moves. For example, interior boundary 724a3 changes as representation 724 moves from the position in FIGS. 7J1 and/or 7J2 to the position in FIG. 7K. In some embodiments, representation 722 does not include the visual effect (e.g., an iridescent effect) described with reference to FIGS. 7J1, 7J2, and 7K. In some embodiments, representation 722 includes the visual effect (e.g., an iridescent effect) described with reference to FIGS. 7J1, 7J2, and 7K. In some embodiments, the animated noise effect in representation 724 changes when representation 724 moves. For example, an animated noise effect on interior portion 724a2 changes as representation 724 moves from the position in FIGS. 7J1 and/or 7J2 to the position in FIG. 7K. In some embodiments, representation 722 does not include the animated noise effect described with reference to FIGS. 7J1, 7J2, and 7K. In some embodiments, representation 722 includes the animated noise effect described with reference to FIGS. 7J1, 7J2, and 7K.

Figure 7L:
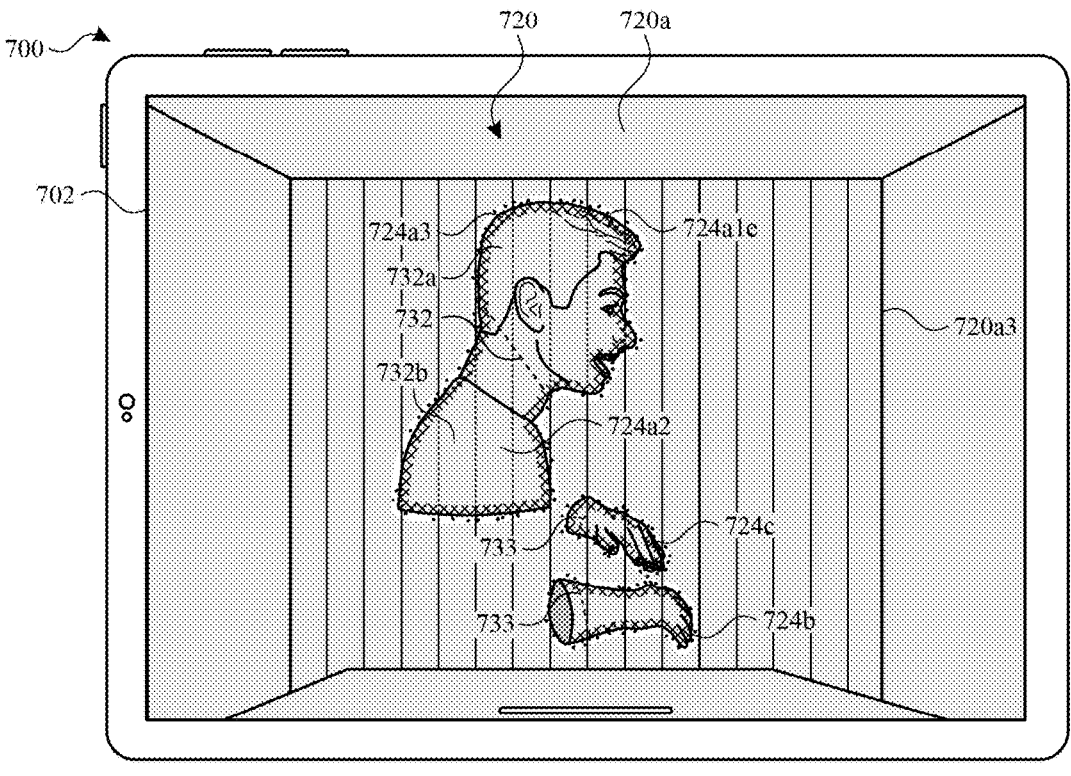

In some embodiments, the appearance of one or more aspects of representation 724 changes in response to a change in the viewpoint from which representation 724 is displayed (e.g., even if representation 724 does not move relative to environment 720). Turning to FIG. 7L, representation 724 is in the same position relative to environment 720, but the viewpoint from which environment 720 is displayed has changed compared to FIG. 7K. For example, the viewpoint has moved such that computer system 700 displays a side view of representation 724 (e.g., as opposed to a front view as shown in FIG. 7K). As a result of the change in viewpoint, the background behind representation 724 is different from the background in FIG. 7K. In FIG. 7L, third background element 720a3 (e.g., a wall with a different color, texture, and/or pattern) is behind representation 724 with edge portion 724a1e. Because edge portion 724a1e is in front of third background element 720a3, edge portion 724a1e has different appearance, as indicated by the speckled fill pattern. In FIG. 7L, the visual effect and the animated noise effect are applied to representation 724. In some embodiments, the visual effect and the animated noise effect remain the same even though representation 724 has a different background and is viewed from a different viewpoint. In some embodiments, computer system 700 changes an appearance of representation 724 when image and/or tracking data of the remote participant corresponding to representation 724 does not meet a set of image and/or tracking criteria (e.g., when the image and/or tracking data is degraded).

Figure 7M:
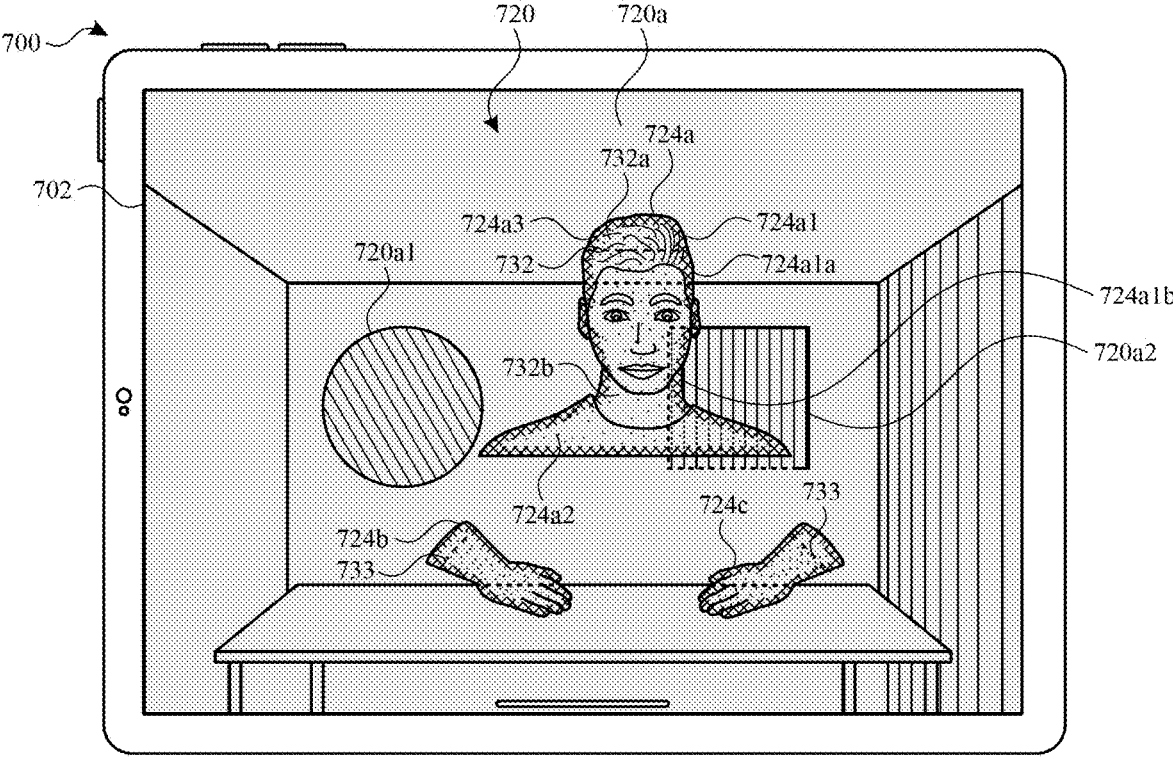

Turning to FIG. 7M, representation 724 is in the same position relative to environment 720 and is displayed from the same viewpoint as in FIGS. 7J1 and/or 7J2. However, image and/or tracking data of the remote participant corresponding to representation 724 is degraded (e.g., has a lower bandwidth, reduced confidence, and/or lower resolution). As a result, representation 724 is displayed with less detail and/or physical accuracy than in FIGS. 7J and/or 7J2. The reduced detail and/or physical accuracy is represented by the speckled pattern in representation 724 in FIG. 7M. Also, representation 724 is displayed with a neutral facial expression (e.g., even if the person represented by representation 724 is actually smiling).

Figure 7N:
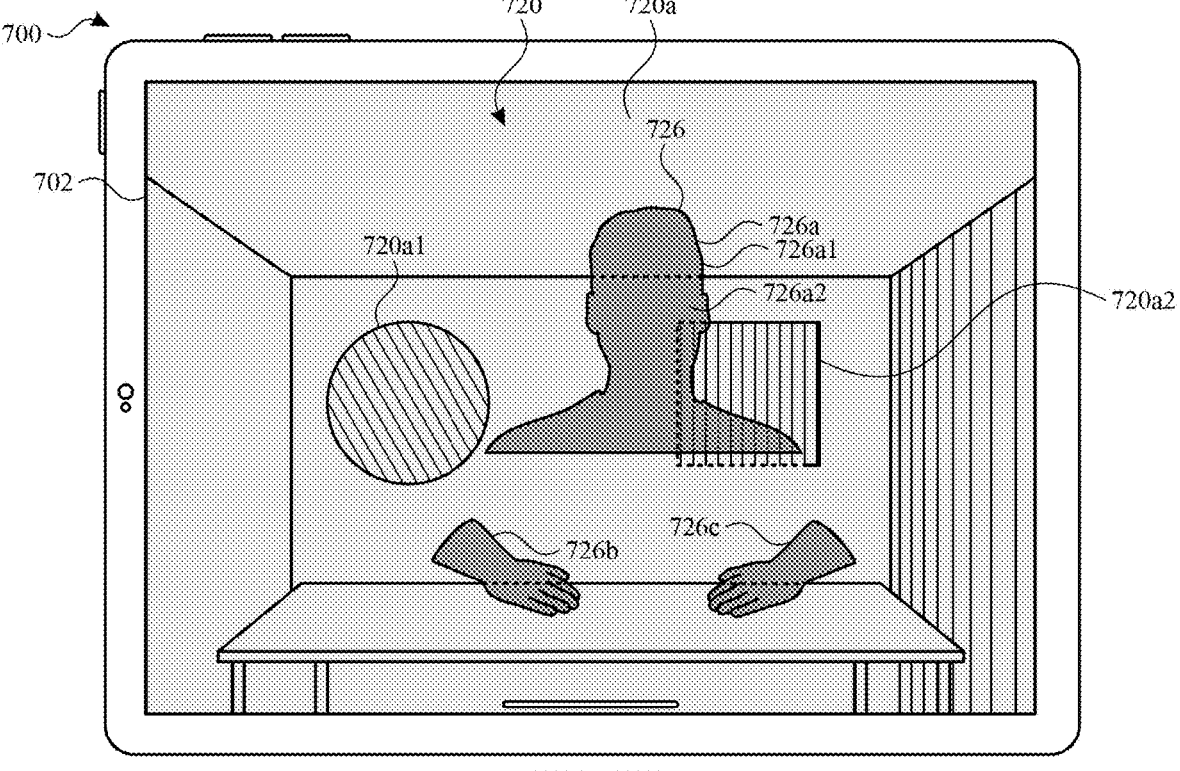

In some embodiments, when image and/or tracking data of the remote participant corresponding to representation 724 does not meet the set of image and/or tracking criteria, the edge of representation 724 is not displayed based on the visual properties of the background (e.g., representation 724 is displayed without an edge treatment and/or edge effect). For example, in FIG. 7M, edge portion 724a1a and edge portion 724a1b have the same appearance, as indicated by the same solid line style used for both edge portion 724a1a and edge portion 724a1b. In some embodiments, representation 724 does not include the visual effect and/or the animated noise effect when image and/or tracking data of the remote participant corresponding to representation 724 does not meet the set of image and/or tracking criteria. For example, in FIG. 7M, interior boundary 724a3 does not have the visual effect (e.g., an iridescent effect) and interior portion 724a2 does not have the animated noise effect. In some embodiments, if image and/or tracking issues persist, computer system 700 further reduces the fidelity of the representation of the remote participant in environment 720. For example, in FIG. 7N, the image and/or tracking data of the remote participant corresponding continues not to meet the set of image and/or tracking criteria. As a result, computer system 700 replaces representation 724 with representation 726, including upper portion 726a, right hand 726b, and left hand 726c, shown in FIG. 7N. In FIG. 7N, representation 726 includes a uniform, substantially uniform, gradient, or pattern fill (e.g., is a silhouette). In some embodiments, representation 726 does not include features that are based on physical features of the remote participant. In some embodiments, representation 726 is a predefined shape (e.g., 716). An appearance of the edge of representation 726 is not based on the background, and representation 726 does not include the visual effect and does not include the animated noise effect described with reference to representation 724. In some embodiments, when the image and/or tracking data of the remote participant corresponding continues not to meet the set of image and/or tracking criteria, computer system 700 removes representation 726 and does not display a representation of the participant (e.g., does not display representation 726).

In some embodiments, the real-time communication session includes three or more participants. For example, in some embodiments, the real-time communication session includes a third participant other than the person represented by, e.g., representation 724 and the user of computer system 700. In some embodiments, the third participant has a different viewpoint than the user of computer system 700. Because the third participant has a different viewpoint, representation 724 is displayed at a different viewing angle for the third participant than for the user of computer system 700. In some embodiments, representation 724 of the person is displayed according to the techniques described with reference to FIGS. 7H-7N based on the viewing angle of representation 724 for the third participant. Thus, representation 724 is displayed with a different appearance (e.g., a different level of detail) for the third participant than for the user of computer system 700 because of the different viewing angle.

In some embodiments, a representation of the person (e.g., representation 712, 714, 716, 722, 724, 726, 912 (described below), 922 (described below), 1114 (described below), 1118 (described below), 1122 (described below), 1306A (described below), and/or 1306B (described below)) is displayed having a color pattern (e.g., a color pattern and/or color effect is applied to the representation of the person or a portion of the representation of the person). FIG. 7O illustrates an example of color pattern image 728 that includes a color pattern that varies over time and/or space. The color pattern is represented by the wavy, overlapping strips with different shadings to indicate the variation in the color pattern over time and space. The color pattern (or, optionally, a portion of the color pattern) in color pattern image 728 can be applied to a representation of the person.

For example, FIG. 7O illustrates an embodiment in which computer system 700 displays representation 724 and representation 730 of another person in environment 720. A color pattern is applied to representation 724 and representation 730. The color pattern can be applied to various portions of the representation. For example, FIG. 7O shows the color pattern applied to portion 724a, right hand 724b, and left hand 724c of representation 724. In some embodiments, the color pattern is applied to some portions of a representation (e.g., to portion 724a but not to right hand 724b and/or left hand 724c).

In some embodiments, the magnitude of the color pattern varies over an extent of the representation. For example, in FIG. 7O, portion 724a includes an upper portion 732a and a lower portion 732b, with a boundary between upper portion 732a and lower portion 732b represented by transition line 732. Transition line 732 represents a transition of the color pattern in representation 724. In FIG. 7O, the color pattern has a greater magnitude (e.g., is more visible and/or brighter) in lower portion 732b than in upper portion 732a. In some embodiments, the color pattern is visible (e.g., has a non-zero magnitude) in upper portion 732a but has a lower magnitude than in lower portion 732b. In some embodiments, the color pattern varies (e.g., gradually) between upper portion 732a and lower portion 732b (e.g., decreases from the bottom of 724a to the top of portion 724a). In some embodiments, the color pattern varies over right hand 724b and/or left hand 724c (e.g., decreases from the forearm to the fingertips in 724b and/or 724c). For example, the magnitude of the color pattern is greater (e.g., the color pattern is highly visible) at the bottom of lower portion 732b and gradually decreases (e.g., the color pattern becomes less visible) in upper portion 732a. In some embodiments, the magnitude of the color pattern is zero (e.g., the color pattern is not visible or is not applied) at the top of upper portion 732a. In some embodiments, transition line 732 represents a position at which the magnitude of the color pattern changes by a greater amount for a given distance (e.g., a spatial rate of range) than in other portions of representation 724.

In some embodiments, the color pattern that is applied to a representation corresponds to a location in color pattern image 728. In FIG. 7O, the color pattern applied to representation 724 is based on portion 728a of color pattern image 728, and the color pattern applied to representation 730 is based on portion 728b of color pattern image 728. Because the color pattern varies over color pattern image 728, applying different portions of color pattern image 728 to representation 724 and representation 730 avoids the color pattern of representation 724 being the same and/or synchronized with the color pattern of representation 730.

In some embodiments, the color pattern changes position based on a viewing angle of representation 724 and/or a viewpoint of a user viewing representation 724. For example, FIG. 7P shows representation 724 at four different viewing angles, including a front view, a partial side view, a full side view, and a rear view, respectively from left to right. As the viewing angle gets further from the front view, the color pattern moves (e.g., increases in magnitude) towards the top of representation 724, as indicated by transition line 732 moving progressively higher in each view, from the front view to the full side view (e.g., transition line 732 is higher in the partial side view than in the front view and is higher in the full side view than in the partial side view). In the embodiment illustrated in FIG. 7P, the color pattern fills representation 724 in the rear view (e.g., the magnitude of the color pattern is substantially uniform over the entirety of representation 724). FIGS. 7K and 7L illustrate another example of the color pattern changing with viewing angle. In particular, as indicated by the position of transition line 732, the color pattern has a greater magnitude and/or is closer to the top of representation 724 in FIG. 7L than in FIG. 7K because FIG. 7L shows a side view and FIG. 7K shows a front view.

In some embodiments, the color pattern changes based on a certainty with which the state of the person corresponding to representation 724 is known. For example, in some embodiments, the certainty of the state of the person corresponding to representation 724 decreases as viewing angle from the front of representation 724 increases (e.g., the state is less certain in the partial side view than in the front view and the state is less certain in the rear view than in the full side view). Accordingly, in some embodiments, the color pattern in FIG. 7P moves (e.g., increases in magnitude) towards the top of representation 724, as indicated by transition line 732 moving progressively higher in each view, from the front view to the full side view due to the certainty of the state of the person decreasing as the viewing angle increases. As another example, in some embodiments, the color pattern has a greater magnitude and/or is closer to the top of representation 1122 in FIG. 11E1 (e.g., as indicated by transition line 732 compared to FIG. 11D) because of mouth 1112a of person 1112 being occluded. The certainty of the state of the person can also change based on a connectivity of the computer system associated with the person represented by representation 724 and/or the connectivity of the computer system displaying representation 724. For example, as indicated by the position of transition line 732, the color pattern has a greater magnitude and/or is closer to the top of representation 724 in FIG. 7M (e.g., as compared to FIG. 7K or FIG. 7L) because of the image and/or tracking data of the remote participant corresponding to representation 724 being degraded, as described above.

In some embodiments, the magnitude and/or position of the color pattern changes when a representation enters (e.g., joins) and/or exits (e.g., leaves) an XR environment and/or a communication session. For example, in some embodiments, a color pattern in representation 712 (e.g., in FIG. 7A and/or FIG. 7B) has a greater magnitude than the color pattern of representation 714 (e.g., in FIG. 7C and/or FIG. 7D) and the color pattern in representation 722 (e.g., in FIG. 7H and/or FIG. 7I) has a greater magnitude than the color pattern of representation 724 (e.g., in FIG. 7J1).

In some embodiments, the features of the color pattern applied to representation 724 in FIGS. 70-7P are applied to representation 724 in other contexts (e.g., contexts described with reference to other figures that include representation 724). For example, in some embodiments, the color pattern described with reference to FIGS. 70-7P is applied according to upper portion 732a, lower portion 732b and transition line 732 shown in FIGS. 7J1, 7J2, 7K, 7L, and/or 7M. In some embodiments, the features of the color pattern applied to representation 724 in FIGS. 70-7P are applied to representation 712, representation 714, representation 716, representation 722, representation 726, representation 912, representation 922, representation 1114, representation 1118, representation 1306A, and/or representation 1306B. For example, in some embodiments, the color pattern described with reference to FIGS. 70-7P is applied according to upper portion 732a, lower portion 732b and transition line 732 shown in FIGS. 11D, 11E1, and/or 11E2.

Additional descriptions regarding FIGS. 7A-7P are provided below in reference to method 800 described with respect to FIG. 8.

FIG. 8 is a flow diagram of an exemplary method 800 for displaying a representation of a person based on a background behind the representation of the person, in some embodiments. In some embodiments, method 800 is performed at a computer system (e.g., computer system 101 in FIG. 1A, 700, X700, a smart phone, a smart watch, a tablet computer, a laptop computer, a desktop computer, a wearable device, and/or a head-mounted device) that is in communication with (e.g., includes and/or is connected to) one or more display generation components (e.g., display generation component 120 in FIGS. 1A, 3, and 4, 702, X702, a visual output device, a 3D display, a display having at least a portion that is transparent or translucent on which images can be projected (such as, e.g., a see-through display), a projector, a heads-up display, and/or a display controller) (e.g., a heads-up display, a display, a touchscreen, a projector, etc.). In some embodiments, the computer system is in communication with one or more input devices (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). In some embodiments, the computer system is in communication with and one or more cameras (e.g., a camera (e.g., color sensors, infrared sensors, and other depth-sensing cameras) that points downward at a user's hand or a camera that points forward from the user's head). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

The computer system displays (802), via the one or more display generation components, movement (e.g., on the one or more display generation components and/or in an XR environment) (e.g., movement from the position of 712 in FIG. 7A to the position of 712 in FIG. 7B; movement from the position of 714 in FIG. 7C to the position of 714 in FIG. 7D; movement from the position of 722 in FIG. 7H to the position of 722 in FIG. 7I; movement from the position of 912 in FIG. 9A to the position of 912 in FIGS. 9B, 9C, and/or 9D; and/or movement from the position of 922 in FIG. 9F to the position of 922 in FIGS. 9G1, 9G2, 9H, and/or 91) of a representation (e.g., 712, 714, 716, 722, 724, 726, 912, 922, 1114, 1118, 1122, 1124, a virtual representation, a 3D representation, an avatar, a graphical virtual object, and/or a collection of graphical virtual objects) of a person (e.g., 1112, the user of the computer system, a user of a remote computer system, a participant in a real-time communication session, and/or a participant in an XR environment or XR experience) in front of a background (e.g., 710a, 710a1,710a2, 710a3, 720a, 720a1, 720a2, 720a3, 910a, 910b, 920a, 1110, and/or 1120). In some embodiments, the computer system displays movement of the representation of the person in response to movement (e.g., detected physical movement) of the person (e.g., the representation moves with movement of the person). In some embodiments, displaying movement of the representation of the person includes displaying an animation of the representation of the person according to movement of the person. In some embodiments, the background includes a physical background (e.g., viewed through a transparent display). In some embodiments, the background includes a graphical representation of a physical background, such as, e.g., an image of a physical background captured by one or more cameras. In some embodiments, the background is a virtual background that includes one or more virtual graphical objects. In some embodiments, the background includes physical objects, representations of physical objects (e.g., images and/or virtual representations of physical objects), virtual objects, or a combination thereof. A visual property (e.g., brightness, color, thickness, pattern, shape, transparency, density, spatial visual property, and/or temporal visual property) of an edge (e.g., 712a, 712a1, 712a2, 712a3, 712a4, 714a, 714a1, 714a2, 714a3, 714a4, 714a5, 714a6, 722a1, 722a1a, 722a1b, 722a1c, 722a1d, 724a1, 724a1a, 724a1b, 724a1c, 724a1d, 724a1e, 912a, 912a1, 912a2, and/or 922a1) of a respective portion of the representation of the person (e.g., a boundary between the respective portion of the representation of the person and the background) changes based on an appearance of a portion of the background behind the respective portion of the representation of the person. In some embodiments, the edge of the respective portion of the representation of the person includes an area or volume within a predetermined distance of a surface or boundary of the representation of the person (e.g., within the surface or boundary of the representation of the person and/or outside a surface and/or boundary of the representation of the person). In some embodiments, the edge of the respective portion of the representation of the person includes a boundary between a surface of the respective portion of the representation of the person and the background relative to a viewpoint from which the respective portion of the representation of the person is viewed.

In accordance with a determination that the portion of the background behind the respective portion of the representation of the person has a first value for a respective visual property (e.g., brightness, color, thickness, pattern, shape, transparency, density, spatial visual property, and/or temporal visual property), the computer system displays (804) the edge (e.g., 712a, 712a1, 712a2, 712a3, 712a4, 714a, 714a1, 714a2, 714a3, 714a4, 714a5, 714a6, 722a1, 722a1a, 722a1b, 722a1c, 722a1d, 724a1, 724a1a, 724a1b, 724a1c, 724a1d, 724a1e, 912a, 912a1, 912a2, and/or 922a1) of the respective portion of the representation of the person with a first appearance (e.g., a first brightness, a first color, a first thickness, a first pattern, a first shape, a first transparency, a first density, a first spatial visual appearance, a first static visual appearance, a first dynamic visual appearance, a first temporal visual appearance, and/or a first animation) that is based on the first value for the respective visual property.

In accordance with a determination that the portion of the background behind the respective portion of the representation of the person has a second value for the respective visual property that is different from the first value for the respective visual property, the computer system displays (806) the edge (e.g., 712a, 712a1, 712a2, 712a3, 712a4, 714a, 714a1, 714a2, 714a3, 714a4, 714a5, 714a6, 722a1, 722a1a, 722a1b, 722a1c, 722a1d, 724a1, 724a1a, 724a1b, 724a1c, 724a1d, 724a1e, 912a, 912a1, 912a2, and/or 922a1) of the respective portion of the representation of the person with a second appearance (e.g., a second brightness, a second color, a second thickness, a second pattern, a second shape, a second transparency, a second density, a second spatial visual appearance, a second static visual appearance, a second dynamic visual appearance, a second temporal visual appearance, and/or a second animation) that is based on the second value for the respective visual property and is different from the first appearance of the edge of the respective portion of the representation of the person.

Displaying movement of the representation of the person informs the user about the state (or change in state) of the person, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space. Displaying the edge of the respective portion of the representation of the person with an appearance that is based on a visual property of the portion of the background behind the respective portion of the representation of the person informs the user about the state (or change in state) of the person, conveys information from the person, and updates the appearance of the representation of the person without requiring user input, thereby performing an operation when a set of conditions has been met without requiring further user input, providing improved visual feedback to the user, reducing the number of inputs needed to perform an operation, and providing a more varied, detailed, and/or realistic user experience while saving storage space.

In some embodiments, the computer system provides (e.g., outputs audio and/or displays a user interface of) a real-time (e.g., live) communication session. In some embodiments, the representation of the person is displayed and/or otherwise used to communicate during the real-time communication session. In some embodiments, a real-time communication session includes real-time communication between participants of the real-time communication session, such as a user of the computer system and one or more other persons (e.g., one or more other users associated with other (e.g., different) computer systems). In some embodiments, providing the real-time communication session includes displaying representations of the person's body (e.g., facial expression, body expression, body position, and/or body movement) via the representation of the person. In some embodiments, providing the real-time communication session includes displaying the representation of the person and/or outputting audio corresponding to utterances of the person in real time. In some embodiments, the computer system and one or more other (e.g., remote) computer systems are in communication (e.g., wireless communication) with one another to enable transmission of information indicative of the representation of the person and/or audio corresponding to utterances of the person between the computer system and the one or more other computer systems. In some embodiments, a real-time communication session includes an XR experience (e.g., an XR environment). In some embodiments, the real-time communication session includes displaying the representation of the person (and, optionally, a representation of a second person) in an XR environment via display generation components of the computer system and the one or more other computer systems in communication via the real-time communication session.

In some embodiments, the computer system displays the representation of the person in response to detecting (e.g., via one or more input devices) a request (e.g., a manual input, a press of a button, a gesture, a touch input, a voice command, and/or other input) to display the representation of the person and/or an XR environment. In some embodiments, the computer system displays the representation of the person in response to detecting movement of the person. In some embodiments, the computer system provides (e.g., displays) an XR experience (e.g., an XR environment and/or a 3D environment) that includes the representation of the person and the background. In some embodiments, the XR experience includes representations of multiple persons in an XR environment including, e.g., the representation of the person and a representation of a user of the computer system. In some embodiments, the person is associated with (e.g., logged into, using, and/or wearing) the computer system. In some embodiments, the person is associated with (e.g., logged into, using, and/or wearing) an external device different from the computer system. In some embodiments, the representation of the person is associated with a user or computer system that is logged into, participating in, and/or connected to an XR experience and/or XR environment.

In some embodiments, while displaying the movement of the representation (e.g., 712, 714, 716, 722, 724, 726, 912, 922, 1114, 1118, 1122, and/or 1124) of the person, the computer system changes the visual property of the edge (e.g., 712a, 712a1, 712a2, 712a3, 712a4, 714a, 714a1, 714a2, 714a3, 714a4, 714a5, 714a6, 722a1, 722a1a, 722a1b, 722a1c, 722a1d, 724a1, 724a1a, 724a1b, 724a1c, 724a1d, 724a1e, 912a, 912a1, 912a2, and/or 922a1) of the respective portion of the representation of the person. In some embodiments, the computer system changes the visual property of the edge of the respective portion of the representation of the person as (or, in some embodiments, in response to) movement of the representation of the person. In some embodiments, the computer system changes the visual property of the edge of the respective portion of the representation of the person as (or, in some embodiments, in response to) movement of the person. In some embodiments, a visual appearance (and/or the visual property) of the edge of the respective portion of the representation of the person changes with (e.g., concurrently with) the movement of the representation of the person (e.g., due to movement of the person). Changing the visual property of the edge of the respective portion of the representation of the person while displaying the movement of the representation of the person informs the user about the state (or change in state) of the person, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, in response to a change in the background (e.g., 710a, 710a1, 710a2, 710a3, 720a, 720a1, 720a2, 720a3, 910a, 910b, 920a, 1110, and/or 1120) (e.g., in response to detecting a change in the background and/or in response to a change in the background being detected (e.g., by one or more remote computer systems and/or sensors)), the computer system changes the visual property of the edge (e.g., 712a, 712a1, 712a2, 712a3, 712a4, 714a, 714a1, 714a2, 714a3, 714a4, 714a5, 714a6, 722a1, 722a1a, 722a1b, 722a1c, 722a1d, 724a1, 724a1a, 724a1b, 724a1c, 724a1d, 724a1e, 912a, 912a1, 912a2, and/or 922a1) of the respective portion of the representation of the person. In some embodiments, the computer system changes the visual appearance of the edge of the respective portion of the representation of the person as the environment behind the representation of the person changes. In some embodiments, the background behind the representation of the person changes because of (or, in some embodiments, in response to) movement of and/or a change in one or more elements of the background (e.g., while the representation of the person remains in the same position in an XR environment). In some embodiments, the background behind the representation of the person changes because of (or, in some embodiments, in response to) movement of the representation of the person to a different position in the XR environment. In some embodiments, the background behind the representation of the person changes because of (or, in some embodiments, in response to) a change in a viewpoint from which the representation of the person is viewed (e.g., the viewpoint changes while the representation of the person remains in a same position). Changing the visual property of the edge of the respective portion of the representation of the person in response to a change in the background informs the user about the state (or change in state) of the background (e.g., relative to the representation of the person) and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, the computer system detects a change (e.g., from FIG. 7D to FIG. 7E, from FIG. 7K to FIG. 7L) in a viewpoint of a user (e.g., a user of the computer system) relative to the representation of the person; and in response to detecting the change in the viewpoint (e.g., a viewpoint within an XR environment) of the user relative to the representation of the person (e.g., in response to detecting a change in the viewpoint and/or in response to a change in the viewpoint being detected), the computer system changes the visual property of the edge (e.g., 712a, 712a1, 712a2, 712a3, 712a4, 714a, 714a1, 714a2, 714a3, 714a4, 714a5, 714a6, 722a1, 722a1a, 722a1b, 722a1c, 722a1d, 724a1, 724a1a, 724a1b, 724a1c, 724a1d, 724a1e, 912a, 912a1, 912a2, and/or 922a1) of the respective portion of the representation of the person. In some embodiments, the change in the viewpoint of the user is due to a change in the position (e.g., movement) of the viewpoint in the XR environment. In some embodiments, the change in the viewpoint of the user is due to a change in position (e.g., movement) of the representation of the person in the XR environment. In some embodiments, the viewpoint of the user is a viewpoint of a user of the computer system in, or relative to, an XR environment. In some embodiments, the change in the viewpoint (e.g., relative to an XR environment) changes an angle (e.g., a viewing angle) from which the representation of the person is viewed (e.g., even if the representation of the person has not moved within the XR environment). Changing the visual property of the edge of the respective portion of the representation of the person in response to detecting the change in the viewpoint of the user relative to the representation of the person informs the user about the change in the viewpoint and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, the computer system displays the edge (e.g., 712a, 712a1, 712a2, 712a3, 712a4, 714a, 714a1, 714a2, 714a3, 714a4, 714a5, 714a6, 722a1, 722a1a, 722a1b, 722a1c, 722a1d, 724a1, 724a1a, 724a1b, 724a1c, 724a1d, 724a1e, 912a, 912a1, 912a2, and/or 922a1) of the respective portion of the representation of the person with the portion of the background behind the respective portion of the representation of the person blurred into the edge of the respective portion of the representation of the person. In some embodiments, displaying the edge of the respective portion of the representation of the person includes blurring the portion of the background behind the respective portion of the representation of the person into the edge of the respective portion of the representation of the person. In some embodiments, the visual property of the edge of the respective portion of the representation of the person includes a blurring effect in which the portion of the background behind the respective portion of the representation of the person is blurred into the edge of the respective portion of the representation of the person. Blurring the portion of the background behind the respective portion of the representation of the person into the edge of the respective portion of the representation of the person creates a more immersive user experience and integrates the representation of the person into the environment without requiring user input, thereby providing improved visual feedback to the user, reducing the number of inputs needed to perform an operation, and providing a more varied, detailed, and/or realistic user experience while saving storage space.

In some embodiments, the computer system displays the edge of the respective portion of the representation of the person based on one or more properties (e.g., brightness, color, thickness, pattern, shape, transparency, density, spatial visual property, and/or temporal visual property) of a virtual element (e.g., 710a, 710a1, 710a2, 710a3, 720a, 720a1, 720a2, 910a, 910b, 920a, 1110, and/or 1120) behind the respective portion of the representation of the person. In some embodiments, the portion of the background behind the respective portion of the representation of the person includes a virtual element. In some embodiments, displaying the edge of the respective portion of the representation of the person based on one or more properties of a virtual element behind the respective portion of the representation of the person incudes: in accordance with a determination that the virtual element includes a first property (or a first value of a property), displaying the edge of the respective portion of the representation of the person with a first appearance; and in accordance with a determination that the virtual element includes a second property (or a second value of the property) that is different from the first property (or that is different from the first value of the property), displaying the edge of the respective portion of the representation of the person with a second appearance that is different from the first appearance. Displaying the edge of the respective portion of the representation of the person based on one or more properties of a virtual element behind the respective portion of the representation of the person creates a more immersive user experience and integrates the representation of the person (e.g., a physical person) with virtual elements without requiring user input, thereby providing improved visual feedback to the user, reducing the number of inputs needed to perform an operation, and providing a more varied, detailed, and/or realistic user experience while saving storage space.

In some embodiments, the computer system displays the edge (e.g., 712a, 712a1, 712a2, 712a3, 712a4, 714a, 714a1, 714a2, 714a3, 714a4, 714a5, 714a6, 722a1, 722a1a, 722a1b, 722a1c, 722a1d, 724a1, 724a1a, 724a1b, 724a1c, 724a1d, 724a1e, 912a, 912a1, 912a2, and/or 922a1) of the respective portion of the representation of the person based on one or more properties (e.g., brightness, color, thickness, pattern, shape, transparency, density, spatial visual property, and/or temporal visual property) of a physical element (e.g., a physical object and/or a real-world element) behind the respective portion of the representation of the person in a three-dimensional environment. In some embodiments, the representation of the person is displayed in front of a three-dimensional environment provided to the user of the computer system (e.g., displayed by the computer system for the user to view). In some embodiments, the portion of the background behind the respective portion of the representation of the person includes a physical element. In some embodiments, displaying the edge of the respective portion of the representation of the person based on one or more properties of a physical element behind the respective portion of the representation of the person incudes: in accordance with a determination that the physical element includes a first property (or a first value of a property), displaying the edge of the respective portion of the representation of the person with a first appearance; and in accordance with a determination that the physical element includes a second property (or a second value of the property) that is different from the first property (or that is different from the first value of the property), displaying the edge of the respective portion of the representation of the person with a second appearance that is different from the first appearance. Displaying the edge of the respective portion of the representation of the person based on one or more properties of a physical element behind the respective portion of the representation of the person in a three-dimensional environment creates a more immersive user experience and integrates the representation (e.g., a virtual representation) of the person (e.g., a physical person) with physical elements without requiring user input, thereby providing improved visual feedback to the user, reducing the number of inputs needed to perform an operation, and providing a more varied, detailed, and/or realistic user experience while saving storage space.

In some embodiments, the computer system displays the edge of the respective portion of the representation of the person based on one or more properties (e.g., brightness, color, thickness, pattern, shape, transparency, density, spatial visual property, and/or temporal visual property) of a virtual element behind the respective portion of the representation of the person and one or more properties of a physical element behind the respective portion of the representation of the person. In some embodiments, the portion of the background behind the respective portion of the representation of the person includes a virtual element and a physical element. In some embodiments, displaying the edge of the respective portion of the representation of the person based on one or more properties of a virtual element behind the respective portion of the representation of the person and one or more properties of a physical element behind the respective portion of the representation of the person incudes: in accordance with a determination that the virtual element and the physical element include a first set of properties (or a first set of values of a property), displaying the edge of the respective portion of the representation of the person with a first appearance; and in accordance with a determination that the virtual element and the physical element include a second set of properties (or a second set of values of the property) that is different from the first set of properties (or that is different from the first set of values of the property), displaying the edge of the respective portion of the representation of the person with a second appearance that is different from the first appearance. Displaying the edge of the respective portion of the representation of the person based a virtual element behind the respective portion of the representation of the person and a physical element behind the respective portion of the representation of the person environment creates a more immersive user experience that integrates physical and virtual elements with the representation of the person without requiring user input, thereby providing improved visual feedback to the user, reducing the number of inputs needed to perform an operation, and providing a more varied, detailed, and/or realistic user experience while saving storage space.

In some embodiments, the background (or, in some embodiments, the portion of the background behind the respective portion of the representation of the person) includes a representation (e.g., an image and/or video) of a physical environment that is in a field of view (e.g., 708, 910, 920, 1110, and/or 1120) of one or more camera sensors (e.g., 704) and (or, in some embodiments, a portion of a physical environment) that is captured by the one or more camera sensors (e.g., one or more remote camera sensors and/or one or more camera sensors that are in communication with (e.g., included in and/or connected to) the computer system). In some embodiments, the visual property of the edge of the respective portion of the representation of the person is based on a physical environment. Including a representation in the background of a physical environment captured by one or more camera sensors creates a more immersive user experience and integrates the representation of the person with representations of physical elements without requiring user input, thereby providing improved visual feedback to the user, reducing the number of inputs needed to perform an operation, and providing a more varied, detailed, and/or realistic user experience while saving storage space.

In some embodiments, the background (e.g., 710a, 720a, 910a, and/or 920a) (or, in some embodiments, the portion of the background behind the respective portion of the representation of the person) includes a representation (e.g., an image and/or video) of a virtual background (e.g., a portion of a VR environment for a user of the computer system behind the representation of the person). In some embodiments, the visual property of the edge of the respective portion of the representation of the person is based on a virtual reality environment. Including a representation in the background of a virtual background creates a more immersive user experience and integrates the representation of the person with virtual aspects of the environment without requiring user input, thereby providing improved visual feedback to the user, reducing the number of inputs needed to perform an operation, and providing a more varied, detailed, and/or realistic user experience while saving storage space.

In some embodiments, the computer system displays the representation of the person (e.g., the edge of the respective portion of the representation of the person) with an iridescent effect (e.g., an iridescent effect with one or more colors and/or that varies over space and/or time) having a first appearance (e.g., a first color, brightness, width, magnitude, extent, pattern, temporal pattern, spatial pattern, and/or duration); while displaying the representation of the person with an iridescent effect having the first appearance, the computer system detects movement of the representation of the person (e.g., movement from the position of 712 in FIG. 7A to the position of 712 in FIG. 7B; movement from the position of 714 in FIG. 7C to the position of 714 in FIG. 7D; movement from the position of 722 in FIG. 7H to the position of 722 in FIG. 7I; movement from the position of 912 in FIG. 9A to the position of 912 in FIGS. 9B, 9C, and/or 9D; and/or movement from the position of 922 in FIG. 9F to the position of 922 in FIGS. 9G1, 9G2, 9H, and/or 9I); and in response to detecting the movement of the representation of the person, the computer system displays the representation of the person (e.g., the edge of the respective portion of the representation of the person) with the iridescent effect having a second appearance (e.g., a second color, brightness, width, magnitude, extent, pattern, temporal pattern, spatial pattern, and/or duration) that is different from the first appearance of the iridescent effect. In some embodiments, the computer system changes an appearance of the iridescent effect in response to detected movement of the representation of the person and/or detected movement of the person. In some embodiments, the second appearance of the iridescent effect (e.g., the change in the appearance of the iridescent effect) is based on a direction and/or amount (e.g., magnitude) of the movement of the representation of the person. For example, in accordance with a determination that the movement of the representation of the person has a first movement characteristic (e.g., direction and/or magnitude), the computer system displays the iridescent effect having the second appearance; and in accordance with a determination that the movement of the representation of the person has a second movement characteristic (e.g., direction and/or magnitude) that is different from the first movement characteristic, the computer system displays the iridescent effect having a fourth appearance that is different from the second appearance of the iridescent effect. Changing an appearance of an iridescent effect applied to the edge of the respective portion of the representation of the person in response to detecting the movement of the representation of the person informs the user about the state (or change in state) of the representation (or the person represented by the representation of the person) and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, while displaying the representation of the person with the iridescent effect having the first appearance, the computer system detects a change in a viewpoint of a user (e.g., a user of the computer system); and in response to detecting the change in the viewpoint of the user, the computer system displays the representation of the person (e.g., the edge of the respective portion of the representation of the person) with the iridescent effect having a third appearance that is different from the first appearance of the iridescent effect (e.g., the computer system changes the appearance of the iridescent effect). In some embodiments, the third appearance of the iridescent effect (e.g., the change in the appearance of the iridescent effect) is based on a direction and/or amount (e.g., magnitude) of the change in the viewpoint of the user. For example, in accordance with a determination that the change in the viewpoint of the user has a first change characteristic (e.g., direction and/or magnitude), the computer system displays the iridescent effect having the third appearance; and in accordance with a determination that the change in the viewpoint of the user has a second change characteristic (e.g., direction and/or magnitude) that is different from the first change characteristic, the computer system displays the iridescent effect having a fifth appearance that is different from the third appearance of the iridescent effect. In some embodiments, the viewpoint of the user is a viewpoint of a user of the computer system in, or relative to, an XR environment. In some embodiments, the change in the viewpoint of the user changes an angle (e.g., a viewing angle) from which the representation of the person is viewed. In some embodiments, displaying the edge of the respective portion of the representation of the person with the iridescent effect includes: in accordance with a determination that the representation of the person is displayed from a first viewpoint (or, in some embodiments, from a first viewing angle), displaying the iridescent effect with a first appearance; and in accordance with a determination that the representation of the person is displayed from a second viewpoint that is different from the first viewpoint (or, in some embodiments, from a second viewing angle that is different from the first viewing angle), displaying the iridescent effect with a second appearance that is different from the first appearance. Changing the visual property of the edge of the respective portion of the representation of the person in response to detecting the change in the viewpoint of the user informs the user about the state (or change in state) of the viewpoint and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, while displaying the representation of the person with the iridescent effect having the first appearance, the computer system detects a change in the portion of the background behind the respective portion of the representation of the person; and in response to detecting the change in the portion of the background (e.g., 710a, 710a1, 710a2, 710a3, 720a, 720a1, 720a2, 720a3, 910a, 910b, 920a, 1110, and/or 1120) behind the respective portion of the representation of the person, the computer system displays the representation of the person with the iridescent effect having the first appearance (e.g., maintaining the appearance of the iridescent effect) (e.g., the appearance of the iridescent effect does not change based on changes in the background). In some embodiments, in response to detecting the change in the portion of the background behind the respective portion of the representation of the person, the computer system changes the appearance of the respective portion (and/or the edge of the respective portion) without changing the appearance of the iridescent effect. Maintaining the appearance of the iridescent effect in response to detecting the change in the portion of the background behind the respective portion of the representation of the person emphasizes changes (e.g., movement) of the representation of the person and/or the viewpoint and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, the computer system detects that the person (or a computer system associated with the person)

joins a real-time extended reality experience (e.g., a real-time communication session that includes representations of respective participants in an XR environment); and in response to detecting that the person joins the real-time extended reality experience, the computer system displays a placeholder representation (e.g., 712, 716, 722, 726, 1118, and/or 1124) a silhouette) of the person that is different from the representation of the person, including displaying an edge of the placeholder representation of the person with the visual property of the edge of the respective portion of the representation of the person (e.g., the edge of the placeholder representation includes the same visual property as the edge of the respective portion of the representation of the person). Displaying a placeholder representation when the person joins the real-time extended reality experience notifies the user that the person has joined the real-time extended reality experience and enables the computer system to represent the person earlier, prior to obtaining more detailed information (e.g., tracking data) about the person, thereby providing improved visual feedback and providing a more varied, detailed, and/or realistic user experience while saving storage space.

In some embodiments, displaying the placeholder representation of the person includes displaying movement (e.g., movement from the position of 712 in FIG. 7A to the position of 712 in FIG. 7B; and/or movement from the position of 722 in FIG. 7H to the position of 722 in FIG. 7I) of the placeholder representation of the person in response to movement of the person (e.g., movement of the person detected by the computer system, movement of the person detected by one or more remote sensors, and/or movement of the person detected by a computer system associated with the person). Displaying movement of the placeholder representation of the person in response to movement of the person notifies the user of the movement of the person, allows the person to convey information, updates the representation of the person without requiring user input, and enables the computer system to represent movement of the person earlier, prior to obtaining more detailed information (e.g., tracking data) about the person, thereby providing improved visual feedback to the user, reducing the number of inputs needed to perform an operation, and providing a more varied, detailed, and/or realistic user experience while saving storage space.

In some embodiments, while displaying the representation of the person (or, in some embodiments, after displaying the movement of the representation of the person in front of the background), in accordance with a determination that a first set of tracking criteria is not met (e.g., in FIGS. 7F, 7G, 7M, and/or 7N) (e.g., the person is unable to be tracked with a threshold certainty, a network bandwidth does not satisfy a threshold bandwidth, a tracking rate does not satisfy a threshold rate, and/or a tracking issue occurs), the computer system displays the representation of the person without the visual property of the edge of the respective portion of the representation of the person. Displaying the representation of the person without the visual property of the edge of the respective portion of the representation of the person in accordance with a determination that a first set of tracking criteria is not met informs the user about the state (e.g., the tracking state) of the person, thereby performing an operation when a set of conditions has been met (or not met) without requiring further user input and providing improved visual feedback.

In some embodiments, while displaying the representation of the person (or, in some embodiments, after displaying the movement of the representation of the person in front of the background), in accordance with a determination that a second set of tracking criteria is not met (e.g., in FIG. 7G and/or 7N) (e.g., the first set of tracking criteria is not met for a predetermined amount of time (e.g., a non-zero amount of time)), the computer system ceases display of the representation of the person and displaying a lower-fidelity (e.g., a less accurate, less detailed, and/or lower resolution) representation of the person. In some embodiments, the lower-fidelity representation of the person has fewer details, fewer features, lower resolution, lower fidelity, and/or less accuracy compared to the representation of the person. In some embodiments, the lower-fidelity representation of the person includes a less accurate representation of the physical features of the person compared to the representation of the person. Displaying a lower-fidelity representation of the person in accordance with a determination that a second set of tracking criteria is not met informs the user about the state (e.g., the tracking state, such as a persistent tracking issue) of the person and updates the appearance of the representation of the person without requiring user input, thereby performing an operation when a set of conditions has been met (or not met) without requiring further user input, reducing the number of inputs needed to perform an operation, and providing improved visual feedback.

In some embodiments, in accordance with a determination that the first set of tracking criteria is not met (e.g., in FIGS. 7F, 7G, 7M, and/or 7N), the computer system displays the representation of the person with an animated noise effect (e.g., a periodic or pseudo-periodic spatially distributed high frequency visual noise such as a simulated film grain) (e.g., the computer system displays an animated noise effect on and/or within the representation of the person). In some embodiments, the animated noise effect includes simulated speckles, particles, and/or artifacts in a random pattern. In some embodiments, animated noise effect includes a random physical texture made from small metallic silver particles found on processed photographic celluloid. In some embodiments, the speckles, particles, and/or artifacts vary in size over space and/or time. Displaying the representation of the person with an animated noise effect in accordance with a determination that the first set of tracking criteria is not met informs the user about the state (e.g., the tracking state, such as a tracking issue) of the person and updates the appearance of the representation of the person without requiring user input, thereby performing an operation when a set of conditions has been met (or not met) without requiring further user input, reducing the number of inputs needed to perform an operation, and providing improved visual feedback.

In some embodiments, the first set of tracking criteria is not met when a first type of tracking issue (e.g., a network bandwidth does not satisfy a threshold bandwidth and/or a track of the person is lost) is detected, and wherein the first set of tracking criteria is met when a second type of tracking issue (e.g., a mouth of the person is occluded) is detected. Displaying the representation of the person without the visual property of the edge of the respective portion of the representation of the person (e.g., meeting or not meeting the first set of tracking criteria) based on a type of tracking issue informs the user of the type of tracking issue and enables the computer system provide information when tracking permits, thereby performing an operation when a set of conditions has been met without requiring further user input, reducing the number of inputs needed to perform an operation, and providing improved visual feedback.

In some embodiments, the computer system displays the representation of the person with an animated noise effect (e.g., as shown on 724 in FIG. 7M and/or 922 in FIG. 9H) (e.g., a periodic or pseudo-periodic spatially distributed high frequency visual noise such as a simulated film grain) that changes over time (e.g., the computer system displays an animated noise effect that changes over time on and/or within the representation of the person). In some embodiments, the computer system modifies the appearance of the representation of the person with an animated noise effect that varies over time. In some embodiments, the animated noise effect creates a motion effect in the representation of the person. In some embodiments, the animated noise effect includes simulated speckles, particles, and/or artifacts in a random pattern. In some embodiments, animated noise effect is a random physical texture made from small metallic silver particles found on processed photographic celluloid. In some embodiments, the speckles, particles, and/or artifacts vary in size over space and/or time. Displaying the representation of the person with an animated noise effect that changes over time informs the user about the state of the person and provides a dynamic appearance of the representation of the person without requiring user input, thereby providing improved visual feedback to the user, reducing the number of inputs needed to perform an operation, and providing a more varied, detailed, and/or realistic user experience while saving storage space.

In some embodiments, displaying the representation of the person with the animated noise effect that changes over time includes varying (e.g., periodically or quasi periodically) a luminance of the animated noise effect over time (e.g., the animated noise effect includes periodic, random, or pseudorandom temporal variations in luminance). Varying the luminance of the animated noise effect over time informs the user about the state of the person and provides a dynamic appearance of the representation of the person without requiring user input, thereby providing improved visual feedback to the user, reducing the number of inputs needed to perform an operation, and providing a more varied, detailed, and/or realistic user experience while saving storage space.

In some embodiments, displaying the representation of the person with the animated noise effect that changes over time includes displaying the animated noise effect with a first magnitude (e.g., density, particle size, brightness, contrast with other features of the representation of the person, and/or temporal variation) on a first portion (e.g., 714d, 714c, 714f, 714g, 722a, 722b, 722c, 724a, 724b, 724c, 922a, 922b, and/or 922c) of the representation of the person and a second magnitude that is different from the first magnitude on a second portion (e.g., 714d, 714c, 714f, 714g, 722a, 722b, 722c, 724a, 724b, 724c, 922a, 922b, and/or 922c) of the representation of the person that is different from the first portion of the representation of the person. In some embodiments, compared to the second magnitude, the first magnitude includes different particle density, particle size, brightness, contrast with other features of the representation of the person, and/or temporal variation relative to other content. Displaying the animated noise effect with different magnitudes on different portions of the representation of the person enables the computer system to emphasize certain portions of the representation of the person and convey information about a portion of the representation of the person relative to another portion of the representation of the person, thereby providing improved visual feedback and providing a more varied, detailed, and/or realistic user experience while saving storage space.

In some embodiments, the first portion of the representation of the person corresponds to one or more hands (e.g., 714c, 714f, 722b, 722c, 724b, 724c, 922b, and/or 922c) of the person (e.g., the first portion is one or more hands of the representation of the person) and the second portion of the representation of the person corresponds to a head (e.g., 714d, 722a, 724a, and/or 922a) of the person (e.g., the second portion is a head of the representation), and wherein the first magnitude is greater than the second magnitude (e.g., the animated noise effect has a greater magnitude on the hands of the representation of the person than on the head of the representation of the person). In some embodiments, compared to the second magnitude, the first magnitude includes greater particle density, larger particle size, greater brightness, more contrast with other features of the representation of the person, and/or greater temporal variation relative to other content. Displaying the animated noise effect with a greater magnitude on the hands of the representation of the person than on the head of the representation of the person enables the computer system to de-emphasize the hands of the representation of the person and convey information about the hands of the representation of the person relative to the head of the representation of the person, thereby providing improved visual feedback and providing a more varied, detailed, and/or realistic user experience while saving storage space.

In some embodiments, the computer system displays the representation of the person with an animated noise effect (e.g., a periodic or pseudo-periodic spatially distributed high frequency visual noise such as a simulated film grain) that has a first animated noise transparency at a first portion (e.g., 712a, 714a, 714c, 724a3, 912c, 922a3, 716a, 722a1, 724al, 726a1, 912a, and/or 922a1, and/or an edge) of the representation of the person (e.g., the computer system displays a spatial animated noise effect that affects the transparency of an edge of the representation of the person). Displaying the animated noise effect with a transparency at a first portion of the representation of the person provides the user with increased context about the environment behind the representation of the user without having to navigate to a different position in the environment, thereby providing improved visual feedback and reducing the number of inputs needed to perform an operation.

In some embodiments, the animated noise effect has a second animated noise transparency at a second portion (e.g., 712b, 714b, 716b, 722a2, 724a2, 726a2, 912b, and/or an interior portion and/or a center portion) of the representation of the person, and wherein the first animated noise transparency is greater (e.g., more transparent) than the second animated noise transparency (e.g., the computer system displays a spatial animated noise effect such that the edge of the representation of the person is more transparent than an interior portion of the representation of the person). Displaying the animated noise effect with different transparency on different portions of the representation of the person enables the computer system to emphasize certain portions of the representation of the person and convey information about a portion of the representation of the person relative to another portion of the representation of the person, thereby providing improved visual feedback and providing a more varied, detailed, and/or realistic user experience while saving storage space.

In some embodiments, the first portion of the representation of the person (e.g., the portion that is more transparent) is closer to (or at) an edge of the representation of the person relative to the second portion of the representation of the person. Displaying the animated noise effect with greater transparency closer to the edge of the representation of the person provides more information in the bulk of the representation of the person and better integrates the representation of the person with the surroundings, thereby providing improved visual feedback and providing a more varied, detailed, and/or realistic user experience while saving storage space.

In some embodiments, the animated noise effect has a greater spatial frequency (e.g., the particles are denser and/or more closely spaced) at the first portion than at the second portion. Displaying the animated noise effect with greater spatial frequency at the first portion than at the second portion enables the computer system to convey information to the user about different portions of the representation of the person and to emphasize one portion of the representation of the person over another portion, thereby providing improved visual feedback.

In some embodiments, displaying the representation of the person includes: in accordance with a determination that the background has a first background brightness (e.g., 910a in FIG. 9C; and/or 920a in FIG. 9I) (e.g., an overall brightness), displaying the representation (e.g., 912; and/or 922) of the person having a first background-based transparency; and in accordance with a determination that the background has a second background brightness (e.g., 910a in FIG. 9E; 920a in FIG. 9J) that is different from the first background brightness, displaying the representation (e.g., 912; and/or 922) of the person having a second background-based transparency that is different from the first background-based transparency. Displaying the representation of the person with different transparency based on the brightness of the background provides information about the background and enables the computer system to adapt the representation of the person to the background without requiring user input, thereby providing improved visual feedback and reducing the number of inputs needed to perform an operation.

In some embodiments, displaying the representation of the person includes: in accordance with a determination that the background has a first color (e.g., an average, median, or other prominent color), displaying the representation (e.g., 712, 714, 716, 722, 724, 726, 912, 922, 1114, 1118, 1122, and/or 1124) of the person with a tint based on the first color (e.g., the color of the background is diffused and/or blended into the representation of the person); and in accordance with a determination that the background has a second color (e.g., an average, median, or other prominent color) that is different from the first color, displaying the representation of the person with a tint based on the second color. Displaying the representation of the person with different tint based on the color of the background provides information about the background and enables the computer system to adapt the representation of the person to the background without requiring user input, thereby providing improved visual feedback and reducing the number of inputs needed to perform an operation.

In some embodiments, the representation of the person is displayed as a part of a real-time communication session between the user of the computer system and one or more other participants including a participant corresponding to the person represented by the representation of the person. In some embodiments, the representation of the person is displayed with one or more other representations (e.g., avatars) of other respective participants displayed as part of the real-time communication session. Displaying the representation of the person as a part of a real-time communication session enables the person to communicate via the representation of the person without having to share a camera feed, thereby providing improved visual feedback to the user and improving privacy and/or security.

In some embodiments, displaying movement of the representation of the person is performed in response to physical movement (e.g., a change in facial expression, movement of a facial feature, movement of a body, movement of a hand relative to the body, and/or movement of an arm relative to the body) of the person. In some embodiments, the computer system detects the physical movement of the person (e.g., the movement of the representation of the person corresponds to and/or simulates the physical movement of the person). In some embodiments, a computer system associated with the person detects the physical movement of the user. In some embodiments, one or more remote sensors detect the physical movement of the user. Displaying movement of the representation of the person in response to physical movement of the person informs the user about the state (or change in state) of the person, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, the computer system displays the representation of the person with a color pattern (e.g., 728) (e.g., within, combined with, overlaid on, and/or adjacent to the representation of the person) that varies (e.g., continuously) over time. In some embodiments, the color pattern varies over space and/or time. In some embodiments, the color pattern includes one or more colors. In some embodiments, a brightness and/or color of the color pattern varies along a first direction and/or a second direction. In some embodiments, a brightness and/or color at a location in the color pattern varies over time. In some embodiments, displaying the representation of the person with the color pattern includes displaying a video color overlay that is masked to the representation of the person (e.g., masking the video color overlay onto the representation of the person). Displaying the representation of the person with a color pattern that varies over time provides a dynamic indication of the state (or change in state) of the person and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, displaying the representation of the person with the color pattern that varies over time includes: displaying the color pattern with a first color-pattern magnitude (e.g., strength, brightness, density, opacity, and/or variation rate over space and/or time) at a first color-pattern portion (e.g., a first portion of 714, a first portion of 724, a first portion of 912, a first portion of 922, a first portion of 1114, a first portion of 1122, a first portion of 1306A, and/or a first portion of 1306B) (e.g., a torso, shoulder, chest, belly, and/or arm) of the representation of the person; and displaying the color pattern with a second color-pattern magnitude (e.g., strength, brightness, density, opacity, and/or variation rate over space and/or time) at a second color-pattern portion (e.g., a second portion of 714, a second portion of 724, a second portion of 912, a second portion of 922, a second portion of 1114, a second portion of 1122, a second portion of 1306A, and/or a second portion of 1306B) (e.g., a head and/or hand) of the representation of the person (e.g., while concurrently displaying the color pattern with the first color-pattern magnitude at the first color-pattern portion of the representation of the person), wherein the first color-pattern magnitude is different from the second color-pattern magnitude and the first color-pattern portion is different from the second color-pattern portion (e.g., the color pattern is applied with different magnitudes at different portions of the representation of the person). The term "color-pattern magnitude" is used herein to distinguish the magnitude of the color pattern from other magnitudes because the magnitude associated with the color pattern can be different from (or the same as) other magnitudes described herein. Similarly, the term "color-pattern portion" is used herein to distinguish the portion of the representation of the person to which the color pattern is applied from other portions of the representation because the portion of the representation of the person at which the color pattern is applied can be different from (or the same as) other portions of the representation described herein. Displaying the color pattern with different magnitudes at different portions of the representation of the person provides a dynamic indication of the difference in state of one portion of the person compared to another portion of the person and updates the appearance of the representation of the person without requiring user input, thereby providing improved visual feedback to the user, reducing the number of inputs needed to perform an operation, and providing a more varied, detailed, and/or realistic user experience while saving storage space.

Figures 9A, 9B:
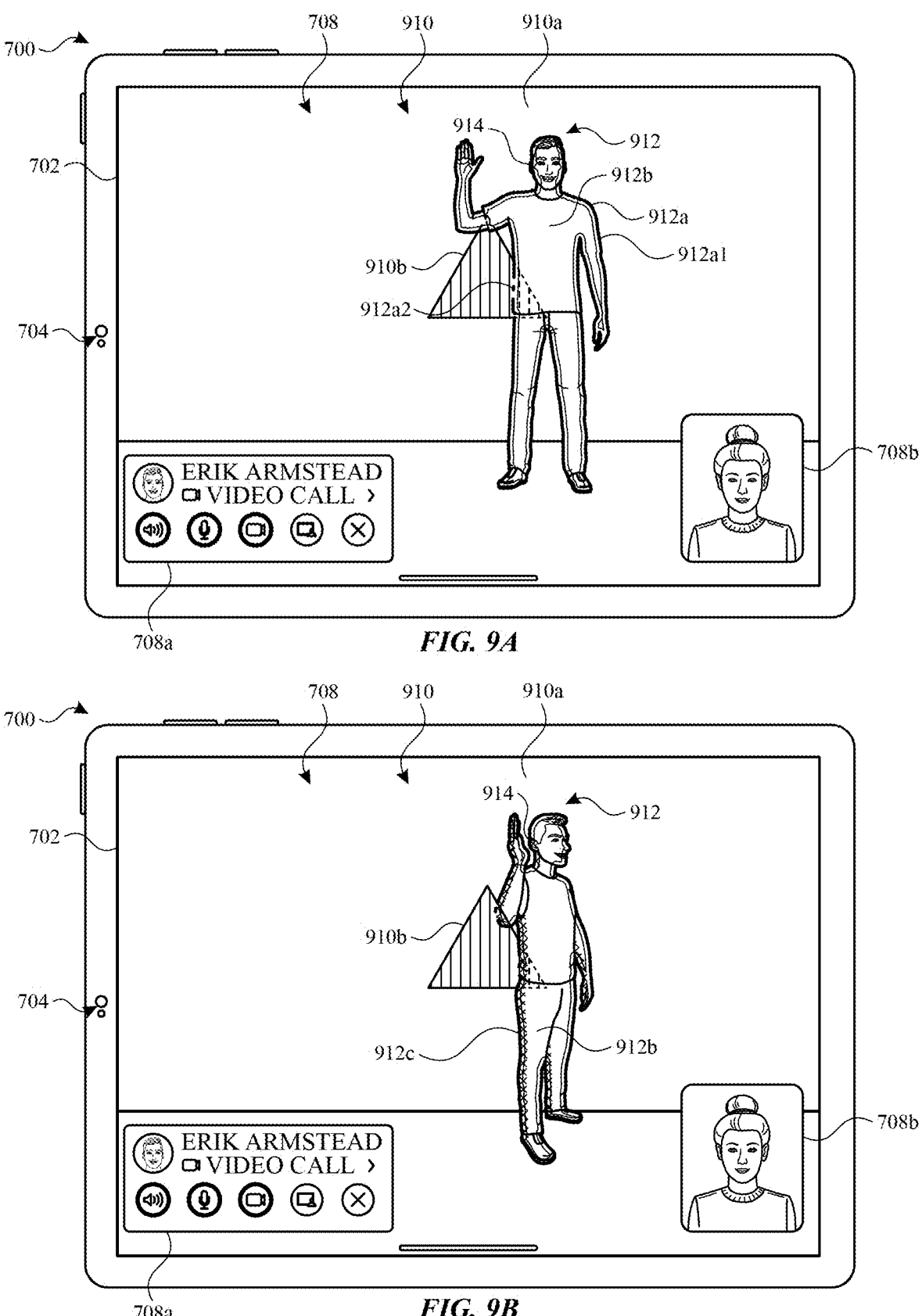
Figures 9C, 9D:
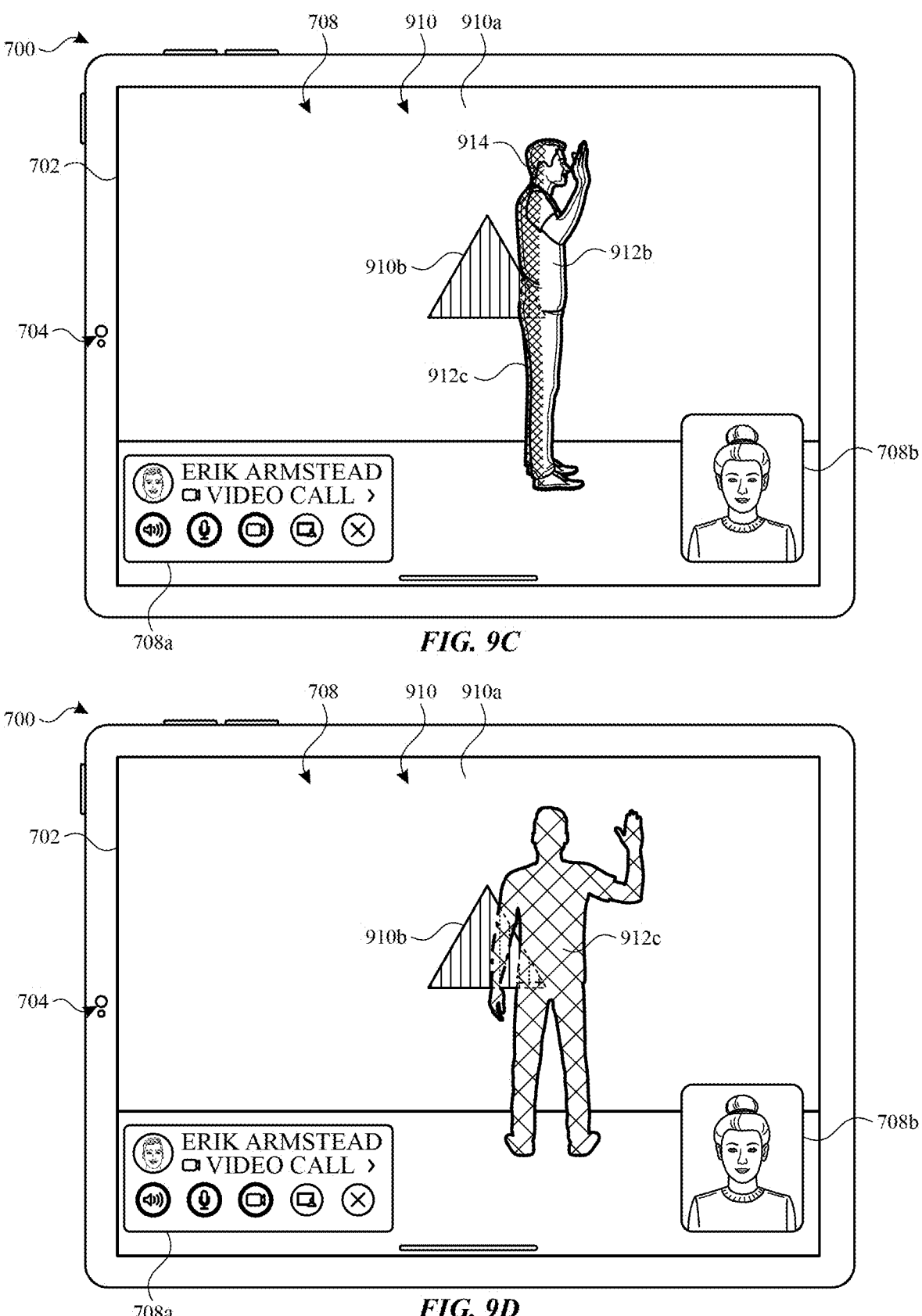
Figure 9E:
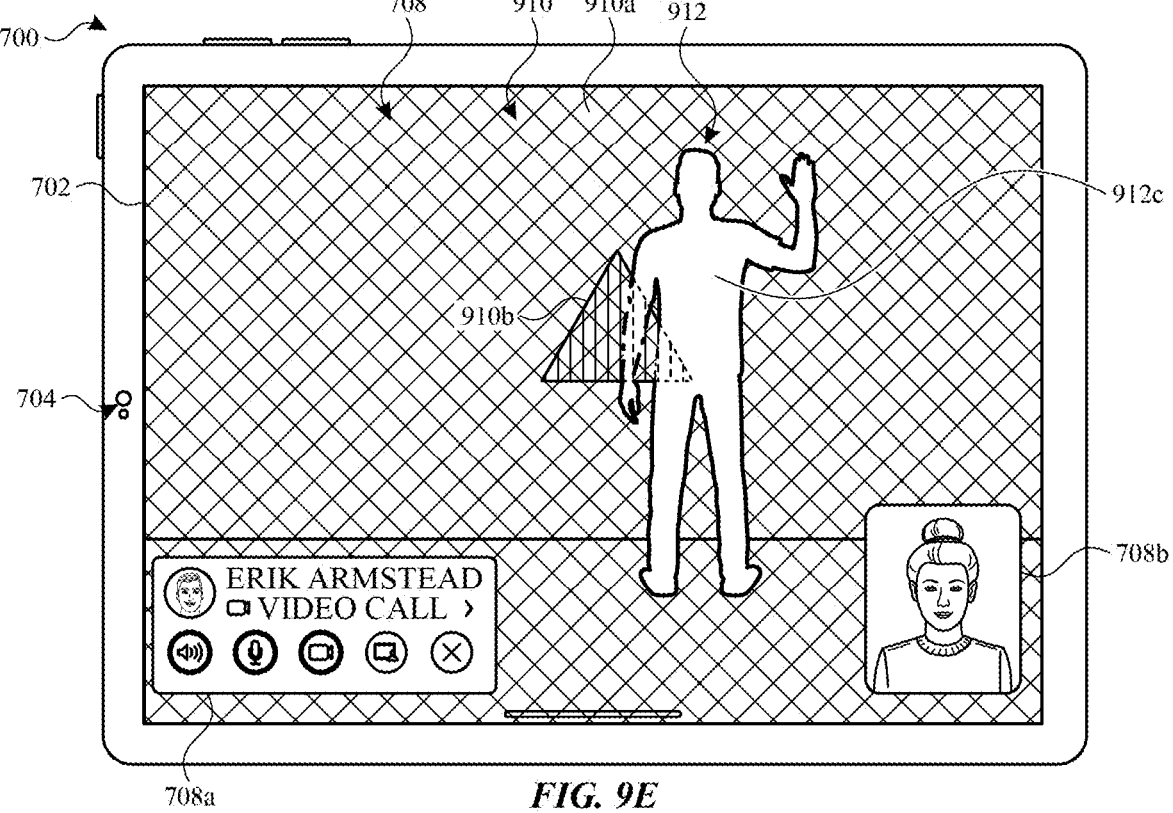
Figure 9H:
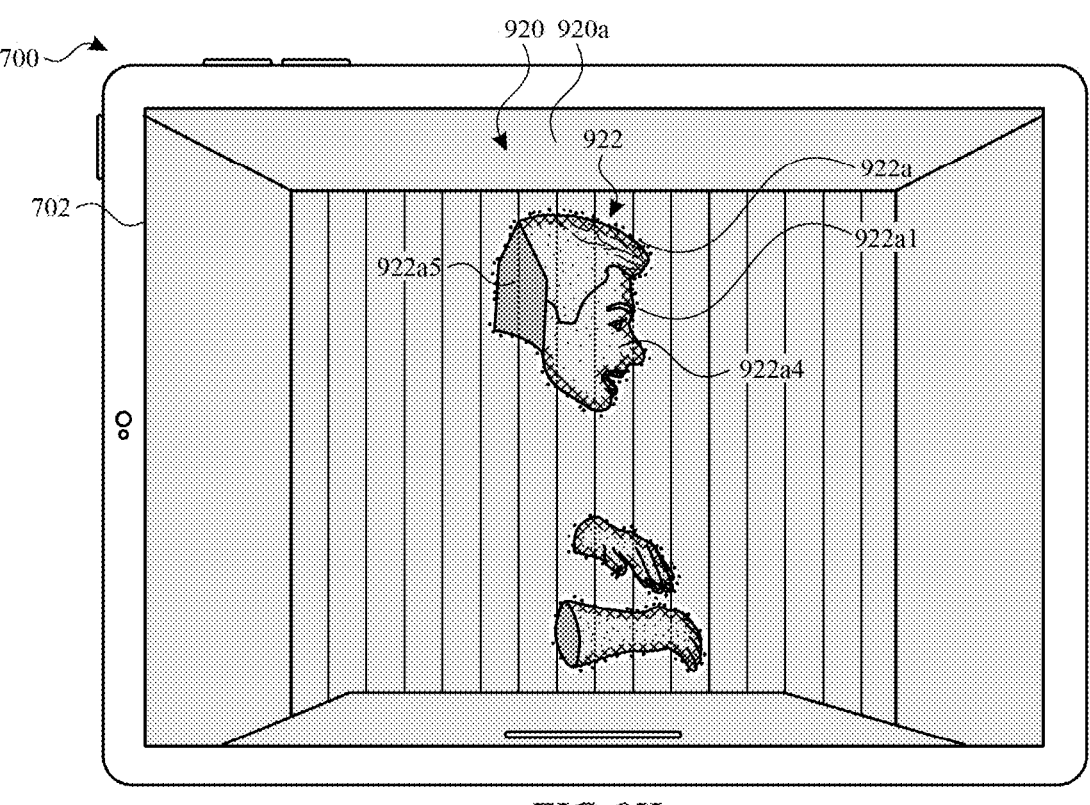
Figure 9I:
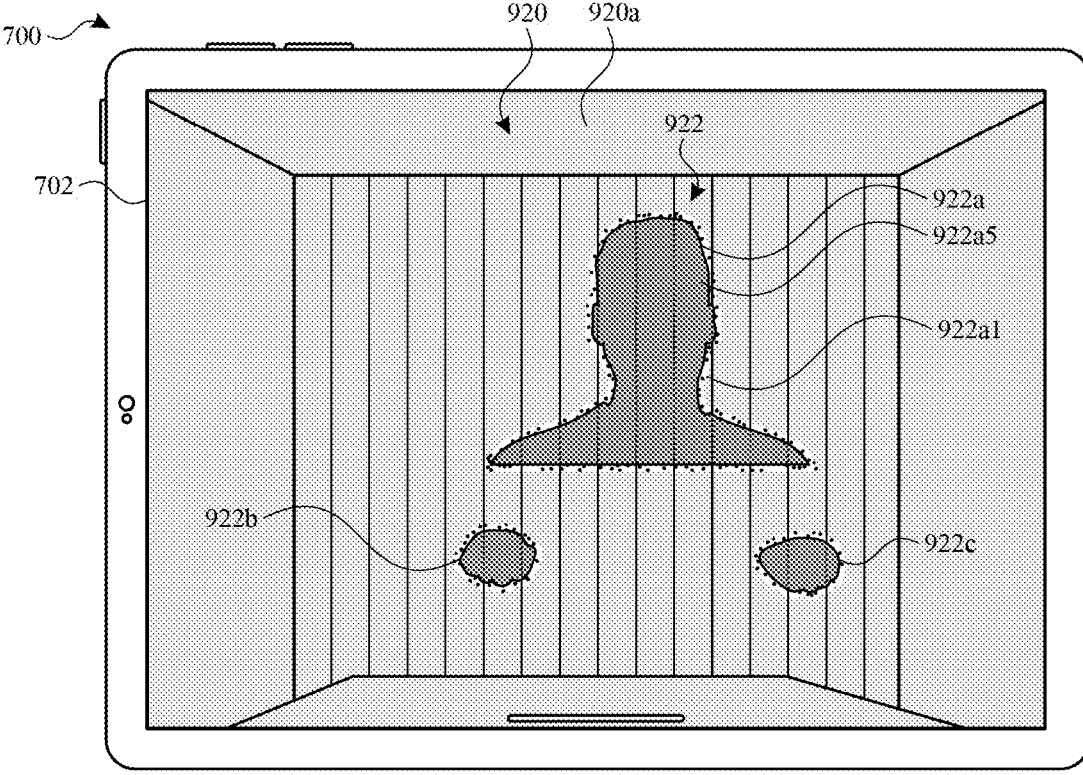
Figure 13C:
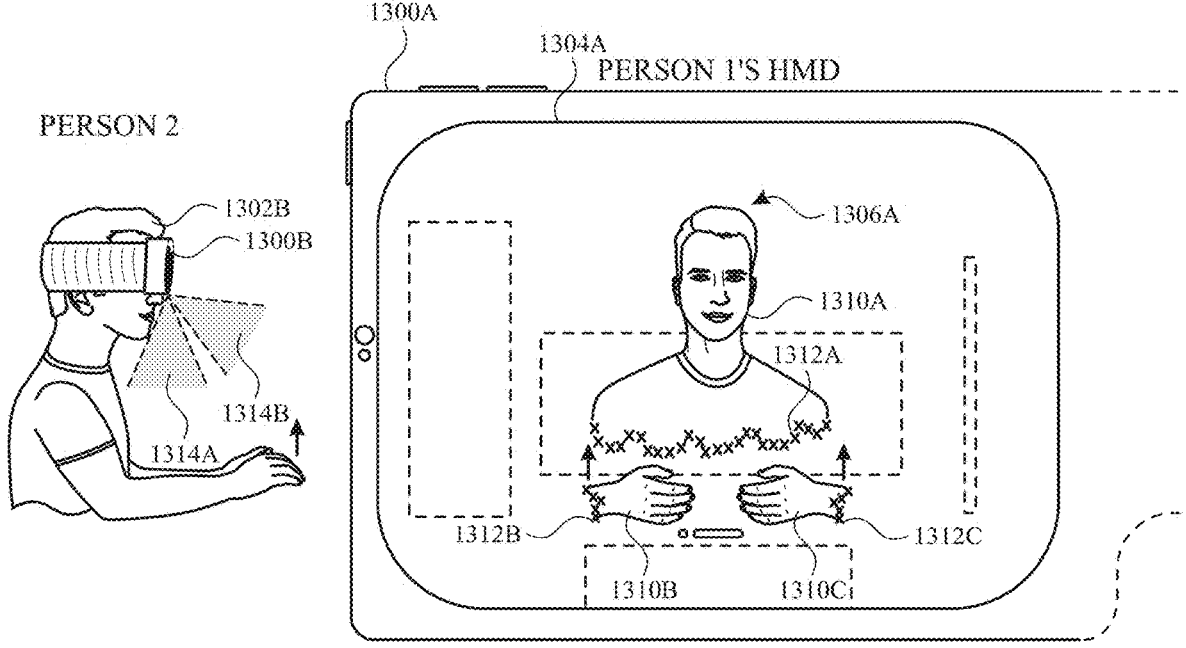
Figure 13D:
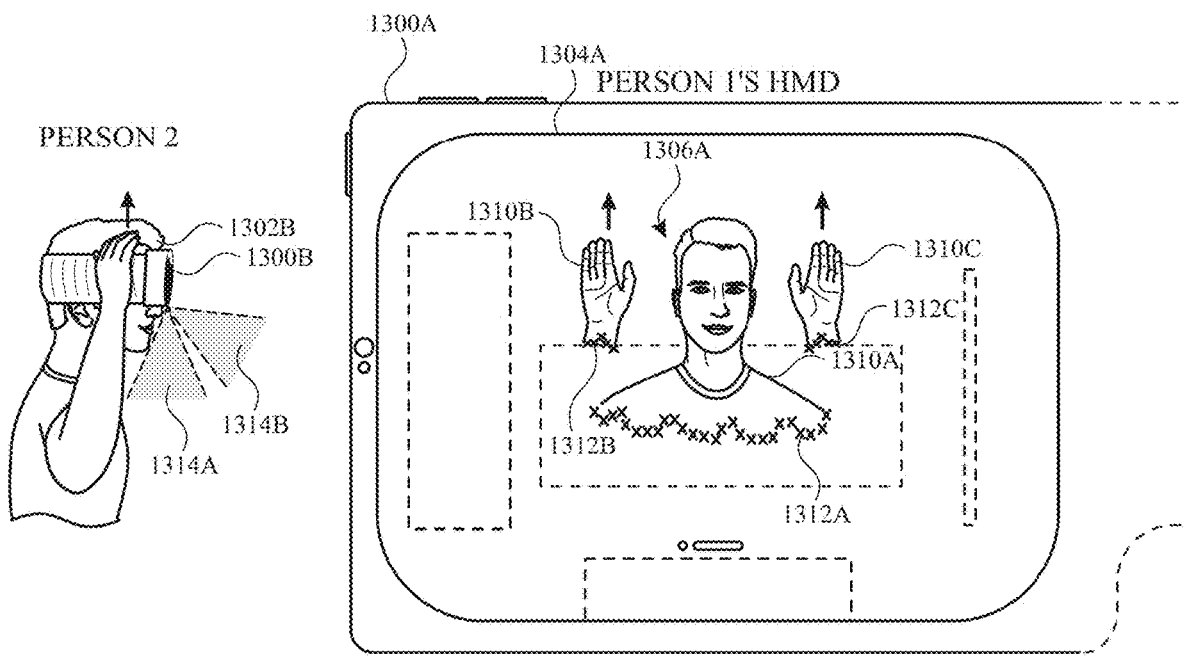
Figure 13E:
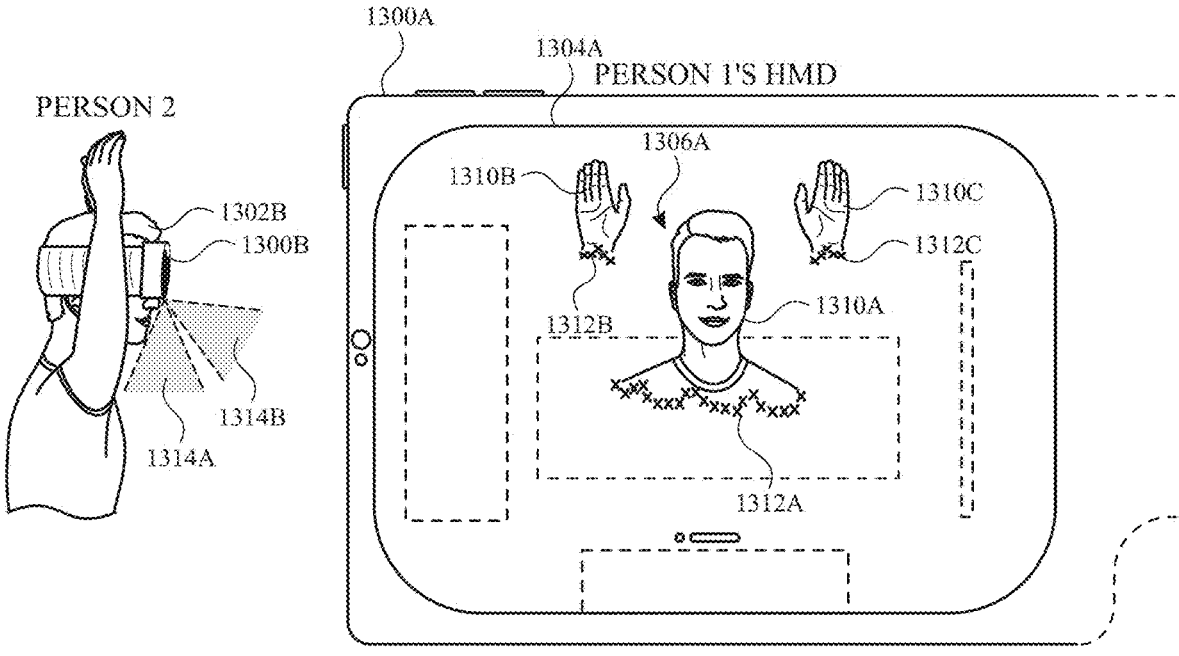
Figure 13F:
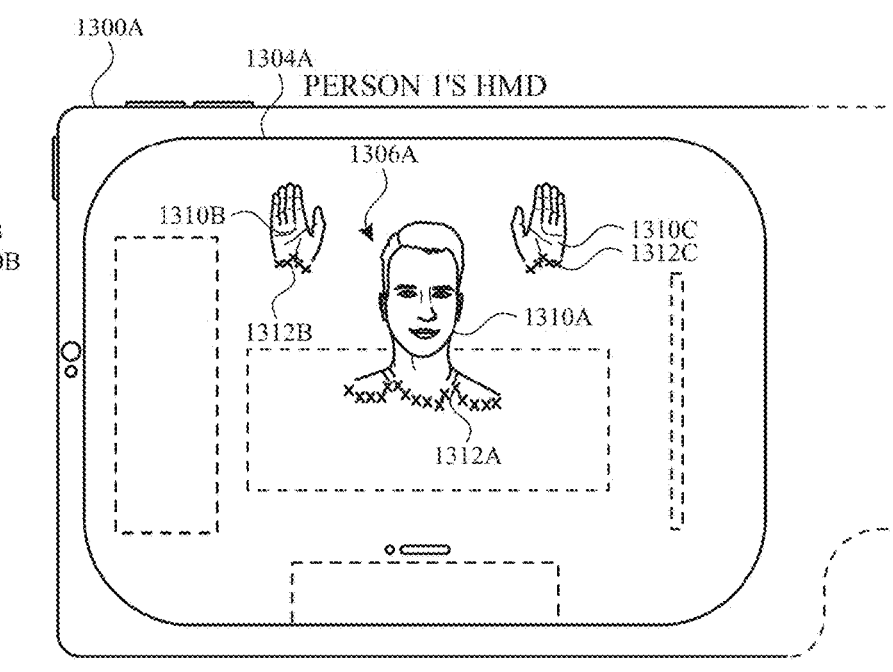
Figure 13G:
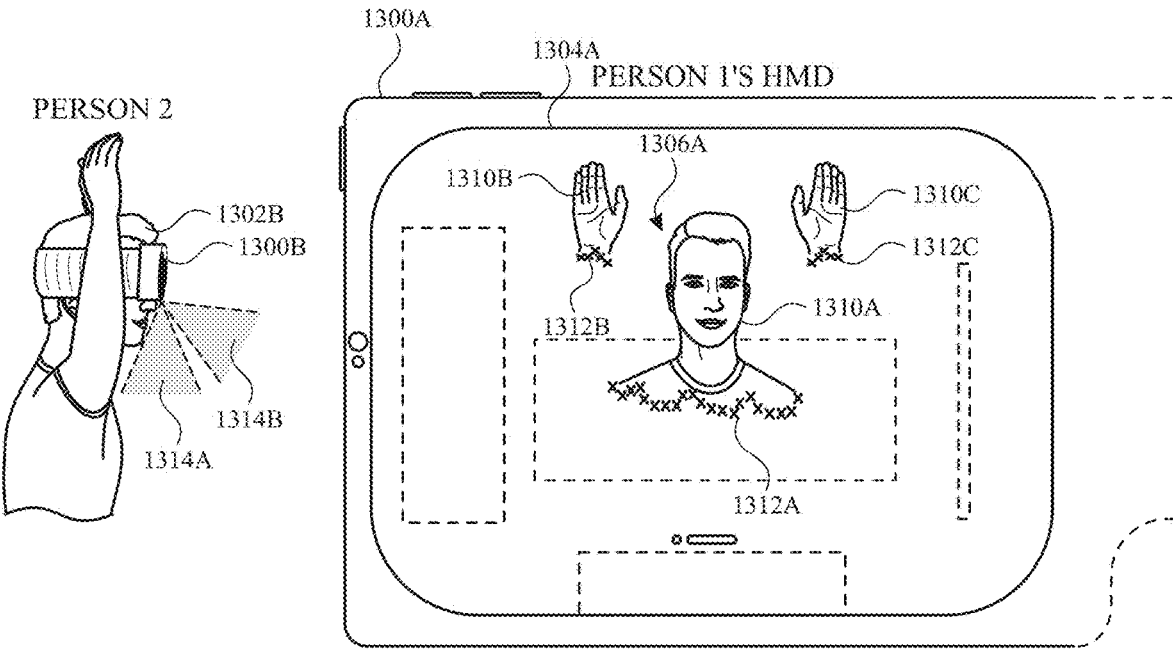
Figure 13H:
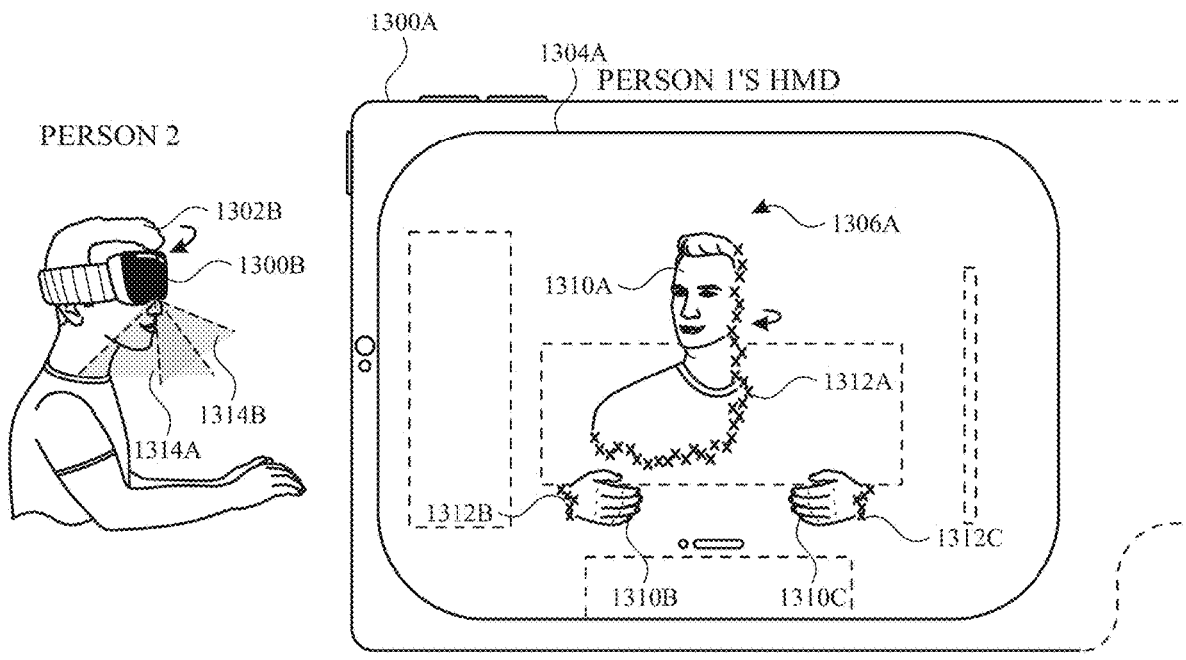
Figure 13I:
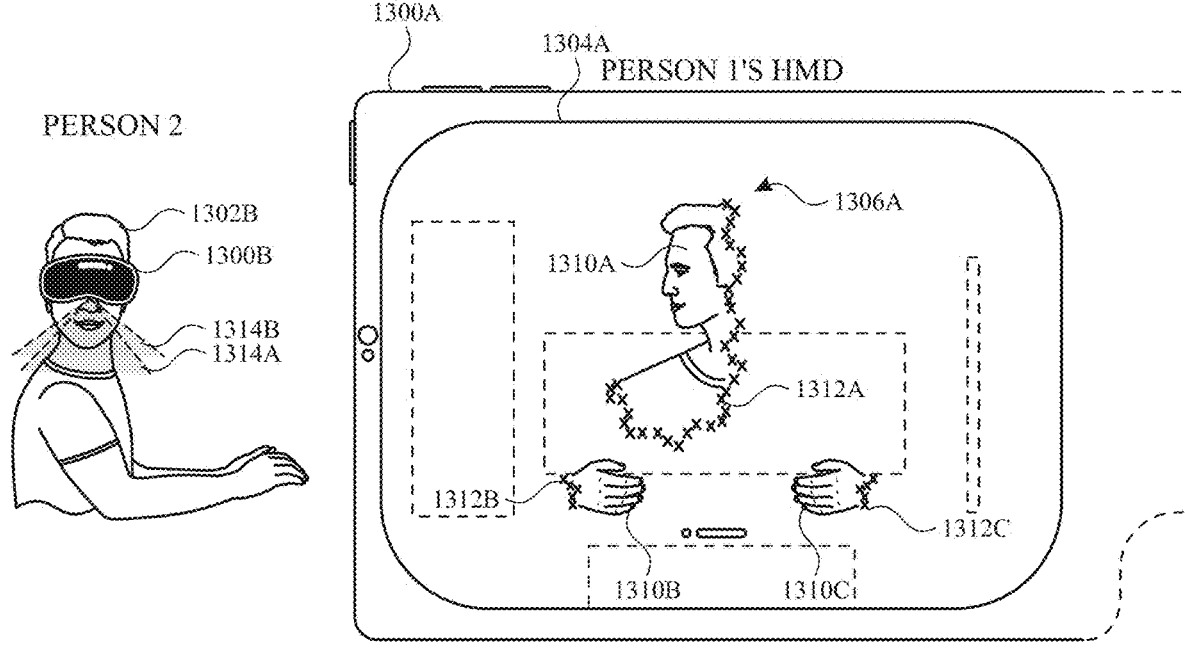

In some embodiments, the computer system detects a change in a viewpoint of a user (e.g., a user of the computer system) relative to the representation of the person; and in response to detecting the change in the viewpoint (e.g., a viewpoint within an XR environment) of the user relative to the representation of the person (e.g., in response to detecting a change in the viewpoint and/or in response to a change in the viewpoint being detected), the computer system changes the color pattern at a third color-pattern portion of the representation of the person from a third color-pattern magnitude to a fourth color-pattern magnitude that is different from the third color-pattern magnitude (e.g., the color pattern in representation 714 changes magnitude from FIG. 7D to FIG. 7E; the color pattern in representation 724 changes magnitude from FIG. 7K to FIG. 7L; the color pattern in representation 724 changes magnitude as the viewpoint of the user relative to representation 724 changes in FIG. 7P; a color pattern in representation 912 changes magnitude from FIG. 9A to FIG. 9B, from FIG. 9B to FIG. 9C, and/or from FIG. 9C to FIG. 9D; a color pattern in representation 922 changes magnitude from FIG. 9F to FIG. 9G1, from FIG. 9G2 to FIG. 9H, and/or from FIG. 9H to FIG. 9I; and/or a color pattern in representation 1306A changes magnitude from FIG. 13C to FIG. 13H, from FIG. 13H to FIG. 13I, and/or from FIG. 13C to FIG. 13J). For example, the color pattern changes in magnitude at the third color-pattern portion of the representation of the person as the viewpoint of the user changes (e.g., the color pattern at the third portion is displayed with the third color-pattern magnitude when the representation of the person is viewed from a front of the representation and displayed with the fourth color-pattern magnitude when viewed from a side or back of the representation). In some embodiments, the color pattern is shifted in space when the viewpoint of the user changes (e.g., the color pattern shifts upward and/or towards a center of the representation of the person when the viewpoint changes from the front of the representation to a side and/or back of the representation). In some embodiments, the change in the viewpoint of the user is due to a change in the position (e.g., movement) of the viewpoint in the XR environment. In some embodiments, the change in the viewpoint of the user is due to a change in position (e.g., movement) of the representation of the person in the XR environment. In some embodiments, the viewpoint of the user is a viewpoint of a user of the computer system in, or relative to, an XR environment. In some embodiments, the change in the viewpoint (e.g., relative to an XR environment) changes an angle (e.g., a viewing angle) from which the representation of the person is viewed (e.g., even if the representation of the person has not moved within the XR environment). Changing the magnitude of the color pattern of the representation of the person in response to detecting the change in the viewpoint of the user relative to the representation of the person informs the user about the change in the viewpoint, indicates a change in certainty with which the appearance of the person from the viewpoint is known, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, displaying the representation of the person with the color pattern than varies over time includes: in accordance with a determination that a first colored portion of the representation of the person has a first color, displaying the color pattern with a first color-based magnitude; and in accordance with a determination that the first colored portion of the representation of the person has a second color that is different from the first color, displaying the color pattern with a second color-based magnitude that is different from the first color-based magnitude (e.g., the color pattern is brighter and/or applied more strongly to lighter colors than to darker colors or the color pattern is darker and/or applied more strongly to darker colors than to lighter colors). For example, in some embodiments, the color of the representation can vary based on differences in clothing, skin color, lighting, and/or other factors. The term "color-based magnitude" is used herein to distinguish the magnitude of the color pattern that is based on a color of a portion of the representation from the magnitude of the color pattern that is based on other factors because the magnitude based on the color of the representation of the person can be different from (or the same as) other magnitudes described herein (e.g., the state-based magnitude). Displaying the color pattern with a magnitude that is based on the color of the portion of the representation to which the color pattern is applied enables the computer system to adjust the magnitude of the color pattern so that the color pattern is noticeable to the user without the user having to manually adjust the magnitude, thereby providing improved visual feedback to the user, reducing the number of inputs needed to perform an operation, and providing a more varied, detailed, and/or realistic user experience while saving storage space.

In some embodiments, the computer system detects a change in a state of the representation of the person (e.g., from 712 in FIG. 7B to 714 in FIG. 7C; from 714 in FIG. 7E to 714 in FIG. 7F or to 716 in FIG. 7G; from 722 in FIGS. 7I to 724 in FIG. 7J1; and/or from 724 in FIG. 7M to 726 in FIG. 7N; 1114 from FIG. 11A to FIG. 11B or to 1118 in FIG. 11C; 1122 from FIG. 11C to FIG. 11E1 or to 1124 in FIG. 11F) (e.g., a change in connection status with a network, a change in a degree of certainty with which a state of a portion of the person is known, the representation of the person entering an XR environment, the representation of the person exiting an XR environment, the person connecting to a real-time communication session, and/or the person disconnecting from a real-time communication session); and in response to detecting the change in the state of the representation of the person, the computer system changes the color pattern from a first state-based magnitude to a second state-based magnitude that is different from the first state-based magnitude. In some embodiments, in response to detecting that the state of the representation of the person changes back to a previous state, the computer system changes the color pattern from the second state-based magnitude back to the first state-based magnitude. The term "state-based magnitude" is used herein to distinguish the magnitude of the color pattern that is based on a state of the representation from the magnitude of the color pattern that is based on other factors because the magnitude based on the state of the representation of the person can be different from (or the same as) other magnitudes described herein (e.g., the color-based magnitude). Changing the magnitude of the color pattern of the representation of the person in response to detecting a change in state of the representation of the person informs the user about the change in state and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, displaying the representation (e.g., 724) of the person with the color pattern that varies over time includes displaying the color pattern based on a first portion (e.g., 728a) of a color pattern image (e.g., 728) (e.g., a two-dimensional image or a three-dimensional image having a color pattern that varies over space and/or time in the same manner as the color pattern of the representation of the person); and the computer system displays a representation (e.g., 730) of a second person with a color pattern that is based on a second portion (e.g., 728b) of the color pattern image that is different from (e.g., has a different appearance than, but common properties, such as color and/or fluctuation patterns, as) the first portion of the color pattern image (e.g., the color pattern of the representation of the person and the color pattern of the representation of the second person are based on different portions of the same color pattern image). In some embodiments, some or all of the techniques applied to and/or behaviors, characteristics, and/or features of the representation of the person are applied to the representation of the second person. In some embodiments, some or all of the representation of the second person is displayed concurrently with some or all of the representation of the person. In some embodiments, the first portion of the color pattern image and/or the second portion of the color pattern image are based on a distance or offset between the representation of the person and the representation of the second person (e.g., in an XR environment). For example, the distance between the first portion of the color image pattern and the second portion of the color image pattern corresponds to the distance between the representation of the person and the representation of the second person. Displaying representations of different persons with color patterns that are based on different portions of a color pattern image provides an overall consistent appearance of the color pattern while also making the color pattern different for the two representations (e.g., to avoid the color pattern at the two representations from being synchronized) without requiring user input to select different color patterns or portions of the color pattern image for each representation, thereby providing improved visual feedback to the user, reducing the number of inputs needed to perform an operation, and providing a more varied, detailed, and/or realistic user experience while saving storage space.

In some embodiments, the computer system detects a change in a viewing angle of the representation of the person (e.g., 714 from FIG. 7D to FIG. 7E; 724 from FIG. 7K to FIG. 7L; change in viewing angle of 724 in FIG. 7P; 912 from FIG. 9A to FIG. 9B, from FIG. 9B to FIG. 9C, and/or from FIG. 9C to FIG. 9D; 922 from FIG. 9F to FIG. 9G1, from FIG. 9G2 to FIG. 9H, and/or from FIG. 9H to FIG. 9I; and/or 1306A from FIG. 13C to FIG. 13H, from FIG. 13H to FIG. 13I, and/or from FIG. 13C to FIG. 13J); and in response to detecting the change in the viewing angle of the representation of the person, the computer system changes an appearance (e.g., a visual appearance and/or a visual characteristic) of the color pattern as the color pattern is applied to the representation of the person (e.g., the color pattern has different appearances when viewed from different angles). In some embodiments, the change in the viewpoint of the user is due to a change in the position (e.g., movement) of the viewpoint in the XR environment. In some embodiments, the change in the viewpoint of the user is due to a change in position (e.g., movement) of the representation of the person in the XR environment. Changing the appearance of the color pattern as the color pattern is applied to the representation of the person in response to detecting the change in the viewing angle of the representation of the person informs the user about the change in the viewing angle and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, aspects/operations of methods 800, 1000, 1200, and/or 1400 may be interchanged, substituted, and/or added between these methods. For example, in some embodiments, the techniques for displaying the representation of the person described in method 800 are applied to the representation of the person described in method 1000, the representation of the person described in method 1200, and/or the representation of the person described in method 1400; in some embodiments, the techniques for displaying the representation of the person described in method 1000 are applied to the representation of the person described in method 800, the representation of the person described in method 1200, and/or the representation of the person described in method 1400; in some embodiments, the techniques for displaying the representation of the person described in method 1200 are applied to the representation of the person described in method 800, the representation of the person described in method 1000, and/or the representation of the person described in method 1400; and/or in some embodiments, the techniques for displaying the representation of the person in method 1400 are applied to the representation of the person described in method 800, the representation of the person described in method 1000, and/or the representation of the person described in method 1200. For brevity, these details are not repeated below.

FIGS. 9A-9J illustrate examples of displaying a representation of a person at different viewing angles, in accordance with some embodiments. For example, an appearance of the representation is displayed with different levels of detail at different viewing angles. FIG. 10 is a flow diagram of an exemplary method 1000 for displaying a representation of a person at different viewing angles. The user interfaces in FIGS. 9A-9J are used to illustrate the processes described below, including the processes in FIG. 10.

FIG. 9A illustrates computer system 700 displaying user interface 708 of the real-time communication application, including menu 708*a* and self-view representation 708*b*, described above with reference to, e.g., FIG. 7A. In FIG. 9A, user interface 708 displays a real-time communication session between the user of computer system 700 and one or more remote participants. Representation 912 of a person (e.g., a remote participant in the real-time communication session) is displayed in environment 910, which includes background 910*a* and background element 910*b*.

In some embodiments, computer system 700 displays edge 912*a* of representation 912 according to some or all of the techniques described with reference to display of edge 712*a* in FIGS. 7A-7G and/or edge 722*a*1 in FIGS. 7H-7N. In some embodiments, background 910*a* is a real or virtual background that affects the appearance of representation 912. In some embodiments, background element 910*b* is a real or virtual element that affects the appearance of representation 912. For example, edge portion 912*a*1 in front of background 910*a* is displayed with a different appearance than edge portion 912*a*2 in front of background element 910*b*, which has different visual properties than background 910*a*.

In FIG. 9A, representation 912 of the person is displayed at a first viewing angle (e.g., head on and/or a front view) relative to a portion of representation 912 (e.g., a front of representation 912). In some embodiments, the viewing angle of representation 912 is based on an orientation of a head of representation 912 (e.g., the angle of the viewpoint of the user relative to a forward-facing direction of the head). In some embodiments, the viewing angle is based on an orientation of a torso of representation 912 (e.g., the angle of the viewpoint of the user relative to a forward-facing direction of the torso).

In FIG. 9A, because representation 912 is displayed at a first viewing angle, computer system 700 displays representation 912 with an appearance having a first level of detail. In some embodiments, because representation 912 is displayed at the first viewing angle, representation 912 is displayed with a first amount of depth effect, a first level of facial detail, a first level of hand detail, and/or a first level of translucency. In some embodiments, because representation 912 is displayed at the first viewing angle, the appearance of representation 912 is affected by (e.g., incorporates a color, brightness, and/or pattern of) background 910*a* by a first amount.

In FIG. 9B, the person corresponding to representation 912 has moved (e.g., in a physical environment). In response to the movement of the person corresponding to representation 912, computer system 700 moves representation 912 in environment 910, as shown in FIG. 9B. In the example illustrated in FIG. 9B, representation 912 has turned to the right from the perspective shown in FIG. 9B (e.g., the perspective of the user of computer system 700). As a result of the movement of representation 912, representation 912 is displayed at a second viewing angle (e.g., relative to the front of representation 912) that is different from the first viewing angle in FIG. 9A. In FIG. 9B, the viewing angle of representation 912 corresponds to a front right side of representation 912. In some embodiments, the appearance of representation 912 changes gradually as the person corresponding to representation 912 moves (e.g., representation 912 tracks spatial movement of the person represented by representation 912). In some embodiments, computer system 700 moves a portion of representation 912 relative to another portion of representation 912 in response to movement of a corresponding portion of the person represented by representation 912 relative to the other corresponding portion of the person represented by representation 912. In some embodiments, the viewing angle of representation 912 changes in response to a change in position (e.g., movement) of a viewpoint of a user (e.g., the user of computer system 700). In some embodiments, the appearance of representation 912 changes gradually as the viewpoint moves.

In FIG. 9B, because representation 912 is displayed at the second viewing angle (e.g., more from a side compared to FIG. 9A), computer system 700 displays representation 912 with an appearance having a second level of detail that is less than the first level of detail when viewed from the first viewing angle. In some embodiments, because representation 912 is displayed at the second viewing angle, representation 912 is displayed with a second amount of depth effect (e.g., less depth effect), a second level of facial detail (e.g., less facial detail), a second level of hand detail (e.g., less hand detail), and/or a second level of translucency (e.g., greater translucency). For example, ear 914 of representation 912 (e.g., corresponding to an ear of the person represented by representation 912) is displayed with less detail when representation 912 is viewed from the second viewing angle than when viewed from the first viewing angle. In some embodiments, because representation 912 is displayed at the second viewing angle (e.g., more from a side), the appearance of representation 912 is affected more by background 910*a* than when representation 912 is displayed at the first viewing angle (e.g., more from a front).

In FIG. 9B, because representation 912 is viewed partially from a side of representation 912, computer system 700 displays a first amount of back portion 912*c* of representation 912 with less detail than portions of representation 912 that are closer to a front of representation 912 (e.g., front portion 912*b*). In some embodiments, the amount of detail in back portion 912*c* decreases from the front of representation 912 to the back of representation 912 (e.g., the amount of detail decreases from right to left in FIG. 9B). In some embodiments, computer system 700 displays a feathering effect in back portion 912*c* when representation 912 is viewed at least partially from the side. In some embodiments, the amount of back portion 912*c* that includes the feathering effect increases with viewing angle (e.g., increases as representation 912 is viewed more from the side). In some embodiments, the feathering effect is applied to some portions of representation 912 and not to other portions.

In FIG. 9C, the person corresponding to representation 912 has moved (e.g., turned further to the right). In response to the movement of the person corresponding to representation 912, computer system 700 moves representation 912 in environment 910, as shown in FIG. 9C. As a result of the movement of representation 912, representation 912 is displayed at a third viewing angle (e.g., relative to the front of representation 912) that is different from the first viewing angle in FIG. 9A and the second viewing angle in FIG. 9B. In FIG. 9C, the viewing angle of representation 912 corresponds to a right side of representation 912. In FIG. 9C, because representation 912 is displayed at the third viewing angle, computer system 700 displays representation 912 with an appearance having a third level of detail that is less than the second level of detail. In some embodiments, because representation 912 is displayed at the third viewing angle, representation 912 is displayed with a third amount of depth effect (e.g., less depth effect), a third level of facial detail (e.g., less facial detail), a third level of hand detail (e.g., less hand detail), and/or a third level of translucency (e.g., greater translucency) than when viewed from the second viewing angle. For example, when representation 912 is viewed from the third viewing angle, ear 914 of representation 912 is not displayed or is displayed with less detail than when representation 912 is viewed from the second viewing angle. In some embodiments, because representation 912 is displayed at the third viewing angle, the appearance of representation 912 is affected more by background 910a than when representation 912 is displayed at the second viewing angle.

In FIG. 9C, because representation 912 is viewed from a side of representation 912, computer system 700 displays a greater amount of back portion 912c of representation 912 with less detail than portions of representation 912 that are closer to a front of representation 912 (e.g., front portion 912b). For example, back portion 912c is larger and/or extends more toward a front of representation 912 when representation 912 is displayed from the third viewing angle (e.g., more from the side and/or back of representation 912) than when displayed from the second viewing angle (e.g., more from the front of representation 912). In some embodiments, the amount of detail in back portion 912c decreases from the front of representation 912 to the back of representation 912 (e.g., the amount of detail decreases from right to left in FIG. 9C). In some embodiments, when representation 912 is displayed from the third viewing angle, back portion 912c includes a greater amount of the feathering effect than when displayed from the second viewing angle (e.g., the feathering effect begins at a position closer to the front of representation 912). In some embodiments, the feathering effect has a lower spatial density (e.g., is less dense and/or more dispersed) when representation 912 is displayed from the third viewing angle than when displayed from the second viewing angle.

In FIG. 9D, the person corresponding to representation 912 has moved further and is now facing approximately 180 degrees away from the direction that he was facing in FIG. 9A. In response to the movement of the person corresponding to representation 912, computer system 700 moves representation 912 in environment 910, as shown in FIG. 9D. As a result of the movement of representation 912, representation 912 is displayed at a fourth viewing angle (e.g., relative to the front of representation 912) that is different from the first viewing angle in FIG. 9A, the second viewing angle in FIG. 9B, and the third viewing angle in FIG. 9C. In FIG. 9D, the viewing angle of representation 912 corresponds to a rear or back view of representation 912.

In FIG. 9D, because representation 912 is displayed at the fourth viewing angle (e.g., completely, or almost completely, from the back), computer system 700 displays representation 912 with an appearance having a fourth level of detail that is less than the third level of detail of the third viewing angle in FIG. 9C. In some embodiments, because representation 912 is displayed at the fourth viewing angle, representation 912 is displayed with a fourth amount of depth effect (e.g., less depth effect or no depth effect), a fourth level of facial detail (e.g., less facial detail or no facial detail), a fourth level of hand detail (e.g., less hand detail or no hand detail), and/or a fourth level of translucency (e.g., greater translucency) than when viewed from the third viewing angle. For example, when representation 912 is viewed from the fourth viewing angle, ear 914 of representation 912 is not displayed. In some embodiments, because representation 912 is displayed at the fourth viewing angle, the appearance of representation 912 is affected more by background 910a than when representation 912 is displayed at the third viewing angle.

In FIG. 9D, because representation 912 is viewed from (e.g., entirely from) the back of representation 912, computer system 700 displays a greater amount of back portion 912c of representation 912 with less detail than portions (e.g., front portion 912b) of representation 912 that are closer to a front of representation 912. In the example illustrated in FIG. 9D, details of representation 912 are completely removed from an interior portion (e.g., back portion 912c) of representation 912 (e.g., representation 912 is, or has the appearance of, a silhouette). In some embodiments, when representation 912 is displayed from the fourth viewing angle (e.g., completely from the back of representation 912), computer system 700 does not display (e.g., removes) the feathering effect.

Turning to FIG. 9E, computer system 700 displays representation 912 at the fourth viewing angle described with reference to FIG. 9D (e.g., a back view of representation 912). In some embodiments, a brightness and/or color of representation 912 depends on the brightness of environment 910 and/or background 910a. For example, in FIG. 9E, environment 910 (e.g., background 910a) is darker than in FIG. 9D, as indicated by the fill pattern in background 910a in FIG. 9E. Because environment 910 is darker in FIG. 9E, representation 912 is lighter (e.g., brighter) compared to representation 912 in FIG. 9D. Conversely, because environment 910 is lighter in FIG. 9D, representation 912 is darker than in FIG. 9E, as indicated by the fill pattern in representation 912 in FIG. 9D.

In some embodiments, the real-time communication session includes three or more participants. For example, in some embodiments, the real-time communication session includes a third participant other than the person represented by representation 912 and the user of computer system 700. In some embodiments, the third participant has a different viewpoint than the user of computer system 700. Because the third participant has a different viewpoint, representation 912 is displayed at a different viewing angle for the third participant than for the user of computer system 700. In some embodiments, representation 912 of the person is displayed according to the techniques described with reference to FIGS. 9A-9E based on the viewing angle of representation 912 for the third participant. Thus, representation 912 is displayed with a different appearance (e.g., a different level of detail) for the third participant than for the user of computer system 700 because of the different viewing angle.

FIGS. 9F-9J illustrate an embodiment that is analogous to the embodiment described in FIGS. 9A-9E. In FIG. 9F, computer system 700 displays a real-time communication session between the user of computer system 700 and one or more remote participants. Representation 922 of a person (e.g., a remote participant in the real-time communication session) is displayed in environment 920, which includes background 920a.

In some embodiments, computer system 700 displays edge 922a1 of representation 912 according to some or all of the techniques described with reference to display of edge 712a in FIGS. 7A-7G and/or edge 722a1 in FIGS. 7H-7N. In FIG. 9F, representation 922 of the person is displayed at a first viewing angle (e.g., head on and/or a front view) relative to a portion (e.g., 922a) of representation 922 (e.g., a front of representation 922). In some embodiments, the viewing angle of representation 922 is based on an orientation of a head of representation 922 (e.g., the angle of the viewpoint of the user relative to a forward-facing direction of the head). In some embodiments, the viewing angle is based on an orientation of a torso of representation 922 (e.g., the angle of the viewpoint of the user relative to a forward-facing direction of the torso).

In FIG. 9F, because representation 922 is displayed at a first viewing angle, computer system 700 displays representation 922 with an appearance having a first level of detail. In some embodiments, because representation 922 is displayed at the first viewing angle, representation 922 is displayed with a first amount of depth effect, a first level of facial detail, a first level of hand detail, and/or a first level of translucency. In some embodiments, because representation 922 is displayed at the first viewing angle, the appearance of representation 922 is affected by (e.g., incorporates a color, brightness, and/or pattern of) background 920a by a first amount.

In FIG. 9G1, the person corresponding to representation 922 has moved (e.g., in a physical environment). In response to the movement of the person corresponding to representation 922, computer system 700 moves representation 922 in environment 920, as shown in FIG. 9G1. In the example illustrated in FIG. 9G1, representation 922 has turned to the right from the perspective shown in FIG. 9G1 (e.g., the perspective of the user of computer system 700). As a result of the movement of representation 922, representation 922 is displayed at a second viewing angle (e.g., relative to the front of representation 922) that is different from the first viewing angle in FIG. 9F. In FIG. 9G1, the viewing angle of representation 922 corresponds to a front right side of representation 922. In some embodiments, the appearance of representation 922 changes gradually as the person corresponding to representation 922 moves (e.g., representation 922 tracks spatial movement of the person represented by representation 922). In some embodiments, computer system 700 moves a portion (e.g., an arm, head, upper portion 922a, right hand 922b, and/or left hand 922c) of representation 922 relative to another portion of representation 922 in response to movement of a corresponding portion of the person represented by representation 922 relative to the other corresponding portion of the person represented by representation 922. In some embodiments, the viewing angle of representation 922 changes in response to a change in position (e.g., movement) of a viewpoint of a user (e.g., the user of computer system 700). In some embodiments, the appearance of representation 922 changes gradually as the viewpoint moves.

In FIG. 9G1, because representation 922 is displayed at the second viewing angle, computer system 700 displays representation 922 with an appearance having a second level of detail that is less than the first level of detail when viewed from the first viewing angle. In some embodiments, because representation 922 is displayed at the second viewing angle, representation 922 is displayed with a second amount of depth effect (e.g., less depth effect), a second level of facial detail (e.g., less facial detail), a second level of hand detail (e.g., less hand detail), and/or a second level of translucency (e.g., greater translucency). For example, car 922a3 of representation 922 (e.g., corresponding to an ear of the person represented by representation 922) is displayed with less detail when representation 922 is viewed from the second viewing angle than when viewed from the first viewing angle. In some embodiments, because representation 922 is displayed at the second viewing angle (e.g., more from a side), the appearance of representation 922 is affected more by background 910a than when representation 922 is displayed at the first viewing angle (e.g., more from a front).

In FIG. 9G1, because representation 922 is viewed partially from a side of representation 922, computer system 700 displays a first amount of back portion 922a5 of representation 922 with less detail than portions of representation 922 that are closer to a front of representation 922 (e.g., portion 922a4). In some embodiments, the amount of detail in back portion 922a5 decreases from the front of representation 912 to the back of representation 922 (e.g., the amount of detail decreases from right to left in FIG. 9G1). In some embodiments, computer system 700 displays a feathering effect in back portion 922a5 when representation 922 is viewed at least partially from the side. In some embodiments, the amount of back portion 922a5 that includes the feathering effect increases with viewing angle (e.g., increases as representation 922 is viewed more from the side). In some embodiments, the feathering effect is applied to some portions of representation 922 and not to other portions.

In some embodiments, the techniques and user interface(s) described in FIGS. 9A-9J are provided by one or more of the devices described in FIGS. 1A-1P. For example, FIG. 9G2 illustrates an embodiment in which representation 922 (e.g., as described in FIGS. 9F and 9G1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

In FIG. 9G2, the person corresponding to representation 922 has moved (e.g., in a physical environment). In response to the movement of the person corresponding to representation 922, HMD X700 moves representation 922 in environment 920, as shown in FIG. 9G2. In the example illustrated in FIG. 9G2, representation 922 has turned to the right from the perspective shown in FIG. 9G2 (e.g., the perspective of the user of HMD X700). As a result of the movement of representation 922, representation 922 is displayed at a second viewing angle (e.g., relative to the front of representation 922) that is different from the first viewing angle in FIG. 9F. In FIG. 9G2, the viewing angle of representation 922 corresponds to a front right side of representation 922. In some embodiments, the appearance of representation 922 changes gradually as the person corresponding to representation 922 moves (e.g., representation 922 tracks spatial movement of the person represented by representation 922). In some embodiments, HMD X700 moves a portion (e.g., an arm, head, upper portion 922a, right hand 922b, and/or left hand 922c) of representation 922 relative to another portion of representation 922 in response to movement of a corresponding portion of the person represented by representation 922 relative to the other corresponding portion of the person represented by representation 922. In some embodiments, the viewing angle of representation 922 changes in response to a change in position (e.g., movement) of a viewpoint of a user (e.g., the user of HMD X700). In some embodiments, the appearance of representation 922 changes gradually as the viewpoint moves.

In FIG. 9G2, because representation 922 is displayed at the second viewing angle, HMD X700 displays representation 922 with an appearance having a second level of detail that is less than the first level of detail when viewed from the first viewing angle. In some embodiments, because representation 922 is displayed at the second viewing angle, representation 922 is displayed with a second amount of depth effect (e.g., less depth effect), a second level of facial detail (e.g., less facial detail), a second level of hand detail (e.g., less hand detail), and/or a second level of translucency (e.g., greater translucency). For example, car 922a3 of representation 922 (e.g., corresponding to an ear of the person represented by representation 922) is displayed with less detail when representation 922 is viewed from the second viewing angle than when viewed from the first viewing angle. In some embodiments, because representation 922 is displayed at the second viewing angle (e.g., more from a side), the appearance of representation 922 is affected more by background 910a than when representation 922 is displayed at the first viewing angle (e.g., more from a front).

In FIG. 9G2, because representation 922 is viewed partially from a side of representation 922, HMD X700 displays a first amount of back portion 922a5 of representation 922 with less detail than portions of representation 922 that are closer to a front of representation 922 (e.g., portion 922a4). In some embodiments, the amount of detail in back portion 922a5 decreases from the front of representation 912 to the back of representation 922 (e.g., the amount of detail decreases from right to left in FIG. 9G2). In some embodiments, HMD X700 displays a feathering effect in back portion 922a5 when representation 922 is viewed at least partially from the side. In some embodiments, the amount of back portion 922a5 that includes the feathering effect increases with viewing angle (e.g., increases as representation 922 is viewed more from the side). In some embodiments, the feathering effect is applied to some portions of representation 922 and not to other portions.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

In FIG. 9H, the person corresponding to representation 922 has moved (e.g., turned further to the right). In response to the movement of the person corresponding to representation 922, computer system 700 moves representation 922 in environment 920, as shown in FIG. 9H. As a result of the movement of representation 922, representation 922 is displayed at a third viewing angle (e.g., relative to the front of representation 912) that is different from the first viewing angle in FIG. 9F and the second viewing angle in FIGS. 9G1 and/or 9G2. In FIG. 9H, the viewing angle of representation 922 corresponds to a right side of representation 922. In FIG. 9H, because representation 922 is displayed at the third viewing angle, computer system 700 displays representation 922 with an appearance having a third level of detail that is less than the second level of detail. In some embodiments, because representation 922 is displayed at the third viewing angle, representation 922 is displayed with a third amount of depth effect (e.g., less depth effect), a third level of facial detail (e.g., less facial detail), a third level of hand detail (e.g., less hand detail), and/or a third level of translucency (e.g., greater translucency) than when viewed from the second viewing angle. For example, when representation 922 is viewed from the third viewing angle, ear 922a3 of representation 922 is not displayed or is displayed with less detail than when representation 922 is viewed from the second viewing angle. In some embodiments, because representation 922 is displayed at the third viewing angle, the appearance of representation 922 is affected more by background 910a than when representation 922 is displayed at the second viewing angle.

In FIG. 9C, because representation 922 is viewed from a side of representation 922, computer system 700 displays a greater amount of back portion 922a5 of representation 922 with less detail than portions of representation 922 that are closer to a front of representation 922 (e.g., portion 922a4). For example, back portion 922a5 is larger and/or extends more toward a front of representation 922 when representation 922 is displayed from the third viewing angle (e.g., more from the side and/or back of representation 922) than when displayed from the second viewing angle (e.g., more from the front of representation 922). In some embodiments, the amount of detail in back portion 922a5 decreases from the front of representation 922 to the back of representation 922 (e.g., the amount of detail decreases from right to left in FIG. 9H). In some embodiments, when representation 922 is displayed from the third viewing angle, back portion 922a5 includes a greater amount of the feathering effect than when displayed from the second viewing angle (e.g., the feathering effect begins at a position closer to the front of representation 922). In some embodiments, the feathering effect has a lower spatial density (e.g., is less dense and/or more dispersed) when representation 922 is displayed from the third viewing angle than when displayed from the second viewing angle.

In FIG. 9I, the person corresponding to representation 922 has moved further and is now facing approximately 180 degrees away from the direction that he was facing in FIG. 9F. In response to the movement of the person corresponding to representation 922, computer system 700 moves representation 922 in environment 920, as shown in FIG. 9I. As a result of the movement of representation 922, representation 922 is displayed at a fourth viewing angle (e.g., relative to the front of representation 922) that is different from the first viewing angle in FIG. 9F, the second viewing angle in FIGS. 9G1 and/or 9G2, and the third viewing angle in FIG. 9H. In FIG. 9I, the viewing angle of representation 922 corresponds to a rear or back view of representation 922. In FIG. 9I, because representation 922 is displayed at the fourth viewing angle (e.g., completely, or almost completely, from the back), computer system 700 displays representation 922 with an appearance having a fourth level of detail that is less than the third level of detail of the third viewing angle in FIG. 9H. In some embodiments, because representation 922 is displayed at the fourth viewing angle, representation 922 is displayed with a fourth amount of depth effect (e.g., less depth effect or no depth effect), a fourth level of facial detail (e.g., less facial detail or no facial detail), a fourth level of hand detail (e.g., less hand detail or no hand detail), and/or a fourth level of translucency (e.g., greater translucency) than when viewed from the third viewing angle. For example, when representation 922 is viewed from the fourth viewing angle, ear 922a3 of representation 922 is not displayed. In some embodiments, because representation 922 is displayed at the fourth viewing angle, the appearance of representation 922 is affected more by background 920a than when representation 922 is displayed at the third viewing angle.

In FIG. 9I, because representation 922 is viewed from (e.g., entirely from) the back of representation 922, computer system 700 displays a greater amount of back portion 922a5 of representation 922 with less detail than portions of representation 922 that are closer to a front of representation 922 (e.g., portion 922a4). In the example illustrated in FIG. 9I, details of representation 922 are completely removed from an interior portion (e.g., back portion 922a5) of representation 922 (e.g., representation 922 is, or has the appearance of, a silhouette). In some embodiments, when representation 922 is displayed from the fourth viewing angle (e.g., completely from the back of representation 922), computer system 700 does not display (e.g., removes) the feathering effect.

Figure 9J:
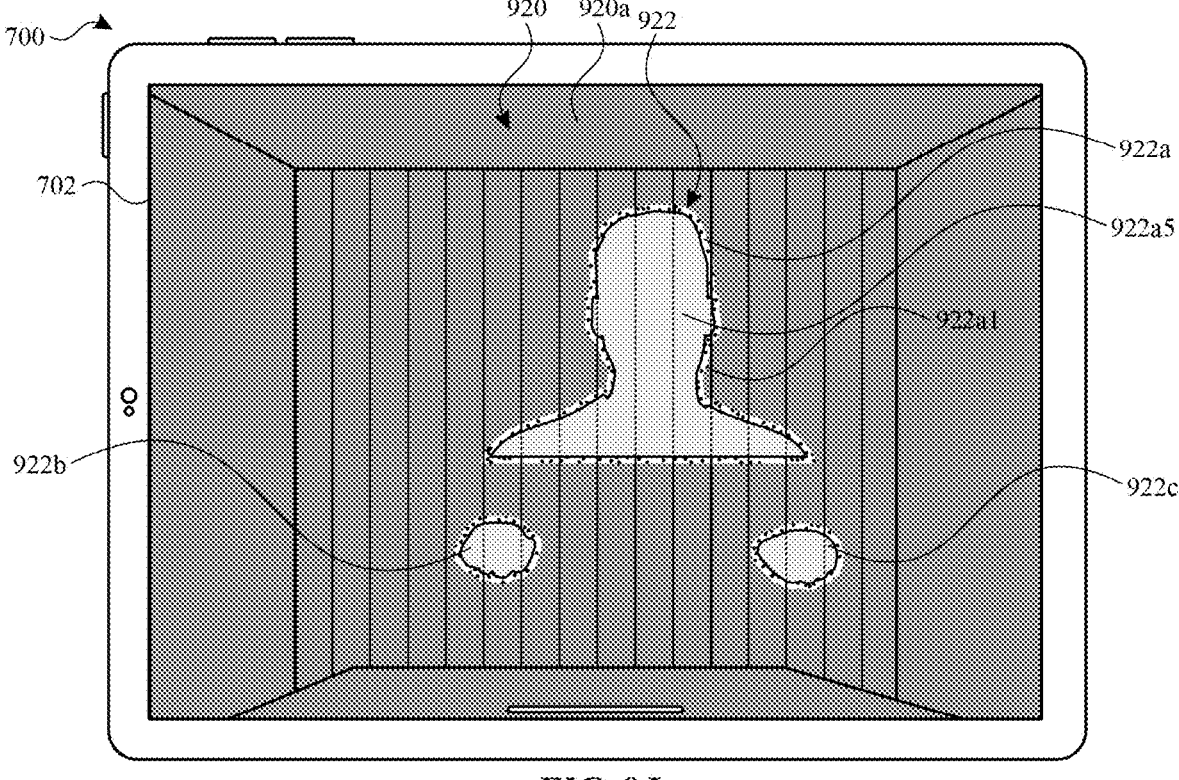

Turning to FIG. 9J, computer system 700 displays representation 922 at the fourth viewing angle described with reference to FIG. 9I (e.g., a back view of representation 922). In some embodiments, a brightness and/or color of representation 922 depends on the brightness of environment 920 and/or background 920a. For example, in FIG. 9I, environment 920 (e.g., background 920a) is darker than in FIG. 9I, as indicated by the shading of background 920a in FIG. 9J. Because environment 920 is darker in FIG. 9J, representation 922 is lighter (e.g., brighter) compared to representation 922 in FIG. 9I. Conversely, because environment 920 is lighter in FIG. 9I, representation 922 is darker than in FIG. 9J, as indicated by the shading in representation 922 in FIG. 9J.

In some embodiments, the real-time communication session includes three or more participants. For example, in some embodiments, the real-time communication session includes a third participant other than the person represented by representation 922 and the user of computer system 700. In some embodiments, the third participant has a different viewpoint than the user of computer system 700. Because the third participant has a different viewpoint, representation 922 is displayed at a different viewing angle for the third participant than for the user of computer system 700. In some embodiments, representation 922 of the person is displayed according to the techniques described with reference to FIGS. 9F-9J based on the viewing angle of representation 922 for the third participant. Thus, representation 922 is displayed with a different appearance (e.g., a different level of detail) for the third participant than for the user of computer system 700 because of the different viewing angle.

Additional descriptions regarding FIGS. 9A-9J are provided below in reference to method 1000 described with respect to FIG. 10.

FIG. 10 is a flow diagram of an exemplary method 1000 for displaying a representation of a person at different viewing angles, in some embodiments. In some embodiments, method 1000 is performed at a computer system (e.g., computer system 101 in FIG. 1A, 700, X700, a smart phone, a smart watch, a tablet computer, a laptop computer, a desktop computer, a wearable device, and/or head-mounted device) that is in communication with (e.g., includes and/or is connected to) one or more display generation components (e.g., display generation component 120 in FIGS. 1A, 3, and 4, 702, X702, a visual output device, a 3D display, a display having at least a portion that is transparent or translucent on which images can be projected (such as, e.g., a see-through display), a projector, a heads-up display, and/or a display controller) (e.g., a heads-up display, a display, a touchscreen, a projector, etc.).

In some embodiments, the computer system is in communication with (e.g., includes and/or is connected to) one or more cameras (e.g., a camera (e.g., color sensors, infrared sensors, and other depth-sensing cameras) that points downward at a user's hand or a camera that points forward from the user's head). In some embodiments, the computer system is in communication with one or more input devices (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)).

In some embodiments, method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

The computer system displays (1002), via the one or more display generation components, a representation (e.g., 712, 714, 716, 722, 724, 726, 912, 922, 1114, 1118, 1122, 1124, a virtual representation, a 3D representation, an avatar, a graphical virtual object, and/or a collection of graphical virtual objects) of a person (e.g., 1112, the user of the computer system a user of a remote computer system, a participant in a real-time communication session, and/or a participant in an XR environment or XR experience) from a respective viewing angle relative to a respective portion of (e.g., 714b, 724a2, 912b, 922a2, and/or a front of) the representation of the person (e.g., a respective perspective of a user of the computer system). In some embodiments, the computer system displays the representation of the person in response to detecting (e.g., via one or more input devices) a request (e.g., a manual input, a press of a button, a gesture, a touch input, a voice command, and/or other input) to display the representation of the person and/or an XR environment. In some embodiments, the computer system displays the representation of the person in response to detecting movement of the person. In some embodiments, the computer system provides (e.g., displays) an XR experience (e.g., an XR environment and/or a 3D environment)

that includes the representation of the person. In some embodiments, the XR experience includes representations of multiple persons in an XR environment including, e.g., the representation of the person and a representation of a user of the computer system. In some embodiments, the person is associated with (e.g., logged into, using, and/or wearing) the computer system. In some embodiments, the person is associated with (e.g., logged into, using, and/or wearing) an external device different from the computer system. In some embodiments, the respective viewing angle is a viewing angle (e.g., in an XR environment) relative to a different (e.g., second) person (e.g., a user of the computer system). In some embodiments, the respective viewing angle is a viewing angle relative to a representation of the different (e.g., second) person in an XR environment. In some embodiments, the respective viewing angle is relative to a position of a person in an XR environment. In some embodiments, the representation of the person is associated with a user or computer system that is logged into, participating in, and/or connected to an XR experience and/or XR environment. In some embodiments, the computer system displays an XR environment from a viewpoint (e.g., within the XR environment) relative to the XR environment, and the respective viewing angle is relative to the viewpoint of the XR environment and the position (e.g., location and/or orientation) of the representation of the person in the XR environment.

In accordance with a determination that the respective viewing angle relative to the respective portion of (e.g., a front of) the representation of the person corresponds to (e.g., is) a first viewing angle (e.g., as shown in FIGS. 9A-9J) relative to the respective portion of (e.g., a front of) the representation of the person (e.g., that the respective viewing angle is within a first range of viewing angles and/or perspectives), the computer system displays (1004) the representation of the person with an appearance having a first level of detail (e.g., a first resolution, a first amount of features, a first amount of information, a first fidelity, and/or a first accuracy). In some embodiments, the level of detail indicates a level of certainty with which an appearance of a portion of the person is known (e.g., the portion of the person that is viewable from the respective viewing angle). For example, in some embodiments, a greater level of detail indicates that the appearance of the portion of the person is known with a greater level of certainty compared to a lesser level of detail that corresponds to a lesser level of certainty. In some embodiments, the appearance of the representation of the person does not represent an actual physical appearance of the person or a portion of the person (e.g., from the respective viewing angle).

In accordance with a determination that the respective viewing angle relative to the respective portion of (e.g., a front of) the representation of the person corresponds to (e.g., is) a second viewing angle (e.g., as shown in FIGS. 9A-9J) relative to the respective portion of (e.g., a front of) the representation of the person (e.g., the respective viewing angle is within a second range of viewing angles and/or perspectives) that is different from the first viewing angle, the computer system displays (1006) the representation of the person with the appearance having a second level of detail (e.g., a second resolution, a second amount of features, a second amount of information, a second fidelity, and/or a second accuracy) that is different from (e.g., greater than or less than) the first level of detail (e.g., the appearance of the representation has different levels of detail when viewed from different viewing angles). Displaying the representation of the person with different levels of detail at different viewing angles informs the user about the state of the person and the amount of information that is known about the portion of the user that is visible from a particular viewing angle, thereby providing improved visual feedback and providing a more varied, detailed, and/or realistic user experience while saving storage space. In some embodiments, the computer system provides (e.g., outputs audio and/or displays a user interface of) a real-time (e.g., live) communication session. In some embodiments, the representation of the person is displayed and/or otherwise used to communicate during the real-time communication session. In some embodiments, a real-time communication session includes real-time communication between participants of the real-time communication session, such as a user of the computer system and one or more other persons (e.g., one or more other users associated with other (e.g., different) computer systems). In some embodiments, providing the real-time communication session includes displaying representations of the person's body (e.g., facial expression, body expression, body position, and/or body movement) via the representation of the person. In some embodiments, providing the real-time communication session includes displaying the representation of the person and/or outputting audio corresponding to utterances of the person in real time. In some embodiments, the computer system and one or more other (e.g., remote) computer systems are in communication (e.g., wireless communication) with one another to enable transmission of information indicative of the representation of the person and/or audio corresponding to utterances of the person between the computer system and the one or more other computer systems. In some embodiments, a real-time communication session includes an XR experience (e.g., an XR environment). In some embodiments, the real-time communication session includes displaying the representation of the person (and, optionally, a representation of a second person) in an XR environment via display generation components of the computer system and the one or more other computer systems in communication via the real-time communication session.

In some embodiments, the computer system receives an indication of a change in the respective viewing angle relative to the respective portion of the representation of the person; and in response to receiving the indication of the change in the respective viewing angle relative to the respective portion of the representation of the person, the computer system changes the appearance of the representation of the person (e.g., change the appearance of 912 from FIG. 9A to FIG. 9B; change the appearance of 912 from FIG. 9B to FIG. 9C; change the appearance of 912 from FIG. 9C to FIG. 9D; change the appearance of 922 from FIG. 9F to FIGS. 9G1 and/or 9G2; change the appearance of 922 from FIGS. 9G1 and/or 9G2 to FIG. 9H; and/or change the appearance of 922 from FIG. 9H to FIG. 9I). Changing the appearance of the representation of the person in response to a change in the viewing angle informs the user of the change in viewing angle and updates the appearance of the representation of the person without requiring user input, thereby providing improved visual feedback to the user, reducing the number of inputs needed to perform an operation, and providing a more varied, detailed, and/or realistic user experience while saving storage space. In some embodiments, receiving an indication of a change in the respective view angle includes detecting (e.g., by the computer system and/or one or more remote sensors and/or devices) a change in position (e.g., location and/or orientation) of the representation of the person, a change in position of the person, a change in a viewpoint (e.g., relative to a physical or XR environment) from which the representation of the person is viewed, and/or a change in position of the computer system.

In some embodiments, the computer system displays, via the one or more display generation components, movement of the representation of the person (e.g., movement from the position of 712 in FIG. 7A to the position of 712 in FIG. 7B; movement from the position of 714 in FIG. 7C to the position of 714 in FIG. 7D; movement from the position of 722 in FIG. 7H to the position of 722 in FIG. 7I; movement from the position of 912 in FIG. 9A to the position of 912 in FIGS. 9B, 9C, and/or 9D; and/or movement from the position of 922 in FIG. 9F to the position of 922 in FIGS. 9G1, 9G2, 9H, and/or 91) in response to movement of the person. In some embodiments, the computer system detects the movement of the person. In some embodiments, a remote computer system and/or one or more sensors remote from the computer system detect the movement of the person. Displaying movement of the representation of the person in response to movement of the person informs the user about the state (or change in state) of the person, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, the representation of the person includes: a first representation portion (e.g., 714d, 714c, 714f, 714g, 722a, 722b, 722c, 724a, 724b, 724c, 922a, 922b, and/or 922c) (e.g., a first portion of the representation of the person) corresponding to a first portion of the person; and a second representation portion (e.g., 714d, 714e, 714f, 714g, 722a, 722b, 722c, 724a, 724b, 724c, 922a, 922b, and/or 922c) (e.g., a second portion of the representation of the person) corresponding to a second portion of the person, wherein the first representation portion is different from the second representation portion, and wherein the first portion of the person is different from the second portion of the person; and the computer system displays movement of the first representation portion relative to the second representation portion in response to movement of the first portion of the person relative to the second portion of the person. In some embodiments, movement of the first representation portion relative to the second representation portion includes: movement of the first representation portion relative to an XR environment (e.g., while the second representation portion maintains a position relative to the XR environment) and/or movement of the second representation portion relative to an XR environment (e.g., while the first representation portion maintains a position relative to the XR environment). Displaying movement of the first representation portion relative to the second representation portion in response to movement of the first portion of the person relative to the second portion of the person informs the user about the state (or change in state) of one portion of the representation of the person relative to another portion, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, the first viewing angle includes a view (e.g., the view in FIGS. 7A, 7B, 7C, 7D, 7H, 7I, 7J1, 7J2, 7K, 7M, 9A, 9B (partial front view), 9F, 9G1 (partial front view), 9G2, and/or 11A-11F) of a front portion (e.g., 712b, 714b, 724a2, 912b, and/or 922a2) (e.g., a face and/or chest) of the representation of the person (e.g., the first viewing angle is a front view and/or is in front of the representation of the person) and the second viewing angle includes a view (e.g., the view in FIGS. 7E (partial view of back), 7L (partial view of back), 9B (partial view of back), 9C (partial view of back), 9D, 9E, 9G1 (partial view of back), 9G2, 9H (partial view of back), 91, and/or 9J) of a back portion (e.g., 912c and/or 922a5) (e.g., a back of a body and/or a back of a head) of the representation of the person (e.g., the second viewing angle is a back view and/or behind the representation of the person). Displaying a front portion of the representation of the person with a different level of detail than a back portion viewed from the front than when viewed from the back informs the user about the state of the person and the relative amount of information that is known about the front and back of the person, thereby providing improved visual feedback and providing a more varied, detailed, and/or realistic user experience while saving storage space.

In some embodiments, the computer system concurrently: displays, via the one or more display generation components, movement (e.g., movement from the position of 712 in FIG. 7A to the position of 712 in FIG. 7B; movement from the position of 714 in FIG. 7C to the position of 714 in FIG. 7D; movement from the position of 722 in FIG. 7H to the position of 722 in FIG. 7I; movement from the position of 912 in FIG. 9A to the position of 912 in FIGS. 9B, 9C, and/or 9D; and/or movement from the position of 922 in FIG. 9F to the position of 922 in FIGS. 9G1, 9G2, 9H, and/or 91) (e.g., an animation of movement) of the representation of the person relative to a viewpoint of an environment (e.g., a physical environment or an XR environment); and changes the appearance of the representation of the person concurrently with displaying the movement of the representation of the person (e.g., in response to the movement of the representation of the person and/or movement of the person) (e.g., the appearance of 712 changes from FIG. 7A to FIG. 7B; the appearance of 714 changes from FIG. 7C to FIG. 7D and/or from FIG. 7D to FIG. 7E; the appearance of 722 changes from FIG. 7H to FIG. 7I; the appearance of 724 changes from FIGS. 7J1 and/or 7J2 to FIG. 7K and/or from FIG. 7K to FIG. 7L; the appearance of 912 changes from FIG. 9A to FIG. 9B, from FIG. 9B to FIG. 9C, and/or from FIG. 9C to FIG. 9D; and/or the appearance of 922 changes from FIG. 9F to FIGS. 9G1 and/or 9G2, from FIGS. 9G1 and/or 9G2 to FIG. 9H, and/or from FIG. 9H to FIG. 91). In some embodiments, changing the appearance of the representation of the person includes gradually changing the appearance of the representation of the person (e.g., the computer system changes the appearance of the representation of the person from a first appearance to a second appearance including displaying the representation of the person with a sequence of one or more intermediate appearances between the first appearance and the second appearance). Changing the appearance of the representation of the person concurrently with displaying the movement of the representation of the person informs the user about the state (or change in state) of the person, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, the appearance having the first level of detail has a first amount of depth (e.g., three-dimensional) effect, and the appearance having the second level of detail has a second amount of depth effect that is different from (e.g., greater than or less than) the first amount of depth effect (e.g., 714 has greater depth effect in FIG. 7D than in FIG. 7E; 724 has greater depth effect in FIG. 7K than in FIG. 7L; 912 has greater depth effect in FIG. 9A than in FIG. 9B, greater depth effect in FIG. 9B than in FIG. 9C, and/or greater depth effect in FIG. 9C than in FIG. 9D and/or FIG. 9E; and/or 922 has greater depth effect in FIG. 9F than in FIGS. 9G1 and/or 9G2, greater depth effect in FIGS. 9G1 and/or 9G2 than in FIG. 9H, and/or greater depth effect in FIG. 9H than in FIG. 9I and/or FIG. 9J). In some embodiments, the depth effect includes different objects (e.g., different body parts or portions of the representation of the person) having a different respective depth values (e.g., in a three-dimensional environment, relative to a viewpoint of the user). In some embodiments, the depth effect includes a center of an object (e.g., a body or body part of the representation of the person) protruding from, or having a different depth than, an edge of the object (e.g., to create a rounded effect). In some embodiments, the computer system displays the representation of the person with a greater amount of three-dimensional effect (e.g., more depth) when the viewing angle is of a front of (e.g., in front of and/or a front view of) the representation of the person than when the viewing angle is of a back of (e.g., behind and/or a back view of) the representation of the person. Displaying the representation of the person with different amounts of depth effect at different viewing angles informs the user about the state of the person and the amount of information that is known about the portion of the user that is visible from a particular viewing angle (e.g., greater depth effect indicates that more information is available), thereby providing improved visual feedback and providing a more varied, detailed, and/or realistic user experience while saving storage space.

In some embodiments, the representation of the person with the appearance having the first level of detail includes a greater amount of detail (e.g., number of features and/or resolution) of a face of the representation of the person than the representation of the person with the appearance having the second level of detail (e.g., 714 has greater facial details in FIG. 7D than in FIG. 7E; 722 has less facial details than 724; 724 has greater facial details in FIG. 7K than in FIG. 7L; 912 has greater facial details in FIG. 9A than in FIG. 9B, greater facial details in FIG. 9B than in FIG. 9C, and/or greater facial details in FIG. 9C than in FIG. 9D and/or FIG. 9E; and/or 922 has greater facial details in FIG. 9F than in FIGS. 9G1 and/or 9G2, greater facial details in FIGS. 9G1 and/or 9G2 than in FIG. 9H, and/or greater facial details in FIG. 9H than in FIG. 9I and/or FIG. 9J). In some embodiments, relative to the second level of detail, the first level of detail includes more facial features (e.g., eyes, eyebrows, eyelashes, beard, mustache, mouth, and/or nose), higher resolution, and/or a more accurate representation of the state of the physical face of the person. Displaying a face of the representation of the person with different levels of detail at different viewing angles informs the user about the state of the face of the person and the amount of information that is known about the face of the user from a particular viewing angle (e.g., greater level of detail indicates that more information is available), thereby providing improved visual feedback and providing a more varied, detailed, and/or realistic user experience while saving storage space.

In some embodiments, the representation of the person with the appearance having the first level of detail includes a greater amount of detail (e.g., number of features and/or resolution) of one or more hands of the representation of the person than the representation of the person with the appearance having the second level of detail (e.g., 714 has greater hand details in FIG. 7D than in FIG. 7E; 724 has greater hand details in FIG. 7K than in FIG. 7L; 912 has greater hand details in FIG. 9A than in FIG. 9B, greater hand details in FIG. 9B than in FIG. 9C, and/or greater hand details in FIG. 9C than in FIG. 9D and/or FIG. 9E; and/or 922 has greater hand details in FIG. 9F than in FIGS. 9G1 and/or 9G2, greater hand details in FIGS. 9G1 and/or 9G2 than in FIG. 9H, and/or greater hand details in FIG. 9H than in FIG. 9I and/or FIG. 9J). In some embodiments, relative to the second level of detail, the first level of detail includes more hand features (e.g., fingers, fingernails, creases, veins, and/or knuckles), higher resolution, and/or a more accurate representation of the state of the physical hand(s) of the person. Displaying the hands of the representation of the person with different levels of detail at different viewing angles informs the user about the state of the hands of the person and the amount of information that is known about the hands of the user from a particular viewing angle (e.g., greater level of detail indicates that more information is available), thereby providing improved visual feedback and providing a more varied, detailed, and/or realistic user experience while saving storage space.

In some embodiments, the representation of the person with the appearance having the first level of detail is less translucent (e.g., more opaque) than the representation of the person with the appearance having the second level of detail (e.g., 714 is less translucent in FIG. 7D than in FIG. 7E; 724 is less translucent in FIG. 7K than in FIG. 7L; 912 is less translucent in FIG. 9A than in FIG. 9B, is less translucent in FIG. 9B than in FIG. 9C, and/or is less translucent in FIG. 9C than in FIG. 9D and/or FIG. 9E; and/or 922 is less translucent in FIG. 9F than in FIGS. 9G1 and/or 9G2, is less translucent in FIGS. 9G1 and/or 9G2 than in FIG. 9H, and/or is less translucent in FIG. 9H than in FIG. 9I and/or FIG. 9J). In some embodiments, a background and/or other objects (e.g., virtual or physical objects) behind the representation of the person are partly visible through the representation of the person, where the visibility of the background and/or other objects is based on the transparency and/or translucency of the representation of the person. Displaying the representation of the person with different levels of translucency based on the viewing angle informs the user about the state of the person and the amount of information that is known about the portion of the user from a particular viewing angle (e.g., greater level of translucency indicates that less information is available), thereby providing improved visual feedback and providing a more varied, detailed, and/or realistic user experience while saving storage space.

In some embodiments, the appearance of the representation of the person is based on one or more visual properties (e.g., content, color, brightness, and/or how light or dark the background is behind the representation of the person) of a background (e.g., 710a, 710a1, 710a2, 710a3, 720a, 720a1, 720a2, 720a3, 910a, 910b, 920a, 1110, and/or 1120) (or, in some embodiments, a portion of a background) behind the representation of the person. In some embodiments, displaying the representation of the person includes: in accordance with a determination that a background behind the representation of the person has first value of a visual property, displaying the representation of the person with a first background-based appearance; and in accordance with a determination that the background behind the representation of the person has a second value of the visual property that is different from the first value of the visual property, displaying the representation of the person with a second background-based appearance that is different from the first background-based appearance. Basing the appearance of the representation of the person on a background behind the representation of the person creates a more immersive user experience and integrates the representation of the person into the environment without requiring user input, thereby providing improved visual feedback to the user, reducing the number of inputs needed to perform an operation, and providing a more varied, detailed, and/or realistic user experience while saving storage space.

In some embodiments, the representation of the person with the appearance having the second level of detail includes a greater amount of the one or more visual properties of the background than the representation of the person with the appearance having the first level of detail (e.g., the representation of the person with the appearance having the second level of detail is more affected by the one or more visual properties of the background than the representation of the person with the appearance having the first level of detail) (e.g., 714 includes a greater amount of the properties of 710*a* in FIG. 7E than in FIG. 7D; 724 includes a greater amount of the properties of 720*a* in FIG. 7L than in FIG. 7K; 912 includes a greater amount of the properties of 910*a* in FIG. 9B than in FIG. 9A, includes a greater amount of the properties of 910*a* in FIG. 9C than in FIG. 9B, and/or includes a greater amount of the properties of 910*a* in FIG. 9D and/or FIG. 9E than in FIG. 9C; and/or 922 includes a greater amount of the properties of 920*a* in FIGS. 9G1 and/or 9G2 than in FIG. 9F, includes a greater amount of the properties of 920*a* in FIG. 9H than in FIGS. 9G1 and/or 9G2, and/or includes a greater amount of the properties of 920*a* in FIG. 9I and/or FIG. 9J than in FIG. 9H). Displaying the representation of the person with different amounts of the visual properties of a background based on the viewing angle informs the user about the state of the person and integrates the representation of the person into the background to a greater extent when less information is known about the person from a particular viewing angle, thereby providing improved visual feedback and providing a more varied, detailed, and/or realistic user experience while saving storage space.

In some embodiments, the appearance of the representation of the person is based on (e.g., takes into account) a physical element (e.g., a physical object and/or a real-world element) (or, in some embodiments, one or more visual properties of a physical element) behind the representation of the person in a three-dimensional environment (e.g., different physical elements and/or visible properties of a physical element behind the representation of the person result in different appearances of the representation of the person) (e.g., the appearance of 712 is based on 710*a*, 710*a*1, 710*a*2, and/or 710*a*3; the appearance of 714 is based on 710*a*, 710*a*1, 710*a*2, and/or 710*a*3; the appearance of 722 is based on 720*a*, 720*a*1, 720*a*2, and/or 720*a*3; the appearance of 724 is based on 720*a*, 720*a*1, 720*a*2, and/or 720*a*3; the appearance of 912 is based on 910*a* and/or 910*b*; the appearance of 922 is based on 920*a*; the appearance of 1114 is based on 1110, and/or the appearance of 1122 is based on 1120). In some embodiments, the representation of the person is displayed in front of a three-dimensional environment provided to the user of the computer system (e.g., displayed by the computer system for the user to view).

Displaying the representation of the person with an appearance based on a physical element behind the representation of the person in a three-dimensional environment creates a more immersive user experience and integrates the representation (e.g., a virtual representation) of the person (e.g., a physical person) with physical elements without requiring user input, thereby providing improved visual feedback to the user, reducing the number of inputs needed to perform an operation, and providing a more varied, detailed, and/or realistic user experience while saving storage space.

In some embodiments, the appearance of the representation of the person is based on (e.g., takes into account) a virtual element (or, in some embodiments, one or more visual properties of a virtual element) behind the representation of the person in a three-dimensional environment (e.g., different virtual elements and/or visible properties of a virtual element behind the representation of the person result in different appearances of the representation of the person) (e.g., the appearance of 712 is based on 710*a*, 710*a*1, 710*a*2, and/or 710*a*3; the appearance of 714 is based on 710*a*, 710*a*1, 710*a*2, and/or 710*a*3; the appearance of 722 is based on 720*a*, 720*a*1, 720*a*2, and/or 720*a*3; the appearance of 724 is based on 720*a*, 720*a*1, 720*a*2, and/or 720*a*3; the appearance of 912 is based on 910*a* and/or 910*b*; the appearance of 922 is based on 920*a*; the appearance of 1114 is based on 1110, and/or the appearance of 1122 is based on 1120). In some embodiments, the representation of the person is displayed in front of a three-dimensional environment provided to the user of the computer system (e.g., displayed by the computer system for the user to view). Displaying the representation of the person with an appearance based on a virtual element behind the representation of the person in a three-dimensional environment creates a more immersive user experience and integrates the representation of the person (e.g., a physical person) with virtual elements without requiring user input, thereby providing improved visual feedback to the user, reducing the number of inputs needed to perform an operation, and providing a more varied, detailed, and/or realistic user experience while saving storage space.

In some embodiments, displaying the representation of the person includes: in accordance with a determination that the background behind the representation of the person has a first background brightness (e.g., a characteristic brightness such as an average, maximum, or minimum brightness), displaying the representation of the person with a first representation brightness; and in accordance with a determination that the background behind the representation of the person has a second brightness (e.g., a characteristic brightness such as an average, maximum, or minimum brightness) that is greater than the first background brightness, displaying the representation of the person with a second representation brightness that is less than the first representation brightness (e.g., the computer system displays the representation of the person with a darker appearance on a lighter background relative to the appearance of the representation of the person on a darker background; and/or the computer system displays the representation of the person with a lighter appearance on a darker background relative to the appearance of the representation of the person on a lighter background) (e.g., 912 is darker in FIG. 9D than in FIG. 9E; and/or 922 is darker in FIG. 9I than in FIG. 9J). Displaying the representation of the person with greater brightness against a darker background than a lighter background enables the computer system to adjust the brightness of the representation based on the background and to improve the contrast between the representation of the person and the background to improve visibility, thereby performing an operation when a set of conditions has been met without requiring further user input, providing improved visual feedback to the user, and providing a more varied, detailed, and/or realistic user experience while saving storage space.

In some embodiments, displaying the representation of the person includes displaying movement (e.g., relative to an XR environment and/or relative to a viewpoint in an XR environment) of the representation of the person in response to movement of (e.g., a change in position of) a viewpoint of a user (e.g., from the viewpoint in FIG. 7D to the viewpoint in FIG. 7E; and/or from the viewpoint in FIG. 7K to the viewpoint in FIG. 7L) (e.g., a viewpoint in an XR environment; a viewpoint from which the representation of the person is displayed; a viewpoint of a user of the computer system; and/or a viewpoint from which an XR environment is displayed by the computer system), including: in accordance with a determination that the viewpoint has moved to a first position (e.g., such that the representation of the person is viewed from a first different viewing angle relative to the respective portion of the representation of the person), displaying a first movement of the representation of the person; and in accordance with a determination that the viewpoint has moved to a second position (e.g., such that the representation of the person is viewed from a second different viewing angle relative to the respective portion of the representation of the person) that is different from the first position, displaying a second movement of the representation of the person that is different from the first movement of the representation of the person. In some embodiments, movement of the viewpoint changes the respective viewing angle relative to the respective portion of the representation of the person. Displaying movement of the representation of the person based on movement of the viewpoint informs the user about the change in the viewpoint and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, displaying the representation of the person includes displaying movement (e.g., relative to an XR environment and/or relative to a viewpoint in an XR environment) of the representation of the person in response to movement of (e.g., a change in position of) the representation of the person (e.g., as a result of movement of the person) (e.g., movement of 712 from the position in FIG. 7A to the position in FIG. 7B; movement of 714 from the position in FIG. 7C to the position in FIG. 7D; movement of 722 from the position in FIG. 7H to the position in FIG. 7I; movement of 912 from the position in FIG. 9A to the position in FIGS. 9B, 9C, and/or 9D; and/or movement of 922 from the position in FIG. 9F to the position in FIGS. 9G1, 9G2, 9H, and/or 9I), including: in accordance with a determination that the representation of the person has moved to a first position (e.g., such that the representation of the person is viewed from a first different viewing angle relative to the respective portion of the representation of the person), displaying a first movement of the representation of the person; and in accordance with a determination that the representation of the person has moved to a second position that is different from the first position (e.g., such that the representation of the person is viewed from a second different viewing angle relative to the respective portion of the representation of the person), displaying a second movement of the representation of the person that is different from (e.g., different in magnitude and/or direction from) the first movement of the representation of the person. In some embodiments, movement of the representation of the person changes the respective viewing angle relative to the respective portion of the representation of the person. Displaying movement of the representation of the person based on the change in position of the representation of the person informs the user about the state (or change in state) of the person, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, displaying the representation of the person with the appearance having the first level of detail includes displaying a first portion of a face of the representation of the person; and displaying the representation of the person with the appearance having the second level of detail includes displaying a second portion of the face of the representation of the person, wherein the first portion of the face includes a greater amount (e.g., more features and/or a larger cross section) of the face of the representation of the person than the second portion of the face (e.g., 714 has a greater amount of a face in FIG. 7D than in FIG. 7E; 724 has a greater amount of a face in FIG. 7K than in FIG. 7L; 912 has a greater amount of a face in FIG. 9A than in FIG. 9B, a greater amount of a face in FIG. 9B than in FIG. 9C, and/or a greater amount of a face in FIG. 9C than in FIG. 9D and/or FIG. 9E; and/or 922 has a greater amount of a face in FIG. 9F than in FIGS. 9G1 and/or 9G2, a greater amount of a face in FIGS. 9G1 and/or 9G2 than in FIG. 9H, and/or a greater amount of a face in FIG. 9H than in FIG. 9I and/or FIG. 9J). In some embodiments, displaying the representation of the person from the respective viewing angle relative to the respective portion of the representation of the person includes: in accordance with a determination that the respective viewing angle relative to the respective portion of the representation of the person corresponds to a third viewing angle relative to the respective portion of the representation of the person, displaying the representation of the person with the appearance having a third level of detail including displaying a third portion of the face of the representation of the person, wherein the third viewing angle is between the first viewing angle and the second viewing angle, and wherein the third portion of the face includes an amount of the face of the representation of the person that is between the amount of the first portion and the amount of the second portion (e.g., less than the first portion and greater than the second portion). Displaying a different amount of the face of the representation of the person at different viewing angles informs the user about the state of the person and the amount of information that is known about the portion of the user that is visible from a particular viewing angle (e.g., less of the face indicates less information), thereby providing improved visual feedback and providing a more varied, detailed, and/or realistic user experience while saving storage space.

In some embodiments, displaying the representation (e.g., 712, 714, 716, 722, 724, 726, 912, 922, 1114, 1118, 1122, and/or 1124) of the person from the respective viewing angle relative to the respective portion of the representation of the person includes: in accordance with a determination that the respective viewing angle relative to the respective portion of the representation of the person corresponds to the first viewing angle relative to the respective portion of the representation of the person, displaying a first amount of a feathering effect (e.g., a first amount of fading and/or blending) at an edge of the face of the representation of the person; and in accordance with a determination that the respective viewing angle relative to the respective portion of the representation of the person corresponds to the second viewing angle relative to the respective portion of the representation of the person, displaying a second amount of the feathering effect (e.g., a second amount of fading and/or blending) at the edge of the face of the representation of the person, wherein the first amount of the feathering effect is less than the second amount of the feathering effect (e.g., the computer system displays less feathering effect when a larger amount of the face is displayed and displays more feathering effect when a smaller amount of the face is displayed) (e.g., 714 has a greater amount of the feathering effect at the edge of the face in FIG. 7D than in FIG. 7E; 724 has a greater amount of the feathering effect at the edge of the face in FIG. 7K than in FIG. 7L; 912 has a greater amount of the feathering effect at the edge of the face in FIG. 9A than in FIG. 9B, a greater amount of the feathering effect at the edge of the face in FIG. 9B than in FIG. 9C, and/or a greater amount of the feathering effect at the edge of the face in FIG. 9C than in FIG. 9D and/or FIG. 9E; and/or 922 has a greater amount of the feathering effect at the edge of the face in FIG. 9F than in FIGS. 9G1 and/or 9G2, a greater amount of the feathering effect at the edge of the face in FIGS. 9G1 and/or 9G2 than in FIG. 9H, and/or a greater amount of the feathering effect at the edge of the face in FIG. 9H than in FIG. 9I and/or FIG. 9J). In some embodiments, a feathering effect includes fading (e.g., gradually fading and/or spatially fading) between colors of pixels and colors of surrounding pixels. In some embodiments, a feathering effect includes blending colors of pixels with colors of surrounding pixels. In some embodiments, a feathering effect includes changing a transparency and/or density over a distance (e.g., a range of pixels) at an edge of an object or representation (e.g., reducing the opacity and/or density at the edge in a direction away from the object or representation). Displaying an amount of a feathering effect at the edge of the face of the representation of the person for different viewing angles informs the user about the state of the person and the amount of information that is known about the portion of the user that is visible from a particular viewing angle (e.g., more feathering indicates less information), thereby providing improved visual feedback and providing a more varied, detailed, and/or realistic user experience while saving storage space.

In some embodiments, the first amount of the feathering effect has a first spatial density (e.g., spatial rate and/or number of pixels over which the feathering effect is spread); and the second amount of the feathering effect has a second spatial density that is different from the first spatial density (e.g., 714 has a feathering effect with different spatial density in FIG. 7D than in FIG. 7E; 724 has a feathering effect with different spatial density in FIG. 7K than in FIG. 7L; 912 has a feathering effect with different spatial density in FIG. 9A than in FIG. 9B, a feathering effect with different spatial density in FIG. 9B than in FIG. 9C, and/or a feathering effect with different spatial density in FIG. 9C than in FIG. 9D and/or FIG. 9E; and/or 922 has a feathering effect with different spatial density in FIG. 9F than in FIGS. 9G1 and/or 9G2, a feathering effect with different spatial density in FIGS. 9G1 and/or 9G2 than in FIG. 9H, and/or a feathering effect with different spatial density in FIG. 9H than in FIG. 9I and/or FIG. 9J). Displaying the feathering effect with a different spatial density at different viewing angles informs the user about the state of the person and the amount of information that is known about the portion of the user that is visible from a particular viewing angle (e.g., greater spatial density indicates more information), thereby providing improved visual feedback and providing a more varied, detailed, and/or realistic user experience while saving storage space.

In some embodiments, displaying the first amount of the feathering effect includes displaying a first boundary (e.g., edge and/or starting location) of the feathering effect at a first location (e.g., a first location on the representation of the person); and displaying the second amount of the feathering effect includes displaying the first boundary of the feathering effect at a second location (e.g., a second location on the representation of the person) that is different from the first location (e.g., the feathering effect is displayed at a different boundary in FIG. 7D than in FIG. 7E; the feathering effect is displayed at a different boundary in FIG. 7K than in FIG. 7L; the feathering effect is displayed at a different boundary in FIG. 9A than in FIG. 9B; the feathering effect is displayed at a different boundary in FIG. 9B than in FIG. 9C; the feathering effect is displayed at a different boundary in FIG. 9C than in FIG. 9D and/or FIG. 9E; the feathering effect is displayed at a different boundary in FIG. 9F than in FIGS. 9G1 and/or 9G2; the feathering effect is displayed at a different boundary in FIGS. 9G1 and/or 9G2 than in FIG. 9H; and/or the feathering effect is displayed at a different boundary in FIG. 9H than in FIG. 9I and/or FIG. 9J). Displaying the feathering effect at different boundaries for different viewing angles informs the user about the state of the person and the amount of information that is known about the portion of the user that is visible from a particular viewing angle (e.g., a boundary that is closer to an edge of a cross section of the representation indicates a greater amount of information), thereby providing improved visual feedback and providing a more varied, detailed, and/or realistic user experience while saving storage space.

In some embodiments, displaying the representation of the person from the respective viewing angle includes displaying the representation of the person with the appearance applied to a representation (e.g., 1114a and/or 1122a1) of a face (e.g., 1112a) of the person (e.g., a face of the representation of the person) and to a representation (e.g., 714c, 714f, 724b, 724c, 922b, and/or 922c) of one or more hands of the person (e.g., one or more hands of the representation of the person). Applying the appearance of the representation of the person to the face and hands of the person enables the computer system to emphasize and/or customize different portions of the representation of the person without requiring user input, thereby reducing the number of inputs needed to perform an operation, providing improved visual feedback to the user, and providing a more varied, detailed, and/or realistic user experience while saving storage space.

In some embodiments, displaying the representation of the person from the respective viewing angle includes: in accordance with a determination that the computer system is associated with a first participant of an extended reality experience and has a first viewpoint of the user (e.g., in an XR environment), displaying the representation of the person with a first appearance; and in accordance with a determination that the computer system is associated with a second participant of an extended reality experience and has a second viewpoint of the user (e.g., in an XR environment), displaying the representation of the person with a second appearance. Displaying the representation of the person with a different appearance for different participants of an extended reality experience provides a customized view of the representation of the person for a user without user input, thereby reducing the number of inputs needed to perform an operation, providing improved visual feedback to the user, and providing a more varied, detailed, and/or realistic user experience while saving storage space.

In some embodiments, the respective viewing angle relative to the respective portion of the representation of the person is based on an orientation of a head (e.g., 714*d*, 724*a*, and/or 922*a*) of the representation of the person relative to a viewpoint of the user (e.g., a viewpoint of the user of the computer system and/or a viewpoint in an XR environment). In some embodiments, in accordance with a determination that the head of the representation of the person has a first orientation relative to a viewpoint, the computer system displays the representation of the person with a first appearance, and in accordance with a determination that the head of the representation of the person has a second orientation relative to the viewpoint that is different from the first orientation relative to the viewpoint, the computer system displays the representation of the person with a second appearance that is different from the first appearance. Displaying the representation of the person with an appearance that is based on an orientation of the head of the representation of the person informs the user about the state of the head and the amount of information that is known about the portion of the head that is visible from a particular viewing angle, thereby providing improved visual feedback to the user and providing a more varied, detailed, and/or realistic user experience while saving storage space.

In some embodiments, the respective viewing angle relative to the respective portion of the representation of the person is based on an orientation of a torso of the representation of the person relative to a viewpoint of the user (e.g., a viewpoint of the user of the computer system and/or a viewpoint in an XR environment). In some embodiments, in accordance with a determination that the torso of the representation of the person has a first orientation relative to a viewpoint, the computer system displays the representation of the person with a first appearance, and in accordance with a determination that the torso of the representation of the person has a second orientation relative to the viewpoint that is different from the first orientation relative to the viewpoint, the computer system displays the representation of the person with a second appearance that is different from the first appearance. Displaying the representation of the person with an appearance that is based on an orientation of the torso of the representation of the person relative to a viewpoint of the user informs the user about the state of the torso and the amount of information that is known about the portion of the torso that is visible from a particular viewing angle, thereby providing improved visual feedback to the user and providing a more varied, detailed, and/or realistic user experience while saving storage space.

In some embodiments, the representation of the person is displayed as a part of a real-time communication session between the user of the computer system and one or more other participants including a participant corresponding to the person represented by the representation of the person. Displaying the representation of the person as a part of a real-time communication session enables the person to communicate via the representation of the person without having to share a camera feed, thereby providing improved visual feedback to the user and improving privacy and/or security.

In some embodiments, displaying the representation of the person includes displaying movement (e.g., movement from the position of 712 in FIG. 7A to the position of 712 in FIG. 7B; movement from the position of 714 in FIG. 7C to the position of 714 in FIG. 7D; movement from the position of 722 in FIG. 7H to the position of 722 in FIG. 7I; movement from the position of 912 in FIG. 9A to the position of 912 in FIGS. 9B, 9C, and/or 9D; and/or movement from the position of 922 in FIG. 9F to the position of 922 in FIGS. 9G1, 9G2, 9H, and/or 9I) of the representation of the person in response to physical movement (e.g., a change in facial expression, movement of a facial feature, movement of a body, movement of a hand relative to the body, and/or movement of an arm relative to the body) of the person (e.g., the movement of the representation of the person corresponds to and/or simulates the physical movement of the person). In some embodiments, a computer system associated with the person detects the physical movement of the user. In some embodiments, one or more remote sensors detect the physical movement of the user. Displaying movement of the representation of the person in response to physical movement of the person informs the user about the state (or change in state) of the person, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space.

FIGS. 11A-11F illustrate examples of displaying a representation of a person when a mouth of the person is occluded by an object, in accordance with some embodiments. In some embodiments, a representation of a person (e.g., a face of a representation of a person, a mouth of a representation of a person, and/or an expression of a representation of a person) is displayed with a larger amount of visual fidelity when a mouth of the person is not occluded than when the mouth of the person is occluded. FIG. 12 is a flow diagram of an exemplary method 1200 for displaying a representation of a person when a mouth of the person is occluded by an object. The user interfaces in FIGS. 11A-11F are used to illustrate the processes described below, including the processes in FIG. 12.

Figure 11A:
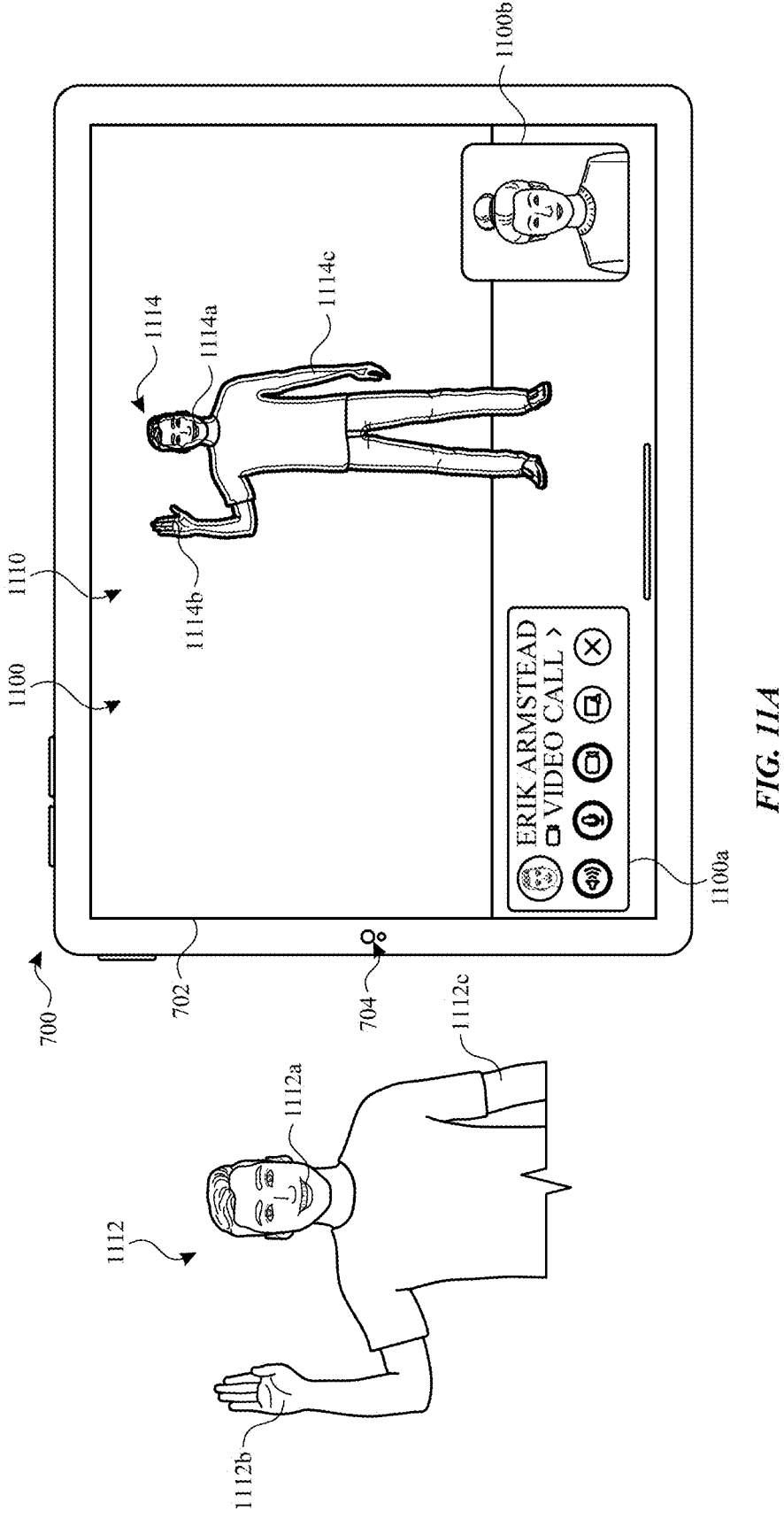
Figure 1I:
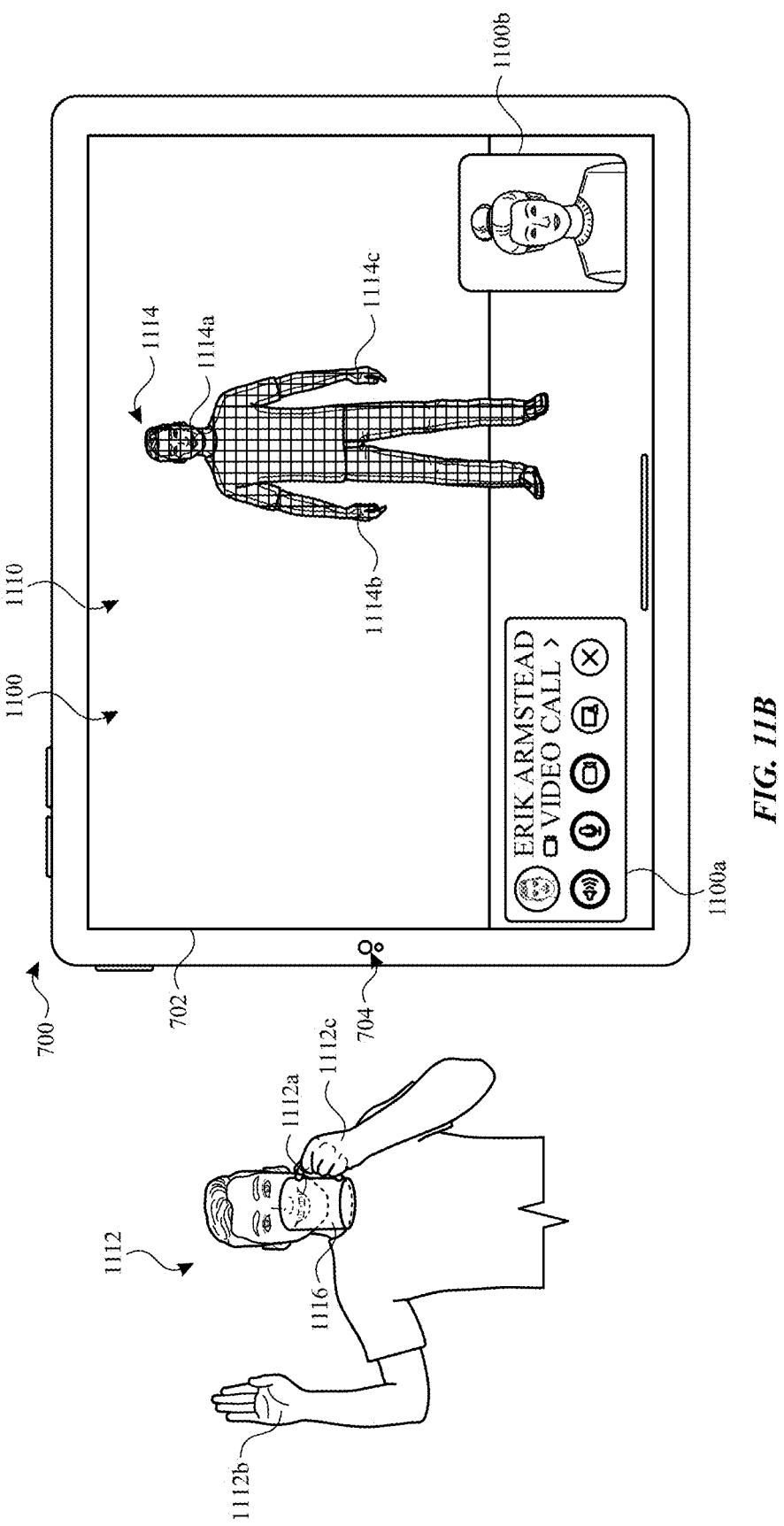
Figure 1I:
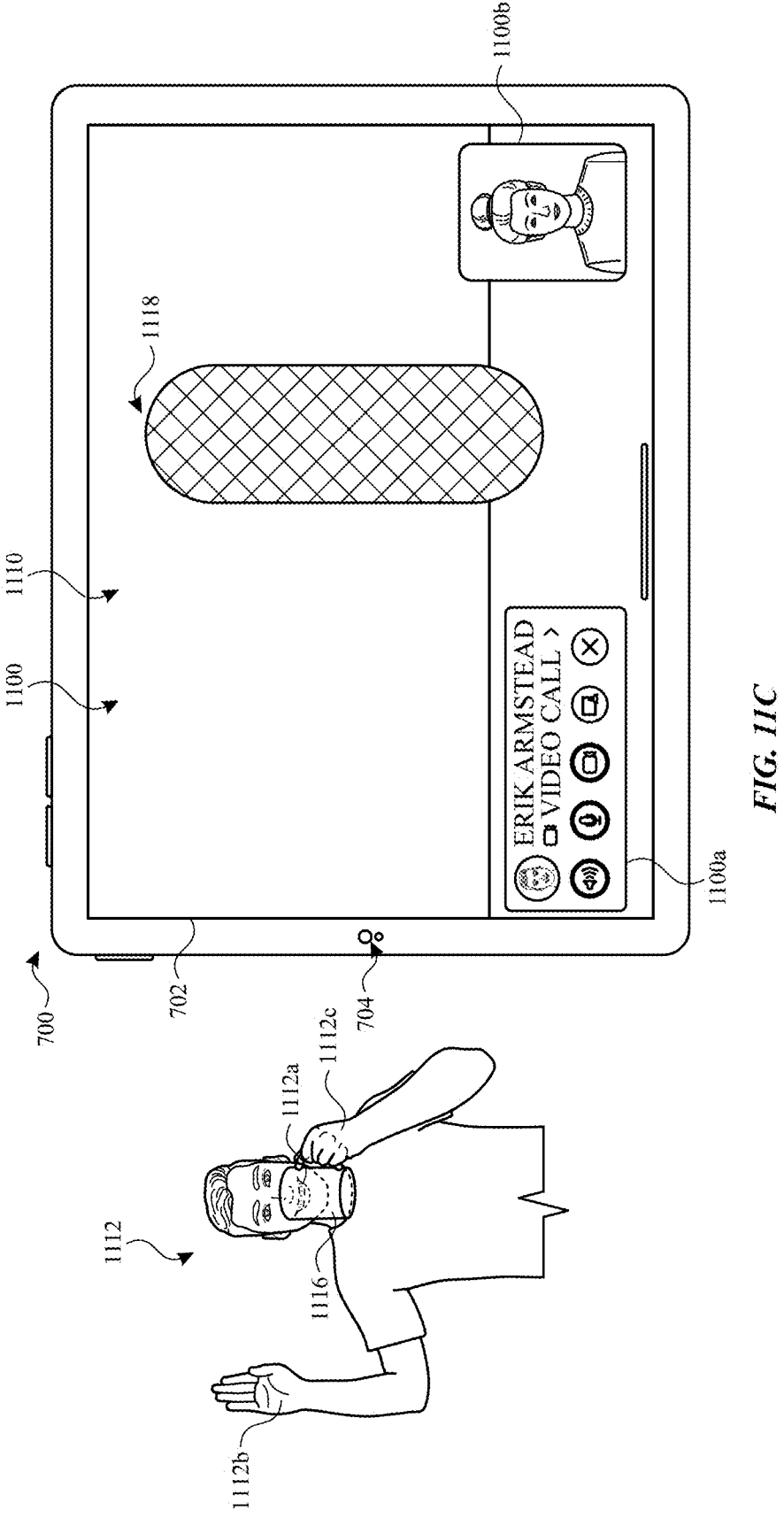

FIG. 11A illustrates person 1112 and computer system 700. Computer system 700 displays user interface 1100 of a real-time communication session, which includes controls 1100*a*, representation 1100*b* of video captured by camera sensor 704, and representation 1110 of an environment (also referred to as environment 1110). Representation 1114 of person 1112 is displayed in environment 1110, including representation 1114*a* of a face of person 1112. In FIG. 11A, there is nothing obstructing mouth 1112*a* of person 1112 (e.g., one or more sensors used to detect mouth 1112*a* to generate representation 1114*a* are able to detect and/or not blocked from mouth 1112*a*). Because nothing is obstructing mouth 1112*a* of person 1112, representation 1114*a* of the face of person 1112 is displayed with a first visual fidelity that accurately represents an expression of mouth 1112*a*. In some embodiments, when an expression of mouth 1112*a* changes (e.g., from smiling to neutral or frowning) while mouth 1112*a* is unobstructed, computer system 700 updates representation 1114*a* of the face of person 1112 to reflect the change in expression. Also, in FIG. 11A, because person 1112 has his right arm 1112*b* raised, computer system 700 displays representation 1114*b* corresponding to right arm 1112*b* in a raised position.

In FIG. 11B, person 1112 has placed object 1116 (e.g., a mug and/or hand) in front of mouth 1112*a* (e.g., between mouth 1112a and one or more sensors used to detect mouth 1112a to generate representation 1114a). In response to a determination that mouth 1112a is occluded, computer system 700 displays representation 1114 of person 1112 with a different appearance than when mouth 1112a is not occluded. For example, in some embodiments, in response to a determination that mouth 1112a is occluded, computer system 700 displays representation 1114 with less visual fidelity than when mouth 1112a is not occluded, as indicated by the fill effect on representation 1114 in FIG. 11B. In some embodiments, in response to a determination that mouth 1112a is occluded, computer system 700 displays representation 1114a of the face of person 1112 with a second visual fidelity that is less than the first visual fidelity displayed in FIG. 11A.

In some embodiments, in response to a determination that mouth 1112a is occluded, computer system 700 displays representation 1114a of the face of person 1112 with a neutral expression (e.g., an expression that is not based on a detected expression of mouth 1112a). In some embodiments, when an expression of mouth 1112a changes while mouth 1112a is occluded, computer system 700 maintains the appearance of representation 1114a (e.g., does not update representation 1114a to reflect the change in expression). In some embodiments, computer system 700 displays a neutral expression and/or maintains the appearance of representation 1114a because the one or more sensors used to detect mouth 1112a to generate representation 1114a are not able to detect the expression and/or change in expression.

In some embodiments, in response to a determination that mouth 1112a is occluded, computer system 700 displays other portions of representation 1114 of person 1112 with less visual fidelity (e.g., in a configuration that is not based on a detected configuration of person 1112). For example, in FIG. 11B, person 1112 has his right arm 1112b raised like in FIG. 11A, but because mouth 1112a is occluded, computer system 700 displays representation 1114b corresponding to right arm 1112b in a lowered position. Similarly, in FIG. 11B, although person 1112 has his left arm 1112c positioned holding object 1116 in front of mouth 1112a, computer system 700 displays representation 1114c corresponding to left arm 1112c in a lowered position.

In some embodiments, when an expression of mouth 1112a changes while mouth 1112a is occluded, computer system 700 maintains the appearance of representation 1114a (e.g., does not update representation 1114a to reflect the change in expression). In some embodiments, computer system 700 displays a neutral expression and/or maintains the appearance of representation 1114a because the one or more sensors used to detect mouth 1112a to generate representation 1114a are not able to detect the expression and/or change in expression.

In some embodiments, representation 1114 is at least partially transparent when mouth 1112a is not occluded and/or when mouth 1112a is occluded. In some embodiments, in response to a determination that mouth 1112a is occluded, computer system 700 deemphasizes (e.g., blurs and/or increases the transparency of) at least a portion of representation 1114. In some embodiments, computer system 700 blurs an entirety of representation 1114. In some embodiments, representation 1114 includes an animated noise effect (e.g., a film grain effect) when mouth 1112a is not occluded and/or when mouth 1112a is occluded. In some embodiments, in response to a determination that mouth 1112a is occluded, computer system 700 increases the animated noise effect in representation 1114. In some embodiments, the animated noise effect is greater (or increased more) on one portion of representation 1114 than on another portion. In some embodiments, computer system 700 displays a simulated lighting effect on at least a portion of representation 1114 of person 1112 mouth 1112a is not occluded and/or when mouth 1112a is occluded. In some embodiments, in response to a determination that mouth 1112a is occluded, computer system 700 changes the simulated lighting effect on representation 1114.

In some embodiments, computer system 700 attempts to track mouth 1112a when mouth 1112a is not occluded and/or when mouth 1112a is occluded. In some embodiments, computer system 700 tracks mouth 1112a with a first tracking function when mouth 1112a is not occluded and tracks mouth 1112a with a different tracking function when mouth 1112a is occluded. In some embodiments, computer system 700 displays representation 1122 (e.g., representation 1122a1 of the face of person 1112) with a different appearance when mouth 1112a is tracked with one tracking function than when mouth 1112a is tracked with a different tracking function. In some embodiments, in accordance with a determination that mouth 1112a is no longer occluded, computer system 700 displays representation 1114 (e.g., including representation 1114a of the face of person 1112) with the first visual fidelity (e.g., with the visual fidelity represented in FIG. 11A).

In FIG. 11C, mouth 1112a of person 1112 remains occluded. In response to mouth 1112a remaining occluded (e.g., for a predetermined amount of time), computer system 700 further reduces the visual fidelity of the representation of person 1112 (or a portion of the representation of person 1112) displayed in environment 1110. In FIG. 11C, in response to mouth 1112a remaining occluded, computer system 700 removes display of representation 1114 and displays representation 1118 (e.g., replaces representation 1114 with representation 1118). In the example illustrated in FIG. 11C, representation 1118 is a generic shape that is not based on an anatomical feature of person 1112. In some embodiments, computer system 700 removes display of representation 1114 without displaying another representation of person 1112 (e.g., without displaying representation 1118). In some embodiments, if mouth 1112a further remains occluded (e.g., for a further predetermined amount of time), computer system 700 removes (e.g., fades out) display of representation 1118 (e.g., without displaying another representation of person 1112).

In some embodiments, the real-time communication session includes three or more participants. For example, in some embodiments, the real-time communication session includes a third participant other than the person represented by representation 1114 and the user of computer system 700. In some embodiments, the third participant has a different viewpoint than the user of computer system 700. Because the third participant has a different viewpoint, representation 1114 is displayed at a different viewing angle for the third participant than for the user of computer system 700. In some embodiments, representation 1114 of the person is displayed according to the techniques described with reference to FIGS. 11A-11C based on the viewing angle of representation 1114 for the third participant. Thus, representation 1114 is displayed with a different appearance (e.g., a different level of detail) for the third participant than for the user of computer system 700 because of the different viewing angle.

Figure 11D:
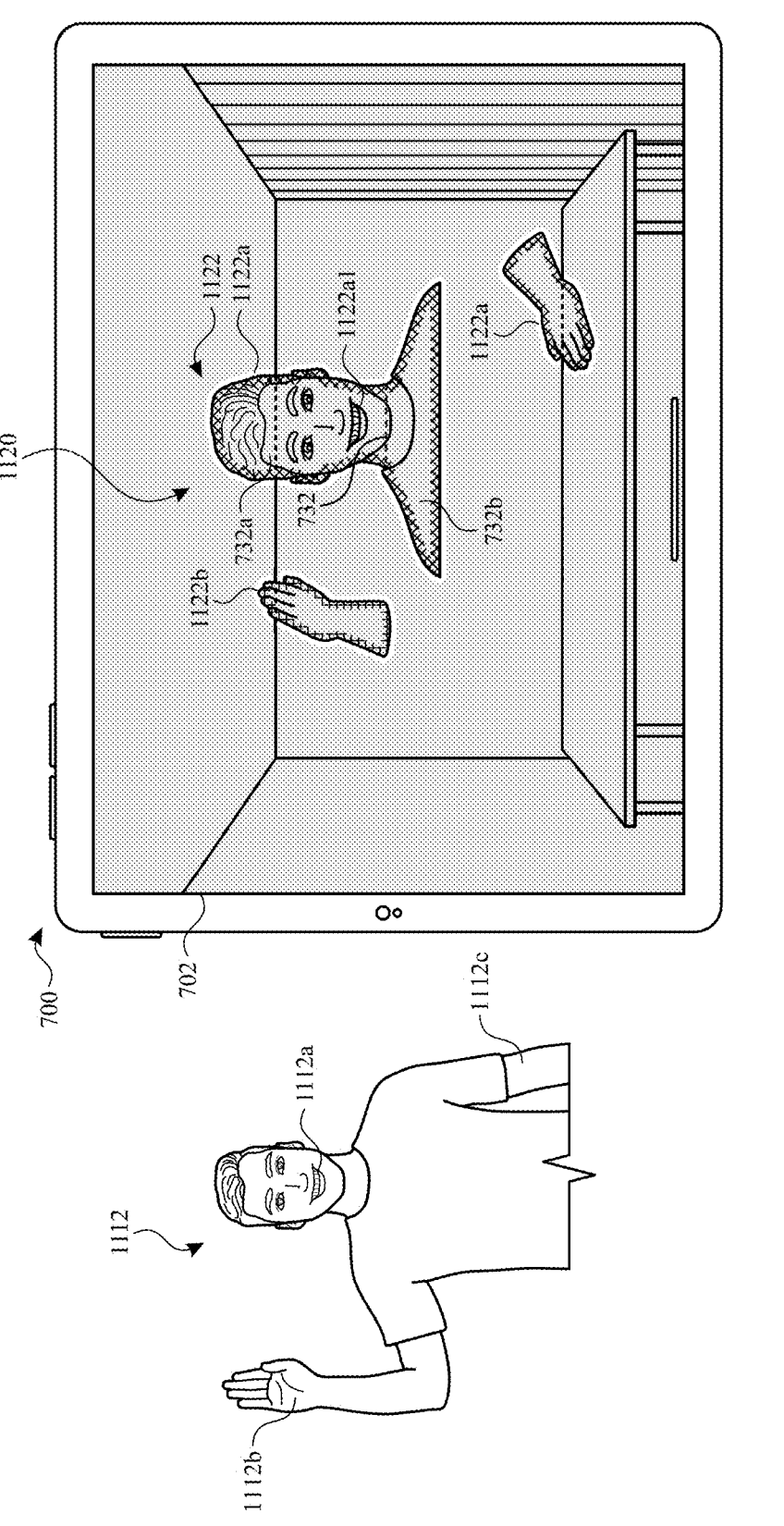
Figure 11F:
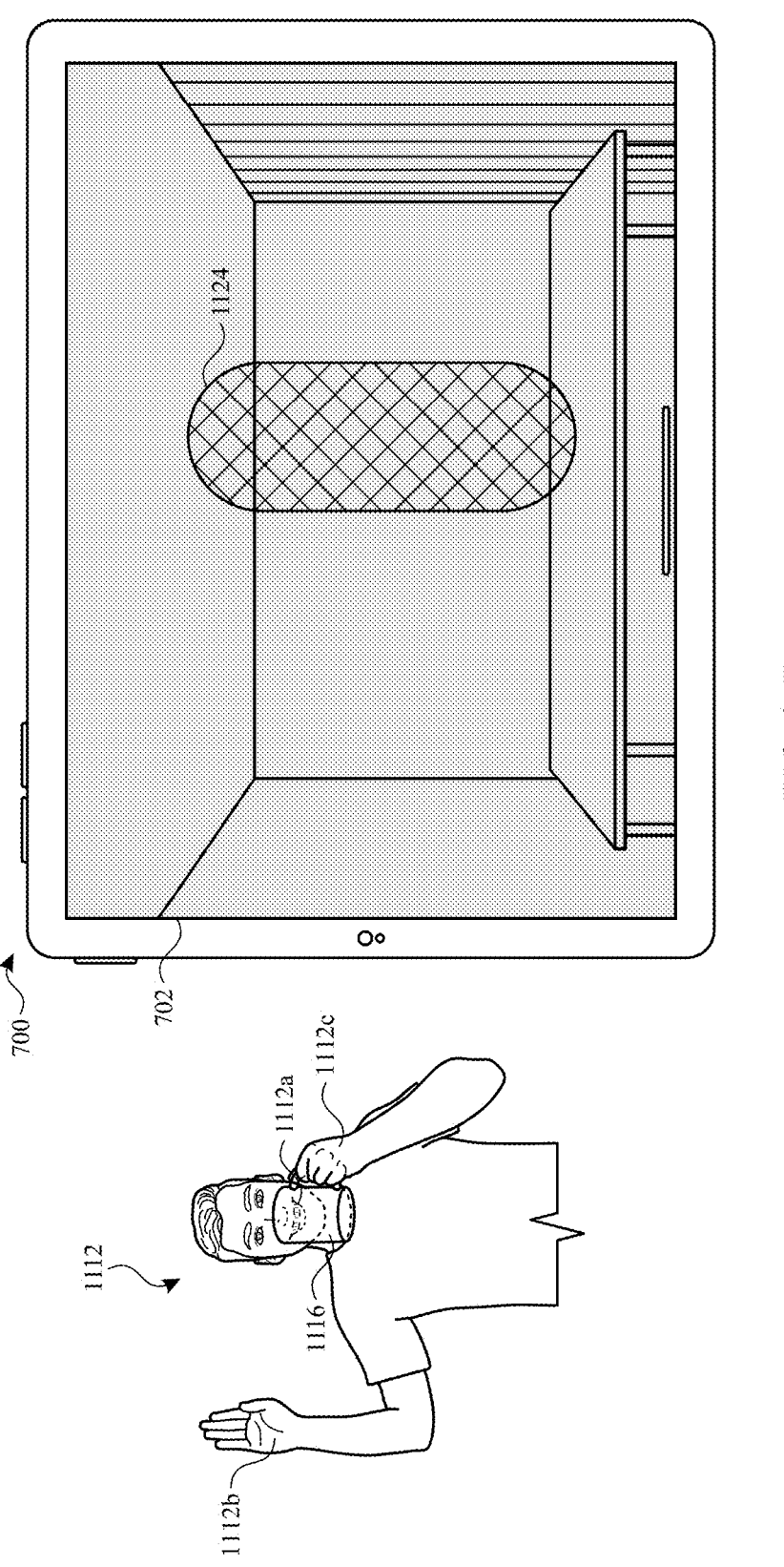

FIGS. 11D-11F illustrate an embodiment that is analogous to the embodiment in FIGS. 11A-11C. In FIG. 11D, person 1112 is in the same position as in FIG. 11A, but computer system 700 displays representation 1122 of person 1112 in environment 1120. Representation 1122 includes upper portion 1122*a*, left hand 1122*c*, and right hand 1122*b*. Upper portion 1122*a* includes representation 1122*a*1 of a face of person 1112. Similar to representation 1114 in FIG. 11A, because nothing is obstructing mouth 1112*a* of person 1112, representation 1122*a*1 of the face of person 1112 is displayed with a first visual fidelity that accurately represents an expression of mouth 1112*a*. In some embodiments, when an expression of mouth 1112*a* changes (e.g., from smiling to neutral or frowning) while mouth 1112*a* is unobstructed, computer system 700 updates representation 1122*a*1 of the face of person 1112 to reflect the change in expression. Also, in FIG. 11D, because person 1112 has his right arm 1112*b* raised, computer system 700 displays right hand 1122*b* in a raised position.

In FIG. 11E1, person 1112 is in the same position as in FIG. 11B. Similar to FIG. 11B, in response to a determination that mouth 1112*a* is occluded, computer system 700 displays representation 1122 of person 1112 with a different appearance than when mouth 1112*a* is not occluded. For example, in some embodiments, in response to a determination that mouth 1112*a* is occluded, computer system 700 displays representation 1122 with less visual fidelity than when mouth 1112*a* is not occluded, as indicated by the speckled fill effect on representation 1122 in FIG. 11E1. In some embodiments, the speckled fill effect represents an animated noise effect (e.g., a film grain effect) applied to representation 1122. In some embodiments, representation 1122 includes an animated noise effect when mouth 1112*a* is not occluded and/or when mouth 1112*a* is occluded. In some embodiments, in response to a determination that mouth 1112*a* is occluded, computer system 700 increases the animated noise effect in representation 1122. In some embodiments, the animated noise effect is greater (or increased more) on one portion (e.g., right hand 1122*b* and/or left hand 1122*c*) of representation 1122 than on another portion (e.g., upper portion 1122*a*).

In some embodiments, in response to a determination that mouth 1112*a* is occluded, computer system 700 displays representation 1122*a*1 of the face of person 1112 with a second visual fidelity that is less than the first visual fidelity displayed in FIG. 11D. In some embodiments, in response to a determination that mouth 1112*a* is occluded, computer system 700 displays representation 1122*a*1 of the face of person 1112 with a neutral expression (e.g., an expression that is not based on a detected expression of mouth 1112*a*). In some embodiments, when an expression of mouth 1112*a* changes while mouth 1112*a* is occluded, computer system 700 maintains the appearance of representation 1122*a*1 (e.g., does not update representation 1122*a*1 to reflect the change in expression). In some embodiments, computer system 700 displays a neutral expression and/or maintains the appearance of representation 1122*a*1 because the one or more sensors used to detect mouth 1112*a* to generate representation 1122*a*1 are not able to detect the expression and/or change in expression.

In some embodiments, in response to a determination that mouth 1112*a* is occluded, computer system 700 displays other portions of representation 1122 of person 1112 with less visual fidelity (e.g., in a configuration that is not based on a detected configuration of person 1112). For example, in FIG. 11E1, person 1112 has his right arm 1112*b* raised like in FIG. 11D, but because mouth 1112*a* is occluded, computer system 700 displays right hand 1122*b* in a lowered position. Similarly, in FIG. 11E1, although person 1112 has his left arm 1112*c* positioned holding object 1116 in front of mouth 1112*a*, computer system 700 displays left hand 1122*c* in a lowered position. In some embodiments, when an expression of mouth 1112*a* changes while mouth 1112*a* is occluded, computer system 700 maintains the appearance of representation 1122*a*1 (e.g., does not update representation 1122*a*1 to reflect the change in expression). In some embodiments, computer system 700 displays a neutral expression and/or maintains the appearance of representation 1122*a*1 because the one or more sensors used to detect mouth 1112*a* to generate representation 1122*a*1 are not able to detect the expression and/or change in expression.

In some embodiments, representation 1122 is at least partially transparent when mouth 1112*a* is not occluded and/or when mouth 1112*a* is occluded. In some embodiments, in response to a determination that mouth 1112*a* is occluded, computer system 700 deemphasizes (e.g., blurs and/or increases the transparency of) at least a portion of representation 1122. In some embodiments, computer system 700 blurs an entirety of representation 1122. In some embodiments, computer system 700 displays a simulated lighting effect on at least a portion of representation 1114 of person 1112 mouth 1112*a* is not occluded and/or when mouth 1112*a* is occluded. In some embodiments, in response to a determination that mouth 1112*a* is occluded, computer system 700 changes the simulated lighting effect on representation 1114.

In some embodiments, computer system 700 attempts to track mouth 1112*a* when mouth 1112*a* is not occluded and/or when mouth 1112*a* is occluded. In some embodiments, computer system 700 tracks mouth 1112*a* with a first tracking function when mouth 1112*a* is not occluded and tracks mouth 1112*a* with a different tracking function when mouth 1112*a* is occluded. In some embodiments, computer system 700 displays representation 1122 (e.g., representation 1122*a*1 of the face of person 1112) with a different appearance when mouth 1112*a* is tracked with one tracking function than when mouth 1112*a* is tracked with a different tracking function. In some embodiments, in accordance with a determination that mouth 1112*a* is no longer occluded, computer system 700 displays representation 1114 (e.g., including representation 1114*a* of the face of person 1112) with the first visual fidelity (e.g., with the visual fidelity represented in FIG. 11A).

In some embodiments, in response to a determination that mouth 1112*a* is occluded, computer system 700 displays darker region 1126 on representation 1122. In FIG. 11E1, computer system 700 displays darker region 1126 on a portion of representation 1122*a*1 of the face of person 1112 that corresponds to mouth 1112*a* of person 1112. In some embodiments, computer system 700 displays darker region 1126 on portions of representation 1122 around (and, optionally, including) representation 1122*a*1 of the face of person 1112 that corresponds to mouth 1112*a* of person 1112. In some embodiments, darker region 1126 simulates a shadow cast by object 1116 and/or left arm 1112*c*. In some embodiments, darker region 1126 simulates a hole and/or a void in representation 1122. In some embodiments, computer system 700 displays a color pattern that varies over time in darker region 1126. In some embodiments, computer system 700 displays the color pattern in darker region 1126 according to some or all of the features of the color pattern described above with reference to, e.g., FIGS. 70-7P. In some embodiments, the darker region changes over time (e.g., randomly or pseudorandomly and/or in response to changes in the occlusion of the mouth region). In some embodiments, a size of the darker region increases as a degree of occlusion of the mouth increases. In some embodiments, a size of the darker region decreases as a degree of occlusion of the mouth decreases. In some embodiments, a position of the darker region moves based on movement of the occlusion (e.g., the darker region is more to the right of the face if the right side of the mouth is more heavily occluded than the right side and/or the darker region is more to the left of the face if the left side of the mouth is more heavily occluded than the left side).

In some embodiments, the techniques and user interface(s) described in FIGS. 11A-11F are provided by one or more of the devices described in FIGS. 1A-1P. For example, FIG. 11E2 illustrates an embodiment in which representation 1122 (e.g., as described in FIGS. 11D and 11E1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

In FIG. 11E2, person 1112 is in the same position as in FIG. 11B. Similar to FIG. 11B, in response to a determination that mouth 1112a is occluded, HMD X700 displays representation 1122 of person 1112 with a different appearance than when mouth 1112a is not occluded. For example, in some embodiments, in response to a determination that mouth 1112a is occluded, HMD X700 displays representation 1122 with less visual fidelity than when mouth 1112a is not occluded, as indicated by the speckled fill effect on representation 1122 in FIG. 11E2. In some embodiments, the speckled fill effect represents an animated noise effect (e.g., a film grain effect) applied to representation 1122. In some embodiments, representation 1122 includes an animated noise effect when mouth 1112a is not occluded and/or when mouth 1112a is occluded. In some embodiments, in response to a determination that mouth 1112a is occluded, HMD X700 increases the animated noise effect in representation 1122. In some embodiments, the animated noise effect is greater (or increased more) on one portion (e.g., right hand 1122b and/or left hand 1122c) of representation 1122 than on another portion (e.g., upper portion 1122a).

In some embodiments, in response to a determination that mouth 1112a is occluded, HMD X700 displays representation 1122a1 of the face of person 1112 with a second visual fidelity that is less than the first visual fidelity displayed in FIG. 11D. In some embodiments, in response to a determination that mouth 1112a is occluded, HMD X700 displays representation 1122a1 of the face of person 1112 with a neutral expression (e.g., an expression that is not based on a detected expression of mouth 1112a). In some embodiments, when an expression of mouth 1112a changes while mouth 1112a is occluded, HMD X700 maintains the appearance of representation 1122a1 (e.g., does not update representation 1122a1 to reflect the change in expression). In some embodiments, HMD X700 displays a neutral expression and/or maintains the appearance of representation 1122a1 because the one or more sensors used to detect mouth 1112a to generate representation 1122a1 are not able to detect the expression and/or change in expression.

In some embodiments, in response to a determination that mouth 1112a is occluded, HMD X700 displays other portions of representation 1122 of person 1112 with less visual fidelity (e.g., in a configuration that is not based on a detected configuration of person 1112). For example, in FIG.

11E2, person 1112 has his right arm 1112b raised like in FIG. 11D, but because mouth 1112a is occluded, HMD X700 displays right hand 1122b in a lowered position. Similarly, in FIG. 11E2, although person 1112 has his left arm 1112c positioned holding object 1116 in front of mouth 1112a, HMD X700 displays left hand 1122c in a lowered position. In some embodiments, when an expression of mouth 1112a changes while mouth 1112a is occluded, HMD X700 maintains the appearance of representation 1122a1 (e.g., does not update representation 1122a1 to reflect the change in expression). In some embodiments, HMD X700 displays a neutral expression and/or maintains the appearance of representation 1122a1 because the one or more sensors used to detect mouth 1112a to generate representation 1122a1 are not able to detect the expression and/or change in expression.

In some embodiments, representation 1122 is at least partially transparent when mouth 1112a is not occluded and/or when mouth 1112a is occluded. In some embodiments, in response to a determination that mouth 1112a is occluded, HMD X700 deemphasizes (e.g., blurs and/or increases the transparency of) at least a portion of representation 1122. In some embodiments, HMD X700 blurs an entirety of representation 1122. In some embodiments, HMD X700 displays a simulated lighting effect on at least a portion of representation 1114 of person 1112 mouth 1112a is not occluded and/or when mouth 1112a is occluded. In some embodiments, in response to a determination that mouth 1112a is occluded, HMD X700 changes the simulated lighting effect on representation 1114.

In some embodiments, HMD X700 attempts to track mouth 1112a when mouth 1112a is not occluded and/or when mouth 1112a is occluded. In some embodiments, HMD X700 tracks mouth 1112a with a first tracking function when mouth 1112a is not occluded and tracks mouth 1112a with a different tracking function when mouth 1112a is occluded. In some embodiments, HMD X700 displays representation 1122 (e.g., representation 1122a1 of the face of person 1112) with a different appearance when mouth 1112a is tracked with one tracking function than when mouth 1112a is tracked with a different tracking function. In some embodiments, in accordance with a determination that mouth 1112a is no longer occluded, HMD X700 displays representation 1114 (e.g., including representation 1114a of the face of person 1112) with the first visual fidelity (e.g., with the visual fidelity represented in FIG. 11A).

In some embodiments, in response to a determination that mouth 1112a is occluded, HMD X700 displays darker region 1126 on representation 1122. In FIG. 11E2, HMD X700 displays darker region 1126 on a portion of representation 1122a1 of the face of person 1112 that corresponds to mouth 1112a of person 1112. In some embodiments, HMD X700 displays darker region 1126 on portions of representation 1122 around (and including) representation 1122a1 of the face of person 1112 that corresponds to mouth 1112a of person 1112. In some embodiments, darker region 1126 simulates a shadow cast by object 1116 and/or left arm 1112c. In some embodiments, darker region 1126 simulates a hole and/or a void in representation 1122. In some embodiments, HMD X700 displays a color pattern that varies over time in darker region 1126. In some embodiments, HMD X700 displays the color pattern in darker region 1126 according to some or all of the features of the color pattern described above with reference to, e.g., FIGS. 70-7P.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

In FIG. 11F, mouth 1112a of person 1112 remains occluded as in FIGS. 11E1 and/or 11E2. In response to mouth 1112a remaining occluded (e.g., for a predetermined amount of time), computer system 700 further reduces the visual fidelity of the representation of person 1112 (or a portion of the representation of person 1112) displayed in environment 1120. In FIG. 11F, in response to mouth 1112a remaining occluded, computer system 700 removes display of representation 1122 and displays representation 1124 (e.g., replaces representation 1122 with representation 1124). In the example illustrated in FIG. 11F, representation 1124 is a generic shape that is not based on an anatomical feature of person 1112. In some embodiments, computer system 700 removes display of representation 1122 without displaying another representation of person 1112 (e.g., without displaying representation 1124). In some embodiments, if mouth 1112a further remains occluded (e.g., for a further predetermined amount of time), computer system 700 removes (e.g., fades out) display of representation 1124 (e.g., without displaying another representation of person 1112).

In some embodiments, the real-time communication session includes three or more participants. For example, in some embodiments, the real-time communication session includes a third participant other than the person represented by representation 1122 and the user of computer system 700. In some embodiments, the third participant has a different viewpoint than the user of computer system 700. Because the third participant has a different viewpoint, representation 1122 is displayed at a different viewing angle for the third participant than for the user of computer system 700. In some embodiments, representation 1122 of the person is displayed according to the techniques described with reference to FIGS. 11D-11F based on the viewing angle of representation 1122 for the third participant. Thus, representation 1122 is displayed with a different appearance (e.g., a different level of detail) for the third participant than for the user of computer system 700 because of the different viewing angle.

Additional descriptions regarding FIGS. 11A-11F are provided below in reference to method 1200 described with respect to FIG. 12.

FIG. 12 is a flow diagram of an exemplary method 1200 for displaying a representation of a person when a mouth of the person is occluded by an object, in some embodiments. In some embodiments, method 1200 is performed at a computer system (e.g., computer system 101 in FIG. 1A, 700, X700, a smart phone, a smart watch, a tablet computer, a laptop computer, a desktop computer, a wearable device, and/or head-mounted device) that is in communication with (e.g., includes and/or is connected to) one or more display generation components (e.g., display generation component 120 in FIGS. 1A, 3, and 4, 702, X702, a visual output device, a 3D display, a display having at least a portion that is transparent or translucent on which images can be projected (such as, e.g., a see-through display), a projector, a heads-up display, and/or a display controller) (e.g., a heads-up display, a display, a touchscreen, a projector, etc.). In some embodiments, the computer system is in communication with one or more cameras (e.g., a camera (e.g., color sensors, infrared sensors, and other depth-sensing cameras) that points downward at a user's hand or a camera that points forward from the user's head). In some embodiments, the computer system is in communication with one or more input devices (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)).

In some embodiments, method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1200 are, optionally, combined and/or the order of some operations is, optionally, changed.

The computer system displays (1202), via the one or more display generation components, a representation (e.g., 712, 714, 716, 722, 724, 726, 912, 922, 1114, 1118, 1122, 1124, a virtual representation, a 3D representation, an avatar, a graphical virtual object, and/or a collection of graphical virtual objects) of a person (e.g., 1112, the user of the computer system, a user of a remote computer system, a participant in a real-time communication session, and/or a participant in an XR environment or XR experience), including displaying a representation (e.g., 1114a and/or 1122a1) of a face (e.g., 1112a) of the person (or, in some embodiments, a representation of a portion of a face of the person, such as, e.g., a mouth of the person) with a first visual fidelity (e.g., a first fidelity of facial expression) (e.g., a first accuracy, a first precision, and/or a first degree of exactness with which the face of the person or a portion of the face of the person is reproduced) (e.g., as shown in FIGS. 11A and/or 11D). In some embodiments, the person is associated with (e.g., logged into, using, and/or wearing) the computer system. In some embodiments, the person is associated with (e.g., logged into, using, and/or wearing) an external device different from the computer system. In some embodiments, the representation of the person is associated with a user or computer system that is logged into, participating in, and/or connected to an XR experience and/or XR environment. In some embodiments, the computer system displays the representation of the person in response to detecting (e.g., via one or more input devices) a request (e.g., a manual input, a press of a button, a gesture, a touch input, a voice command, and/or other input) to display the representation of the person and/or an XR environment. In some embodiments, the computer system displays the representation of the person in response to detecting movement of the person. In some embodiments, the computer system provides (e.g., displays) an XR experience (e.g., an XR environment and/or a 3D environment) that includes the representation of the person. In some embodiments, the XR experience includes representations of multiple persons in an XR environment including, e.g., the representation of the person and a representation of a user of the computer system.

In response to a determination (e.g., by the computer system and/or by a remote computer system such as, e.g., a server or a device associated with a participant in an XR experience other than a user of the computer system) that a mouth of the person is occluded (e.g., that one or more cameras and/or image sensors are obstructed from viewing the mouth of the person and/or that the mouth of the person is covered) (e.g., as shown in FIGS. 11B, 11C, 11D, and/or 11F), the computer system displays (1204) the representation of the face of the person (or, in some embodiments, the representation of the portion of the face of the person) with a second visual fidelity (e.g., a second fidelity of facial expression) (e.g., a second accuracy, a second precision, and/or a second degree of exactness with which the face of the person or a portion of the face of the person is reproduced) that is less than the first visual fidelity. Displaying the representation of the face of the person with less visual fidelity when a mouth of the person is occluded indicates to the user that the mouth of the person is occluded, avoids confusing the user by not displaying the face of the person with an appearance that portrays a greater accuracy than is actually known, and updates the appearance of the representation of the person due to the occlusion without requiring user input, thereby providing improved visual feedback to the user, reducing the number of inputs needed to perform an operation, and providing a more varied, detailed, and/or realistic user experience while saving storage space. In some embodiments, in response to a determination that the mouth of the person is occluded, the computer system changes an appearance of the representation of the face of the person and/or changes a visual fidelity of the representation of the face of the person to a lower visual fidelity. In some embodiments, in response to a determination that the mouth of the person is occluded, the computer system changes an appearance of a representation of a portion of the face of the person and/or changes a visual fidelity of the representation of the portion of the face of the person to a lower visual fidelity. In some embodiments, the second visual fidelity conveys less or reduced certainty in the facial expression of the person than the first visual fidelity. In some embodiments, the computer system provides (e.g., outputs audio and/or displays a user interface of) a real-time (e.g., live) communication session. In some embodiments, the representation of the person is displayed and/or otherwise used to communicate during the real-time communication session.

In some embodiments, a real-time communication session includes real-time communication between participants of the real-time communication session, such as a user of the computer system and one or more other persons (e.g., one or more other users associated with other (e.g., different) computer systems). In some embodiments, providing the real-time communication session includes displaying representations of the person's body (e.g., facial expression, body expression, body position, and/or body movement) via the representation of the person. In some embodiments, providing the real-time communication session includes displaying the representation of the person and/or outputting audio corresponding to utterances of the person in real time. In some embodiments, the computer system and one or more other (e.g., remote) computer systems are in communication (e.g., wireless communication) with one another to enable transmission of information indicative of the representation of the person and/or audio corresponding to utterances of the person between the computer system and the one or more other computer systems. In some embodiments, a real-time communication session includes an XR experience (e.g., an XR environment). In some embodiments, the real-time communication session includes displaying the representation of the person (and, optionally, a representation of a second person) in an XR environment via display generation components of the computer system and the one or more other computer systems in communication via the real-time communication session.

In some embodiments, while displaying the representation of the face of the person with the first visual fidelity (e.g., as shown in FIGS. 11A and/or 11D), the computer system changes a state (e.g., an appearance) of the representation (e.g., 1114a and/or 1122a1) of the face of the person in response to a change (e.g., in response to detecting a change) in an expression (e.g., a facial expression) of the person (e.g., while maintaining display of the representation of the face of the person with the first visual fidelity). In some embodiments, the computer system changes a representation of an expression of the face of the person to correspond to (e.g., to match and/or simulate) an expression (or a change in expression) of the physical face of the person. In some embodiments, the computer system generates the state (e.g., the changed state or the updated state) of the representation of the face of the person. In some embodiments, a computer system of (e.g., being used by) the person represented by the representation of the person generates the state (e.g., the changed state or the updated state) of the representation of the face of the person. In some embodiments, the computer system detects the expression of the person. In some embodiments, a remote computer system, such as a computer system being used by the person represented by the representation of the person, detects the expression of the person. Changing a state of the representation of the face of the person in response to a change in the expression of the person informs the user about the state (or change in state) of the person, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, while displaying the representation of the face of the person with the second visual fidelity (e.g., as shown in FIGS. 11B, 11C, 11D, and/or 11F), the computer system maintains a state (e.g., an appearance) of the representation (e.g., 1114a and/or 1122a1) of the face (e.g., 1112*a*) of the person when an expression (e.g., a facial expression) of the person changes (e.g., while maintaining display of the representation of the face of the person with the second visual fidelity). In some embodiments, when the mouth of the person is occluded, the computer system does not change a representation of an expression of the face of the person to correspond to (e.g., to match and/or simulate) an expression (or a change in expression) of the physical face of the person (e.g., because the computer system cannot detect (or cannot detect above a threshold level of certainty) the expression (or change in expression) due to the mouth being occluded). Maintaining a state of the representation of the face of the person when an expression of the person changes while displaying the representation of the face of the person with the second visual fidelity (e.g., while the mouth of the person is occluded) indicates to the user that information about a state of the face of the person is reduced and avoids confusing the user by not giving the appearance of more information about the expression of the person than is actually available, thereby providing improved visual feedback to the user.

In some embodiments, displaying the representation (e.g., 1114*a* and/or 1122*a*1) of the face of the person with the second visual fidelity is performed when the mouth of the person is occluded by a hand (e.g., 1112*b*, a hand of 1112*c*, and/or a hand of the person). Displaying the representation of the face of the person with less visual fidelity when a mouth of the person is occluded by a hand informs the user of the position of one portion of the person (e.g., a hand) relative to another portion of the person (e.g., the face), thereby providing improved visual feedback to the user and providing a more varied, detailed, and/or realistic user experience while saving storage space.

In some embodiments, displaying the representation of the face of the person with the second visual fidelity is performed when the mouth of the person is occluded by a non-anatomical object (e.g., 1116 and/or an object that is not part of a body of the person). Displaying the representation of the face of the person with less visual fidelity when a mouth of the person is occluded by a non-anatomical object informs the user of the position of an object relative to a portion of the person (e.g., the face), thereby providing improved visual feedback to the user and providing a more varied, detailed, and/or realistic user experience while saving storage space.

In some embodiments, in response to a determination (e.g., by the computer system and/or by a remote computer system such as, e.g., a server or a device associated with a participant in an XR experience other than a user of the computer system) that the mouth of the person is occluded (e.g., as shown in FIGS. 11B, 11C, 11D, and/or 11F), the computer system visually deemphasizes at least a portion of the representation of the person. In some embodiments, the portion of the representation of the person includes a facial feature and/or a non-facial feature. In some embodiments, visually deemphasizing the portion of the representation of the person includes blurring the portion of the representation of the person, reducing an opacity of the portion of the representation of the person, and/or increasing a transparency of the portion of the representation of the person. Deemphasizing a portion of the representation of the person when the mouth of the person is occluded indicates to the user that the mouth of the person is occluded without requiring user input, thereby performing an operation when a set of conditions has been met without requiring further user input, providing improved visual feedback to the user, reducing the number of inputs needed to perform an operation, and providing a more varied, detailed, and/or realistic user experience while saving storage space.

In some embodiments, deemphasizing at least a portion of the representation of the person includes blurring an entirety of the representation of the person (e.g., displaying the representation of the person with a blur effect). Blurring an entirety of the representation of the person when the mouth of the person is occluded indicates to the user that the mouth of the person is occluded without requiring user input, thereby providing improved visual feedback to the user, reducing the number of inputs needed to perform an operation, and providing a more varied, detailed, and/or realistic user experience while saving storage space.

In some embodiments, deemphasizing at least a portion of the representation (e.g., 712, 714, 716, 722, 724, 726, 912, 922, 1114, 1118, 1122, and/or 1124) of the person includes increasing an animated noise effect (e.g., a periodic or pseudo-periodic spatially distributed high frequency visual noise such as a simulated film grain). In some embodiments, the animated noise effect includes simulated speckles, particles, and/or artifacts in a random pattern. In some embodiments, the animated noise effect includes a random physical texture made from small metallic silver particles found on processed photographic celluloid. In some embodiments, the speckles, particles, and/or artifacts vary in size over space and/or time. Increasing an animated noise effect when the mouth of the person is occluded indicates to the user that the mouth of the person is occluded without requiring user input, thereby providing improved visual feedback to the user, reducing the number of inputs needed to perform an operation, and providing a more varied, detailed, and/or realistic user experience while saving storage space.

In some embodiments, deemphasizing at least a portion of the representation of the person includes changing a simulated lighting effect (e.g., dimming a simulated lighting effect) on the at least a portion of the representation (e.g., 712, 714, 716, 722, 724, 726, 912, 922, 1114, 1118, 1122, and/or 1124) of the person. In some embodiments, changing the simulated lighting effect includes changing a color, changing a pattern, changing a style, changing a diffusion amount, and/or changing a beam angle of the simulated lighting effect. Changing a simulated lighting effect on the at least a portion of the representation of the person when the mouth of the person is occluded indicates to the user that the mouth of the person is occluded without requiring user input, thereby providing improved visual feedback to the user, reducing the number of inputs needed to perform an operation, and providing a more varied, detailed, and/or realistic user experience while saving storage space.

In some embodiments, while displaying the representation of the face of the person with the first visual fidelity (e.g., as shown in FIGS. 11A and/or 11D), the computer system tracks a mouth of the person according to a first tracking algorithm (or first tracking technique or first tracking criteria); and in response to a determination that the mouth of the person is occluded (e.g., as shown in FIGS. 11B, 11C, 11D, and/or 11F), the computer system tracks the mouth of the person according to a second tracking algorithm (or second tracking technique or second tracking criteria) that is different from the first tracking algorithm. In some embodiments, the first tracking algorithm uses a first set of tracking parameters, weightings, measurement window, noise model, and/or update rate. In some embodiments, the second tracking algorithm uses a second set of tracking parameters, weightings, measurement window, noise model, and/or update rate that is different from the first set of tracking parameters and/or update rate. In some embodiments, tracking the mouth of the person according to the second tracking algorithm results in a different appearance of the representation of the face of the person than tracking the mouth of the person according to the first tracking algorithm. Changing a tracking algorithm in response to a determination that the mouth of the person is occluded enables the computer system to select a tracking algorithm based on the context, conserve processing resources, and provide an appearance of the representation of the user that better reflects the information known about the mouth of the person, thereby performing an operation when a set of conditions has been met without requiring further user input, providing improved visual feedback to the user, and providing a more varied, detailed, and/or realistic user experience while saving storage space.

In some embodiments, after displaying the representation of the face of the person with the second visual fidelity (e.g., as shown in FIGS. 11B, 11C, 11D, and/or 11F): in response to a determination (e.g., by the computer system and/or by a remote computer system such as, e.g., a server or a device associated with a participant in an XR experience other than a user of the computer system) that the mouth of the person is not (e.g., no longer) occluded (e.g., when the occlusion ends) (e.g., as shown in FIGS. 11A and/or 11D), the computer system displays the representation of the face of the person with the first visual fidelity. Displaying the representation of the face of the person with the first visual fidelity in response to a determination that the mouth of the person is not occluded enables the computer system to update increase the visual fidelity with the occlusion is removed without user input and inform the user of the state of the person, thereby performing an operation when a set of conditions has been met without requiring further user input, providing improved visual feedback to the user, and providing a more varied, detailed, and/or realistic user experience while saving storage space.

In some embodiments, after displaying the representation of the face of the person with the second visual fidelity (e.g., as shown in FIGS. 11B, 11C, 11D, and/or 11F): in accordance with a determination (e.g., by the computer system and/or by a remote computer system such as, e.g., a server or a device associated with a participant in an XR experience other than a user of the computer system) that the mouth of the person has been occluded for a first threshold amount of time (e.g., a non-zero threshold amount of time, 1 second, 2 seconds, 5 seconds, 10 seconds, 30 seconds, 60 seconds, 90 seconds, or 180 seconds), the computer system ceases display of the representation of the person (e.g., ceasing display of 712, 714, 716, 722, 724, 726, 912, 922, 1114, 1118, 1122, and/or 1124). In some embodiments, ceasing display of the representation of the person includes fading out (e.g., gradually fading out) the representation of the person. Ceasing display of the representation of the person in accordance with a determination that the mouth of the person has been occluded for a first threshold amount of time indicates to the user that the mouth of the person remains occluded, conserves resources, and avoids confusing the user by displaying a portion of the representation of the person for which information is not available, thereby performing an operation when a set of conditions has been met without requiring further user input, providing improved visual feedback to the user, and providing a more varied, detailed, and/or realistic user experience while saving storage space.

In some embodiments, the representation of the person includes an anatomical representation of the person, and after displaying the representation of the face of the person with the second visual fidelity (e.g., as shown in FIGS. 11B, 11C, 11D, and/or 11F) in accordance with a determination (e.g., by the computer system and/or by a remote computer system such as, e.g., a server or a device associated with a participant in an XR experience other than a user of the computer system) that the mouth of the person has been occluded for a second threshold amount of time (e.g., a non-zero threshold amount of time, 1 second, 2 seconds, 5 seconds, 10 seconds, 30 seconds, 60 seconds, 90 seconds, or 180 seconds), the computer system displays a non-anatomical representation (e.g., 716, 1118, and/or 1124) of the person without displaying the anatomical representation (e.g., the computer system replaces the anatomical representation of the person with the non-anatomical representation of the person). In some embodiments, displaying a non-anatomical representation of the person without displaying the anatomical representation includes ceasing display of the anatomical representation of the person. Displaying a non-anatomical representation of the person without displaying the anatomical representation in accordance with a determination that the mouth of the person has been occluded for a second threshold amount of time indicates to the user that the mouth of the person remains occluded, conserves resources, and avoids confusing the user by displaying a less accurate representation of the person when information is not available, thereby performing an operation when a set of conditions has been met without requiring further user input, providing improved visual feedback to the user, and providing a more varied, detailed, and/or realistic user experience while saving storage space.

In some embodiments, displaying the representation of the face of the person with the second visual fidelity (e.g., as shown in FIGS. 11B, 11C, 11D, and/or 11F) includes: in accordance with a determination (e.g., by the computer system and/or by a remote computer system such as, e.g., a server or a device associated with a participant in an XR experience other than a user of the computer system) that the face of the person is being tracked with a first degree of confidence, displaying the representation of the face of the person with a first expression (e.g., an expression that attempts to accurately reflect the actual physical expression on the face of the person); and in accordance with a determination (e.g., by the computer system and/or by a remote computer system such as, e.g., a server or a device associated with a participant in an XR experience other than a user of the computer system) that the face of the person is being tracked with a second degree of confidence that is different from the first degree of confidence, displaying the representation of the face of the person with a second expression (e.g., an expression that does not attempt to accurately reflect the actual physical expression on the face of the person; and/or a neutral expression). In some embodiments, in accordance with a determination that the face of the person is being tracked with the first degree of confidence and that a first expression (e.g., facial expression) of the person is detected (e.g., by the computer system and/or by a remote computer system such as, e.g., a server or a device associated with a participant in an XR experience other than a user of the computer system), the computer system displays the representation of the face of the person with the first expression; and in accordance with a determination that the face of the person is being tracked with the first degree of confidence and that a second expression (e.g., facial expression) of the person that is different from the first expression of the person is detected (e.g., by the computer system and/or by a remote computer system such as, e.g., a server or a device associated with a participant in an XR experience other than a user of the computer system), the computer system displays the representation of the face of the person with a third expression that is different from the first expression (and, in some embodiments, the second expression). In some embodiments, in accordance with a determination that the face of the person is being tracked with the second degree of confidence and that the first expression of the person is detected (e.g., by the computer system and/or by a remote computer system such as, e.g., a server or a device associated with a participant in an XR experience other than a user of the computer system), the computer system displays the representation of the face of the person with the second expression; and in accordance with a determination that the face of the person is being tracked with the second degree of confidence and that the second expression of the person that is different from the first expression of the person is detected (e.g., by the computer system and/or by a remote computer system such as, e.g., a server or a device associated with a participant in an XR experience other than a user of the computer system), the computer system displays the representation of the face of the person with the second expression (e.g., the same expression as displayed for the first expression of the person). Displaying an expression of the representation of the face of the person based on the degree of confidence with which the face of the person is being tracked indicates to the user the degree of confidence with which the face of the person is being tracked and enables the computer system to conserve resources when the degree of confidence is low and to adjust the expression of the representation of the person when the degree of confidence changes without user input, thereby performing an operation when a set of conditions has been met without requiring further user input, reducing the number of inputs needed to perform an operation, providing improved visual feedback to the user, and providing a more varied, detailed, and/or realistic user experience while saving storage space.

In some embodiments, the representation of the person is displayed as a part of a real-time communication session between the user of the computer system and one or more other participants including a participant corresponding to the person represented by the representation of the person. Displaying the representation of the person as a part of a real-time communication session enables the person to communicate via the representation of the person without having to share a camera feed, thereby providing improved visual feedback to the user and improving privacy and/or security.

In some embodiments, displaying the representation of the person includes displaying movement of the representation of the person (e.g., movement of 712 from the position in FIG. 7A to the position in FIG. 7B; movement of 714 from the position in FIG. 7C to the position in FIG. 7D; movement of 722 from the position in FIG. 7H to the position in FIG. 7I; movement of 912 from the position in FIG. 9A to the position in FIGS. 9B, 9C, and/or 9D; and/or movement of 922 from the position in FIG. 9F to the position in FIGS. 9G1, 9G2, 9H, and/or 91) in response to physical movement (e.g., a change in facial expression, movement of a facial feature, movement of a body, movement of a hand relative to the body, and/or movement of an arm relative to the body) of the person (e.g., the movement of the representation of the person corresponds to and/or simulates the physical movement of the person). In some embodiments, a computer system associated with the person detects the physical movement of the user. In some embodiments, one or more remote sensors detect the physical movement of the user. Displaying movement of the representation of the person in response to physical movement of the person informs the user about the state (or change in state) of the person, conveys information from the person, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, in response to the determination that the mouth of the person is occluded, the computer system displays, via the one or more display generation components, a darker region (e.g., 1126) (e.g., a simulated or virtual shadow effect) on a portion of the representation (e.g., 1122a1) of the face of the person that corresponds to a mouth of the person (e.g., display the portion of the representation of the face of the person that corresponds to the mouth of the person with the darker region) (e.g., darken and/or dim a portion of the representation of the face of the person). In some embodiments, the darker region is displayed on and/or applied to a representation of the mouth of the person. In some embodiments, the darker region simulates a shadow cast by a hand of the person and/or other object that is occluding the mouth of the person. In some embodiments, the darker region is displayed on and/or applied to a representation of a neck, shoulder, and/or upper chest of the person (e.g., in addition to the portion of the representation of the face of the person that corresponds to the mouth of the person). Displaying a darker region on the representation of the person provides information about the state (or, optionally, change in state) of the person, provides a more realistic representation of the person, and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, displaying the darker region (e.g., 1126) on the portion of the representation (e.g., 1122a1) of the face of the person that corresponds to a mouth of the person includes displaying a color pattern (e.g., 728) (e.g., within, overlaid on, and/or adjacent to the darker region or the simulated shadow effect) that varies (e.g., continuously) over time in the darker region (e.g., the color pattern is applied with and/or as part of the darker region or the simulated shadow effect). In some embodiments, the color pattern applied to the darker region or the simulated shadow effect includes any of the features of the color pattern described above with reference to, e.g., FIGS. 70-7P. Displaying a color pattern that varies over time in the darker region provides a noticeable and dynamic indication about the state (or, optionally, change in state) of the person and varies the appearance of the representation of the person without requiring user input, thereby providing improved visual feedback to the user, reducing the number of inputs needed to perform an operation, and providing a more varied, detailed, and/or realistic user experience while saving storage space.

FIGS. 13A-13N illustrate examples of displaying a representation of a person, in accordance with some embodiments. In some embodiments, an appearance of the representation is changed by shifting a boundary of the representation of the person to display different portions of the representation and to change which portions of the representation of the person are visible. In some embodiments, the boundary is moved to avoid displaying a representation of a portion of a person for which an appearance is uncertain, which can improve the overall appearance of the representation of the person. FIG. 14 is a flow diagram of an exemplary method 1400 for displaying a representation of a person with a boundary that is shifted over time. The user interfaces in FIGS. 13A-13N are used to illustrate the processes described below, including the processes in FIG. 14. In some embodiments, the user interfaces described in FIGS. 13A-13N are displayed on a head-mounted device and a user provides inputs using air gestures, voice commands, and/or inputs on a remote control.

FIG. 13A illustrates an XR experience involving Person 1 (also referred to as person 1302A) and Person 2 (also referred to as person 1302B). In the illustrated embodiment, person 1302A and person 1302B share a common XR environment 1301 and are represented in environment 1301 by respective representations, representation 1306A of person 1302B and representation 1306B of person 1302A. Person 1302A wears computer system 1300A and person 1302B wears computer system 1300B. Computer system 1300A displays XR environment 1301, including representation 1306A of person 1302B, from a viewpoint of person 1302A via a display generation component 1304A. Similarly, computer system 1300B displays XR environment 1301, including representation 1306B of person 1302A, from a viewpoint of person 1302B via display generation component 1304B. In some embodiments, computer system 1300A and/or computer system 1300B is a head-mounted device. In some embodiments, any of the features, components, and/or parts, including the arrangements and configurations thereof shown in FIGS. 1B-1P can be included, either alone or in any combination, in computer system 1300A and/or computer system 1300B.

In some embodiments, computer system 1300A and/or computer system 1300B includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display 700a includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, computer system 700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, computer system 1300A and/or computer system 1300B includes any of the features, components, and/or parts of any of first button 1-128, button 11.1.1-114, second button 1-132, and or dial or button 1-328, either alone or in any combination. In some embodiments, computer system 1300A and/or computer system 1300B includes one or more audio output components (e.g., electronic component 1-112) for generating audio feedback (e.g., audio output), optionally generated based on detected events and/or user inputs detected by computer system 1300A and/or computer system 1300B.

Turning to FIG. 13B, techniques for displaying representations of people are described with reference to representation 1306A of Person 2 (person 1302B) displayed on computer system 1300A of Person 1 (person 1302A). The same or analogous techniques can be applied to representation 1306B of Person 1 (person 1302A) displayed on computer system 1300B of Person 2 (person 1302B).

As shown in FIG. 13B, representation 1306A of Person 2 includes upper portion 1310A, first hand portion 1310B, and second hand portion 1310C. Representation 1306A has a boundary that includes boundary 1312A of upper portion 1310A, boundary 1312B of first hand portion 1310B, and boundary 1312C of second hand portion 1310C. Boundary 1312A, boundary 1312B, and boundary 1312C are collectively referred to as boundary 1312.

In some embodiments, representation 1306A is based on an appearance and/or position of corresponding physical portions of Person 2 detected by computer system 1300B worn by Person 2. For example, computer system 1300B includes one or more sensors (e.g., cameras) with field of view 1314A and field of view 1314B. Field of view 1314A is directed downward and can detect a mouth of Person 2 and/or other portions of Person 2 that are in field of view 1314A. Field of view 1314B is directed more forward compared to field of view 1314A and can detect the hands of Person 2 when they are in field of view 1314B. The appearance of upper portion 1310A (e.g., shoulders, a mouth, and/or a chin of representation 1306A) is based at least in part on portions of Person 2 (e.g., the shoulders, mouth, and/or chin of Person 2) detected in field of view 1314A, and the appearance of first hand portion 1310B and second hand portion 1310C is based at least in part on the hands of Person 2 detected in field of view 1314A and/or field of view 1314B.

In some embodiments, different portions of representation 1306A are displayed (e.g., made visible and/or revealed) by changing the position of (e.g., moving and/or shifting) boundary 1312 relative to representation 1306A. In some embodiments, the position of boundary 1312 changes slightly and/or gradually over time when a position and/or a certainty of an appearance of Person 2 remains constant or does not change significantly over time. For example, Person 2 is in the same position in FIG. 13C as in FIG. 13B, but at different times. Because Person 2 is in the same position in FIG. 13C as in FIG. 13B, representation 1306A is in the same position in FIG. 13C as in FIG. 13B, but boundary 1312 is in a different position in FIG. 13C than in FIG. 13B. For example, in FIG. 13C, boundary 1312A has a different (e.g., slightly different) position and/or shape compared to the position and/or shape of boundary 1312A in FIG. 13B; boundary 1312B has a different (e.g., slightly different) position and/or shape compared to the position and/or shape of boundary 1312B in FIG. 13B; and/or boundary 1312C has a different (e.g., slightly different) position and/or shape compared to the position and/or shape of boundary 1312C in FIG. 13B.

In some embodiments, representation 1306A (or one or more portions of representation 1306A) moves in response to movement of Person 2. For example, in FIG. 13C, Person 2 begins to move his hands upward (e.g., as indicated by the upward-pointing arrows) to a position next to his head shown in FIG. 13D. In response to moving his hands from the position in FIG. 13C to the position in FIG. 13D, first hand portion 1310B and second hand portion 1310C move according to the movement of the hands of Person 2. In some embodiments, the position and/or movement of the hands of Person 2 is detected by computer system 1300B.

In some embodiments, in response to movement of Person 2, computer system 1300A displays a different portion of representation 1306A by changing a position of boundary 1312. For example, in FIG. 13D, boundary 1312A is moved (e.g., upward and/or to a side) towards the face and/or head of upper portion 1310A to display less (e.g., less of the chest and/or shoulders) of upper portion 1310A; boundary 1312B is moved toward the fingertips of first hand portion 1310B to display less (e.g., less forearm, wrist, and/or hand) of first hand portion 1310B; and boundary 1312C is moved toward the fingertips of second hand portion 1310C to display less (e.g., less forearm, wrist, and/or hand) of second hand portion 1310C. In some embodiments, the boundary shifts gradually over time (e.g., moves without a discontinuity in the position of the boundary). Accordingly, in the embodiment illustrated in FIG. 13D, the boundary (e.g., boundary 1312A) of one portion (e.g., upper portion 1310A) of representation 1306A changes in response to movement of a portion of Person 2 that corresponds to a different portion (e.g., first hand portion 1310B and/or second hand portion 1310C) of representation 1306A.

In some embodiments, boundary 1312 is moved because a certainty of the appearance of Person 2 changes. For example, in some embodiments, less of the hands of Person 2 is within the field of view of computer system 1300B at the position in FIG. 13D compared to FIG. 13C. As a result, the appearance of the hands of Person 2 is less certain compared to FIG. 13C. Because the certainty of the appearance of the hands of Person 2 has decreased compared to FIG. 13C, boundary 1312 is moved to display less of representation 1306A. In this way, the position of boundary 1312 and/or the amount of representation 1306A that is displayed indicates the certainty of the appearance of Person 2. In some embodiments, the boundary (e.g., boundary 1312A) of one portion (e.g., upper portion 1310A) of representation 1306A changes in response to a change in certainty of an appearance of a portion of Person 2 that corresponds to a different portion (e.g., first hand portion 1310B and/or second hand portion 1310C) of representation 1306A.

In FIG. 13D, Person 2 continues moving his hands upward to the position shown in FIG. 13E (e.g., above his head and/or further out of field of view 1314A and/or field of view 1314B). In response to the further movement of the hands of Person 2, first hand portion 1310B and second hand portion 1310C move upward relative to upper portion 1310A, and boundary 1312 continues moving in the same direction as described in FIG. 13D. For example, boundary 1312A is moved (e.g., upward and/or to the side) towards the face and/or head of upper portion 1310A to display less (e.g., less of the chest, shoulders, and/or body) of upper portion 1310A; boundary 1312B is moved toward the fingertips of first hand portion 1310B to display less (e.g., less or no forearm, wrist, and/or hand) of first hand portion 1310B; and boundary 1312C is moved toward the fingertips of second hand portion 1310C to display less (e.g., less or no forearm, wrist, and/or hand) of second hand portion 1310C.

In some embodiments, computer system 1300B is capable of estimating a position and/or shape of the shoulder(s) of Person 2 with greater certainty when the arms of Person 2 are lower than when the arms of Person 2 are higher (e.g., even when the field of view of the sensor(s) of computer system 1300B is substantially the same). For example, in the embodiment illustrated in FIGS. 13C-13E, the appearance of Person 2's shoulders is less certain in FIG. 13D than in FIG.

13C because the arms of Person 2 are higher (e.g., raised and/or elevated) in FIG. 13D compared to FIG. 13C and less certain in FIG. 13E than in FIG. 13D because the arms of Person 2 are higher in FIG. 13E compared to FIG. 13D. As a result, in FIG. 13D, boundary 1312A is shifted to show less of the portion of representation 1306A that corresponds to the shoulders of Person 2 than in FIG. 13C; and in FIG. 13E, boundary 1312A is shifted to show less of (e.g., hide and/or not show) the portion of representation 1306A that corresponds to the shoulders of Person 2 compared to FIG. 13D.

In some embodiments, boundary 1312 has simulated inertia and continues moving in a direction after Person 2 has stopped moving and/or the certainty of the appearance of Person 2 has stopped changing. For example, in FIG. 13F, boundary 1312 (e.g., including boundary 1312A, boundary 1312B, and/or boundary 1312C) continues moving in the direction described in FIGS. 13D and 13E. In some embodiments, boundary 1312 stops moving and then moves back (e.g., in an opposite direction). For example, in FIG. 13G compared to FIG. 13F, boundary 1312 is moved (e.g., downward and/or to the side) away from the face and/or head of upper portion 1310A to display more (e.g., more of the shoulders and/or body) of upper portion 1310A; boundary 1312B is moved away from the fingertips of first hand portion 1310B to display more (e.g., more wrist and/or arm) of first hand portion 1310B; and boundary 1312C is moved away from the fingertips of second hand portion 1310C to display more (e.g., more wrist and/or arm) of second hand portion 1310C.

In some embodiments, boundary 1312 is moved to display a different portion of representation 1306A in response to Person 2 turning his head. In FIG. 13H, the head of Person 2 is turned to Person 2's right (e.g., away from his left shoulder) compared to the position of Person 2 in FIG. 13B. In some embodiments, field of view 1314A and/or field of view 1314B move with (e.g., are fixed relative to) computer system 1300B, as illustrated in FIG. 13H and FIG. 13I. Since the head of Person 2 is turned to the right, the appearance of Person 2's left shoulder is uncertain because the left shoulder is not in field of view 1314A and/or field of view 1314B. Because the appearance of Person 2's left shoulder is uncertain, boundary 1312A is positioned (e.g., moved and/or shifted) to hide (e.g., not show) the portion of representation 1306A that corresponds to Person 2's left shoulder.

In the embodiment illustrated in FIG. 13H, the appearance of the side and/or back of Person 2's head (e.g., including hair on the side and/or back of Person 2's head) is uncertain because the side and/or back of Person 2's head are not in field of view 1314A and/or field of view 1314B. As a result, when Person 2's head is turned, boundary 1312A is positioned (e.g., moved and/or shifted) to hide (e.g., not show and/or remove) a representation of at least a portion of the side and/or back of the head of Person 2 (e.g., including hair on the side and/or back of the head of Person 2). In the illustrated embodiment, because the appearance of a part of Person 2 that corresponds to a part of upper portion 1310A is less certain when the head of Person 2 is turned, boundary 1312B on first hand portion 1310B and boundary 1312C on second hand portion 1310C are moved to display less of first hand portion 1310B and second hand portion 1310C, respectively.

In FIG. 13I, the head of Person 2 is turned further compared to FIG. 13H. As a result, the appearance of Person 2 is less certain than in FIG. 13H. As a result, boundary 1312 is moved to display less of the side and/or back of the head of representation 1306A (e.g., including hair on the side and/or back of representation 1306A), less of the right shoulder of representation 1306A, and less of first hand portion 1310B and second hand portion 1310C.

Figure 13J:
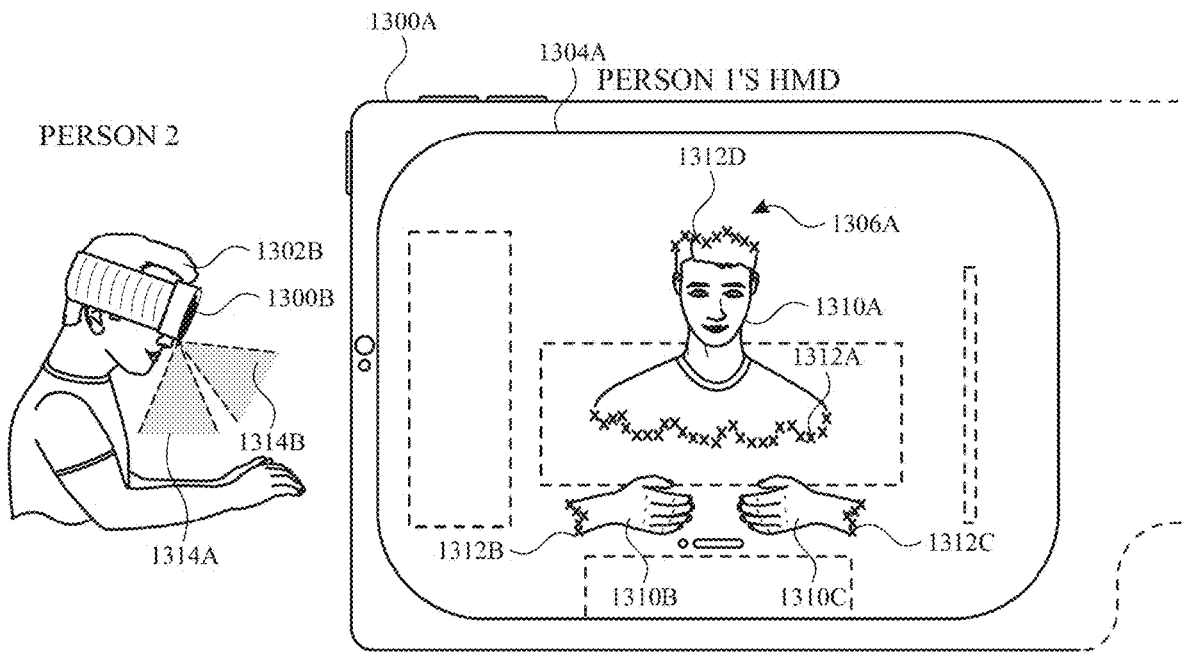

In FIG. 13J, the head of Person 2 is tilted down compared to FIG. 13B. In response to the head of Person 2 being tilted down, the representation of the head of Person 2 in representation 1306 is oriented (e.g., moved and/or tilted) down. The appearance of the top of the head of Person 2 is uncertain (e.g., because the top of the head of Person 2 is not in field of view 1314A and/or field of view 1314B). Because the appearance of the top of the head of Person 2 is uncertain, representation 1306A includes boundary 1312D, which is positioned so that representation 1306A does not include a representation of the top of the head of Person 2 (e.g., the top and/or back of the head of representation 1306A is hidden). In some embodiments, in response to the head of Person 2 being tilted down, boundary 1312B and boundary 1312C are moved to display less of first hand portion 1310B and second hand portion 1310C, respectively.

Figure 13K:
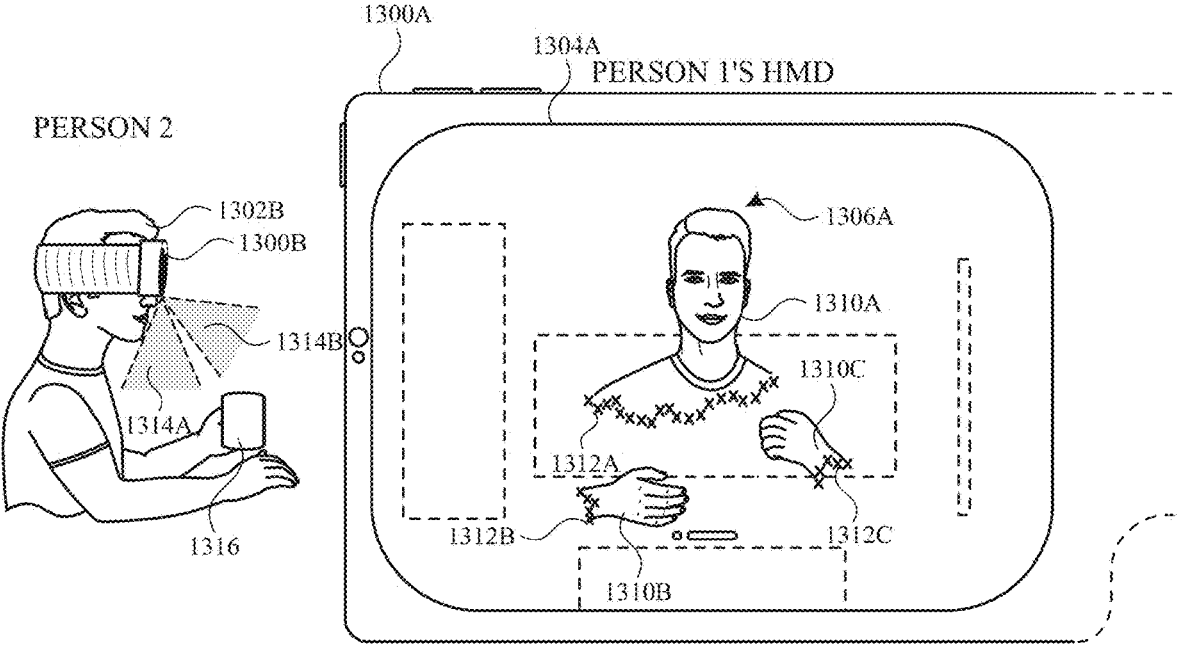

In some embodiments, boundary 1312 is moved in response to a portion of Person 2 being obscured to avoid displaying a representation of the obscured portion. FIGS. 13K-13N illustrate an embodiment in which a mouth of Person 2 is obscured in field of view 1314A by object 1316 (e.g., a physical object such as a coffee mug). In the embodiment illustrated in FIGS. 13K-13N, computer system 1300A does not display a representation of object 1316. In some embodiments, computer system 1300A displays a representation (e.g., a virtual representation) of object 1316. In some embodiments, the techniques described with reference to object 1316 are applied when the mouth of Person 2 is obscured by a hand and/or other portion of Person 2. In FIG. 13K, Person 2 is holding object 1316 away from his mouth. Because the mouth of Person 2 is not obscured, boundary 1312 (and boundary 1312A in particular) is positioned so that the representation of the mouth of Person 2 is displayed in representation 1306A.

Figure 13L:
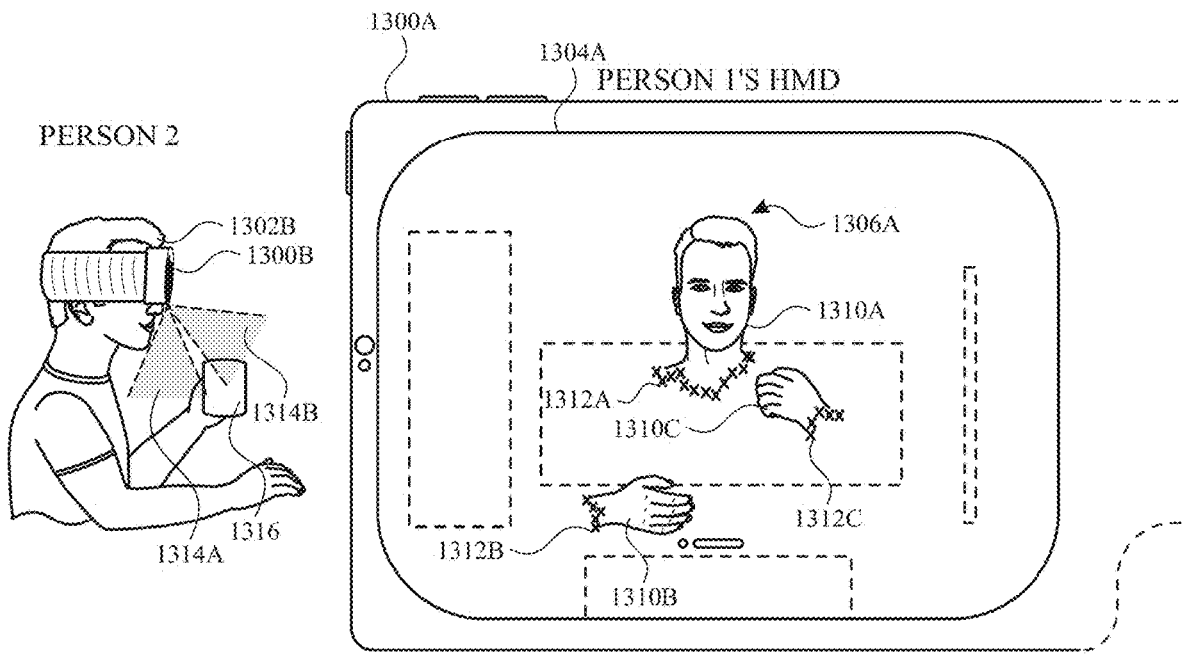

In FIG. 13L, object 1316 is moved toward the mouth of Person 2 (e.g., partially into field of view 1314A). In response to object 1316 being brought toward the mouth of Person 2, boundary 1312 (e.g., boundary 1312A) is moved closer to the representation of the mouth of Person 2 in representation 1306 and less of upper portion 1310A is displayed. In some embodiments, as object 1316 is brought closer to the mouth of Person 2, boundary 1312B and boundary 1312C are moved to display less of first hand portion 1310B and second hand portion 1310C, respectively. In some embodiments, because object 1316 is closer to (e.g., partially obscures) the hand of Person 2 that corresponds to second hand portion 1310C, less of second hand portion 1310C is displayed than first hand portion 1310B (e.g., boundary 1312C is moved more than boundary 1312B).

Figure 13M:
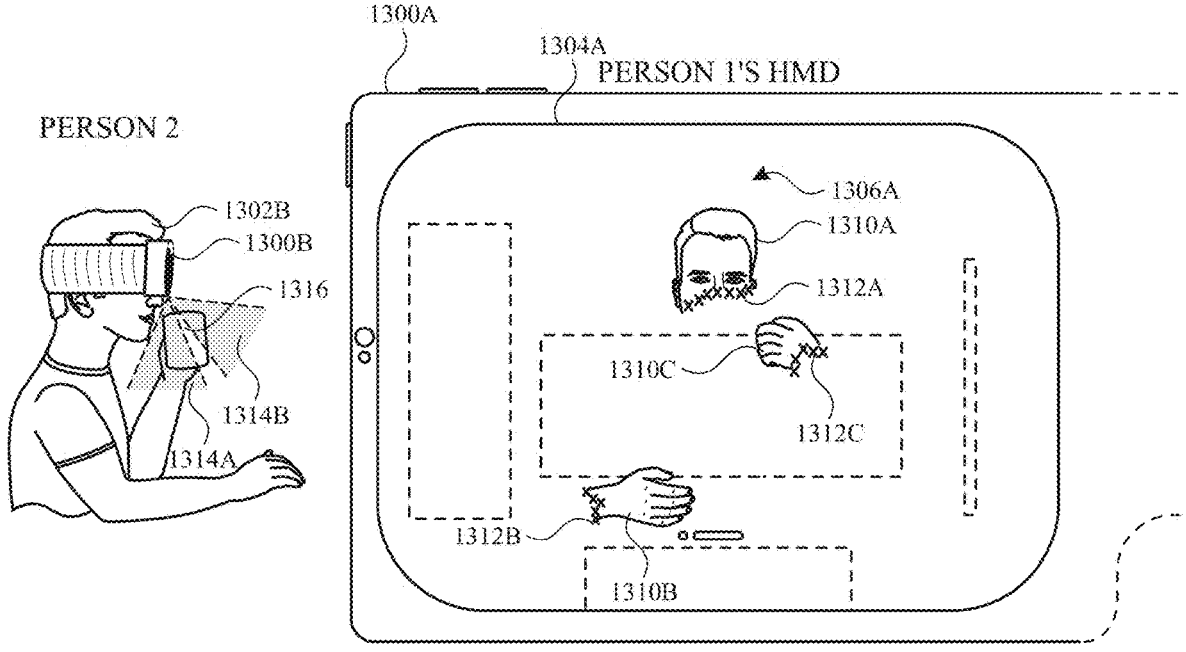
Figure 13N:
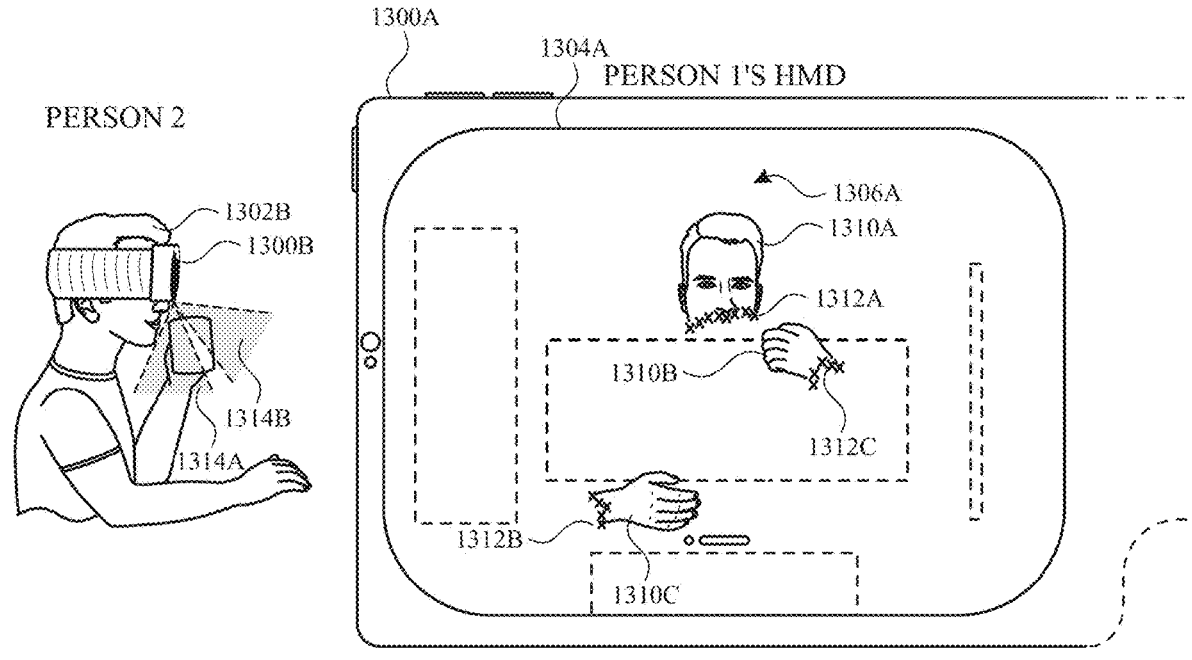

In FIG. 13M, object 1316 is moved further toward the mouth of Person 2 to a position that obscures the mouth of Person 2. For example, object 1316 blocks computer system 1300B from detecting the mouth of Person 2 in field of view 1314A. In response to the mouth of Person 2 being obscured, computer system 1300A displays representation 1306A without a representation of the mouth of Person 2. Boundary 1312A is moved toward the top of upper portion 1310A past the position at which the representation of the mouth of Person 2 would be displayed. In some embodiments, when the mouth of Person 2 is obscured, boundary 1312B and boundary 1312C are moved to display less of first hand portion 1310B and second hand portion 1310C, respectively. In some embodiments, because object 1316 is closer to (e.g., partially obscures) the hand of Person 2 that corresponds to second hand portion 1310C, less of second hand portion 1310C is displayed than first hand portion 1310B (e.g., boundary 1312C is moved more than boundary 1312B).

In some embodiments, boundary 1312 has simulated inertia and continues moving after Person 2 has stopped moving and/or the certainty of the appearance of Person 2 has stopped changing (e.g., similar to as described with reference to FIGS. 13E-13G). For example, after movement of object 1316 stops, boundary 1312 (e.g., including boundary 1312A, boundary 1312B, and/or boundary 1312C) continues moving in the direction described in FIG. 13L (e.g., to the position shown in FIG. 13M). In some embodiments, boundary 1312 stops moving and then moves back (e.g., in a different and/or an opposite direction). For example, in FIG. 13N compared to FIG. 13M, boundary 1312 is moved (e.g., downward and/or to a side) away from the head of upper portion 1310A (e.g., toward where the representation of the mouth would be displayed) to display more (e.g., more of the face, neck, shoulders, and/or body) of upper portion 1310A; boundary 1312B is moved away from the fingertips of first hand portion 1310B to display more of first hand portion 1310B; and boundary 1312C is moved away from the fingertips of second hand portion 1310C to display more of second hand portion 1310C.

Additional descriptions regarding FIGS. 13A-13N are provided below in reference to method 1400 described with respect to FIG. 14.

FIG. 14 is a flow diagram of an exemplary method 1400 for displaying a representation of a person with a boundary that shifts over time, in some embodiments. In some embodiments, method 1400 is performed at a computer system (e.g., computer system 101 in FIG. 1A, 700, X700, 1300A, 1300B, 1-100, 1-200, 1-302, 1-406, 3-100, 6-100, 6-200, 6-300, 6-400, 11.1.1-100, 11.1.2-100, a smart phone, a smart watch, a tablet computer, a laptop computer, a desktop computer, a wearable device, and/or head-mounted device) that is in communication with (e.g., includes and/or is connected to) one or more display generation components (e.g., display generation component 120 in FIGS. 1A, 3, and 4, 702, X702, 1304A, 1304B, 1-120a, 1-120b, 11.1.1-104a, 11.1.1-104b 11.3.2-100, 11.3.2-200, a visual output device, a 3D display, a display having at least a portion that is transparent or translucent on which images can be projected (such as, e.g., a see-through display), a projector, a heads-up display, and/or a display controller) (e.g., a heads-up display, a display, a touchscreen, a projector, etc.). In some embodiments, the computer system is in communication with one or more cameras (e.g., a camera (e.g., color sensors, infrared sensors, and other depth-sensing cameras) that points downward at a user's hand(s) or a camera that points forward from the user's head). In some embodiments, the computer system is in communication with one or more input devices (e.g., 1-128; 11.1.1-114; 1-132; 1-328a; a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)).

In some embodiments, method 1400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1400 are, optionally, combined and/or the order of some operations is, optionally, changed.

According to method 1400, while displaying, via the one or more display generation components, a representation (e.g., 1306A, 1306B, 1310A, 1310B, and/or 1310C) (e.g., a virtual representation, a 3D representation, an avatar, a graphical virtual object, and/or a collection of graphical virtual objects) of a person (e.g., 1302A and/or 1302B) (e.g., the user of the computer system, a user of a remote computer system, a participant in a real-time communication session, and/or a participant in an XR environment or XR experience), the computer system updates (1402) the representation of the person over time. Updating the representation of the person over time includes moving (1404) one or more portions (e.g., 1310A, 1310B, 1310C, and/or portions thereof) of the representation of the person based on (e.g., in response to) movement (e.g., detected physical movement) of one or more corresponding portions of the person (e.g., the hand raise gesture and/or arm raise gesture in FIGS. 13C-13G; the head turn gesture in FIGS. 13H-13I; and/or the head tilt gesture illustrated in FIG. 13J) (e.g., movement of one or more body parts of the person, changes in facial expression including mouth movement, and/or eye movement) (e.g., the representation moves with movement of the person; and/or one or more portions of the representation move in response to movement of one or more corresponding body parts of the person). In some embodiments, updating the representation of the person includes displaying an animation of the representation of the person according to movement of the person. Updating the representation of the person over time includes, while moving one or more portions of the representation of the person based on movement (e.g., detected physical movement) of one or more corresponding portions of the person (e.g., portions of 1302A and/or portions of 1302B), shifting (1406) a boundary (e.g., 1312A, 1312B, 1312C, 1312D, a dynamic boundary, a fluid boundary, a liquid boundary, an edge, a dynamic edge, a fluid edge, and/or a liquid edge) of the representation of the person over time to change which portions of the representation of the person are visible, wherein the boundary shifts gradually (e.g., without a discontinuity in position) over time.

Shifting the boundary includes, at a first time (e.g., FIG. 13B), displaying (1408), via the one or more display generation components, a first portion of the representation of the person (e.g., the portion of 1306A in FIG. 13B) that is (e.g., at least in part) based on (e.g., defined by, delineated by, and/or determined by) a first position of the boundary (e.g., the position of 1312A, 1312B, and/or 1312C in FIG. 13B). Updating the representation of the person over time includes, after displaying the first portion of the representation of the person that is based on the first position of the boundary, displaying (1410) (e.g., at a second time that is different from the first time), via the one or more display generation components, a second portion of the representation of the person (e.g., the portion of 1306A in FIGS. 13C, 13D, 13E, 13F, 13G, 13H, 13I, 13J, 13K, 13L, 13M, and/or 13N) that is (e.g., at least in part) based on (e.g., defined by, delineated by, and/or determined by) a second position of the boundary (e.g., the position of 1312A, 1312B, and/or 1312C in FIGS. 13C, 13D, 13E, 13F, 13G, 13H, 13I, 13J, 13K, 13L, 13M, and/or 13N) that is different from the first position of the boundary, wherein the second portion of the representation of the person is different from the first portion of the representation of the person (e.g., changing the position of the boundary causes a different portion of the representation of the person to be displayed). In some embodiments, the second portion includes a greater amount of the representation of the person than the first portion (e.g., changing the position of the boundary displays more of the representation than was previously displayed). In some embodiments, the second portion includes a lesser amount of the representation of the person than the first portion (e.g., changing the position of the boundary displays less of the representation than was previously displayed). In some embodiments, the second portion includes a part of the representation of the person that is not included in the first portion (e.g., changing the position of the boundary reveals a part of the representation that was previously hidden). In some embodiments, the second portion does not include a part of the representation of the person that is included in the first portion (e.g., changing the position of the boundary hides a part of the representation that was previously shown). In some embodiments, the boundary of the representation of the person is moved over time to show and/or hide different portions of the representation of the person. In some embodiments, the boundary of the representation of the person separates a portion of the representation of the person from a background. In some embodiments, the boundary of the representation of the person includes a boundary between a surface of the representation of the person and the background relative to a viewpoint from which the representation of the person is viewed.

In some embodiments, the computer system provides (e.g., outputs audio and/or displays a user interface of) a real-time (e.g., live) communication session. In some embodiments, the representation of the person is displayed and/or otherwise used to communication during the real-time communication session. In some embodiments, a real-time communication session includes real-time communication between participants of the real-time communication session, such as a user of the computer system and one or more other persons (e.g., one or more other users associated with other (e.g., different) computer systems). In some embodiments, providing the real-time communication session includes displaying representations of the person's body (e.g., facial expression, body expression, body position, and/or body movement) via the representation of the person. In some embodiments, providing the real-time communication session includes displaying the representation of the person and/or outputting audio corresponding to utterances of the person in real time. In some embodiments, the computer system and one or more other (e.g., remote and/or external) computer systems are in communication (e.g., wireless communication) with one another to enable transmission of information indicative of the representation of the person and/or audio corresponding to utterances of the person between the computer system and the one or more other computer systems. In some embodiments, a real-time communication session includes an XR experience (e.g., an XR environment). In some embodiments, the real-time communication session includes displaying the representation of the person (and, optionally, a representation of a second person) in an XR environment via display generation components of the computer system and the one or more other computer systems in communication via the real-time communication session.

In some embodiments, the computer system displays the representation of the person in response to detecting (e.g., via one or more input devices) a request (e.g., a manual input, a press of a button, a gesture, a touch input, a voice command, and/or other input) to display the representation of the person and/or an XR environment (e.g., 1301). In some embodiments, the computer system displays the representation of the person in response to detecting movement of the person. In some embodiments, the computer system provides (e.g., displays) an XR experience (e.g., an XR environment and/or a 3D environment) that includes the representation of the person and the background. In some embodiments, the XR experience includes representations of multiple persons in an XR environment including, e.g., the representation of the person and a representation of a user of the computer system.

In some embodiments, the person is associated with (e.g., logged into, using, and/or wearing) the computer system. In some embodiments, the person is associated with (e.g., logged into, using, and/or wearing) an external device different from the computer system. In some embodiments, the representation of the person is associated with a user or computer system that is logged into, participating in, and/or connected to a real-time communication session, an XR experience, and/or XR environment.

Shifting the boundary of the representation of the person over time to change which portions of the representation of the person are visible informs the user about the state (or change in state) of the person (e.g., such as the movement of the one or more corresponding portions of the person), conveys information about the certainty of the appearance of the person (e.g., the accuracy of the representation of the person), and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, updating the representation of the person over time includes: in response to detecting that an appearance of a physical portion of the person (e.g., a body part, a portion of a body part, and/or a physical feature of the person) (e.g., in FIGS. 13H-13I, the side and/or back of the head of person 1302B, hair on the side and/or back of the head of person 1302B, and/or the left shoulder of person 1302B; in FIG. 13J, the top of the head of person 1302B; in FIGS. 13M-13N, the mouth of person 1302B) does not satisfy a set of certainty criteria (e.g., a set of criteria that is based at least in part on a certainty with which the appearance of the physical portion of the person is known; a certainty with which the appearance of the physical portion of the person does not satisfy a certainty threshold; and/or the physical portion of the person is obscured), shifting the boundary of the representation of the person to cease display of (e.g., hide) a portion of the representation of the person that corresponds to the physical portion of the person (e.g., shifting the boundary to display a portion of the representation of the person that does not include the portion of the representation of the person that corresponds to the physical portion of the person). Shifting the boundary of the representation of the person to cease display of the portion that corresponds to a physical portion of the person in response to detecting that an appearance of the physical portion of the person does not satisfy a set of certainty criteria informs the user about the state (or change in state) of the person, conveys information about the certainty of the appearance of the person (e.g., the accuracy of the representation of the person), and updates the appearance of the representation of the person without requiring user input, thereby providing improved visual feedback to the user, reducing the number of inputs needed to perform an operation, and providing a more varied, detailed, and/or realistic user experience while saving storage space. In some embodiments, shifting the boundary of the representation of the person to cease display of the portion of the representation of the person that corresponds to the physical portion of the person includes: displaying the representation of the person with the portion of the representation of the person that corresponds to the physical portion of the person (e.g., displaying 1306A in FIG. 13L) (e.g., movement of the boundary starts from a position below the physical portion and/or from a position at which the portion of the representation of the person that corresponds to the physical portion is visible); and after displaying the representation of the person with the portion of the representation of the person that includes the portion of the representation of the person that corresponds to the physical portion of the person, shifting the boundary of the representation of the person to display the representation of the person without the portion of the representation of the person that corresponds to the physical portion of the person (e.g., as shown in FIG. 13M) (e.g., shifting the boundary to hide the portion of the representation of the person that corresponds to the physical portion of the person). Shifting the boundary to display the representation of the person without the portion that corresponds to the physical portion of the person after displaying the representation with the portion that corresponds to the physical portion informs the user that the appearance (or certainty of appearance) of the physical portion has changed and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, updating the representation of the person over time includes: while an appearance of the person remains within a threshold range of appearances (e.g., while the appearance, and/or a certainty of the appearance, is constant or not changing more than a threshold amount), shifting the boundary of the representation of the person over time (e.g., the boundary moves slightly over time while the person is stationary and/or while a certainty of an appearance of the person is within a threshold certainty range (e.g., is constant or not changing significantly)) (e.g., as described in FIGS. 13B-13C). Shifting the boundary of the representation of the person over time while an appearance of the person remains within a threshold range of appearances provides a dynamic effect that makes the representation of the person appear more natural without requiring user input and indicates that the boundary can shift even if the person is not moving or the appearance of the person is not changing, thereby providing improved visual feedback to the user, reducing the number of inputs needed to perform an operation, and providing a more varied, detailed, and/or realistic user experience while saving storage space.

In some embodiments, shifting the boundary of the representation of the person includes moving the boundary according to simulated motion of a physical liquid (e.g., a fluid dynamic model). Moving the boundary according to simulated motion of a physical liquid provides a dynamic effect that makes the representation of the person appear more natural without requiring user input and indicates that the boundary can shift even if the person is not moving or the appearance of the person is not changing, thereby providing improved visual feedback to the user, reducing the number of inputs needed to perform an operation, and providing a more varied, detailed, and/or realistic user experience while saving storage space.

In some embodiments, the representation of the person includes an interior portion and an exterior portion, the interior portion is farther from the boundary of the representation of the person than the exterior portion; and updating the representation of the person over time includes: in response to detecting a change in certainty of an appearance of an interior portion of the person (e.g., a body part, a portion of a body part, and/or a physical feature of the person) that corresponds to the interior portion of the representation of the person (e.g., the interior portion of the person becomes at least partially obscured from a sensor), shifting the boundary of the representation of the person to cease display of (e.g., hide and/or remove display of) the interior portion and at least a portion of the exterior portion of the representation of the person that is between the boundary of the representation of the person and the interior portion (e.g., shifting the boundary to hide an exterior portion of the representation of the person in response to a change in certainty of an appearance of a portion of the person that corresponds to an interior portion of the representation of the person) (e.g., in FIG. 13M, when the certainty of the appearance of the mouth of person 1302B changes, boundary 1312A moves to hide a portion of 1306A between the representation of the mouth and the position of boundary 1312A in FIG. 13L). Ceasing display of a interior portion and at least a portion of an exterior portion of the representation of the person that is between the boundary of the representation of the person and the interior portion in response to detecting a change in certainty of an appearance of an interior portion of the person informs the user about the state (or change in state) of the interior portion of the person, conveys information about the certainty of the appearance of the person while reducing the impact on the interior portion of the representation (e.g., which often conveys a greater amount of information than a boundary), and updates the appearance of the representation of the person without requiring user input, thereby providing improved visual feedback to the user, reducing the number of inputs needed to perform an operation, and providing a more varied, detailed, and/or realistic user experience while saving storage space.

In some embodiments, shifting the boundary includes moving the boundary (e.g., a portion of the boundary) from a lower region (e.g., a waist, belly, and or forearm) of the representation of the person toward an upper region (e.g., a head and/or fingers) of the representation of the person that is above (e.g., closer to a head and/or fingers of the representation of the person than) the lower region of the representation of the person (e.g., boundary 1312A moves upward in FIGS. 13D, 13E, 13F, 13H, 13I, 13J, 13L, and/or 13M). Moving the boundary from a lower region toward an upper region of the representation of the person informs the user about the state (or change in state) of the person (e.g., such as the movement of the one or more corresponding portions of the person) by impacting portions of the representation that often convey less information or are not used as often for communicating compared to portions higher on the representation (e.g., such as a face of the person), thereby providing improved visual feedback to the user, improving communication between people via the representation of the person, and providing a more varied, detailed, and/or realistic user experience while saving storage space.

In some embodiments, the representation of the person includes one or more of a face (e.g., the face of 1310A), a neck (e.g., the neck of 1310A), one or more shoulders (e.g., the shoulders of 1310A), a torso (e.g., the torso of 1310A), or one or more hands (e.g., 1310B and/or 1310C) (e.g., or representations thereof). In some embodiments, the representation of the person includes one or more arms or portions thereof. Including a face, neck, shoulders, torso, and/or hands in the representation of the person provides a more realistic representation of the person and enables the person to communicate and convey information more effectively, thereby providing improved visual feedback to the user, reducing the number of inputs needed to perform an operation, and providing a more varied, detailed, and/or realistic user experience while saving storage space.

In some embodiments, displaying the representation of the person includes displaying a representation of a shoulder of the person (e.g., the representation of the person includes a representation of a shoulder of the person) (e.g., 1306A in FIG. 13C); and updating the representation of the person over time includes: in response to detection of (e.g., in response to detecting at the computer system or a computer system being used by the person represented by the representation) an arm raise gesture (e.g., upward movement of one or more arms and/or hands of the person; one or more arms and/or hands of the person are being raised; and/or one or more arms and/or hands of the person have been raised), shifting (e.g., moving and/or raising) the boundary to cease display of (e.g., hide and/or remove display of) the representation of the shoulder (e.g., shifting the boundary to display the representation of the person without the representation of the shoulder) (e.g., as shown in FIGS. 13E-13G). Shifting the boundary to cease display of the representation of the shoulder in response to detection of an arm raise gesture conveys to the user that information about the shoulder of the person is uncertain when the person's arm is raised and updates the appearance of the representation of the person without requiring user input, thereby providing improved visual feedback to the user and reducing the number of inputs needed to perform an operation.

In some embodiments, displaying the representation of the person includes displaying a representation of a shoulder of the person (e.g., the representation of the person includes a representation of a shoulder of the person) (e.g., 1306A in FIG. 13C); and updating the representation of the person over time includes: in response to detection of (e.g., in response to detecting at the computer system or a computer system being used by the person represented by the representation) a head turn gesture (e.g., movement of a head of the person; a head of the person is turning; and/or a head of the person has turned), shifting (e.g., moving and/or raising) the boundary to cease display of (e.g., hide and/or remove display of) the representation of the shoulder (e.g., shifting the boundary to display the representation of the person without the representation of the shoulder) (e.g., as shown in FIGS. 13H-13I). Shifting the boundary to cease display of the representation of the shoulder in response to detecting a head turn gesture conveys to the user that information about the shoulder of the person is uncertain when the person's head is turned and updates the appearance of the representation of the person without requiring user input, thereby providing improved visual feedback to the user and reducing the number of inputs needed to perform an operation.

In some embodiments, displaying the representation of the person (e.g., 1306A in FIG. 13L) includes displaying a representation of a mouth of the person (e.g., the representation of the person includes a representation of a mouth of the person); and updating the representation of the person over time includes: in response to detection that (e.g., in response to detecting at the computer system or a computer system being used by the person represented by the representation) the mouth of the person is obscured (e.g., occluded, blocked, hidden, and/or unable to be detected), ceasing display of (e.g., hiding and/or removing display of)

the representation of the mouth (e.g., displaying the representation of the person without the representation of the mouth) (e.g., as shown in FIGS. 13M-13N). In some embodiments, in response to detecting that the mouth of the person is obscured, the computer system shifts (e.g., moves) the boundary to cease display of (e.g., hide and/or remove display of) the representation of the mouth (e.g., shifts the boundary to display the representation of the person without the representation of the mouth). In some embodiments, in response to detecting that the mouth of the person is obscured, the computer system blurs the representation of the mouth, displays the representation of the mouth with an appearance that is not based on a detected appearance of the mouth (e.g., with a neutral expression), and/or reduces a resolution and/or fidelity of the representation of the mouth. Ceasing display of the representation of the mouth in response to detection that the mouth of the person is obscured conveys to the user that information about the mouth of the person is uncertain and updates the appearance of the representation of the person without requiring user input, thereby providing improved visual feedback to the user and reducing the number of inputs needed to perform an operation.

In some embodiments, displaying the representation of the person (e.g., 1306A in FIG. 13C) includes displaying a representation of hair of the person (e.g., the representation of the person includes a representation of hair of the person); and updating the representation of the person over time includes: in response to detection of (e.g., in response to detecting at the computer system or a computer system being used by the person represented by the representation) a head turn gesture (e.g., movement of a head of the person; a head of the person is turning; and/or a head of the person has turned), ceasing display of (e.g., hiding) at least a portion of the representation of the hair (e.g., displaying the representation of the person without the representation of the hair, without a portion of the representation of the hair that was previously displayed, and/or without a representation of a portion of hair that would be visible based on the orientation of the representation of the person) (e.g., as shown in FIGS. 13H-13I). Ceasing display of at least a portion of the representation of the hair in response to detection of a head turn gesture conveys to the user that information about the hair of the person is uncertain when the head of the person is turned and updates the appearance of the representation of the person without requiring user input, thereby providing improved visual feedback to the user and reducing the number of inputs needed to perform an operation.

In some embodiments, displaying the representation of the person (e.g., 1306A in FIG. 13C) includes displaying a representation of a head of the person (e.g., the representation of the person includes a representation of a head of the person); and updating the representation of the person over time includes: in response to detection of (e.g., in response to detecting at the computer system or a computer system being used by the person represented by the representation) a head turn gesture (e.g., movement of a head of the person; a head of the person is turning; and/or a head of the person has turned), displaying the representation of the person without at least a portion of the head (e.g., without displaying at least a portion of a side and/or back of the head) (e.g., as shown in FIGS. 13H-13I). Displaying the representation of the person without at least a portion of the head in response to detection of a head turn gesture conveys to the user that information about the portion of the head (e.g., the back and/or side of the head) is uncertain when the head of the person is turned and updates the appearance of the representation of the person without requiring user input, thereby providing improved visual feedback to the user and reducing the number of inputs needed to perform an operation.

In some embodiments, shifting the boundary of the representation of the person over time includes moving the boundary with simulated inertia (e.g., and/or simulated momentum) (e.g., after the border begins to move in a respective direction in response to movement of the person, the border continues to move in the respective direction after the person has stopped moving or moves in a different direction) (e.g., as shown in FIGS. 13E-13F and FIG. 13M). Moving the boundary with simulated inertia provides a dynamic effect that makes the representation of the person appear more natural without requiring user input, thereby providing improved visual feedback to the user, reducing the number of inputs needed to perform an operation, and providing a more varied, detailed, and/or realistic user experience while saving storage space.

In some embodiments, shifting the boundary of the representation of the person over time includes decreasing (e.g., gradually decreasing) over time a speed of movement of the boundary (e.g., such that the boundary stops moving when the boundary reaches a target position, such as the second position) (e.g., to the position of 1312 in FIGS. 13G, 13I, and/or 13N). Decreasing over time a speed of movement of the boundary provides a dynamic effect that makes the representation of the person appear more natural without requiring user input and indicates that the boundary can shift even if the person is not moving or the appearance of the person is not changing, thereby providing improved visual feedback to the user, reducing the number of inputs needed to perform an operation, and providing a more varied, detailed, and/or realistic user experience while saving storage space.

In some embodiments, shifting the boundary of the representation of the person over time includes: moving the boundary (e.g., in a first direction) to a target position (e.g., the second position) (e.g., the position of 1312 in FIG. 13E); moving the boundary (e.g., in the first direction) beyond (e.g., away from) the target position (e.g., to the position of 1312 in FIG. 13F; or to the position of 1312 in FIG. 13M) (e.g., hiding more of the representation of the person than would be hidden if the boundary were at the target position); and moving the boundary (e.g., in a second directions, such as a direction opposite the first direction) back towards (e.g., back towards and/or to) the target position (e.g., moving the boundary toward the target position, then moving the boundary past the target position, and then moving the boundary back toward the target position; and/or the boundary overshoots the target position and then retreats) (e.g., revealing a portion of the representation of the person that was hidden when the boundary moved beyond the target position) (e.g., as shown in FIG. 13G; or as shown in FIG. 13N). Moving the boundary to the target position, moving the boundary past the target position, and moving the boundary toward the target position provides a dynamic effect that makes the representation of the person appear more natural without requiring user input, thereby providing improved visual feedback to the user, reducing the number of inputs needed to perform an operation, and providing a more varied, detailed, and/or realistic user experience while saving storage space.

In some embodiments, displaying the representation of the person includes displaying the boundary (e.g., 1312A, 1312B, 1312C, and/or 1312D) of the representation of the person with a feathering effect (e.g., fading and/or blending the representation of the person with a background element at the boundary of the representation of the person). In some embodiments, a feathering effect includes gradually fading between colors of pixels and colors of surrounding pixels. In some embodiments, a feathering effect includes blending colors of pixels with colors of surrounding pixels. In some embodiments, a feathering effect includes gradually increasing a transparency of the representation of the person in a direction that is away from the boundary. Displaying the boundary of the representation of the person with a feathering effect provides a dynamic effect that makes the representation of the person appear more natural without requiring user input and informs the user about the state of the person and the amount of information that is known about the boundary, thereby providing improved visual feedback to the user, reducing the number of inputs needed to perform an operation, and providing a more varied, detailed, and/or realistic user experience while saving storage space.

In some embodiments, displaying the representation of the person includes displaying a representation of a face of the person (e.g., the representation of the person includes a representation of a face of the person) (e.g., as shown in FIG. 13L); and updating the representation of the person over time includes: in response to detecting that the face (or, in some embodiments, a portion of the face) of the person is obscured (e.g., occluded, blocked, hidden, and/or unable to be detected) (e.g., as shown in FIGS. 13M-13N), maintaining an appearance of the representation of the face that was displayed prior (e.g., immediately prior) to detecting that the face of the person is obscured (e.g., the appearance of the representation of the face of 1306A in FIG. 13L) (e.g., the computer system holds the last frame of the representation of the face that was displayed before detecting that the face is occluded) for at least a threshold amount of time (e.g., 0.02, 0.05, 0.1, 0.2, 0.5, or 1 seconds). In some embodiments, the threshold amount of time is an amount of time that it takes to animate the boundary moving beyond the location of a portion of the representation of the person that includes a feature that was obscured (e.g., temporarily holding a frame of the representation of the face while the computer system moves the boundary to hide that portion of the face so that an inaccurate facial expression is not displayed due to the fact that the feature was obscured). Maintaining the appearance of the representation of the face that was displayed prior to detecting that the face of the person is obscured provides a more accurate representation of the face of the person when information is currently uncertain, thereby providing improved visual feedback to the user and provides a more detailed and/or realistic user experience.

In some embodiments, displaying the representation of the person (e.g., including updating the representation of the person over time) includes displaying the representation of the person such that the boundary (e.g., a shape, direction, and/or path of the boundary) (e.g., a shape, direction, and/or path of 1312A, 1312B, 1312C, and/or 1312D) does not change by more than a threshold amount (e.g., the boundary changes gradually or not at all) over a length (e.g., a path) of the boundary (e.g., the boundary does not include any sharp corners; and/or a curvature at any point on the boundary is not less than a threshold radius of curvature). Displaying the representation of the person such that the boundary does not change by more than a threshold amount over a length of the boundary avoids sharp corners in the boundary that may appear unnatural and makes the representation of the person appear more natural without requiring user input, thereby providing improved visual feedback to the user, reducing the number of inputs needed to perform an operation, and providing a more varied, detailed, and/or realistic user experience while saving storage space.

In some embodiments, shifting the boundary of the representation of the person includes: in accordance with a determination that the movement of the one or more corresponding portions of the person has a first speed of movement (e.g., moves with a first speed) (e.g., the transition from FIG. 13C to FIG. 13E occurs over a first amount of time), moving the boundary with a first boundary speed; and in accordance with a determination that the movement of the one or more corresponding portions of the person has a second speed of movement (e.g., moves with a second speed) (e.g., the transition from FIG. 13C to FIG. 13E occurs over a second amount of time that is different from the first amount of time) that is different from (e.g., greater than or less than) the first speed of movement, moving the boundary with a second boundary speed that is different from the first boundary speed (e.g., the speed of movement of the boundary is directly proportional to the speed of movement of the one or more corresponding portions of the person; and/or the boundary moves faster in response to faster movement of the one or more corresponding portions of the person and moves slower in response to slower movement of the one or more corresponding portions of the person). Moving the boundary with a speed based on the speed of movement of the one or more corresponding portions of the person enables the representation of the person to more accurately reflect the state of the person and provides a dynamic effect that makes the representation of the person appear more responsive and natural without requiring user input, thereby providing improved visual feedback to the user, reducing the number of inputs needed to perform an operation, performing an operation when a set of conditions has been met without requiring further user input, and providing a more varied, detailed, and/or realistic user experience while saving storage space.

In some embodiments, displaying the representation (e.g., 1306A) of the person includes displaying a representation (e.g., 1310A) of a torso (e.g., and/or a head, neck, shoulders, chest, and/or belly) of the person and a representation (e.g., 1310B and/or 1310C) of one or more hands of the person (e.g., the representation of the person includes a representation of a torso and a representation of one or more hands); the boundary (e.g., 1312) of the representation of the person includes a torso boundary (e.g., 1312A) on the representation of the torso and a hand boundary (e.g., 1312B and/or 1312C) on the representation of the one or more hands of the person; and shifting the boundary includes shifting the torso boundary over time and shifting the hands boundary over time (e.g., concurrently shifting the torso boundary over time and the hands boundary over time). In some embodiments, the torso boundary is shifted independently from the hands boundary (e.g., the torso boundary and the hands boundary are shifted by different amounts, in different directions, and/or at different times). Shifting a boundary of a torso and a boundary of hands over time conveys more precise information about particular portions of the person, enables the representation of the person to more accurately reflect the state of the person, and provides a dynamic effect that makes the representation of the person appear more responsive and natural without requiring user input, thereby providing improved visual feedback to the user, reducing the number of inputs needed to perform an operation, and providing a more varied, detailed, and/or realistic user experience while saving storage space.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for displaying a representation of a person. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components, the computer system comprising:

one or more processors; and memory storing one or more programs configured to be executed by the one or more processors, the one or more programs including instructions for:

displaying, via the one or more display generation components, a representation of a person, including displaying a representation of a face of the person with a first visual fidelity; and in response to a determination that a mouth of the person is occluded, visually deemphasizing at least a portion of the representation of the face of the person, including changing an appearance of the representation of the face of the person from the representation of the face of the person with the first visual fidelity to the representation of the face of the person with a second visual fidelity that is less than the first visual fidelity.

2. The computer system of claim 1, the one or more programs further including instructions for:
while displaying the representation of the face of the person with the first visual fidelity, changing a state of the representation of the face of the person in response to a change in an expression of the person.

3. The computer system of claim 1, the one or more programs further including instructions for:
while displaying the representation of the face of the person with the second visual fidelity, maintaining a state of the representation of the face of the person when an expression of the person changes.

4. The computer system of claim 1, wherein displaying the representation of the face of the person with the second visual fidelity is performed when the mouth of the person is occluded by a hand.

5. The computer system of claim 1, wherein displaying the representation of the face of the person with the second visual fidelity is performed when the mouth of the person is occluded by a non-anatomical object.

6. The computer system of claim 1, wherein deemphasizing at least a portion of the representation of the person includes blurring an entirety of the representation of the person.

7. The computer system of claim 1, wherein deemphasizing at least a portion of the representation of the person includes increasing an animated noise effect.

8. The computer system of claim 1, wherein deemphasizing at least a portion of the representation of the person includes changing a simulated lighting effect on the at least a portion of the representation of the person.

9. The computer system of claim 1, the one or more programs further including instructions for:
while displaying the representation of the face of the person with the first visual fidelity, tracking a mouth of the person according to a first tracking algorithm; and
in response to a determination that the mouth of the person is occluded, tracking the mouth of the person according to a second tracking algorithm that is different from the first tracking algorithm.

10. The computer system of claim 1, the one or more programs further including instructions for:
after displaying the representation of the face of the person with the second visual fidelity:
in response to a determination that the mouth of the person is not occluded, displaying the representation of the face of the person with the first visual fidelity.

11. The computer system of claim 1, the one or more programs further including instructions for:
after displaying the representation of the face of the person with the second visual fidelity:
in accordance with a determination that the mouth of the person has been occluded for a first threshold amount of time, ceasing display of the representation of the person.

12. The computer system of claim 1, wherein the representation of the person includes an anatomical representation of the person, the one or more programs further including instructions for:
after displaying the representation of the face of the person with the second visual fidelity:

in accordance with a determination that the mouth of the person has been occluded for a second threshold amount of time, displaying a non-anatomical representation of the person without displaying the anatomical representation.

13. The computer system of claim 1, wherein displaying the representation of the face of the person with the second visual fidelity includes:
in accordance with a determination that the face of the person is being tracked with a first degree of confidence, displaying the representation of the face of the person with a first expression; and
in accordance with a determination that the face of the person is being tracked with a second degree of confidence that is different from the first degree of confidence, displaying the representation of the face of the person with a second expression.

14. The computer system of claim 1, wherein the representation of the person is displayed as a part of a real-time communication session between a user of the computer system and one or more other participants including a participant corresponding to the person represented by the representation of the person.

15. The computer system of claim 1, wherein displaying the representation of the person includes displaying movement of the representation of the person in response to physical movement of the person.

16. The computer system of claim 1, the one or more programs further including instructions for:
in response to the determination that the mouth of the person is occluded, displaying, via the one or more display generation components, a darker region on a portion of the representation of the face of the person that corresponds to a mouth of the person.

17. The computer system of claim 16, wherein displaying the darker region on the portion of the representation of the face of the person that corresponds to a mouth of the person includes displaying a color pattern that varies over time in the darker region.

18. A non-transitory computer-readable storage medium storing one or more programs configured to be executed by one or more processors of a computer system that is in communication with one or more display generation components, the one or more programs including instructions for:
displaying, via the one or more display generation components, a representation of a person, including displaying a representation of a face of the person with a first visual fidelity; and
in response to a determination that a mouth of the person is occluded, visually deemphasizing at least a portion of the representation of the face of the person, including changing an appearance of the representation of the face of the person from the representation of the face of the person with the first visual fidelity to the representation of the face of the person with a second visual fidelity that is less than the first visual fidelity.

19. A method, comprising:
at a computer system that is in communication with one or more display generation components:
displaying, via the one or more display generation components, a representation of a person, including displaying a representation of a face of the person with a first visual fidelity; and
in response to a determination that a mouth of the person is occluded, visually deemphasizing at least a portion of the representation of the face of the person, including changing an appearance of the representation of the face of the person from the representation of the face of the person with the first visual fidelity to the representation of the face of the person with a second visual fidelity that is less than the first visual fidelity.

20. The non-transitory computer-readable storage medium of claim 18, the one or more programs further including instructions for:

while displaying the representation of the face of the person with the first visual fidelity, changing a state of the representation of the face of the person in response to a change in an expression of the person.

21. The non-transitory computer-readable storage medium of claim 18, the one or more programs further including instructions for:

while displaying the representation of the face of the person with the second visual fidelity, maintaining a state of the representation of the face of the person when an expression of the person changes.

22. The non-transitory computer-readable storage medium of claim 18, wherein displaying the representation of the face of the person with the second visual fidelity is performed when the mouth of the person is occluded by a hand.

23. The non-transitory computer-readable storage medium of claim 18, wherein displaying the representation of the face of the person with the second visual fidelity is performed when the mouth of the person is occluded by a non-anatomical object.

24. The non-transitory computer-readable storage medium of claim 18, the one or more programs further including instructions for:

while displaying the representation of the face of the person with the first visual fidelity, tracking a mouth of the person according to a first tracking algorithm; and in response to a determination that the mouth of the person is occluded, tracking the mouth of the person according to a second tracking algorithm that is different from the first tracking algorithm.

25. The non-transitory computer-readable storage medium of claim 18, the one or more programs further including instructions for:

after displaying the representation of the face of the person with the second visual fidelity:

in response to a determination that the mouth of the person is not occluded, displaying the representation of the face of the person with the first visual fidelity.

26. The non-transitory computer-readable storage medium of claim 18, the one or more programs further including instructions for:

after displaying the representation of the face of the person with the second visual fidelity:

in accordance with a determination that the mouth of the person has been occluded for a first threshold amount of time, ceasing display of the representation of the person.

27. The non-transitory computer-readable storage medium of claim 18, wherein the representation of the person includes an anatomical representation of the person, the one or more programs further including instructions for:

after displaying the representation of the face of the person with the second visual fidelity:

in accordance with a determination that the mouth of the person has been occluded for a second threshold amount of time, displaying a non-anatomical representation of the person without displaying the anatomical representation.

28. The non-transitory computer-readable storage medium of claim 18, wherein displaying the representation of the face of the person with the second visual fidelity includes:

in accordance with a determination that the face of the person is being tracked with a first degree of confidence, displaying the representation of the face of the person with a first expression; and in accordance with a determination that the face of the person is being tracked with a second degree of confidence that is different from the first degree of confidence, displaying the representation of the face of the person with a second expression.

29. The non-transitory computer-readable storage medium of claim 18, wherein the representation of the person is displayed as a part of a real-time communication session between a user of the computer system and one or more other participants including a participant corresponding to the person represented by the representation of the person.

30. The non-transitory computer-readable storage medium of claim 18, wherein displaying the representation of the person includes displaying movement of the representation of the person in response to physical movement of the person.

31. The non-transitory computer-readable storage medium of claim 18, the one or more programs further including instructions for:

in response to the determination that the mouth of the person is occluded, displaying, via the one or more display generation components, a darker region on a portion of the representation of the face of the person that corresponds to a mouth of the person.

32. The method of claim 19, further comprising:

while displaying the representation of the face of the person with the first visual fidelity, changing a state of the representation of the face of the person in response to a change in an expression of the person.

33. The method of claim 19, further comprising:

while displaying the representation of the face of the person with the second visual fidelity, maintaining a state of the representation of the face of the person when an expression of the person changes.

34. The method of claim 19, wherein displaying the representation of the face of the person with the second visual fidelity is performed when the mouth of the person is occluded by a hand.

35. The method of claim 19, wherein displaying the representation of the face of the person with the second visual fidelity is performed when the mouth of the person is occluded by a non-anatomical object.

36. The method of claim 19, further comprising:

while displaying the representation of the face of the person with the first visual fidelity, tracking a mouth of the person according to a first tracking algorithm; and in response to a determination that the mouth of the person is occluded, tracking the mouth of the person according to a second tracking algorithm that is different from the first tracking algorithm.

37. The method of claim 19, further comprising:

after displaying the representation of the face of the person with the second visual fidelity:

in response to a determination that the mouth of the person is not occluded, displaying the representation of the face of the person with the first visual fidelity.

38. The method of claim 19, further comprising:

after displaying the representation of the face of the person with the second visual fidelity:

in accordance with a determination that the mouth of the person has been occluded for a first threshold amount of time, ceasing display of the representation of the person.

39. The method of claim 19, wherein the representation of the person includes an anatomical representation of the person, the method further comprising:

after displaying the representation of the face of the person with the second visual fidelity:

in accordance with a determination that the mouth of the person has been occluded for a second threshold amount of time, displaying a non-anatomical representation of the person without displaying the anatomical representation.

40. The method of claim 19, wherein displaying the representation of the face of the person with the second visual fidelity includes:

in accordance with a determination that the face of the person is being tracked with a first degree of confidence, displaying the representation of the face of the person with a first expression; and in accordance with a determination that the face of the person is being tracked with a second degree of confidence that is different from the first degree of confidence, displaying the representation of the face of the person with a second expression.

41. The method of claim 19, wherein the representation of the person is displayed as a part of a real-time communication session between a user of the computer system and one or more other participants including a participant corresponding to the person represented by the representation of the person.

42. The method of claim 19, wherein displaying the representation of the person includes displaying movement of the representation of the person in response to physical movement of the person.

43. The method of claim 19, further comprising:

in response to the determination that the mouth of the person is occluded, displaying, via the one or more display generation components, a darker region on a portion of the representation of the face of the person that corresponds to a mouth of the person.

* * * * *